US012695768B2

(12) United States Patent
Maya et al.

(10) Patent No.: US 12,695,768 B2
(45) Date of Patent: Jul. 28, 2026

(54) MONITORING A SOFTWARE DEVELOPMENT PIPELINE

(71) Applicant: LACEWORK, INC., San Jose, CA (US)

(72) Inventors: Salim Afiune Maya, Oakland, CA (US); David M. Hazekamp, Tinley Park, IL (US); Úlfar Erlingsson, Palo Alto, CA (US); Yijou Chen, Cupertino, CA (US)

(73) Assignee: FORTINET, INC., Sunnyvale, CA (US)

( * ) Notice: Subject to any disclaimer, the term of this patent is extended or adjusted under 35 U.S.C. 154(b) by 152 days.

(21) Appl. No.: 17/838,974

(22) Filed: Jun. 13, 2022

(65) Prior Publication Data

US 2022/0311794 A1 Sep. 29, 2022

Related U.S. Application Data

(63) Continuation-in-part of application No. 17/504,311, filed on Oct. 18, 2021, now Pat. No. 11,677,772, (Continued)

(51) Int. Cl.
*H04L 9/40* (2022.01)
*G06F 9/455* (2018.01)
(Continued)

(52) U.S. Cl.
CPC .......... *H04L 63/1425* (2013.01); *G06F 9/455* (2013.01); *G06F 9/545* (2013.01); *G06F 16/2456* (2019.01); *G06F 16/9024* (2019.01);

*G06F 16/9038* (2019.01); *G06F 16/9535* (2019.01); *G06F 16/9537* (2019.01); (Continued)

(58) Field of Classification Search
None
See application file for complete search history.

(56) References Cited

U.S. PATENT DOCUMENTS

| | | | |
|---|---|---|---|
| 5,584,024 A | 12/1996 | Shwartz | |
| 5,806,062 A | 9/1998 | Chen et al. | |

(Continued)

FOREIGN PATENT DOCUMENTS

| | | |
|---|---|---|
| CN | 111652396 A | 9/2020 |
| EP | 3693874 A1 | 8/2020 |

(Continued)

OTHER PUBLICATIONS

International Search Report and Written Opinion, PCT/US2023/021022, mailed Aug. 1, 2023, 9 pages.

(Continued)

*Primary Examiner* — Syed A Roni

(74) *Attorney, Agent, or Firm* — Jaffery Watson Hamilton & DeSanctis LLP

(57) ABSTRACT

Monitoring a software development pipeline, including: retrieving, from one or more components in the software development pipeline, information associated with a software application; identifying, based on the information associated with the software application, an anomaly associated with the software application; and performing one or more remedial actions based on the anomaly.

20 Claims, 52 Drawing Sheets

Related U.S. Application Data which is a continuation of application No. 16/665, 961, filed on Oct. 28, 2019, now Pat. No. 11,153,339, which is a continuation of application No. 16/134, 794, filed on Sep. 18, 2018, now Pat. No. 10,581,891.

(60) Provisional application No. 63/287,506, filed on Dec. 8, 2021, provisional application No. 63/244,336, filed on Sep. 15, 2021, provisional application No. 63/241,966, filed on Sep. 8, 2021, provisional application No. 62/650,971, filed on Mar. 30, 2018, provisional application No. 62/590,986, filed on Nov. 27, 2017.

(51) Int. Cl.

| | |
|---|---|
| *G06F 9/54* | (2006.01) |
| *G06F 16/2455* | (2019.01) |
| *G06F 16/901* | (2019.01) |
| *G06F 16/9038* | (2019.01) |
| *G06F 16/9535* | (2019.01) |
| *G06F 16/9537* | (2019.01) |
| *G06F 21/57* | (2013.01) |
| *H04L 67/306* | (2022.01) |
| *H04L 67/50* | (2022.01) |

(52) U.S. Cl.
CPC ............ *G06F 21/57* (2013.01); *G06F 21/577* (2013.01); *H04L 63/10* (2013.01); *H04L 67/306* (2013.01); *H04L 67/535* (2022.05); *G06F 2221/033* (2013.01)

(56) References Cited

U.S. PATENT DOCUMENTS

| | | | |
|---|---|---|---|
| 6,347,339 | B1 | 2/2002 | Morris et al. |
| 6,363,411 | B1 | 3/2002 | Dugan et al. |
| 6,434,663 | B1 | 8/2002 | Grimsrud et al. |
| 6,938,084 | B2 | 8/2005 | Gamache et al. |
| 7,054,873 | B2 | 5/2006 | Nordström et al. |
| 7,233,333 | B2 | 6/2007 | Lomask |
| 7,310,733 | B1 | 12/2007 | Pearson et al. |
| 7,478,246 | B2 | 1/2009 | Arndt et al. |
| 7,484,091 | B2 | 1/2009 | Bade et al. |
| 7,526,501 | B2 | 4/2009 | Albahari et al. |
| 7,529,801 | B2 | 5/2009 | Moore et al. |
| 7,562,045 | B2 | 7/2009 | Beadle et al. |
| 7,707,411 | B2 | 4/2010 | Bade et al. |
| 7,739,211 | B2 | 6/2010 | Coffman et al. |
| 7,743,153 | B2 | 6/2010 | Hall et al. |
| 7,747,559 | B2 | 6/2010 | Leitner et al. |
| 7,765,431 | B2 | 7/2010 | Agha et al. |
| 7,797,548 | B2 | 9/2010 | Pearson et al. |
| 7,856,544 | B2 | 12/2010 | Schenfeld et al. |
| 7,926,026 | B2 | 4/2011 | Klein et al. |
| 7,962,635 | B2 | 6/2011 | Naidu et al. |
| 7,996,885 | B2 | 8/2011 | Jaiswal et al. |
| 8,032,925 | B2 | 10/2011 | Cho |
| 8,037,284 | B2 | 10/2011 | Schenfeld et al. |
| 8,037,521 | B2 | 10/2011 | Minato |
| 8,050,907 | B2 | 11/2011 | Baisley et al. |
| 8,086,852 | B2 | 12/2011 | Bade et al. |
| 8,103,906 | B1 | 1/2012 | Alibakhsh et al. |
| 8,122,122 | B1 | 2/2012 | Clingenpeel et al. |
| 8,140,977 | B2 | 3/2012 | Kriss et al. |
| 8,151,107 | B2 | 4/2012 | Song et al. |
| 8,160,999 | B2 | 4/2012 | Jin et al. |
| 8,209,204 | B2 | 6/2012 | Adler et al. |
| 8,276,197 | B1 | 9/2012 | Mangal et al. |
| 8,291,233 | B2 | 10/2012 | Pearson et al. |
| 8,301,660 | B2 | 10/2012 | Yalamanchi |
| 8,341,711 | B1 | 12/2012 | Pennington et al. |
| 8,351,456 | B2 | 1/2013 | Kadous et al. |
| 8,352,589 | B2 | 1/2013 | Ridel et al. |

| | | | |
|---|---|---|---|
| 8,359,584 | B2 | 1/2013 | Rao et al. |
| 8,443,442 | B2 | 5/2013 | Wang et al. |
| 8,490,055 | B2 | 7/2013 | Basak |
| 8,497,863 | B2 | 7/2013 | Xie et al. |
| 8,549,002 | B2 | 10/2013 | Herter et al. |
| 8,561,157 | B2 | 10/2013 | Ge |
| 8,595,262 | B1 | 11/2013 | Hayden |
| 8,607,306 | B1 | 12/2013 | Bridge et al. |
| 8,655,989 | B2 | 2/2014 | Ritter et al. |
| 8,671,453 | B2 | 3/2014 | Underwood et al. |
| 8,725,587 | B2 | 5/2014 | Beadle et al. |
| 8,826,403 | B2 | 9/2014 | Bhaskaran et al. |
| 8,843,646 | B2 | 9/2014 | Kuzin et al. |
| 8,862,524 | B2 | 10/2014 | Zheng et al. |
| 8,959,608 | B2 | 2/2015 | Ahmed et al. |
| 9,021,583 | B2 | 4/2015 | Wittenstein et al. |
| 9,037,273 | B2 | 5/2015 | Mikkelsen |
| 9,043,764 | B2 | 5/2015 | Ranganathan et al. |
| 9,053,306 | B2 | 6/2015 | Yoshigaki et al. |
| 9,053,437 | B2 | 6/2015 | Adler et al. |
| 9,064,210 | B1 | 6/2015 | Hart |
| 9,075,618 | B2 | 7/2015 | Winternitz et al. |
| 9,110,873 | B2 | 8/2015 | Woodall et al. |
| 9,159,024 | B2 | 10/2015 | Bhanot et al. |
| 9,189,623 | B1 | 11/2015 | Lin et al. |
| 9,225,730 | B1 | 12/2015 | Brezinski |
| 9,231,935 | B1 | 1/2016 | Bridge et al. |
| 9,239,873 | B2 | 1/2016 | Branch et al. |
| 9,246,897 | B2 | 1/2016 | He |
| 9,323,806 | B2 | 4/2016 | Sadikov et al. |
| 9,332,020 | B2 | 5/2016 | Thomas et al. |
| 9,369,450 | B1 | 6/2016 | Barak et al. |
| 9,391,978 | B2 | 7/2016 | Burch et al. |
| 9,400,882 | B2 | 7/2016 | Pearson et al. |
| 9,430,830 | B2 | 8/2016 | Madabhushi et al. |
| 9,495,522 | B2 | 11/2016 | Singh et al. |
| 9,497,224 | B2 | 11/2016 | Sweet et al. |
| 9,515,999 | B2 | 12/2016 | Ylonen |
| 9,516,053 | B1 | 12/2016 | Muddu et al. |
| 9,537,851 | B2 | 1/2017 | Gordon et al. |
| 9,558,265 | B1 | 1/2017 | Tacchi et al. |
| 9,569,869 | B2 | 2/2017 | Hesse et al. |
| 9,582,766 | B2 | 2/2017 | Sadikov et al. |
| 9,589,069 | B2 | 3/2017 | Yang et al. |
| 9,591,010 | B1 | 3/2017 | Muddu et al. |
| 9,596,253 | B2 | 3/2017 | Chauhan et al. |
| 9,596,254 | B1 | 3/2017 | Muddu et al. |
| 9,596,295 | B2 | 3/2017 | Banadaki et al. |
| 9,600,915 | B2 | 3/2017 | Winternitz et al. |
| 9,602,506 | B2 | 3/2017 | Kang et al. |
| 9,602,526 | B2 | 3/2017 | Liu et al. |
| 9,639,676 | B2 | 5/2017 | Betz et al. |
| 9,652,875 | B2 | 5/2017 | Vassilvitskii et al. |
| 9,654,503 | B1 | 5/2017 | Kowalyshyn |
| 9,659,337 | B2 | 5/2017 | Lee et al. |
| 9,665,660 | B2 | 5/2017 | Wensel |
| 9,667,641 | B2 | 5/2017 | Muddu et al. |
| 9,678,850 | B1 | 6/2017 | Rickard et al. |
| 9,679,243 | B2 | 6/2017 | Zou et al. |
| 9,690,553 | B1 * | 6/2017 | Brodie ..................... G06F 8/71 |
| 9,699,205 | B2 | 7/2017 | Muddu et al. |
| 9,710,332 | B1 | 7/2017 | Fan et al. |
| 9,720,703 | B2 | 8/2017 | Reick et al. |
| 9,720,704 | B2 | 8/2017 | Reick et al. |
| 9,727,441 | B2 | 8/2017 | Agarwal et al. |
| 9,727,604 | B2 | 8/2017 | Jin et al. |
| 9,729,416 | B1 | 8/2017 | Khanal et al. |
| 9,734,040 | B2 | 8/2017 | Gounares |
| 9,740,744 | B2 | 8/2017 | Stetson et al. |
| 9,741,138 | B2 | 8/2017 | Friedlander et al. |
| 9,749,339 | B2 | 8/2017 | Kadambe et al. |
| 9,753,960 | B1 | 9/2017 | Troyanovsky |
| 9,760,619 | B1 | 9/2017 | Lattanzi et al. |
| 9,781,115 | B2 | 10/2017 | Heise |
| 9,787,705 | B1 | 10/2017 | Love et al. |
| 9,805,080 | B2 | 10/2017 | Joshi et al. |
| 9,805,140 | B2 | 10/2017 | Chakrabarti et al. |
| 9,811,790 | B2 | 11/2017 | Ahern et al. |
| 9,813,435 | B2 | 11/2017 | Muddu et al. |

(56)                References Cited

U.S. PATENT DOCUMENTS

| | | | |
|---|---|---|---|
| 9,819,671 | B2 | 11/2017 | Ji |
| 9,824,473 | B2 | 11/2017 | Winternitz et al. |
| 9,830,435 | B2 | 11/2017 | Haven |
| 9,836,183 | B1 | 12/2017 | Love et al. |
| 9,838,410 | B2 | 12/2017 | Muddu et al. |
| 9,843,837 | B2 | 12/2017 | Gopalan |
| 9,852,230 | B2 | 12/2017 | Fleury et al. |
| 9,853,968 | B2 | 12/2017 | Shen et al. |
| 9,864,672 | B2 | 1/2018 | Seto et al. |
| 9,887,999 | B2 | 2/2018 | Dong et al. |
| 9,923,911 | B2 | 3/2018 | Vasseur et al. |
| 9,942,220 | B2 | 4/2018 | Bajenov et al. |
| 9,946,800 | B2 | 4/2018 | Qian et al. |
| 9,953,014 | B1 | 4/2018 | Reshadi et al. |
| 9,954,842 | B2 | 4/2018 | Huang |
| 9,985,827 | B2 | 5/2018 | Li et al. |
| 10,003,605 | B2 | 6/2018 | Muddu et al. |
| 10,033,611 | B1 | 7/2018 | Linkous et al. |
| 10,104,071 | B2 | 10/2018 | Gordon et al. |
| 10,115,111 | B2 | 10/2018 | Miltonberger |
| 10,116,670 | B2 | 10/2018 | Muddu et al. |
| 10,121,000 | B1 | 11/2018 | Rivlin et al. |
| 10,122,740 | B1 | 11/2018 | Finkelshtein et al. |
| 10,127,273 | B2 | 11/2018 | Dickey |
| 10,142,357 | B1 | 11/2018 | Tamersoy et al. |
| 10,148,677 | B2 | 12/2018 | Muddu et al. |
| 10,149,148 | B2 | 12/2018 | Zha et al. |
| 10,158,652 | B2 | 12/2018 | Muddu et al. |
| 10,182,058 | B2 | 1/2019 | Xu |
| 10,205,735 | B2 | 2/2019 | Apostolopoulos |
| 10,205,736 | B2 | 2/2019 | Rieke et al. |
| 10,237,254 | B2 | 3/2019 | McDowell et al. |
| 10,237,294 | B1 | 3/2019 | Zadeh et al. |
| 10,243,970 | B2 | 3/2019 | Muddu et al. |
| 10,249,266 | B2 | 4/2019 | Zamir |
| 10,254,848 | B2 | 4/2019 | Winternitz et al. |
| 10,331,659 | B2 | 6/2019 | Ahuja et al. |
| 10,338,895 | B2 | 7/2019 | Zhang et al. |
| 10,339,309 | B1 | 7/2019 | Kling et al. |
| 10,367,704 | B2 | 7/2019 | Giura et al. |
| 10,382,303 | B2 | 8/2019 | Khanal et al. |
| 10,382,529 | B2 | 8/2019 | Wan et al. |
| 10,389,738 | B2 | 8/2019 | Muddu et al. |
| 10,389,742 | B2 | 8/2019 | Reddy et al. |
| 10,419,463 | B2 | 9/2019 | Muddu et al. |
| 10,419,465 | B2 | 9/2019 | Muddu et al. |
| 10,419,468 | B2 | 9/2019 | Glatfelter et al. |
| 10,419,469 | B1 | 9/2019 | Singh et al. |
| 10,425,437 | B1 | 9/2019 | Bog et al. |
| 10,432,639 | B1 | 10/2019 | Bebee et al. |
| 10,447,526 | B2 | 10/2019 | Tucker et al. |
| 10,454,753 | B2 | 10/2019 | Sasturkar et al. |
| 10,454,889 | B2 | 10/2019 | Huang |
| 10,459,979 | B2 | 10/2019 | Piechowicz et al. |
| 10,462,169 | B2 | 10/2019 | Durairaj et al. |
| 10,491,705 | B2 | 11/2019 | Oetting et al. |
| 10,496,263 | B2 | 12/2019 | So et al. |
| 10,496,468 | B2 | 12/2019 | Gefen et al. |
| 10,496,678 | B1 | 12/2019 | Tang |
| 10,505,818 | B1 | 12/2019 | Yona et al. |
| 10,510,007 | B2 | 12/2019 | Singhal et al. |
| 10,515,095 | B2 | 12/2019 | Childress et al. |
| 10,521,584 | B1 | 12/2019 | Mehr |
| 10,534,633 | B2 | 1/2020 | Hilemon et al. |
| 10,547,521 | B1 | 1/2020 | Roy et al. |
| 10,560,309 | B1 | 2/2020 | Chitalia et al. |
| 10,565,373 | B1 | 2/2020 | Rao et al. |
| 10,581,891 | B1 | 3/2020 | Kapoor et al. |
| 10,587,609 | B2 | 3/2020 | Ebrahimi et al. |
| 10,592,535 | B2 | 3/2020 | Ahn et al. |
| 10,594,718 | B1 | 3/2020 | Deaguero et al. |
| 10,599,718 | B2 | 3/2020 | Kumar et al. |
| RE47,937 | E | 4/2020 | Ramachandran et al. |
| RE47,952 | E | 4/2020 | Ramachandran et al. |
| 10,614,200 | B2 | 4/2020 | Betz et al. |
| 10,642,867 | B2 | 5/2020 | Palanciuc |
| 10,656,979 | B2 | 5/2020 | Ishakian et al. |
| 10,664,757 | B2 | 5/2020 | Lastras-Montano et al. |
| 10,666,668 | B2 | 5/2020 | Muddu et al. |
| 10,673,880 | B1 | 6/2020 | Pratt et al. |
| 10,685,295 | B1 | 6/2020 | Ross et al. |
| 10,691,810 | B1 | 6/2020 | Freitag et al. |
| 10,693,900 | B2 | 6/2020 | Zadeh et al. |
| 10,698,954 | B2 | 6/2020 | Piechowicz et al. |
| 10,701,051 | B2 | 6/2020 | Ohsumi |
| 10,708,082 | B1 | 7/2020 | Bakiaraj et al. |
| 10,728,121 | B1 | 7/2020 | Chitalia et al. |
| 10,735,329 | B2 | 8/2020 | Wang et al. |
| 10,754,940 | B2 | 8/2020 | Ohsumi |
| 10,756,982 | B2 | 8/2020 | Bai et al. |
| 10,771,488 | B2 | 9/2020 | Verma et al. |
| 10,775,183 | B2 | 9/2020 | Ho et al. |
| 10,776,191 | B2 | 9/2020 | Zheng et al. |
| 10,776,441 | B1 | 9/2020 | Echeverria et al. |
| 10,788,570 | B2 | 9/2020 | Wilson |
| 10,791,131 | B2 | 9/2020 | Nor et al. |
| 10,797,974 | B2 | 10/2020 | Giura et al. |
| 10,803,169 | B1 | 10/2020 | Flatten et al. |
| 10,812,497 | B2 | 10/2020 | Venkatramani et al. |
| 10,824,675 | B2 | 11/2020 | Alonso et al. |
| 10,824,813 | B2 | 11/2020 | Smith et al. |
| 10,853,082 | B1 | 12/2020 | Aleti et al. |
| 10,871,878 | B1 | 12/2020 | Mody et al. |
| 10,873,592 | B1 | 12/2020 | Singh et al. |
| 10,885,452 | B1 | 1/2021 | Garg |
| 10,904,007 | B2 | 1/2021 | Kim et al. |
| 10,904,270 | B2 | 1/2021 | Muddu et al. |
| 10,911,470 | B2 | 2/2021 | Muddu et al. |
| 10,986,114 | B1 | 4/2021 | Singh et al. |
| 11,036,716 | B2 | 6/2021 | Griffith et al. |
| 11,036,800 | B1 | 6/2021 | Kayyoor et al. |
| 11,044,264 | B2 | 6/2021 | Durairaj et al. |
| 11,048,492 | B2 | 6/2021 | Jain et al. |
| 11,082,289 | B2 | 8/2021 | Dang et al. |
| 11,120,343 | B2 | 9/2021 | Das et al. |
| 11,126,533 | B2 | 9/2021 | Knowles et al. |
| 11,153,339 | B1 | 10/2021 | Kapoor et al. |
| 11,194,849 | B2 | 12/2021 | Lassoued et al. |
| 11,212,299 | B2 | 12/2021 | Gamble et al. |
| 11,233,821 | B2 | 1/2022 | Yadav et al. |
| 11,258,807 | B2 | 2/2022 | Muddu et al. |
| 11,281,519 | B2 | 3/2022 | Krishnaswamy et al. |
| 11,314,789 | B2 | 4/2022 | Goldfarb |
| 11,329,998 | B1 | 5/2022 | Shahidzadeh et al. |
| 11,347,625 | B1 | 5/2022 | Agarwal et al. |
| 11,388,211 | B1 | 7/2022 | Breeden et al. |
| 11,411,966 | B2 | 8/2022 | Muddu et al. |
| 11,431,735 | B2 | 8/2022 | Shua |
| 11,463,464 | B2 | 10/2022 | Zadeh et al. |
| 11,489,863 | B1 | 11/2022 | Shua et al. |
| 11,494,787 | B2 | 11/2022 | Erickson et al. |
| 11,514,054 | B1 | 11/2022 | Borthwick et al. |
| 11,544,138 | B2 | 1/2023 | Kapish et al. |
| 11,575,693 | B1 | 2/2023 | Muddu et al. |
| 11,606,272 | B1 | 3/2023 | Popelka et al. |
| 11,620,310 | B1 | 4/2023 | Akidau et al. |
| 11,636,090 | B2 | 4/2023 | Li et al. |
| 11,640,388 | B2 | 5/2023 | Yang et al. |
| 11,647,034 | B2 | 5/2023 | Levin et al. |
| 11,658,990 | B2 | 5/2023 | Shapoury |
| 11,669,571 | B2 | 6/2023 | Binkley et al. |
| 11,687,438 | B1 | 6/2023 | Torbett et al. |
| 11,693,958 | B1 | 7/2023 | Steiman |
| 11,700,190 | B2 | 7/2023 | Yadav et al. |
| 11,722,554 | B2 | 8/2023 | Keren et al. |
| 11,734,351 | B2 | 8/2023 | Binkley et al. |
| 11,734,419 | B1 | 8/2023 | Mackle |
| 11,748,473 | B2 | 9/2023 | Araujo et al. |
| 11,755,576 | B1 | 9/2023 | Jiang et al. |
| 11,755,602 | B2 | 9/2023 | Smith et al. |
| 11,757,907 | B1 | 9/2023 | Berger et al. |
| 11,769,098 | B2 | 9/2023 | Adinarayan et al. |
| 11,770,387 | B1 | 9/2023 | Shivamoggi et al. |
| 11,770,398 | B1 | 9/2023 | Erlingsson et al. |

(56) References Cited

U.S. PATENT DOCUMENTS

| | | |
|---|---|---|
| 11,907,368 B1 | 2/2024 | Ye et al. |
| 11,947,946 B1 | 4/2024 | Rao |
| 12,050,507 B1 | 7/2024 | Starosta et al. |
| 12,079,737 B1 | 9/2024 | Biswas |
| 12,099,428 B1 | 9/2024 | Agarwal et al. |
| 2002/0059531 A1 | 5/2002 | On |
| 2002/0161889 A1 | 10/2002 | Gamache et al. |
| 2002/0184225 A1 | 12/2002 | Ghukasyan |
| 2003/0037136 A1 | 2/2003 | Labovitz et al. |
| 2003/0179227 A1 | 9/2003 | Ahmad et al. |
| 2003/0195803 A1 | 10/2003 | Ketonen |
| 2003/0233361 A1 | 12/2003 | Cady |
| 2004/0015470 A1 | 1/2004 | Smith et al. |
| 2004/0225929 A1 | 11/2004 | Agha et al. |
| 2005/0060287 A1 | 3/2005 | Hellman et al. |
| 2005/0102284 A1 | 5/2005 | Srinivasan et al. |
| 2005/0102365 A1 | 5/2005 | Moore et al. |
| 2005/0108142 A1 | 5/2005 | Beadle et al. |
| 2005/0188222 A1 | 8/2005 | Motsinger et al. |
| 2005/0231760 A1 | 10/2005 | Minato |
| 2005/0246288 A1 | 11/2005 | Kimura et al. |
| 2005/0246521 A1 | 11/2005 | Bade et al. |
| 2006/0025987 A1 | 2/2006 | Baisley et al. |
| 2006/0026419 A1 | 2/2006 | Arndt et al. |
| 2006/0036896 A1 | 2/2006 | Gamache et al. |
| 2006/0085437 A1 | 4/2006 | Brodhun et al. |
| 2006/0090095 A1 | 4/2006 | Massa et al. |
| 2006/0109271 A1 | 5/2006 | Lomask |
| 2006/0259470 A1 | 11/2006 | Chandrasekharan et al. |
| 2006/0288415 A1 | 12/2006 | Wong |
| 2007/0050497 A1 | 3/2007 | Haley et al. |
| 2007/0118909 A1 | 5/2007 | Hertzog et al. |
| 2007/0130330 A1 | 6/2007 | Ridel et al. |
| 2007/0162605 A1 | 7/2007 | Chalasani et al. |
| 2007/0162963 A1 | 7/2007 | Penet et al. |
| 2007/0168696 A1 | 7/2007 | Ridel et al. |
| 2007/0169175 A1 | 7/2007 | Hall et al. |
| 2007/0214111 A1 | 9/2007 | Jin et al. |
| 2007/0225956 A1 | 9/2007 | Pratt et al. |
| 2007/0266425 A1 | 11/2007 | Cho |
| 2007/0282916 A1 | 12/2007 | Albahari et al. |
| 2008/0034411 A1 | 2/2008 | Aoyama |
| 2008/0065879 A1 | 3/2008 | Song et al. |
| 2008/0072062 A1 | 3/2008 | Pearson et al. |
| 2008/0109730 A1 | 5/2008 | Coffman et al. |
| 2008/0147707 A1 | 6/2008 | Jin et al. |
| 2008/0148180 A1 | 6/2008 | Liu et al. |
| 2008/0151893 A1 | 6/2008 | Nordmark et al. |
| 2008/0155335 A1 | 6/2008 | Klein et al. |
| 2008/0244718 A1 | 10/2008 | Frost et al. |
| 2008/0263643 A1 | 10/2008 | Jaiswal et al. |
| 2008/0270451 A1 | 10/2008 | Thomsen et al. |
| 2009/0006843 A1 | 1/2009 | Bade et al. |
| 2009/0007010 A1 | 1/2009 | Kriss et al. |
| 2009/0019160 A1 | 1/2009 | Schuler |
| 2009/0063857 A1 | 3/2009 | Bade et al. |
| 2009/0165109 A1 | 6/2009 | Hird |
| 2009/0177573 A1 | 7/2009 | Beadle et al. |
| 2009/0222740 A1 | 9/2009 | Yuan |
| 2009/0228474 A1 | 9/2009 | Chiu et al. |
| 2009/0271504 A1 | 10/2009 | Ginter et al. |
| 2009/0287720 A1 | 11/2009 | Herter et al. |
| 2009/0300716 A1 | 12/2009 | Ahn |
| 2009/0307651 A1 | 12/2009 | Senthil et al. |
| 2009/0327328 A1 | 12/2009 | Woodall et al. |
| 2010/0042823 A1 | 2/2010 | Arndt et al. |
| 2010/0094767 A1 | 4/2010 | Miltonberger |
| 2010/0114931 A1 | 5/2010 | Xie et al. |
| 2010/0172261 A1 | 7/2010 | Shinbo et al. |
| 2010/0217860 A1 | 8/2010 | Naidu et al. |
| 2010/0274785 A1 | 10/2010 | Procopiuc et al. |
| 2010/0309206 A1 | 12/2010 | Xie et al. |
| 2010/0329162 A1 | 12/2010 | Kadous et al. |
| 2011/0023098 A1 | 1/2011 | Pearson et al. |
| 2011/0029952 A1 | 2/2011 | Harrington |
| 2011/0055138 A1 | 3/2011 | Khanduja et al. |
| 2011/0119100 A1 | 5/2011 | Ruhl et al. |
| 2011/0154287 A1 | 6/2011 | Mukkamala et al. |
| 2011/0276951 A1 | 11/2011 | Jain |
| 2011/0302631 A1 | 12/2011 | Sureshchandra et al. |
| 2012/0005243 A1 | 1/2012 | Merwe et al. |
| 2012/0054732 A1 | 3/2012 | Jain et al. |
| 2012/0089875 A1 | 4/2012 | Faust et al. |
| 2012/0102029 A1 | 4/2012 | Larson et al. |
| 2012/0143898 A1 | 6/2012 | Bruno et al. |
| 2012/0158858 A1 | 6/2012 | Gkantsidis et al. |
| 2012/0159333 A1 | 6/2012 | Mital et al. |
| 2012/0173541 A1 | 7/2012 | Venkataramani |
| 2012/0317149 A1 | 12/2012 | Jagota et al. |
| 2012/0317151 A1 | 12/2012 | Ruf et al. |
| 2012/0323956 A1 | 12/2012 | Dumitru et al. |
| 2013/0024412 A1 | 1/2013 | Gong et al. |
| 2013/0067100 A1 | 3/2013 | Kuzin et al. |
| 2013/0081118 A1 | 3/2013 | Ge |
| 2013/0086667 A1 | 4/2013 | Haven |
| 2013/0097320 A1 | 4/2013 | Ritter et al. |
| 2013/0151453 A1 | 6/2013 | Bhanot et al. |
| 2013/0173915 A1 | 7/2013 | Haulund |
| 2013/0205357 A1 | 8/2013 | Bahnck et al. |
| 2013/0219295 A1 | 8/2013 | Feldman et al. |
| 2013/0269007 A1 | 10/2013 | Yoshigaki et al. |
| 2013/0298244 A1 | 11/2013 | Kumar et al. |
| 2013/0304915 A1 | 11/2013 | Kawai |
| 2013/0305357 A1 | 11/2013 | Ayyagari et al. |
| 2014/0041005 A1 | 2/2014 | He |
| 2014/0067750 A1 | 3/2014 | Ranganathan et al. |
| 2014/0096113 A1* | 4/2014 | Kuehlmann ........ G06F 11/3672 |
| | | 717/126 |
| 2014/0098101 A1 | 4/2014 | Friedlander et al. |
| 2014/0115001 A1 | 4/2014 | Arroyo et al. |
| 2014/0115011 A1 | 4/2014 | Buerner et al. |
| 2014/0125672 A1 | 5/2014 | Winternitz et al. |
| 2014/0165204 A1 | 6/2014 | Williams et al. |
| 2014/0181944 A1 | 6/2014 | Ahmed et al. |
| 2014/0208191 A1 | 7/2014 | Zaric et al. |
| 2014/0245443 A1 | 8/2014 | Chakraborty |
| 2014/0279779 A1 | 9/2014 | Zou et al. |
| 2014/0280068 A1 | 9/2014 | Dhoopar et al. |
| 2014/0325631 A1 | 10/2014 | Pearson et al. |
| 2014/0359558 A1 | 12/2014 | Chamberlain |
| 2014/0379716 A1 | 12/2014 | Branch et al. |
| 2015/0058619 A1 | 2/2015 | Sweet et al. |
| 2015/0135312 A1 | 5/2015 | Wada et al. |
| 2015/0161201 A1 | 6/2015 | Sadikov et al. |
| 2015/0172321 A1 | 6/2015 | Kirti et al. |
| 2015/0188751 A1 | 7/2015 | Vasseur et al. |
| 2015/0213598 A1 | 7/2015 | Madabhushi et al. |
| 2015/0310649 A1 | 10/2015 | Winternitz et al. |
| 2015/0319185 A1 | 11/2015 | Kirti et al. |
| 2015/0341379 A1 | 11/2015 | Lefebvre et al. |
| 2015/0356144 A1 | 12/2015 | Chawla et al. |
| 2016/0063226 A1 | 3/2016 | Singh et al. |
| 2016/0078365 A1 | 3/2016 | Baumard |
| 2016/0080404 A1 | 3/2016 | Kohout et al. |
| 2016/0110434 A1 | 4/2016 | Kakaraddi et al. |
| 2016/0120070 A1 | 4/2016 | Myrah et al. |
| 2016/0149937 A1 | 5/2016 | Katmor et al. |
| 2016/0203411 A1 | 7/2016 | Sadikov et al. |
| 2016/0205125 A1 | 7/2016 | Kim et al. |
| 2016/0218911 A1 | 7/2016 | Wessels et al. |
| 2016/0261522 A1 | 9/2016 | Hanis et al. |
| 2016/0261544 A1 | 9/2016 | Conover |
| 2016/0330183 A1 | 11/2016 | McDowell et al. |
| 2016/0330206 A1 | 11/2016 | Xu |
| 2016/0352765 A1 | 12/2016 | Mermoud et al. |
| 2016/0357521 A1 | 12/2016 | Zhang et al. |
| 2016/0359592 A1 | 12/2016 | Kulshreshtha et al. |
| 2016/0359872 A1 | 12/2016 | Yadav et al. |
| 2016/0373428 A1 | 12/2016 | Shi |
| 2017/0063830 A1 | 3/2017 | Huang |
| 2017/0063888 A1 | 3/2017 | Muddu et al. |
| 2017/0063903 A1 | 3/2017 | Muddu et al. |
| 2017/0063905 A1 | 3/2017 | Muddu et al. |
| 2017/0063906 A1 | 3/2017 | Muddu et al. |

(56)  References Cited

U.S. PATENT DOCUMENTS

| | | |
|---|---|---|
| 2017/0063908 A1 | 3/2017 | Muddu et al. |
| 2017/0063909 A1 | 3/2017 | Muddu et al. |
| 2017/0063910 A1 | 3/2017 | Muddu et al. |
| 2017/0063911 A1 | 3/2017 | Muddu et al. |
| 2017/0063912 A1 | 3/2017 | Muddu et al. |
| 2017/0070594 A1 | 3/2017 | Oetting et al. |
| 2017/0076206 A1 | 3/2017 | Lastras-Montano et al. |
| 2017/0085553 A1 | 3/2017 | Gordon et al. |
| 2017/0086069 A1 | 3/2017 | Liu |
| 2017/0102961 A1 | 4/2017 | Hilemon et al. |
| 2017/0111245 A1 | 4/2017 | Ishakian et al. |
| 2017/0116315 A1 | 4/2017 | Xiong et al. |
| 2017/0118099 A1 | 4/2017 | Huang |
| 2017/0118240 A1 | 4/2017 | Devi Reddy et al. |
| 2017/0134240 A1 | 5/2017 | Hévizi et al. |
| 2017/0142140 A1 | 5/2017 | Muddu et al. |
| 2017/0147646 A1 | 5/2017 | Lee et al. |
| 2017/0148197 A1 | 5/2017 | Winternitz et al. |
| 2017/0155570 A1 | 6/2017 | Maheshwari et al. |
| 2017/0155672 A1 | 6/2017 | Muthukrishnan et al. |
| 2017/0163666 A1 | 6/2017 | Venkatramani et al. |
| 2017/0169229 A1 | 6/2017 | Brucker et al. |
| 2017/0223036 A1 | 8/2017 | Muddu et al. |
| 2017/0230183 A1 | 8/2017 | Sweet et al. |
| 2017/0249069 A1 | 8/2017 | Zamir |
| 2017/0251013 A1 | 8/2017 | Kirti et al. |
| 2017/0257358 A1 | 9/2017 | Ebrahimi et al. |
| 2017/0262521 A1 | 9/2017 | Cho et al. |
| 2017/0272344 A1 | 9/2017 | Tang et al. |
| 2017/0277553 A1 | 9/2017 | Zada et al. |
| 2017/0277582 A1 | 9/2017 | Chen et al. |
| 2017/0277997 A1 | 9/2017 | Zong et al. |
| 2017/0279827 A1 | 9/2017 | Savalle et al. |
| 2017/0286190 A1 | 10/2017 | Ishakian et al. |
| 2017/0288974 A1 | 10/2017 | Yoshihira et al. |
| 2017/0330096 A1 | 11/2017 | Gupta et al. |
| 2017/0337262 A1 | 11/2017 | Smith et al. |
| 2017/0346683 A1 | 11/2017 | Li et al. |
| 2017/0353853 A1 | 12/2017 | Zha et al. |
| 2017/0359361 A1 | 12/2017 | Modani et al. |
| 2017/0366492 A1 | 12/2017 | Ho et al. |
| 2018/0004835 A1 | 1/2018 | Piechowicz et al. |
| 2018/0004859 A1 | 1/2018 | Piechowicz et al. |
| 2018/0007145 A1 | 1/2018 | Piechowicz et al. |
| 2018/0013650 A1 | 1/2018 | Khanal et al. |
| 2018/0013776 A1 | 1/2018 | Gay et al. |
| 2018/0019932 A1 | 1/2018 | Giura et al. |
| 2018/0020015 A1 | 1/2018 | Munro et al. |
| 2018/0025361 A1 | 1/2018 | Llagostera et al. |
| 2018/0032221 A1* | 2/2018 | Boss ........................ G06F 11/00 |
| 2018/0034840 A1 | 2/2018 | Marquardt et al. |
| 2018/0039688 A1 | 2/2018 | Ahn et al. |
| 2018/0063178 A1 | 3/2018 | Jadhav et al. |
| 2018/0067981 A1 | 3/2018 | Ahuja et al. |
| 2018/0069885 A1 | 3/2018 | Patterson et al. |
| 2018/0084069 A1 | 3/2018 | Be'ery et al. |
| 2018/0089132 A1 | 3/2018 | Atta et al. |
| 2018/0096047 A1 | 4/2018 | Childress et al. |
| 2018/0097793 A1 | 4/2018 | Agarwal et al. |
| 2018/0103052 A1 | 4/2018 | Choudhury et al. |
| 2018/0115578 A1 | 4/2018 | Subbarayan et al. |
| 2018/0123864 A1 | 5/2018 | Tucker et al. |
| 2018/0137858 A1 | 5/2018 | Saxena et al. |
| 2018/0139200 A1 | 5/2018 | Gordon et al. |
| 2018/0173789 A1 | 6/2018 | Llagostera et al. |
| 2018/0174062 A1 | 6/2018 | Simo et al. |
| 2018/0181750 A1 | 6/2018 | Lamothe-Brassard |
| 2018/0191781 A1 | 7/2018 | Palani et al. |
| 2018/0211425 A1 | 7/2018 | Winternitz et al. |
| 2018/0219888 A1 | 8/2018 | Apostolopoulos |
| 2018/0219897 A1 | 8/2018 | Muddu et al. |
| 2018/0227286 A1 | 8/2018 | Ohsumi |
| 2018/0248901 A1 | 8/2018 | Rieke |
| 2018/0260442 A1 | 9/2018 | Vaidhyanathan et al. |
| 2018/0260574 A1 | 9/2018 | Morello et al. |
| 2018/0267787 A1 | 9/2018 | Rathinasabapathy et al. |
| 2018/0268078 A1 | 9/2018 | Gianetto et al. |
| 2018/0287956 A1 | 10/2018 | Bryc et al. |
| 2018/0288063 A1 | 10/2018 | Koottayi et al. |
| 2018/0307833 A1 | 10/2018 | Noeth et al. |
| 2018/0314576 A1* | 11/2018 | Pasupuleti .......... G06F 11/0754 |
| 2018/0329958 A1 | 11/2018 | Choudhury et al. |
| 2018/0336353 A1 | 11/2018 | Manadhata et al. |
| 2018/0357422 A1 | 12/2018 | Telang et al. |
| 2018/0359162 A1 | 12/2018 | Savov et al. |
| 2018/0367548 A1 | 12/2018 | Stokes, III et al. |
| 2018/0375886 A1 | 12/2018 | Kirti et al. |
| 2019/0012979 A1 | 1/2019 | Takahashi et al. |
| 2019/0028327 A1 | 1/2019 | Silva et al. |
| 2019/0042879 A1 | 2/2019 | Munoz |
| 2019/0042950 A1 | 2/2019 | Lin et al. |
| 2019/0050445 A1 | 2/2019 | Griffith et al. |
| 2019/0058626 A1 | 2/2019 | Knowles et al. |
| 2019/0065323 A1 | 2/2019 | Dhamdhere et al. |
| 2019/0068627 A1 | 2/2019 | Thampy |
| 2019/0073373 A1 | 3/2019 | Surale et al. |
| 2019/0075126 A1 | 3/2019 | Muddu et al. |
| 2019/0087480 A1 | 3/2019 | Palanciuc |
| 2019/0098037 A1 | 3/2019 | Shenoy, Jr. et al. |
| 2019/0101622 A1 | 4/2019 | Wilson |
| 2019/0109870 A1 | 4/2019 | Bedhapudi et al. |
| 2019/0132224 A1 | 5/2019 | Verma et al. |
| 2019/0132344 A1 | 5/2019 | Lem et al. |
| 2019/0149553 A1 | 5/2019 | Xu |
| 2019/0158524 A1 | 5/2019 | Zadeh et al. |
| 2019/0163555 A1 | 5/2019 | Zheng et al. |
| 2019/0163754 A1 | 5/2019 | Huang et al. |
| 2019/0222597 A1 | 7/2019 | Crabtree et al. |
| 2019/0227860 A1 | 7/2019 | Gefen et al. |
| 2019/0259033 A1 | 8/2019 | Reddy et al. |
| 2019/0312796 A1 | 10/2019 | Giura et al. |
| 2019/0312898 A1 | 10/2019 | Verma et al. |
| 2019/0318100 A1 | 10/2019 | Bhatia et al. |
| 2019/0327251 A1 | 10/2019 | Muddu et al. |
| 2019/0339965 A1 | 11/2019 | Garvey et al. |
| 2019/0342282 A1 | 11/2019 | Carbune et al. |
| 2019/0342307 A1 | 11/2019 | Gamble et al. |
| 2019/0342311 A1 | 11/2019 | Muddu et al. |
| 2019/0349305 A1 | 11/2019 | Wang et al. |
| 2019/0354554 A1 | 11/2019 | Piechowicz et al. |
| 2019/0356555 A1 | 11/2019 | Bai et al. |
| 2019/0362024 A1 | 11/2019 | Brousseau et al. |
| 2019/0364067 A1 | 11/2019 | Yona et al. |
| 2019/0378050 A1 | 12/2019 | Edkin et al. |
| 2019/0379684 A1 | 12/2019 | Brown et al. |
| 2019/0385069 A1 | 12/2019 | Weng et al. |
| 2020/0014718 A1 | 1/2020 | Durairaj et al. |
| 2020/0021607 A1 | 1/2020 | Muddu et al. |
| 2020/0026695 A1 | 1/2020 | Yan et al. |
| 2020/0065857 A1 | 2/2020 | Lagi et al. |
| 2020/0074341 A1 | 3/2020 | He et al. |
| 2020/0076685 A1 | 3/2020 | Vaidya et al. |
| 2020/0076836 A1 | 3/2020 | DiValentin et al. |
| 2020/0080856 A1 | 3/2020 | Ho et al. |
| 2020/0120143 A1 | 4/2020 | Nicoll et al. |
| 2020/0125572 A1 | 4/2020 | Hanckel et al. |
| 2020/0128047 A1 | 4/2020 | Biswas et al. |
| 2020/0175042 A1 | 6/2020 | Batruni |
| 2020/0175361 A1 | 6/2020 | Che et al. |
| 2020/0192690 A1 | 6/2020 | Gupta et al. |
| 2020/0202006 A1 | 6/2020 | Shah et al. |
| 2020/0228555 A1 | 7/2020 | Wittenschlaeger |
| 2020/0252376 A1 | 8/2020 | Feng et al. |
| 2020/0257797 A1 | 8/2020 | Monsonego et al. |
| 2020/0272740 A1 | 8/2020 | Obee et al. |
| 2020/0278892 A1 | 9/2020 | Nainar et al. |
| 2020/0280592 A1 | 9/2020 | Ithal et al. |
| 2020/0287923 A1 | 9/2020 | Raghavendra et al. |
| 2020/0287927 A1 | 9/2020 | Zadeh et al. |
| 2020/0311644 A1 | 10/2020 | Willard, III et al. |
| 2020/0320106 A1 | 10/2020 | Goldfarb |
| 2020/0334241 A1 | 10/2020 | Muralidhar et al. |
| 2020/0334293 A1 | 10/2020 | Piechowicz et al. |
| 2020/0336489 A1 | 10/2020 | Wuest et al. |

(56) References Cited

U.S. PATENT DOCUMENTS

| | | |
|---|---|---|
| 2020/0351151 A1 | 11/2020 | Dang et al. |
| 2020/0379879 A1 | 12/2020 | Plotnik et al. |
| 2020/0403860 A1 | 12/2020 | Lewis et al. |
| 2020/0404008 A1 | 12/2020 | Venkatramani et al. |
| 2020/0412752 A1 | 12/2020 | Shapoury |
| 2021/0014256 A1 | 1/2021 | Malhotra |
| 2021/0019193 A1 | 1/2021 | Ffrench et al. |
| 2021/0019209 A1 | 1/2021 | Krishnaswamy et al. |
| 2021/0030191 A1 | 2/2021 | Bertolina et al. |
| 2021/0042217 A1* | 2/2021 | Hwang ............... G06F 11/3604 |
| 2021/0049127 A1 | 2/2021 | Kunchakarra et al. |
| 2021/0064666 A1 | 3/2021 | Wang et al. |
| 2021/0073107 A1 | 3/2021 | Sharma |
| 2021/0110033 A1 | 4/2021 | Noeth et al. |
| 2021/0117232 A1 | 4/2021 | Sriharsha et al. |
| 2021/0117868 A1 | 4/2021 | Sriharsha |
| 2021/0144164 A1 | 5/2021 | Mathur et al. |
| 2021/0232420 A1 | 7/2021 | Dhruvakumar et al. |
| 2021/0256089 A1 | 8/2021 | Linga et al. |
| 2021/0256152 A1 | 8/2021 | Linga et al. |
| 2021/0286798 A1 | 9/2021 | Li et al. |
| 2021/0294798 A1 | 9/2021 | Binkley et al. |
| 2021/0295351 A1 | 9/2021 | Wells et al. |
| 2021/0311957 A1 | 10/2021 | Georgievski et al. |
| 2021/0329019 A1 | 10/2021 | Shua |
| 2021/0336976 A1 | 10/2021 | Shua |
| 2021/0342125 A1 | 11/2021 | Burnett et al. |
| 2021/0342742 A1 | 11/2021 | G Rao et al. |
| 2021/0352142 A1 | 11/2021 | Jayaram et al. |
| 2021/0357206 A1 | 11/2021 | Karve et al. |
| 2021/0365462 A1 | 11/2021 | Pippin et al. |
| 2021/0377287 A1 | 12/2021 | Shua |
| 2021/0406917 A1 | 12/2021 | Erickson et al. |
| 2022/0004718 A1 | 1/2022 | Quamar et al. |
| 2022/0019698 A1 | 1/2022 | Durham et al. |
| 2022/0046059 A1 | 2/2022 | Pandurangi et al. |
| 2022/0050840 A1 | 2/2022 | Parravicini et al. |
| 2022/0058193 A1 | 2/2022 | Smith et al. |
| 2022/0060510 A1 | 2/2022 | Clayton et al. |
| 2022/0067186 A1 | 3/2022 | Thakur et al. |
| 2022/0086179 A1 | 3/2022 | Levin et al. |
| 2022/0092481 A1 | 3/2022 | Neithalath et al. |
| 2022/0107788 A1 | 4/2022 | Beck et al. |
| 2022/0121708 A1 | 4/2022 | Burnett et al. |
| 2022/0121741 A1 | 4/2022 | Araujo et al. |
| 2022/0124108 A1 | 4/2022 | Gamble et al. |
| 2022/0129803 A1 | 4/2022 | Bikumala et al. |
| 2022/0164643 A1 | 5/2022 | Charnock et al. |
| 2022/0172050 A1 | 6/2022 | Dalli et al. |
| 2022/0191226 A1 | 6/2022 | Chan et al. |
| 2022/0244892 A1 | 8/2022 | Wushour |
| 2022/0272117 A1 | 8/2022 | Maheve et al. |
| 2022/0294816 A1 | 9/2022 | Martin et al. |
| 2022/0327119 A1 | 10/2022 | Gasper et al. |
| 2022/0335318 A1 | 10/2022 | Wang et al. |
| 2022/0342690 A1 | 10/2022 | Shua |
| 2022/0345480 A1 | 10/2022 | Shua |
| 2022/0345481 A1 | 10/2022 | Shua |
| 2022/0345483 A1 | 10/2022 | Shua |
| 2022/0350641 A1 | 11/2022 | Gilmore et al. |
| 2022/0350789 A1 | 11/2022 | Yang et al. |
| 2022/0350931 A1 | 11/2022 | Shua |
| 2022/0360600 A1 | 11/2022 | Reed et al. |
| 2022/0374800 A1 | 11/2022 | Adinarayan et al. |
| 2022/0376970 A1 | 11/2022 | Chawathe et al. |
| 2022/0382611 A1 | 12/2022 | Kapish et al. |
| 2022/0394082 A1 | 12/2022 | Keren et al. |
| 2022/0414072 A1 | 12/2022 | Tandon et al. |
| 2022/0414105 A1 | 12/2022 | Umay et al. |
| 2023/0006889 A1 | 1/2023 | Thyagaturu et al. |
| 2023/0011043 A1 | 1/2023 | Panse et al. |
| 2023/0025252 A1 | 1/2023 | Erickson et al. |
| 2023/0039566 A1 | 2/2023 | Ghag et al. |
| 2023/0052827 A1 | 2/2023 | Araujo et al. |
| 2023/0075355 A1 | 3/2023 | Twigg et al. |
| 2023/0077030 A1 | 3/2023 | Makkar et al. |
| 2023/0079593 A1 | 3/2023 | Nolan et al. |
| 2023/0088960 A1 | 3/2023 | Popelka et al. |
| 2023/0096930 A1 | 3/2023 | Dasdan |
| 2023/0101773 A1 | 3/2023 | Katahanas et al. |
| 2023/0107891 A1 | 4/2023 | Miriyala et al. |
| 2023/0131525 A1 | 4/2023 | Sopik et al. |
| 2023/0137378 A1 | 5/2023 | LaTerza et al. |
| 2023/0138371 A1 | 5/2023 | Bandukwala et al. |
| 2023/0168874 A1 | 6/2023 | Makhija et al. |
| 2023/0169168 A1 | 6/2023 | Magen Medina et al. |
| 2023/0179613 A1 | 6/2023 | Andrews et al. |
| 2023/0208870 A1 | 6/2023 | Yellapragada et al. |
| 2023/0244523 A1 | 8/2023 | Gorantla et al. |
| 2023/0251960 A1 | 8/2023 | Sharma et al. |
| 2023/0275909 A1 | 8/2023 | Shivamoggi et al. |
| 2023/0275917 A1 | 8/2023 | Karmali et al. |
| 2023/0291755 A1 | 9/2023 | Siebel et al. |
| 2023/0305813 A1 | 9/2023 | Jalal et al. |
| 2023/0412629 A1 | 12/2023 | Beveridge et al. |
| 2024/0070495 A1 | 2/2024 | Satish et al. |
| 2024/0160724 A1 | 5/2024 | Shetty et al. |
| 2024/0201983 A1 | 6/2024 | Groenewegen et al. |
| 2024/0220658 A1 | 7/2024 | Herrera et al. |
| 2024/0361995 A1 | 10/2024 | Somasundaram et al. |

FOREIGN PATENT DOCUMENTS

| | | |
|---|---|---|
| WO | 2006009827 A2 | 1/2006 |
| WO | 2017147411 A1 | 8/2017 |
| WO | 2020226979 A2 | 11/2020 |
| WO | 2023163825 A1 | 8/2023 |
| WO | 2023215491 A1 | 11/2023 |

OTHER PUBLICATIONS

International Search Report and Written Opinion, PCT/US2022/042737, Dec. 6, 2022, 9 pages.

Al-Yaseen et al., "Real-Time Intrusion Detection System Using Multi-Agent System", IAENG International Journal of Computer Science, vol. 43, No. 1, Feb. 2016, pp. 80-90, International Association of Engineers (IAENG), Hong Kong.

Akoglu et al., "Graph-based Anomaly Detection and Description: A Survey", Apr. 28, 2014.

Amidon et al., "Program Fracture and Recombination for Efficient Automatic Code Reuse", In 2015 IEEE High Performance Extreme Computing Conference (HPEC), Sep. 2015, pp. 1-6, IEEE.org (online), DOI: 10.1109/HPEC.2015.7396314.

Ammar et al., "Query Optimization Techniques in Graph Databases", International Journal of Database Management Systems (IIDMS), vol. 8, No. 4, Aug. 2016, pp. 1-14 (Year: 2016).

Balasubramaniyan et al., "An Architecture For Intrusion Detection Using Autonomous Agents", In Proceedings 14th Annual Computer Security Applications Conference (Cat. No. 98EX217), 19 pages, Jun. 1998, IEEE, DOI: 10.1109/CSAC.1998.738563.

Beutel et al., "User Behavior Modeling with Large-Scale Graph Analysis", Computer Science Department, Carnegie Mellon University, May 2016.

Bugiel et al., "Towards Taming Privilege-Escalation Attacks on Android", In NOSS (vol. 17, p. 19), Feb. 2012.

Chang et al., "Reality Bites—Progressive Querying and Result Visualization in Logical and VR Spaces", Proceedings of 1994 IEEE Symposium on Visual Languages, pp. 100-109, Oct. 1994, IEEE, DOI: 10.1109NL.1994.363635.

Chesson, "Communication And Control In A Cluster Network", ACM '74: Proceedings of the 1974 annual ACM conference—vol. 2, Jan. 1974, pp. 509-514, http://doi.org/10.1145/1408839 (Year 1974).

Crosbie et al., "Defending a Computer System using Autonomous Agents", docs.lib.purdue.edu (online), Mar. 1995, 11 pages.

Hautamaki et al., "Outlier Detection Using k-Nearest Neighbour Graph", Proceedings of the 17th International Conference on Pattern Recognition (ICPR 2004), vol. 3, Aug. 2004, IEEE, DOI: 10.1109/ICPR.2004.1334558.

(56)    References Cited

OTHER PUBLICATIONS

Hooper et al., "Medusa: a simple tool for interaction graph analysis", Bioinformatics, vol. 21 No. 24, Sep. 2005, pp. 4432-4433, Oxford University Press (online), URL: https://academic.oup.com/bioinformatics/article/21/24/4432/179694.

Koutra et al., "Exploring and Making Sense of Large Graphs", Computer Science Department, Carnegie Mellon University, Aug. 2015.

Leopold et al., "A Visual Query System for the Specification and Scientific Analysis off Continual Queries", Proceedings, IEEE Symposia on Human-Centric Computing Languages and Environments (Cat. No.01TH8587), Sep. 2001, pp. 203-211, IEEE, doi: 10.1109/HCC.2001.995260.

Liao et al., "Visualizing Graph Dynamics And Similarity For Enterprise Network Security And Management", VizSec 10: Proceedings of the Seventh International Symposium on Visualization for Cyber Security, Sep. 2010, pp. 34-45, URL: https://doi.org/10.1145/1850795.1850799.

Long et al., "Automatic Input Rectification", 2012 34th International Conference on Software Engineering (ICSE), Jun. 2012, pp. 80-90, IEEE.org (online), DOI: 10.1109/ICSE.2012.6227204.

Mateescu et al., "Join-Graph Propagation Algorithms", Journal of Artificial Intelligence Research, vol. 37, Mar. 2010, pp. 279-328, AI Access Foundation, Inc. (online), URL: https://doi.org/10.1613/jair.2842.

Moriano et al., "Insider Threat Event Detection in User-System Interactions", MIST '17: Proceedings of the 2017 International Workshop on Managing Insider Security Threats, Oct. 2017, pp. 1-12, ACM Digital Library (online), URL: https://doi.Jrg/10.1145/3139923.3139928.

Perkins et al., "Automatically Patching Errors in Deployed Software", Proceedings of the ACM SIGOPS 22nd Symposium on Operating Systems Principles, Oct. 2009, pp. 82-102, acm.org (online), URL: https://doi.org/10.1145/1629575.1629585.

Ranshous et al., "Anomaly detection in dynamic networks: a survey", WIREs Computational Statistics, vol. 7, May/Jun. 2015, pp. 223-247, Wiley Periodicals, Inc, United States.

Rinard, "Living In The Comfort Zone", ACM SIGPLAN Notices, vol. 42, Issue 10, Oct. 2007, pp. 611-622, acm.org (online), URL: https://doi.org/10.1145/1297105.1297072.

Rinard, "Manipulating Program Functionality to Eliminate Security Vulnerabilities", In Moving Target Defense, Jan. 2011, pp. 109-115. Springer, New York, NY.

Samuel et al., "Let's Parse to Prevent Pwnage", Proceedings of the 5th USENIX conference on Large-Scale Exploits and Emergent Threats (LEET'12), Apr. 2012, 3 pages, acm.org (online), URL: https://www.usenix.org/conference/leet12/workshop-program/presentation/samuel.

Shen et al., "Active Learning for Inference and Regeneration of Applications that Access Databases", ACM Transactions on Programming Languages and Systems (TOPLAS), vol. 42, Issue 4, Article 18, Jan. 2021, pp. 1-119, acm.org (online), URL: https://doi.org/10.1145/3430952.

Tamassia et al., "Graph Drawing for Security Visualization", In: Graph Drawing (GD 2008), Lecture Notes in Computer Science, vol. 5417, Springer, Berlin, Heidelberg (online), URL: https://doi.org/10.1007/978-3-642-00219-9_2.

Vaas et al., "Detecting disguised processes using Application-Behavior Profiling", In 2017 IEEE International Symposium on Technologies for Homeland Security (HST), pp. 1-6, Jun. 2017, IEEE, DOI: 10.1109/THS.2017.7943508.

Vasilakis et al., "Supply-Chain Vulnerability Elimination via Active Learning and Regeneration", Proceedings of the 2021 ACM SIGSAC Conference on Computer and Communications Security, Nov. 2021, pp. 1755-1770, acm.org (online), URL: https://doi.org/10.1145/3460120.3484736.

Yu et al., "Recommending Join Queries Based on Path Frequency", 2015 12th Web Information System and Application Conference (WISA), Sep. 2015, pp. 21-26, IEEE, DOI: 10.1109/WISA.2015.52.

Brojo Kishore Mishra et al., "Intrusion Detection Systems for High Performance Computing Environment", 978-1-4799-5958-7, 2014 IEEE, 6 pages.

Office Action for U.S. Appl. No. 18/096,105, mailed Dec. 19, 2024, 10 pages.

Office Action for U.S. Appl. No. 17/829,110 mailed Dec. 16, 2024, 31 pages.

Office Action for U.S. Appl. No. 18/392,355, mailed Dec. 12, 2024, 11 pages.

Office Action for U.S. Appl. No. 17/893,721, mailed Dec. 16, 2024, 12 pages.

Office Action for U.S. Appl. No. 17/948,879 mailed Dec. 6, 2024, 15 pages.

Office action for U.S. Appl. No. 18/096,114 mailed Dec. 19, 2024, 13 pages.

Eran Levy, "Data Lake Ingestion: 7 Best Practices", Data Lakes, Jan. 10, 22, 8 pages.

Final Office Action for U.S. Appl. No. 17/853,002 mailed Oct. 1, 2024, 22 pages.

Final Office Action for U.S. Appl. No. 18/426,799 mailed Jan. 24, 2025, 16 pages.

Josh O'Brien, "New Styra DAS Compliance Packs Foster Collaboration Across Teams," Published Apr. 14, 2021, Styra. (Year: 2021), 4 pages.

Lauri Moilanen; "Collecting Logs from Docker Containers," Bachelor's thesis, School of Technology, Degree Program in Information Technology, May 2020, 58 pages.

Notice of Allowance for U.S. Appl. No. 17/853,002 mailed Jan. 24, 2025, 10 pages.

Notice of Allowance for U.S. Appl. No. 18/415,879, mailed Jan. 29, 2025, 8 pages.

Office Action for U.S. Appl. No. 17/838,974 mailed Jan. 14, 2025, 16 pages.

Office Action for U.S. Appl. No. 17/855,112 mailed Jan. 2, 2025, 5 pages.

Office Action for U.S. Appl. No. 17/855,247 mailed Nov. 15, 2024, 16 pages.

Office Action for U.S. Appl. No. 17/964,311 mailed Feb. 4, 2025, 15 pages.

Office Action for U.S. Appl. No. 17/964,378 mailed Feb. 18, 2025, 17 pages.

Office Action for U.S. Appl. No. 17/988,743 mailed Feb. 27, 2025, 16 pages.

Office Action for U.S. Appl. No. 18/161,709 mailed Mar. 3, 2025, 9 pages.

Office Action for U.S. Appl. No. 18/186,888 mailed Feb. 25, 2025, 12 pages.

Office Action for U.S. Appl. No. 18/192,391, mailed Feb. 27, 2025, 13 pages.

Paul Foryt, "The Guide to Kubernetes Compliance," Published Jul. 7, 2022, Styra. (Year: 2022).

* cited by examiner

200

201
Receive packet.

202
Get connection information associated with packet.

203
Determine process associated with connection.

204
Determine information about process (e.g., parents, binary, user).

205
Transmit information.

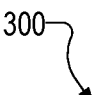
300
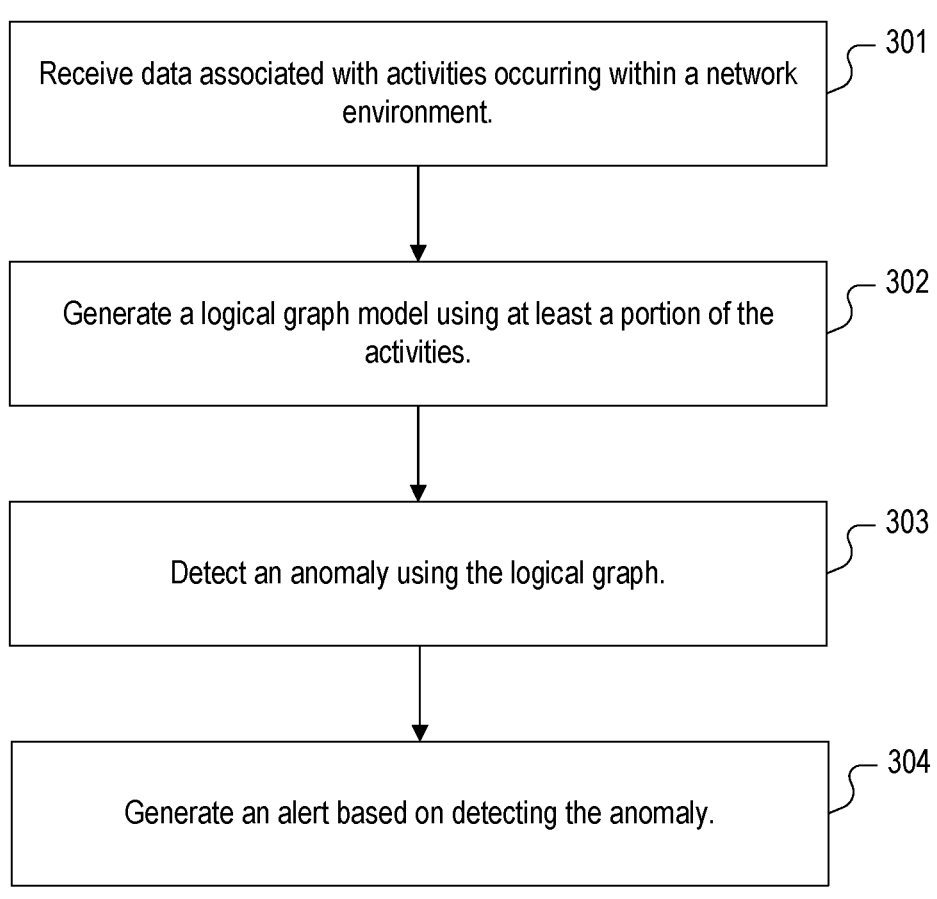
| Receive data associated with activities occurring within a network environment. | 301 |
↓
| Generate a logical graph model using at least a portion of the activities. | 302 |
↓
| Detect an anomaly using the logical graph. | 303 |
↓
| Generate an alert based on detecting the anomaly. | 304 |
Fig. 3A

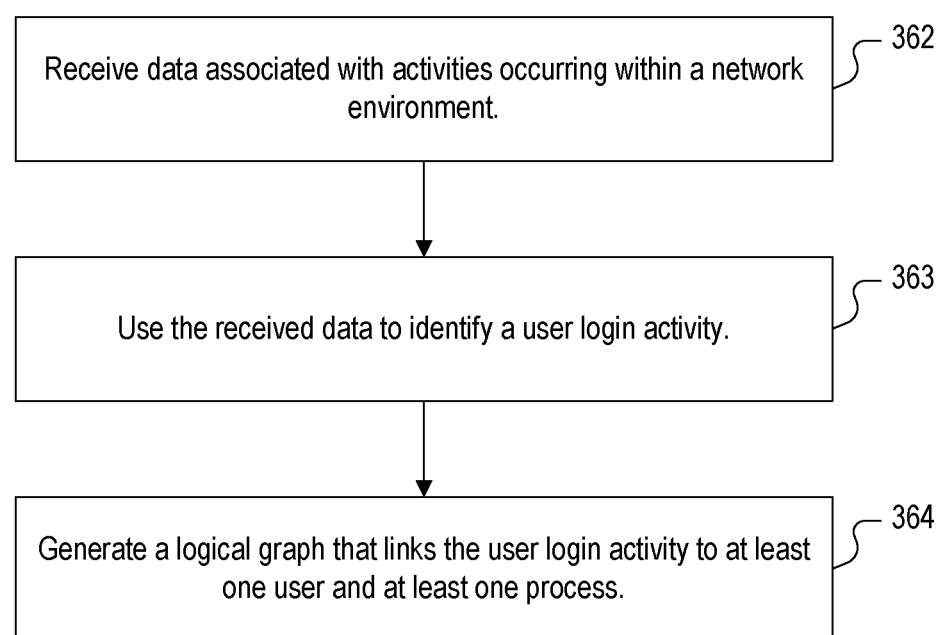
361
| 362 |
| --- |
| Receive data associated with activities occurring within a network environment. |
| 363 |
| --- |
| Use the received data to identify a user login activity. |
| 364 |
| --- |
| Generate a logical graph that links the user login activity to at least one user and at least one process. |
Fig. 3H

380

| | |
|---|---|
| Identify new ssh connection records. | 381 |
| Match ssh connection records. | 382 |
| Identify new login records. | 383 |
| Identify new login-connection records. | 384 |
| Identify login-local-descendant records in the lookback time period. | 385 |
| Identify new processes. | 386 |
| Identify new login-local-descendant records. | 387 |
| Identify new login-lineage records. | 388 |
| Generate output data. | 389 |

| MID | start_time | PID_hash | src_IP_addr | src_port | dst_IP_addr | dst_port | prot | dir |
|-----|-----------|----------|-------------|----------|-------------|----------|------|-----|
| A | t1 | A1 | 1.1.1.10 | 10000 | 2.2.2.20 | 22 | TCP | Incoming |
| A | t2 | A3 | 2.2.2.20 | 10001 | 2.2.2.21 | 22 | TCP | Outgoing |
| B | t2 | B1 | 2.2.2.20 | 10001 | 2.2.2.21 | 22 | TCP | Incoming |

| src_MID | src_PID_hash | dst_MID | dst_PID_hash | dst_start_time | src_IP_addr | src_port | dst_IP_addr | dst_port |
|---------|--------------|---------|--------------|----------------|-------------|----------|-------------|----------|
| null | null | A | A1 | t1 | 1.1.1.10 | 10000 | 2.2.2.20 | 22 |
| A | A3 | B | B1 | t2 | 2.2.2.20 | 10001 | 2.2.2.21 | 22 |

Fig. 3L

| MID | login_time | sshd_PID_hash |
|-----|-----------|---------------|
| A | t1 | A1 |
| B | t2 | B1 |

Fig. 3M

| MID | sshd_PID_hash | login_time | login_username | src_IP_addr | src_port | dst_IP_addr | dst_port |
|-----|---------------|-----------|----------------|-------------|----------|-------------|----------|
| A | A1 | t1 | X | 1.1.1.10 | 10000 | 2.2.2.20 | 22 |
| B | B1 | t2 | Y | 2.2.2.20 | 10001 | 2.2.2.21 | 22 |

Fig. 3N

| MID | start_time | PID_hash | exe_path | parent_PID_hash |
|-----|-----------|----------|----------|-----------------|
| A | t1 | A1 | /usr/sbin/sshd | A0 |
| A | t1 | A2 | /bin/bash | A1 |
| A | t2 | A3 | /usr/bin/ssh | A2 |
| B | t2 | B1 | /usr/sbin/sshd | B0 |
| B | t2 | B2 | /bin/bash | B1 |
| B | t3 | B3 | /usr/bin/curl | B2 |

Fig. 3O

| MID | sshd_PID_hash | PID_hash |
|-----|---------------|----------|
| A | A1 | A1 |
| A | A1 | A2 |
| A | A1 | A3 |
| B | B1 | B1 |
| B | B1 | B2 |
| B | B1 | B3 |

Fig. 3P

| parent_MID | parent_sshd_PID_hash | child_MID | origin_sshd_PID_hash |
|------------|---------------------|-----------|----------------------|
| A | A1 | B | B1 |

Fig. 3Q

| MID | sshd_PID_hash | parent_MID | parent_sshd_PID_hash | origin_MID | origin_sshd_PID_hash |
|-----|---------------|------------|----------------------|------------|----------------------|
| A | A1 | null | null | A | A1 |
| B | B1 | A | A1 | A | A1 |

Fig. 3R

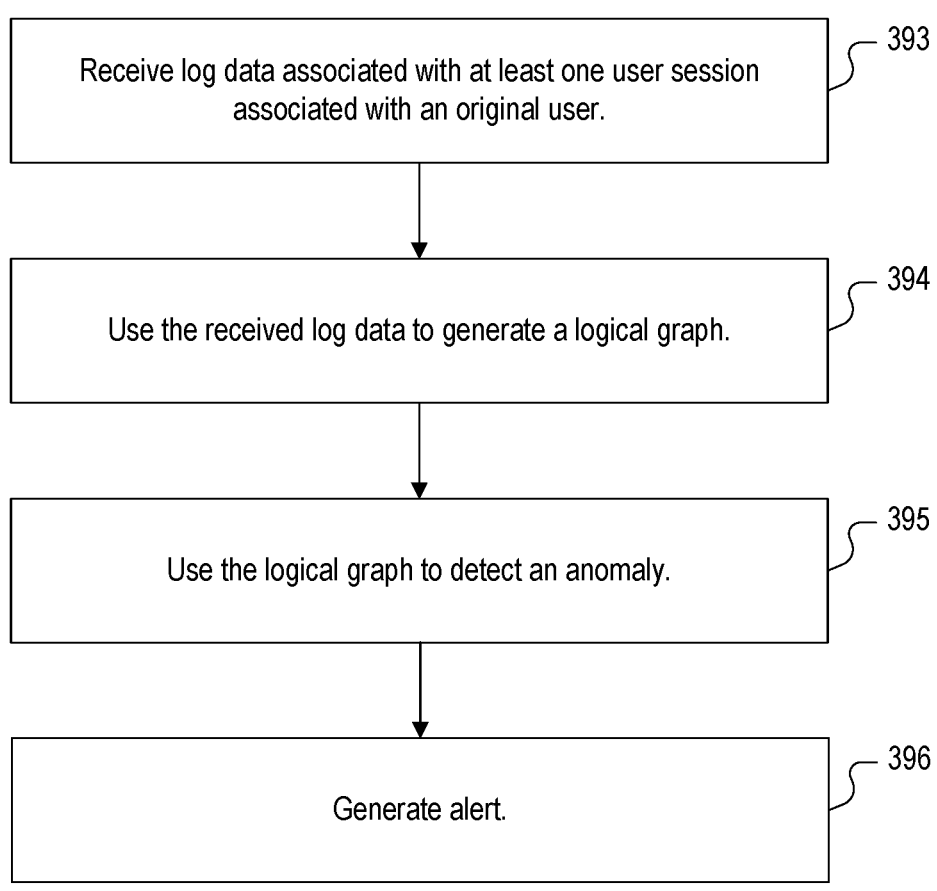
392
Receive log data associated with at least one user session associated with an original user. — 393
Use the received log data to generate a logical graph. — 394
Use the logical graph to detect an anomaly. — 395
Generate alert. — 396
Fig. 3S

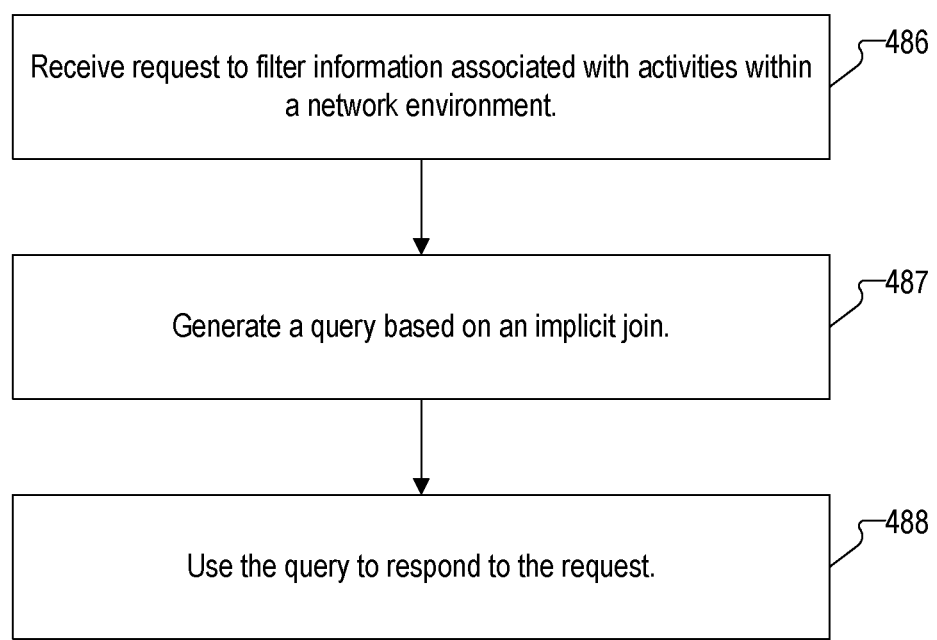
Fig. 4L

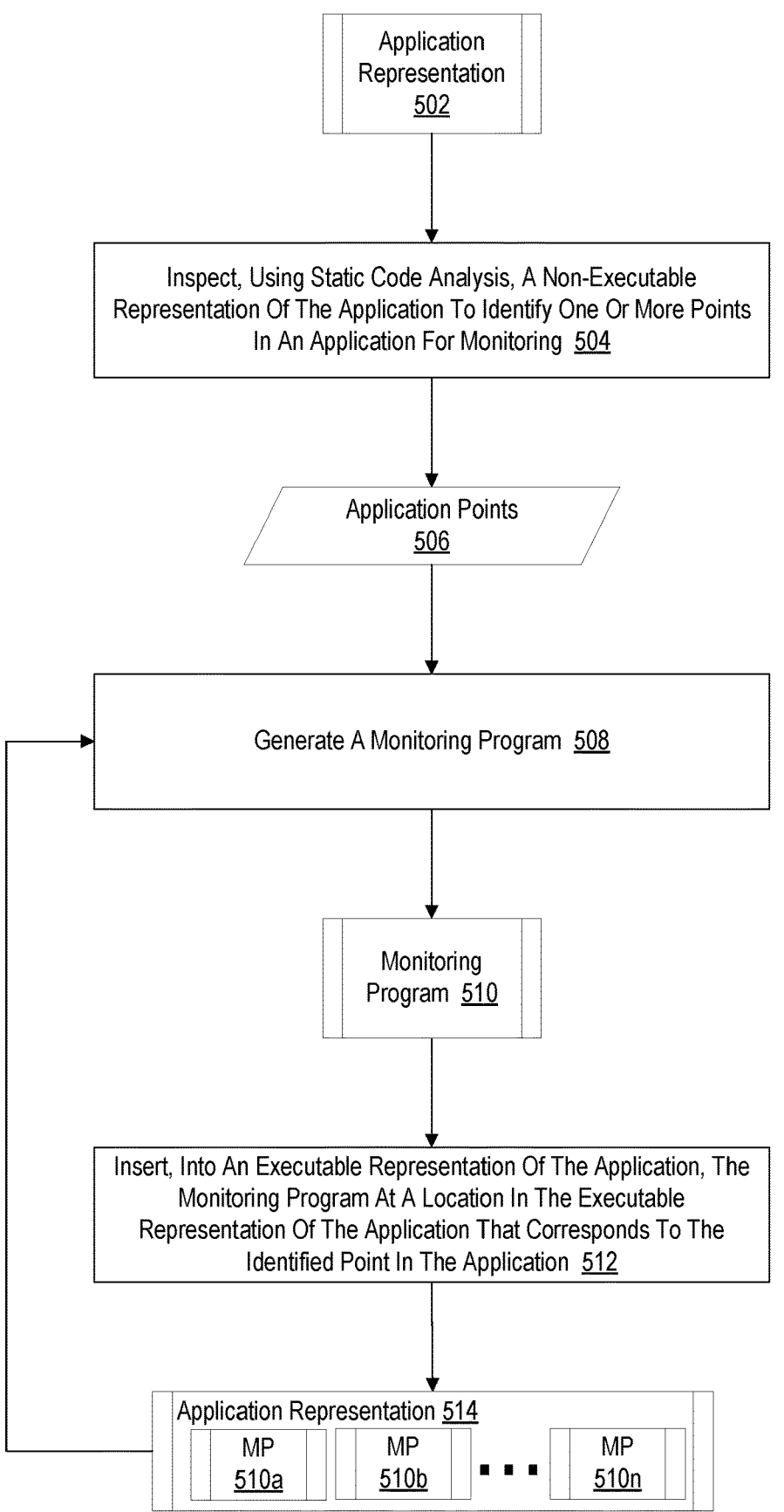

Application Representation 502

Inspect, Using Static Code Analysis, A Non-Executable Representation Of The Application To Identify One Or More Points In An Application For Monitoring 504

Application Points 506

Generate A Monitoring Program 508

Monitoring Program 510

Insert, Into An Executable Representation Of The Application, The Monitoring Program At A Location In The Executable Representation Of The Application That Corresponds To The Identified Point In The Application 512

Application Representation 514

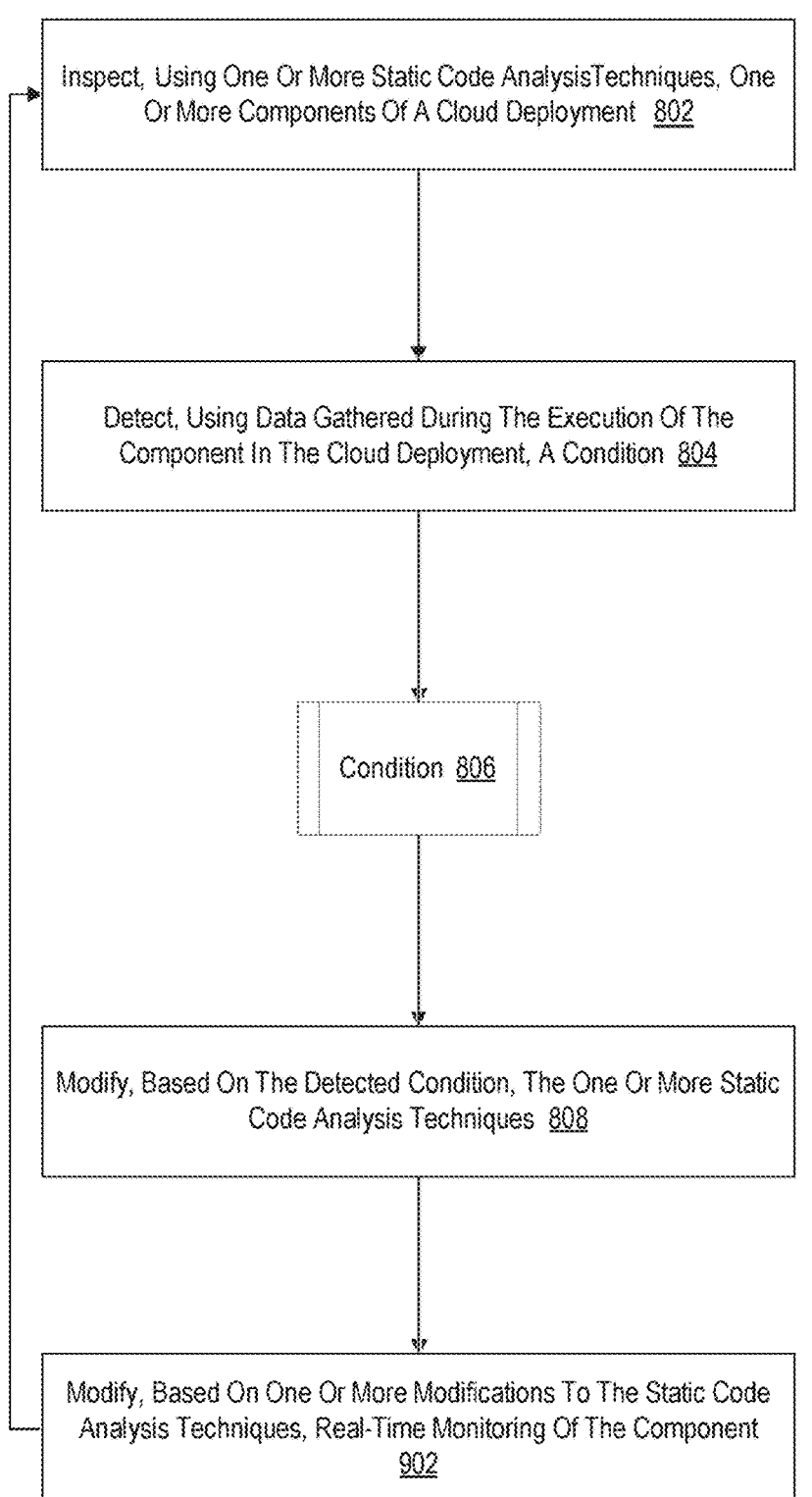

Inspect, Using One Or More Static Code AnalysisTechniques, One Or More Components Of A Cloud Deployment  802

Detect, Using Data Gathered During The Execution Of The Component In The Cloud Deployment, A Condition  804

Condition  806

Modify, Based On The Detected Condition, The One Or More Static Code Analysis Techniques  808

Modify, Based On One Or More Modifications To The Static Code Analysis Techniques, Real-Time Monitoring Of The Component  902

Fig. 9

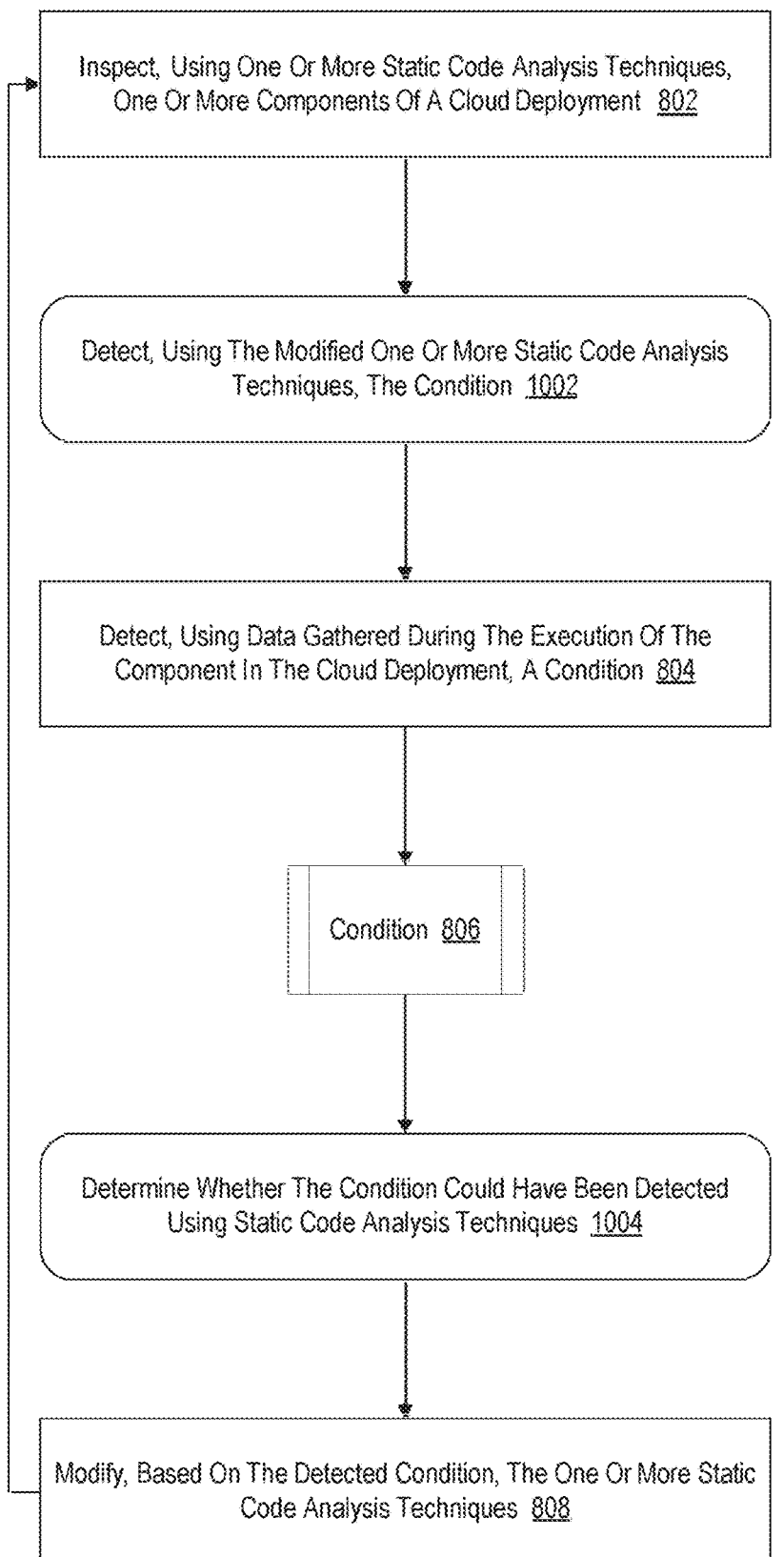

Inspect, Using One Or More Static Code Analysis Techniques, One Or More Components Of A Cloud Deployment  802

Detect, Using The Modified One Or More Static Code Analysis Techniques, The Condition  1002

Detect, Using Data Gathered During The Execution Of The Component In The Cloud Deployment, A Condition  804

Condition  806

Determine Whether The Condition Could Have Been Detected Using Static Code Analysis Techniques  1004

Modify, Based On The Detected Condition, The One Or More Static Code Analysis Techniques  808

Fig. 10

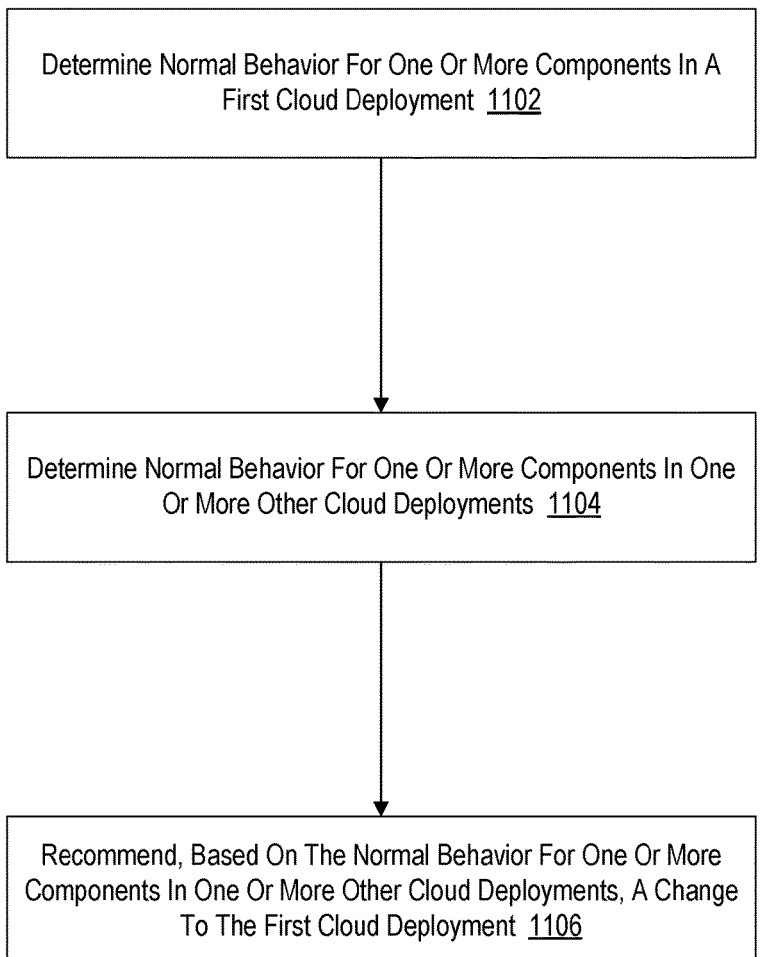

Determine Normal Behavior For One Or More Components In A
First Cloud Deployment 1102

Determine Normal Behavior For One Or More Components In One
Or More Other Cloud Deployments 1104

Recommend, Based On The Normal Behavior For One Or More
Components In One Or More Other Cloud Deployments, A Change
To The First Cloud Deployment 1106

Components 1110

First Cloud Deployment 1108

Components 1112

Second Cloud Deployment 1114

Fig. 11

MONITORING A SOFTWARE DEVELOPMENT PIPELINE

CROSS-REFERENCE TO RELATED APPLICATIONS

This is a continuation in-part application for patent entitled to a filing date and claiming the benefit of U.S. Pat. No. 11,677,722 issued Jun. 13, 2023, herein incorporated by reference in its entirety, which is a continuation of U.S. Pat. No. 11,153,339, issued Oct. 19, 2021, which is a continuation of U.S. Pat. No. 10,581,891, issued Mar. 3, 2020, which claims the benefit of U.S. Provisional Application Nos. 62/590,986, filed Nov. 27, 2017 and 62/650,971, filed Mar. 30, 2018. This application also claims benefit of U.S. Provisional Patent Application Nos. 63/241,966, filed Sep. 8, 2021, 63/244,336, filed Sep. 15, 2021, and 63/287,506, filed Dec. 8, 2021.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2I illustrates an example of a portion of a polygraph as rendered in an interface.

FIG. 2O illustrates an example of a machine server graph as rendered in an interface.

FIG. 3A illustrates an example of a process for detecting anomalies in a network environment.

FIG. 3H illustrates an example of a process for performing extended user tracking.

FIG. 3K illustrates example records.

FIG. 3L illustrates example output from performing an ssh connection match.

FIG. 3M illustrates example records.

FIG. 3N illustrates example records.

FIG. 3O illustrates example records.

FIG. 3P illustrates example records.

FIG. 3Q illustrates an adjacency relationship between two login sessions.

FIG. 3R illustrates example records.

FIG. 3S illustrates an example of a process for detecting anomalies.

FIG. 4I illustrates an example of a dossier for an event.

FIG. 4L illustrates an example of a process for dynamically generating and executing a query.

FIG. 5 sets forth a flowchart illustrating an example method of dynamically generating monitoring tools for software applications in accordance with some embodiments.

FIG. 9 sets forth a flow chart illustrating an additional example method of using real-time monitoring to inform static analysis in accordance with some embodiments.

FIG. 10 sets forth a flow chart illustrating an additional example method of using real-time monitoring to inform static analysis in accordance with some embodiments.

FIG. 11 sets forth a flowchart illustrating an example method of configuring cloud deployments (or components in a software development pipeline) based on learnings obtained by monitoring other cloud deployments (or components in another software development pipeline) in accordance with some embodiments of the present disclosure.

DETAILED DESCRIPTION

Various illustrative embodiments are described herein with reference to the accompanying drawings. It will, however, be evident that various modifications and changes may be made thereto, and additional embodiments may be implemented, without departing from the scope of the invention as set forth in the claims. For example, certain features of one embodiment described herein may be combined with or substituted for features of another embodiment described herein. The description and drawings are accordingly to be regarded in an illustrative rather than a restrictive sense.

Figure 1A:
FIG. 1A shows an illustrative configuration in which a data platform is configured to perform various operations with respect to a cloud environment that includes a plurality of compute assets.

FIG. 1A shows an illustrative configuration 10 in which a data platform 12 is configured to perform various operations with respect to a cloud environment 14 that includes a plurality of compute assets 16-1 through 16-N (collectively "compute assets 16). For example, data platform 12 may include data ingestion resources 18 configured to ingest data from cloud environment 14 into data platform 12, data processing resources 20 configured to perform data processing operations with respect to the data, user interface resources 22 configured to provide one or more external users and/or compute resources (e.g., computing device 24) with access to an output of data processing resources 20. Each of these resources are described in detail herein.

Cloud environment 14 may include any suitable network-based computing environment as may serve a particular application. For example, cloud environment 14 may be implemented by one or more compute resources provided and/or otherwise managed by one or more cloud service providers, such as Amazon Web Services (AWS), Google Cloud Platform (GCP), Microsoft Azure, and/or any other cloud service provider configured to provide public and/or private access to network-based compute resources.

Compute assets 16 may include, but are not limited to, containers (e.g., container images, deployed and executing container instances, etc.), virtual machines, workloads, applications, processes, physical machines, compute nodes, clusters of compute nodes, software runtime environments (e.g., container runtime environments), and/or any other virtual and/or physical compute resource that may reside in and/or be executed by one or more computer resources in cloud environment 14. In some examples, one or more compute assets 16 may reside in one or more datacenters.

A compute asset 16 may be associated with (e.g., owned, deployed, or managed by) a particular entity, such as a customer or client of cloud environment 14 and/or data platform 12. Accordingly, for purposes of the discussion herein, cloud environment 14 may be used by one or more entities.

Data platform 12 may be configured to perform one or more data security monitoring and/or remediation services, compliance monitoring services, anomaly detection services, DevOps services, compute asset management services, and/or any other type of data analytics service as may serve a particular implementation. Data platform 12 may be managed or otherwise associated with any suitable data platform provider, such as a provider of any of the data analytics services described herein. The various resources included in data platform 12 may reside in the cloud and/or be located on-premises and be implemented by any suitable combination of physical and/or virtual compute resources, such as one or more computing devices, microservices, applications, etc.

Data ingestion resources 18 may be configured to ingest data from cloud environment 14 into data platform 12. This may be performed in various ways, some of which are described in detail herein. For example, as illustrated by arrow 26, data ingestion resources 18 may be configured to receive the data from one or more agents deployed within cloud environment 14, utilize an event streaming platform (e.g., Kafka) to obtain the data, and/or pull data (e.g., configuration data) from cloud environment 14. In some examples, data ingestion resources 18 may obtain the data using one or more agentless configurations.

The data ingested by data ingestion resources 18 from cloud environment 14 may include any type of data as may serve a particular implementation. For example, the data may include data representative of configuration information associated with compute assets 16, information about one or more processes running on compute assets 16, network activity information, information about events (creation events, modification events, communication events, user-initiated events, etc.) that occur with respect to compute assets 16, etc. In some examples, the data may or may not include actual customer data processed or otherwise generated by compute assets 16.

As illustrated by arrow 28, data ingestion resources 18 may be configured to load the data ingested from cloud environment 14 into a data store 30. Data store 30 is illustrated in FIG. 1A as being separate from and communicatively coupled to data platform 12. However, in some alternative embodiments, data store 30 is included within data platform 12.

Data store 30 may be implemented by any suitable data warehouse, data lake, data mart, and/or other type of database structure as may serve a particular implementation. Such data stores may be proprietary or may be embodied as vendor provided products or services such as, for example, Snowflake, Google BigQuery, Druid, Amazon Redshift, IBM db2, Dremio, Databricks Lakehouse Platform, Cloudera, Azure Synapse Analytics, and others.

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable the joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in an enterprise data warehouse (EDW). "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged.

Data processing resources 20 may be configured to perform various data processing operations with respect to data ingested by data ingestion resources 18, including data ingested and stored in data store 30. For example, data processing resources 20 may be configured to perform one or more data security monitoring and/or remediation operations, compliance monitoring operations, anomaly detection operations, DevOps operations, compute asset management operations, and/or any other type of data analytics operation as may serve a particular implementation. Various examples of operations performed by data processing resources 20 are described herein.

As illustrated by arrow 32, data processing resources 20 may be configured to access data in data store 30 to perform the various operations described herein. In some examples, this may include performing one or more queries with respect to the data stored in data store 30. Such queries may be generated using any suitable query language.

In some examples, the queries provided by data processing resources 20 may be configured to direct data store 30 to perform one or more data analytics operations with respect to the data stored within data store 30. These data analytics operations may be with respect to data specific to a particular entity (e.g., data residing in one or more silos within data store 30 that are associated with a particular customer) and/or data associated with multiple entities. For example, data processing resources 20 may be configured to analyze data associated with a first entity and use the results of the analysis to perform one or more operations with respect to a second entity.

One or more operations performed by data processing resources 20 may be performed periodically according to a predetermined schedule. For example, one or more operations may be performed by processing resources 20 every hour or any other suitable time interval. Additionally or alternatively, one or more operations performed by data processing resources 20 may be performed in substantially real-time (or near real-time) as data is ingested into data platform 12. In this manner, the results of such operations (e.g., one or more detected anomalies in the data) may be provided to one or more external entities (e.g., computing device 24 and/or one or more users) in substantially real-time and/or in near real-time.

Figure 1B:
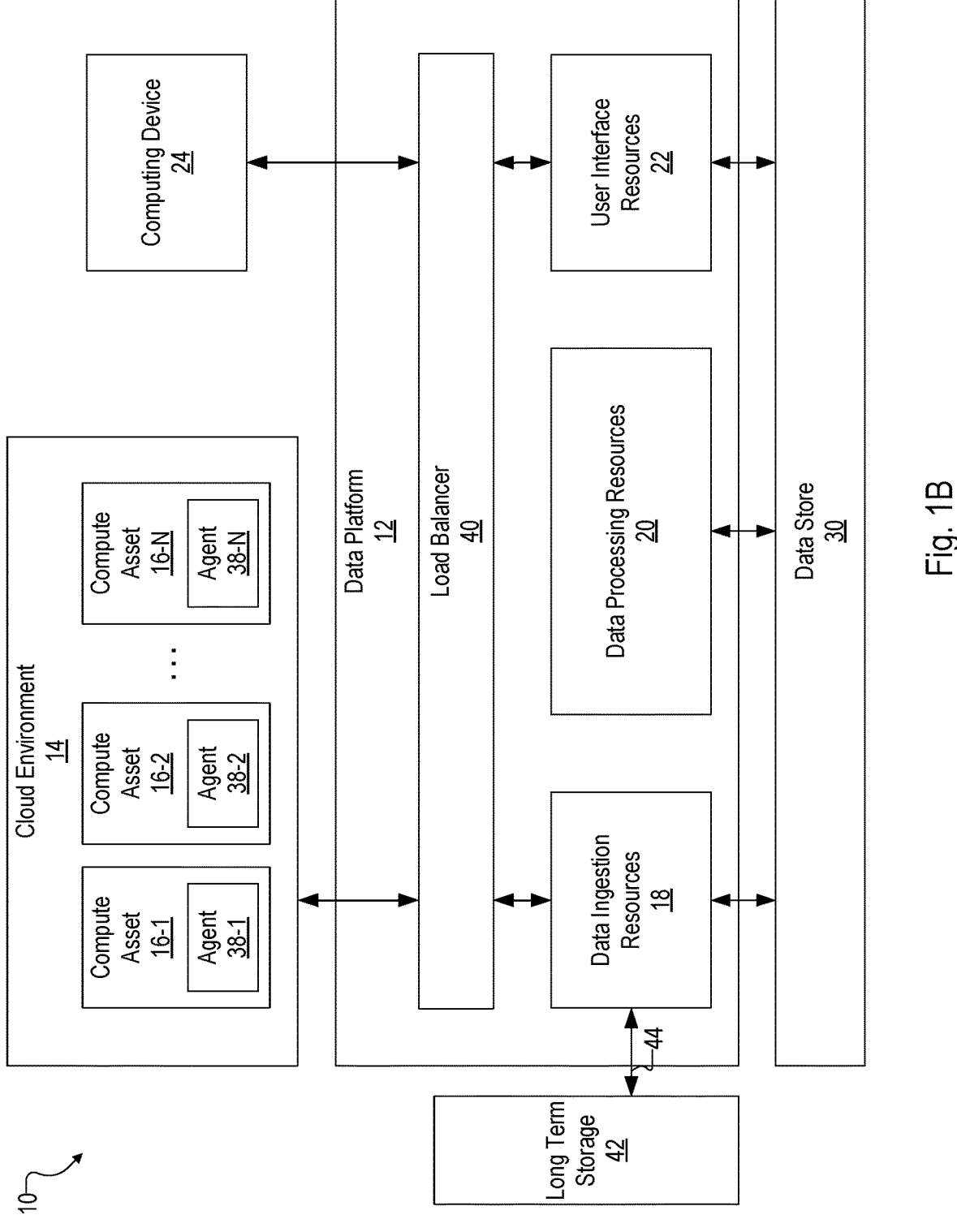
FIG. 1B shows an illustrative implementation of the configuration of FIG. 1A.

User interface resources 22 may be configured to perform one or more user interface operations, examples of which are described herein. For example, user interface resources 22 may be configured to present one or more results of the data processing performed by data processing resources 20 to one or more external entities (e.g., computing device 24 and/or one or more users), as illustrated by arrow 34. As illustrated by arrow 36, user interface resources 22 may access data in data store 30 to perform the one or more user interface operations FIG. 1B illustrates an implementation of configuration 10 in which an agent 38 (e.g., agent 38-1 through agent 38-N) is installed on each of compute assets 16. As used herein, an agent may include a self-contained binary and/or other type of code or application that can be run on any appropriate platforms, including within containers and/or other virtual compute assets. Agents 38 may monitor the nodes on which they execute for a variety of different activities, including but not limited to, connection, process, user, machine, and file activities. In some examples, agents 38 can be executed in user space, and can use a variety of kernel modules (e.g., auditd, iptables, netfilter, pcap, etc.) to collect data. Agents can be implemented in any appropriate programming language, such as C or Golang, using applicable kernel APIs.

Agents 38 may be deployed in any suitable manner. For example, an agent 38 may be deployed as a containerized application or as part of a containerized application. As described herein, agents 38 may selectively report information to data platform 12 in varying amounts of detail and/or with variable frequency.

Also shown in FIG. 1B is a load balancer 40 configured to perform one or more load balancing operations with respect to data ingestion operations performed by data ingestion resources 18 and/or user interface operations performed by user interface resources 22. Load balancer 40 is shown to be included in data platform 12. However, load balancer 40 may alternatively be located external to data platform 12. Load balancer 40 may be implemented by any suitable microservice, application, and/or other computing resources. In some alternative examples, data platform 12 may not utilize a load balancer such as load balancer 40.

Also shown in FIG. 1B is long term storage 42 with which data ingestion resources may interface, as illustrated by arrow 44. Long term storage 42 may be implemented by any suitable type of storage resources, such as cloud-based storage (e.g., AWS S3, etc.) and/or on-premises storage and may be used by data ingestion resources 18 as part of the data ingestion process. Examples of this are described herein. In some examples, data platform 12 may not utilize long term storage 42.

The embodiments described herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the principles described herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 1C:
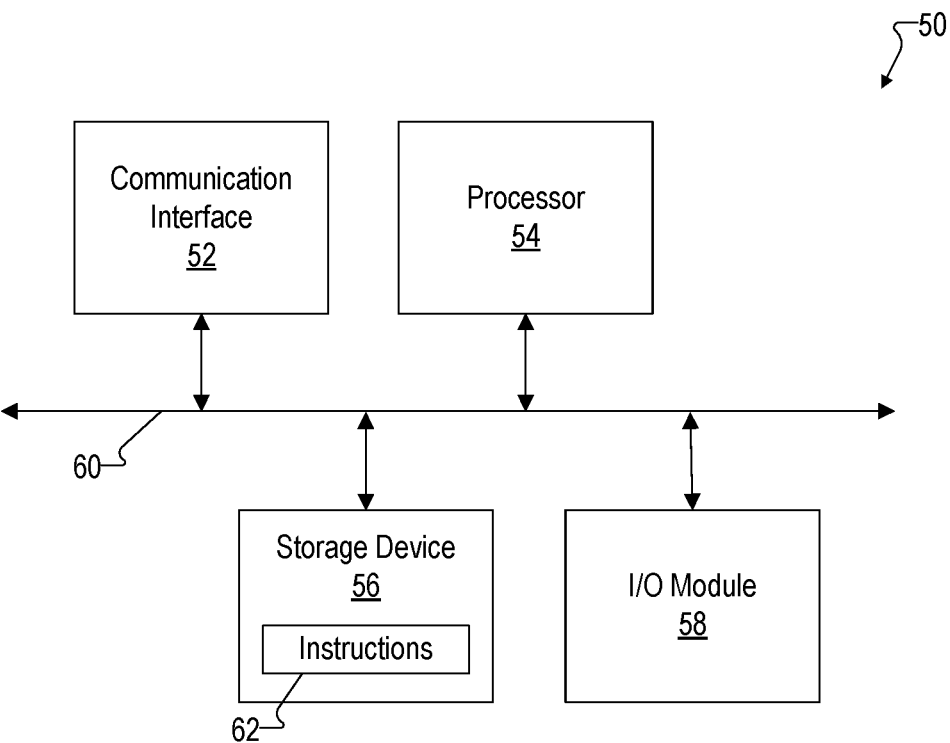
FIG. 1C illustrates an example computing device.

FIG. 1C illustrates an example computing device 50 that may be specifically configured to perform one or more of the processes described herein. Any of the systems, microservices, computing devices, and/or other components described herein may be implemented by computing device 50.

As shown in FIG. 1C, computing device 50 may include a communication interface 52, a processor 54, a storage device 56, and an input/output ("I/O") module 58 communicatively connected one to another via a communication infrastructure 60. While an exemplary computing device 50 is shown in FIG. 1C, the components illustrated in FIG. 1C are not intended to be limiting. Additional or alternative components may be used in other embodiments. Components of computing device 50 shown in FIG. 1C will now be described in additional detail.

Communication interface 52 may be configured to communicate with one or more computing devices. Examples of communication interface 52 include, without limitation, a wired network interface (such as a network interface card), a wireless network interface (such as a wireless network interface card), a modem, an audio/video connection, and any other suitable interface.

Processor 54 generally represents any type or form of processing unit capable of processing data and/or interpreting, executing, and/or directing execution of one or more of the instructions, processes, and/or operations described herein. Processor 54 may perform operations by executing computer-executable instructions 62 (e.g., an application, software, code, and/or other executable data instance) stored in storage device 56.

Storage device 56 may include one or more data storage media, devices, or configurations and may employ any type, form, and combination of data storage media and/or device. For example, storage device 56 may include, but is not limited to, any combination of the non-volatile media and/or volatile media described herein. Electronic data, including data described herein, may be temporarily and/or permanently stored in storage device 56. For example, data representative of computer-executable instructions 62 configured to direct processor 54 to perform any of the operations described herein may be stored within storage device 56. In some examples, data may be arranged in one or more databases residing within storage device 56.

I/O module 58 may include one or more I/O modules configured to receive user input and provide user output. I/O module 58 may include any hardware, firmware, software, or combination thereof supportive of input and output capabilities. For example, I/O module 58 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 58 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 58 is configured to provide graphical data to a display for presentation to a user. The graphical data may be representative of one or more graphical user interfaces and/or any other graphical content as may serve a particular implementation.

Figure 1D:
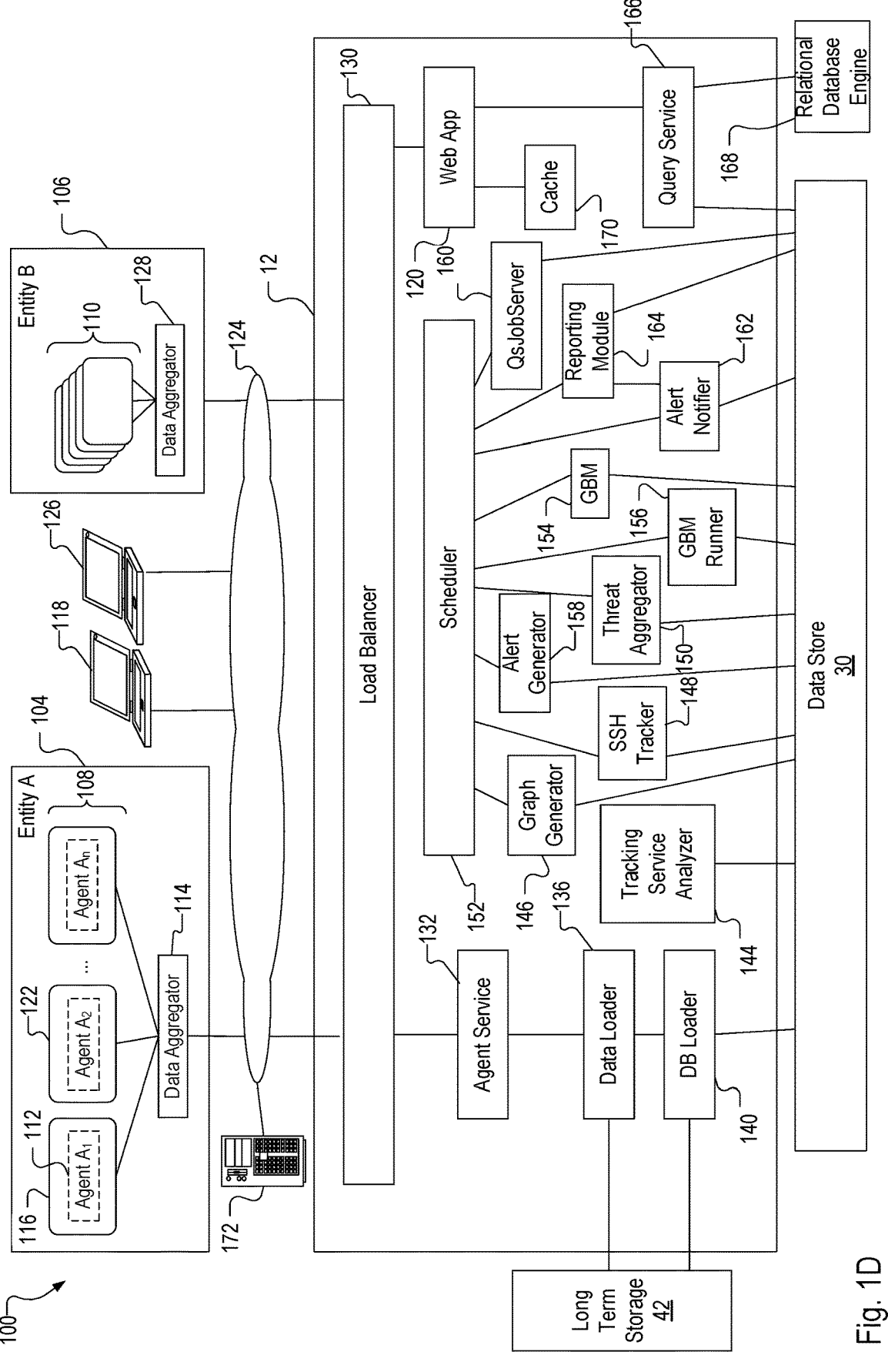
FIG. 1D illustrates an example of an environment in which activities that occur within datacenters are modeled.

FIG. 1D illustrates an example implementation 100 of configuration 10. As such, one or more components shown in FIG. 1D may implement one or more components shown in FIG. 1A and/or FIG. 1B. In particular, implementation 100 illustrates an environment in which activities that occur within datacenters are modeled using data platform 12. Using techniques described herein, a baseline of datacenter activity can be modeled, and deviations from that baseline can be identified as anomalous. Anomaly detection can be beneficial in a security context, a compliance context, an asset management context, a DevOps context, and/or any other data analytics context as may serve a particular implementation.

Two example datacenters (104 and 106) are shown in FIG. 1D, and are associated with (e.g., belong to) entities named entity A and entity B, respectively. A datacenter may include dedicated equipment (e.g., owned and operated by entity A, or owned/leased by entity A and operated exclusively on entity A's behalf by a third party). A datacenter can also include cloud-based resources, such as infrastructure as a service (IaaS), platform as a service (PaaS), and/or software as a service (SaaS) elements. The techniques described herein can be used in conjunction with multiple types of datacenters, including ones wholly using dedicated equipment, ones that are entirely cloud-based, and ones that use a mixture of both dedicated equipment and cloud-based resources.

Both datacenter 104 and datacenter 106 include a plurality of nodes, depicted collectively as set of nodes 108 and set of nodes 110, respectively, in FIG. 1D. These nodes may implement compute assets 16. Installed on each of the nodes are in-server/in-virtual machine (VM)/embedded in IoT device agents (e.g., agent 112), which are configured to collect data and report it to data platform 12 for analysis. As described herein, agents may be small, self-contained binaries that can be run on any appropriate platforms, including virtualized ones (and, as applicable, within containers). Agents may monitor the nodes on which they execute for a variety of different activities, including: connection, process, user, machine, and file activities. Agents can be executed in user space, and can use a variety of kernel modules (e.g., auditd, iptables, netfilter, pcap, etc.) to collect data. Agents can be implemented in any appropriate programming language, such as C or Golang, using applicable kernel APIs.

As described herein, agents can selectively report information to data platform 12 in varying amounts of detail and/or with variable frequency. As is also described herein, the data collected by agents may be used by data platform 12 to create polygraphs, which are graphs of logical entities, connected by behaviors. In some embodiments, agents report information directly to data platform 12. In other embodiments, at least some agents provide information to a data aggregator, such as data aggregator 114, which in turn provides information to data platform 12. The functionality of a data aggregator can be implemented as a separate binary or other application (distinct from an agent binary), and can also be implemented by having an agent execute in an "aggregator mode" in which the designated aggregator node acts as a Layer 7 proxy for other agents that do not have access to data platform 12. Further, a chain of multiple aggregators can be used, if applicable (e.g., with agent 112 providing data to data aggregator 114, which in turn provides data to another aggregator (not pictured) which provides data to data platform 12). An example way to implement an aggregator is through a program written in an appropriate language, such as C or Golang.

Use of an aggregator can be beneficial in sensitive environments (e.g., involving financial or medical transactions) where various nodes are subject to regulatory or other architectural requirements (e.g., prohibiting a given node from communicating with systems outside of datacenter 104). Use of an aggregator can also help to minimize security exposure more generally. As one example, by limiting communications with data platform 12 to data aggregator 114, individual nodes in nodes 108 need not make external network connections (e.g., via Internet 124), which can potentially expose them to compromise (e.g., by other external devices, such as device 118, operated by a criminal). Similarly, data platform 12 can provide updates, configuration information, etc., to data aggregator 114 (which in turn distributes them to nodes 108), rather than requiring nodes 108 to allow incoming connections from data platform 12 directly.

Another benefit of an aggregator model is that network congestion can be reduced (e.g., with a single connection being made at any given time between data aggregator 114 and data platform 12, rather than potentially many different connections being open between various of nodes 108 and data platform 12). Similarly, network consumption can also be reduced (e.g., with the aggregator applying compression techniques/bundling data received from multiple agents).

One example way that an agent (e.g., agent 112, installed on node 116) can provide information to data aggregator 114 is via a REST API, formatted using data serialization protocols such as Apache Avro. One example type of information sent by agent 112 to data aggregator 114 is status information. Status information may be sent by an agent periodically (e.g., once an hour or once any other predetermined amount of time). Alternatively, status information may be sent continuously or in response to occurrence of one or more events. The status information may include, but is not limited to, a. an amount of event backlog (in bytes) that has not yet been transmitted, b. configuration information, c. any data loss period for which data was dropped, d. a cumulative count of errors encountered since the agent started, e. version information for the agent binary, and/or f cumulative statistics on data collection (e.g., number of network packets processed, new processes seen, etc.).

A second example type of information that may be sent by agent 112 to data aggregator 114 is event data (described in more detail herein), which may include a UTC timestamp for each event. As applicable, the agent can control the amount of data that it sends to the data aggregator in each call (e.g., a maximum of 10 MB) by adjusting the amount of data sent to manage the conflicting goals of transmitting data as soon as possible, and maximizing throughput. Data can also be compressed or uncompressed by the agent (as applicable) prior to sending the data.

Each data aggregator may run within a particular customer environment. A data aggregator (e.g., data aggregator 114) may facilitate data routing from many different agents (e.g., agents executing on nodes 108) to data platform 12. In various embodiments, data aggregator 114 may implement a SOCKS 5 caching proxy through which agents can connect to data platform 12. As applicable, data aggregator 114 can encrypt (or otherwise obfuscate) sensitive information prior to transmitting it to data platform 12, and can also distribute key material to agents which can encrypt the information (as applicable). Data aggregator 114 may include a local storage, to which agents can upload data (e.g., pcap packets). The storage may have a key-value interface. The local storage can also be omitted, and agents configured to upload data to a cloud storage or other storage area, as applicable. Data aggregator 114 can, in some embodiments, also cache locally and distribute software upgrades, patches, or configuration information (e.g., as received from data platform 12).

Various examples associated with agent data collection and reporting will now be described.

In the following example, suppose that a user (e.g., a network administrator) at entity A (hereinafter "user A") has decided to begin using the services of data platform 12. In some embodiments, user A may access a web frontend (e.g., web app 120) using a computer 126 and enrolls (on behalf of entity A) an account with data platform 12. After enrollment is complete, user A may be presented with a set of installers, pre-built and customized for the environment of entity A, that user A can download from data platform 12 and deploy on nodes 108. Examples of such installers include, but are not limited to, a Windows executable file, an iOS app, a Linux package (e.g., .deb or .rpm), a binary, or a container (e.g., a Docker container). When a user (e.g., a network administrator) at entity B (hereinafter "user B") also signs up for the services of data platform 12, user B may be similarly presented with a set of installers that are pre-built and customized for the environment of entity B.

User A deploys an appropriate installer on each of nodes 108 (e.g., with a Windows executable file deployed on a Windows-based platform or a Linux package deployed on a Linux platform, as applicable). As applicable, the agent can be deployed in a container. Agent deployment can also be performed using one or more appropriate automation tools, such as Chef, Puppet, Salt, and Ansible. Deployment can also be performed using managed/hosted container management/orchestration frameworks such as Kubernetes, Mesos, and/or Docker Swarm.

In various embodiments, the agent may be installed in the user space (i.e., is not a kernel module), and the same binary is executed on each node of the same type (e.g., all Windows-based platforms have the same Windows-based binary installed on them). An illustrative function of an agent, such as agent 112, is to collect data (e.g., associated with node 116) and report it (e.g., to data aggregator 114). Other tasks that can be performed by agents include data configuration and upgrading.

One approach to collecting data as described herein is to collect virtually all information available about a node (and, e.g., the processes running on it). Alternatively, the agent may monitor for network connections, and then begin collecting information about processes associated with the network connections, using the presence of a network packet associated with a process as a trigger for collecting additional information about the process. As an example, if a user of node 116 executes an application, such as a calculator application, which does not typically interact with the network, no information about use of that application may be collected by agent 112 and/or sent to data aggregator 114. If, however, the user of node 116 executes an ssh command (e.g., to ssh from node 116 to node 122), agent 112 may collect information about the process and provide associated information to data aggregator 114. In various embodiments, the agent may always collect/report information about certain events, such as privilege escalation, irrespective of whether the event is associated with network activity.

Figure 2A:
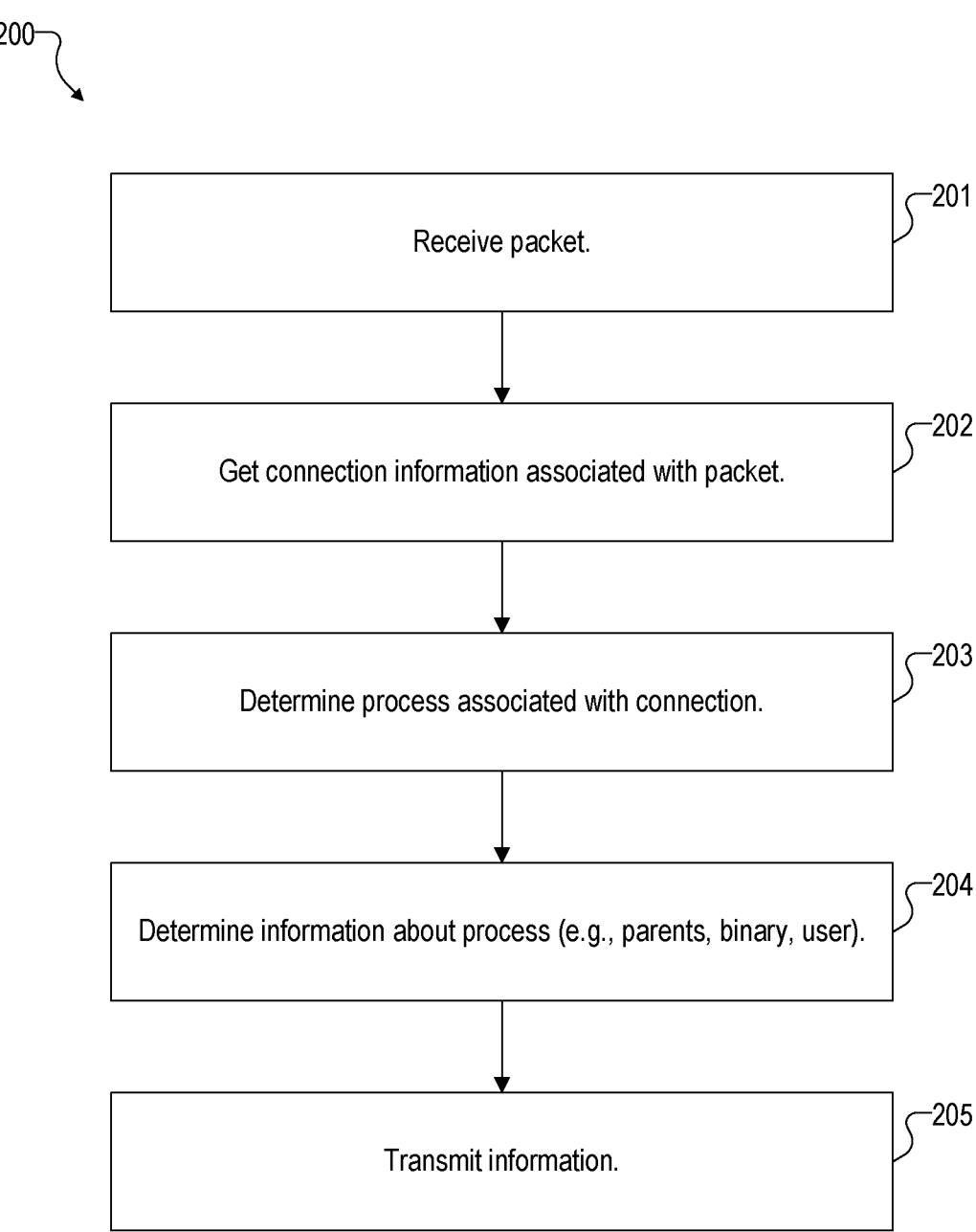
FIG. 2A illustrates an example of a process, used by an agent, to collect and report information about a client.

An approach to collecting information (e.g., by an agent) is as follows, and described in conjunction with process 200 depicted in FIG. 2A. An agent (e.g., agent 112) monitors its node (e.g., node 116) for network activity. One example way that agent 112 can monitor node 116 for network activity is by using a network packet capture tool (e.g., listening using libpcap). As packets are received (201), the agent obtains and maintains (e.g., in an in-memory cache) connection information associated with the network activity (202). Examples of such information include DNS query/response, TCP, UDP, and IP information.

The agent may also determine a process associated with the network connection (203). One example approach is for the agent to use a kernel network diagnostic API (e.g., netlink_diag) to obtain inode/process information from the kernel. Another example approach is for the agent to scan using netstat (e.g., on /proc/net/tcp, /proc/net/tcp6, /proc/net/udp, and/proc/net/udp6) to obtain sockets and relate them to processes. Information such as socket state (e.g., whether a socket is connected, listening, etc.) can also be collected by the agent.

One way an agent can obtain a mapping between a given inode and a process identifier is to scan within the /proc/pid directory. For each of the processes currently running, the agent examines each of their file descriptors. If a file descriptor is a match for the inode, the agent can determine that the process associated with the file descriptor owns the inode. Once a mapping is determined between an inode and a process identifier, the mapping is cached. As additional packets are received for the connection, the cached process information is used (rather than a new search being performed).

In some cases, exhaustively scanning for an inode match across every file descriptor may not be feasible (e.g., due to CPU limitations). In various embodiments, searching through file descriptors is accordingly optimized. User filtering is one example of such an optimization. A given socket is owned by a user. Any processes associated with the socket will be owned by the same user as the socket. When matching an inode (identified as relating to a given socket) against processes, the agent can filter through the processes and only examine the file descriptors of processes sharing the same user owner as the socket. In various embodiments, processes owned by root are always searched against (e.g., even when user filtering is employed).

Another example of an optimization is to prioritize searching the file descriptors of certain processes over others. One such prioritization is to search through the subdirectories of /proc/ starting with the youngest process. One approximation of such a sort order is to search through /proc/ in reverse order (e.g., examining highest numbered processes first). Higher numbered processes are more likely to be newer (i.e., not long-standing processes), and thus more likely to be associated with new connections (i.e., ones for which inode-process mappings are not already cached). In some cases, the most recently created process may not have the highest process identifier (e.g., due to the kernel wrapping through process identifiers).

Another example prioritization is to query the kernel for an identification of the most recently created process and to search in a backward order through the directories in /proc/ (e.g., starting at the most recently created process and working backwards, then wrapping to the highest value (e.g., 32768) and continuing to work backward from there). An alternate approach is for the agent to keep track of the newest process that it has reported information on (e.g., to data aggregator 114), and begin its search of /proc/ in a forward order starting from the PID of that process.

Another example prioritization is to maintain, for each user actively using node 116, a list of the five (or any other number) most recently active processes. Those processes are more likely than other processes (less active, or passive) on node 116 to be involved with new connections, and can thus be searched first. For many processes, lower valued file descriptors tend to correspond to non-sockets (e.g., stdin, stdout, stderr). Yet another optimization is to preferentially search higher valued file descriptors (e.g., across processes) over lower valued file descriptors (that are less likely to yield matches).

In some cases, while attempting to locate a process identifier for a given inode, an agent may encounter a socket that does not correspond to the inode being matched against and is not already cached. The identity of that socket (and its corresponding inode) can be cached, once discovered, thus removing a future need to search for that pair.

In some cases, a connection may terminate before the agent is able to determine its associated process (e.g., due to a very short-lived connection, due to a backlog in agent processing, etc.). One approach to addressing such a situation is to asynchronously collect information about the connection using the audit kernel API, which streams information to user space. The information collected from the audit API (which can include PID/inode information) can be matched by the agent against pcap/inode information. In some embodiments, the audit API is always used, for all connections. However, due to CPU utilization considerations, use of the audit API can also be reserved for short/otherwise problematic connections (and/or omitted, as applicable).

Once the agent has determined which process is associated with the network connection (203), the agent can then collect additional information associated with the process (204). As will be described in more detail below, some of the collected information may include attributes of the process (e.g., a process parent hierarchy, and an identification of a binary associated with the process). As will also be described in more detail below, other of the collected information is derived (e.g., session summarization data and hash values).

The collected information is then transmitted (205), e.g., by an agent (e.g., agent 112) to a data aggregator (e.g., data aggregator 114), which in turn provides the information to data platform 12. In some embodiments, all information collected by an agent may be transmitted (e.g., to a data aggregator and/or to data platform 12). In other embodiments, the amount of data transmitted may be minimized (e.g., for efficiency reasons), using various techniques.

One approach to minimizing the amount of data flowing from agents (such as agents installed on nodes 108) to data platform 12 is to use a technique of implicit references with unique keys. The keys can be explicitly used by data platform 12 to extract/derive relationships, as necessary, in a data set at a later time, without impacting performance.

As previously mentioned, some data collected about a process is constant and does not change over the lifetime of the process (e.g., attributes), and some data changes (e.g., statistical information and other variable information). Constant data can be transmitted (210) once, when the agent first becomes aware of the process. And, if any changes to the constant data are detected (e.g., a process changes its parent), a refreshed version of the data can be transmitted (210) as applicable.

In some examples, an agent may collect variable data (e.g., data that may change over the lifetime of the process). In some examples, variable data can be transmitted (210) at periodic (or other) intervals. Alternatively, variable data may be transmitted in substantially real time as it is collected. In some examples, the variable data may indicate a thread count for a process, a total virtual memory used by the process, the total resident memory used by the process, the total time spent by the process executing in user space, and/or the total time spent by the process executing in kernel space. In some examples, the data may include a hash that may be used within data platform 12 to join process creation time attributes with runtime attributes to construct a full dataset.

Below are additional examples of data that an agent, such as agent 112, can collect and provide to data platform 12.

1. User Data

Core User Data: user name, UID (user ID), primary group, other groups, home directory.

Failed Login Data: IP address, hostname, username, count.

User Login Data: user name, hostname, IP address, start time, TTY (terminal), UID (user ID), GID (group ID), process, end time.

2. Machine Data

Dropped Packet Data: source IP address, destination IP address, destination port, protocol, count.

Machine Data: hostname, domain name, architecture, kernel, kernel release, kernel version, OS, OS version, OS description, CPU, memory, model number, number of cores, last boot time, last boot reason, tags (e.g., Cloud provider tags such as AWS, GCP, or Azure tags), default router, interface name, interface hardware address, interface IP address and mask, promiscuous mode.

3. Network Data

Network Connection Data: source IP address, destination IP address, source port, destination port, protocol, start time, end time, incoming and outgoing bytes, source process, destination process, direction of connection, histograms of packet length, inter packet delay, session lengths, etc.

Listening Ports in Server: source IP address, port number, protocol, process.

Dropped Packet Data: source IP address, destination IP address, destination port, protocol, count.

Arp Data: source hardware address, source IP address, destination hardware address, destination IP address.

DNS Data: source IP address, response code, response string, question (request), packet length, final answer (response).

4. Application Data

Package Data: exe path, package name, architecture, version, package path, checksums (MD5, SHA-1, SHA-256), size, owner, owner ID.

Application Data: command line, PID (process ID), start time, UID (user ID), EUID (effective UID), PPID (parent process ID), PGID (process group ID), SID (session ID), exe path, username, container ID.

5. Container Data

Container Image Data: image creation time, parent ID, author, container type, repo, (AWS) tags, size, virtual size, image version.

Container Data: container start time, container type, container name, container ID, network mode, privileged, PID mode, IP addresses, listening ports, volume map, process ID.

6. File Data

File path, file data hash, symbolic links, file creation data, file change data, file metadata, file mode.

As mentioned above, an agent, such as agent 112, can be deployed in a container (e.g., a Docker container), and can also be used to collect information about containers. Collection about a container can be performed by an agent irrespective of whether the agent is itself deployed in a container or not (as the agent can be deployed in a container running in a privileged mode that allows for monitoring).

Agents can discover containers (e.g., for monitoring) by listening for container create events (e.g., provided by Docker), and can also perform periodic ordered discovery scans to determine whether containers are running on a node. When a container is discovered, the agent can obtain attributes of the container, e.g., using standard Docker API calls (e.g., to obtain IP addresses associated with the container, whether there's a server running inside, what port it is listening on, associated PIDs, etc.). Information such as the parent process that started the container can also be collected, as can information about the image (which comes from the Docker repository).

In various embodiments, agents may use namespaces to determine whether a process is associated with a container. Namespaces are a feature of the Linux kernel that can be used to isolate resources of a collection of processes. Examples of namespaces include process ID (PID) namespaces, network namespaces, and user namespaces. Given a process, the agent can perform a fast lookup to determine whether the process is part of the namespace the container claims to be its namespace.

As mentioned, agents can be configured to report certain types of information (e.g., attribute information) once, when the agent first becomes aware of a process. In various embodiments, such static information is not reported again (or is reported once a day, every twelve hours, etc.), unless it changes (e.g., a process changes its parent, changes its owner, or a SHA-1 of the binary associated with the process changes).

In contrast to static/attribute information, certain types of data change constantly (e.g., network-related data). In various embodiments, agents are configured to report a list of current connections every minute (or other appropriate time interval). In that connection list will be connections that started in that minute interval, connections that ended in that minute interval, and connections that were ongoing through-out the minute interval (e.g., a one minute slice of a one hour connection).

In various embodiments, agents are configured to collect/compute statistical information about connections (e.g., at the one minute level of granularity and or at any other time interval). Examples of such information include, for the time interval, the number of bytes transferred, and in which direction. Another example of information collected by an agent about a connection is the length of time between packets. For connections that span multiple time intervals (e.g., a seven minute connection), statistics may be calculated for each minute of the connection. Such statistical information (for all connections) can be reported (e.g., to a data aggregator) once a minute.

In various embodiments, agents are also configured to maintain histogram data for a given network connection, and provide the histogram data (e.g., in the Apache Avro data exchange format) under the Connection event type data. Examples of such histograms include: 1. a packet length histogram (packet_len_hist), which characterizes network packet distribution; 2. a session length histogram (session_len_hist), which characterizes a network session length; 3. a session time histogram (session_time_hist), which characterizes a network session time; and 4. a session switch time histogram (session_switch_time_hist), which characterizes network session switch time (i.e., incoming→outgoing and vice versa). For example, histogram data may include one or more of the following fields: 1. count, which provides a count of the elements in the sampling; 2. sum, which provides a sum of elements in the sampling; 3. max, which provides the highest value element in the sampling; 4. std_dev, which provides the standard deviation of elements in the sampling; and 5. buckets, which provides a discrete sample bucket distribution of sampling data (if applicable).

For some protocols (e.g., HTTP), typically, a connection is opened, a string is sent, a string is received, and the connection is closed. For other protocols (e.g., NFS), both sides of the connection engage in a constant chatter. Histograms allow data platform 12 to model application behavior (e.g., using machine learning techniques), for establishing baselines, and for detecting deviations. As one example, suppose that a given HTTP server typically sends/receives 1,000 bytes (in each direction) whenever a connection is made with it. If a connection generates 500 bytes of traffic, or 2,000 bytes of traffic, such connections would be considered within the typical usage pattern of the server. Suppose, however, that a connection is made that results in 10 G of traffic. Such a connection is anomalous and can be flagged accordingly.

Returning to FIG. 1D, as previously mentioned, data aggregator 114 may be configured to provide information (e.g., collected from nodes 108 by agents) to data platform 12. Data aggregator 128 may be similarly configured to provide information to data platform 12. As shown in FIG. 1D, both aggregator 114 and aggregator 128 may connect to a load balancer 130, which accepts connections from aggregators (and/or as applicable, agents), as well as other devices, such as computer 126 (e.g., when it communicates with web app 120), and supports fair balancing. In various embodiments, load balancer 130 is a reverse proxy that load balances accepted connections internally to various microservices (described in more detail below), allowing for services provided by data platform 12 to scale up as more agents are added to the environment and/or as more entities subscribe to services provided by data platform 12. Example ways to implement load balancer 130 include, but are not limited to, using HaProxy, using nginx, and using elastic load balancing (ELB) services made available by Amazon.

Agent service 132 is a microservice that is responsible for accepting data collected from agents (e.g., provided by aggregator 114). In various embodiments, agent service 132 uses a standard secure protocol, such as HTTPS to communicate with aggregators (and as applicable agents), and receives data in an appropriate format such as Apache Avro. When agent service 132 receives an incoming connection, it can perform a variety of checks, such as to see whether the data is being provided by a current customer, and whether the data is being provided in an appropriate format. If the data is not appropriately formatted (and/or is not provided by a current customer), it may be rejected.

If the data is appropriately formatted, agent service 132 may facilitate copying the received data to a streaming data stable storage using a streaming service (e.g., Amazon Kinesis and/or any other suitable streaming service. Once the ingesting into the streaming service is complete, service 132 may send an acknowledgement to the data provider (e.g., data aggregator 114). If the agent does not receive such an acknowledgement, it is configured to retry sending the data to data platform 12. One way to implement agent service 132 is as a REST API server framework (e.g., Java DropWizard), configured to communicate with Kinesis (e.g., using a Kinesis library).

In various embodiments, data platform 12 uses one or more streams (e.g., Kinesis streams) for all incoming customer data (e.g., including data provided by data aggregator 114 and data aggregator 128), and the data is sharded based on the node (also referred to herein as a "machine") that originated the data (e.g., node 116 vs. node 122), with each node having a globally unique identifier within data platform 12. Multiple instances of agent service 132 can write to multiple shards.

Kinesis is a streaming service with a limited period (e.g., 1-7 days). To persist data longer than a day, the data may be copied to long term storage 42 (e.g., S3). Data loader 136 is a microservice that is responsible for picking up data from a data stream (e.g., a Kinesis stream) and persisting it in long term storage 42. In one example embodiment, files collected by data loader 136 from the Kinesis stream are placed into one or more buckets, and segmented using a combination of a customer identifier and time slice. Given a particular time segment, and a given customer identifier, the corresponding file (stored in long term storage) contains five minutes (or another appropriate time slice) of data collected at that specific customer from all of the customer's nodes. Data loader 136 can be implemented in any appropriate programming language, such as Java or C, and can be configured to use a Kinesis library to interface with Kinesis. In various embodiments, data loader 136 uses the Amazon Simple Queue Service (SQS) (e.g., to alert DB loader 140 that there is work for it to do).

DB loader 140 is a microservice that is responsible for loading data into an appropriate data store 30, such as SnowflakeDB or Amazon Redshift, using individual per-customer databases. In particular, DB loader 140 is configured to periodically load data into a set of raw tables from files created by data loader 136 as per above. DB loader 140 manages throughput, errors, etc., to make sure that data is loaded consistently and continuously. Further, DB loader 140 can read incoming data and load into data store 30 data that is not already present in tables of data store 30 (also referred to herein as a database). DB loader 140 can be implemented in any appropriate programming language, such as Java or C, and an SQL framework such as jOOQ (e.g., to manage SQLs for insertion of data), and SQL/JDBC libraries. In some examples, DB loader 140 may use Amazon S3 and Amazon Simple Queue Service (SQS) to manage files being transferred to and from data store 30.

Customer data included in data store 30 can be augmented with data from additional data sources, such as AWS Cloud-Trail and/or other types of external tracking services. To this end, data platform may include a tracking service analyzer 144, which is another microservice. Tracking service analyzer 144 may pull data from an external tracking service (e.g., Amazon CloudTrail) for each applicable customer account, as soon as the data is available. Tracking service analyzer 144 may normalize the tracking data as applicable, so that it can be inserted into data store 30 for later querying/analysis. Tracking service analyzer 144 can be written in any appropriate programming language, such as Java or C. Tracking service analyzer 144 also makes use of SQL/JDBC libraries to interact with data store 30 to insert/query data.

As described herein, data platform 12 can model activities that occur within datacenters, such as datacenters 104 and 106. The model may be stable over time, and differences, even subtle ones (e.g., between a current state of the datacenter and the model) can be surfaced. The ability to surface such anomalies can be particularly beneficial in datacenter environments where rogue employees and/or external attackers may operate slowly (e.g., over a period of months), hoping that the elastic nature of typical resource use (e.g., virtualized servers) will help conceal their nefarious activities.

Using techniques described herein, data platform 12 can automatically discover entities (which may implement compute assets 16) deployed in a given datacenter. Examples of entities include workloads, applications, processes, machines, virtual machines, containers, files, IP addresses, domain names, and users. The entities may be grouped together logically (into analysis groups) based on behaviors, and temporal behavior baselines can be established. In particular, using techniques described herein, periodic graphs can be constructed (also referred to herein as poly-graphs), in which the nodes are applicable logical entities, and the edges represent behavioral relationships between the logical entities in the graph. Baselines can be created for every node and edge.

Communication (e.g., between applications/nodes) is one example of a behavior. A model of communications between processes is an example of a behavioral model. As another example, the launching of applications is another example of a behavior that can be modeled. The baselines may be periodically updated (e.g., hourly) for every entity. Additionally or alternatively, the baselines may be continuously updated in substantially real-time as data is collected by agents. Deviations from the expected normal behavior can then be detected and automatically reported (e.g., as anomalies or threats detected). Such deviations may be due to a desired change, a misconfiguration, or malicious activity. As applicable, data platform 12 can score the detected deviations (e.g., based on severity and threat posed). Additional examples of analysis groups include models of machine communications, models of privilege changes, and models of insider behaviors (monitoring the interactive behavior of human users as they operate within the datacenter).

Two example types of information collected by agents are network level information and process level information. As previously mentioned, agents may collect information about every connection involving their respective nodes. And, for each connection, information about both the server and the client may be collected (e.g., using the connection-to-process identification techniques described above). DNS queries and responses may also be collected. The DNS query information can be used in logical entity graphing (e.g., collapsing many different IP addresses to a single service—e.g., s3.amazon.com). Examples of process level information collected by agents include attributes (user ID, effective user ID, and command line). Information such as what user/application is responsible for launching a given process and the binary being executed (and its SHA-256 values) may also be provided by agents.

The dataset collected by agents across a datacenter can be very large, and many resources (e.g., virtual machines, IP addresses, etc.) are recycled very quickly. For example, an IP address and port number used at a first point in time by a first process on a first virtual machine may very rapidly be used (e.g., an hour later) by a different process/virtual machine.

Figure 2B:
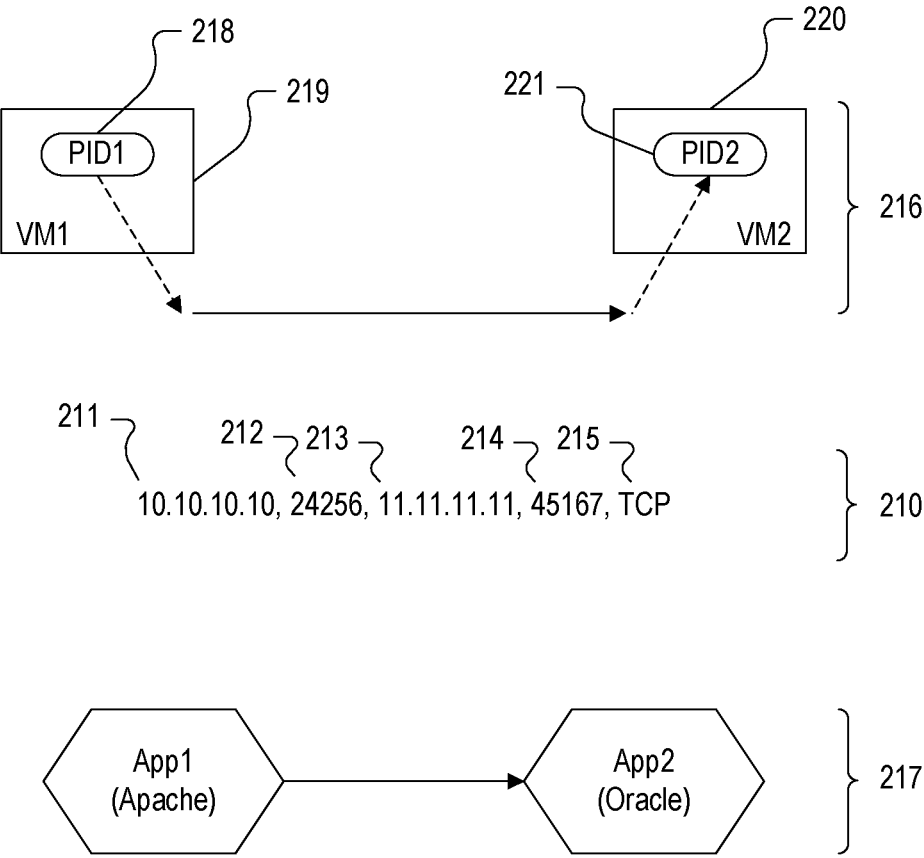
FIG. 2B illustrates a 5-tuple of data collected by an agent, physically and logically.

A dataset (and elements within it) can be considered at both a physical level, and a logical level, as illustrated in FIG. 2B. In particular, FIG. 2B illustrates an example 5-tuple of data 210 collected by an agent, represented physically (216) and logically (217). The 5-tuple includes a source address 211, a source port 212, a destination address 213, a destination port 214, and a protocol 215. In some cases, port numbers (e.g., 212, 214) may be indicative of the nature of a connection (e.g., with certain port usage standardized). However, in many cases, and in particular in datacenters, port usage is ephemeral. For example, a Docker container can listen on an ephemeral port, which is unrelated to the service it will run. When another Docker container starts (for the same service), the port may well be different. Similarly, particularly in a virtualized environment, IP addresses may be recycled frequently (and are thus also potentially ephemeral) or could be NATed, which makes identification difficult.

A physical representation of the 5-tuple is depicted in region 216. A process 218 (executing on machine 219) has opened a connection to machine 220. In particular, process 218 is in communication with process 221. Information such as the number of packets exchanged between the two machines over the respective ports can be recorded.

As previously mentioned, in a datacenter environment, portions of the 5-tuple may change—potentially frequently—but still be associated with the same behavior. Namely, one application (e.g., Apache) may frequently be in communication with another application (e.g., Oracle), using ephemeral datacenter resources. Further, either/both of Apache and Oracle may be multi-homed. This can lead to potentially thousands of 5-tuples (or more) that all correspond to Apache communicating with Oracle within a datacenter. For example, Apache could be executed on a single machine, and could also be executed across fifty machines, which are variously spun up and down (with different IP addresses each time). An alternate representation of the 5-tuple of data 210 is depicted in region 217, and is logical. The logical representation of the 5-tuple aggregates the 5-tuple (along with other connections between Apache and Oracle having other 5-tuples) as logically representing the same connection. By aggregating data from raw physical connection information into logical connection information, using techniques described herein, a size reduction of six orders of magnitude in the data set can be achieved.

Figure 2C:
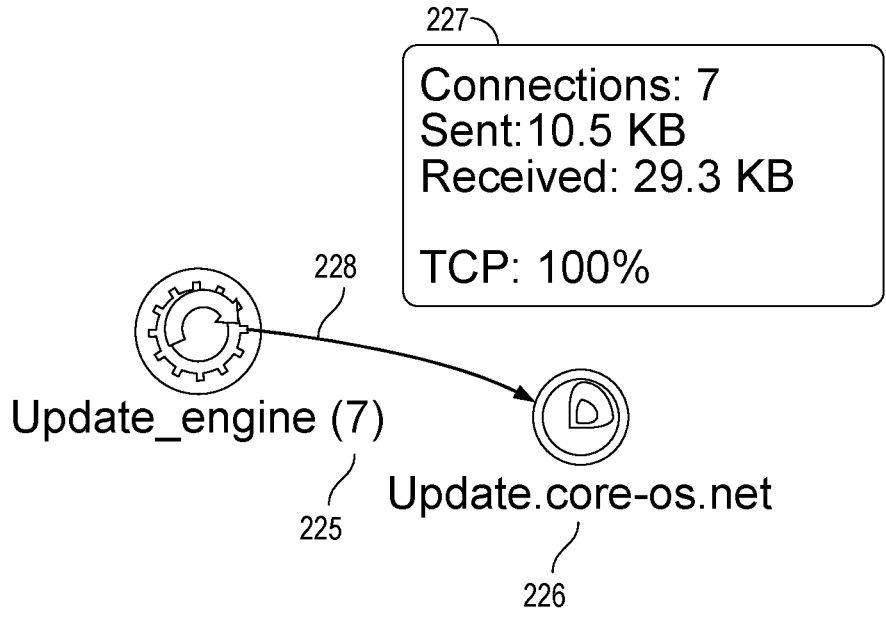
FIG. 2C illustrates a portion of a polygraph.

FIG. 2C depicts a portion of a logical polygraph. Suppose a datacenter has seven instances of the application update_engine 225, executing as seven different processes on seven different machines, having seven different IP addresses, and using seven different ports. The instances of update_engine variously communicate with update.core-os.net 226, which may have a single IP address or many IP addresses itself, over the one hour time period represented in the polygraph. In the example shown in FIG. 2C, update_engine is a client, connecting to the server update.core-os.net, as indicated by arrow 228.

Behaviors of the seven processes are clustered together, into a single summary. As indicated in region 227, statistical information about the connections is also maintained (e.g., number of connections, histogram information, etc.). A polygraph such as is depicted in FIG. 2C can be used to establish a baseline of behavior (e.g., at the one-hour level), allowing for the future detection of deviations from that baseline. As one example, suppose that statistically an update_engine instance transmits data at 11 bytes per second. If an instance were instead to transmit data at 1000 bytes per second, such behavior would represent a deviation from the baseline and could be flagged accordingly. Similarly, changes that are within the baseline (e.g., an eighth instance of update_engine appears, but otherwise behaves as the other instances; or one of the seven instances disappears) are not flagged as anomalous. Further, datacenter events, such as failover, autobalancing, and A-B refresh are unlikely to trigger false alarms in a polygraph, as at the logical level, the behaviors remain the same.

Figure 2D:
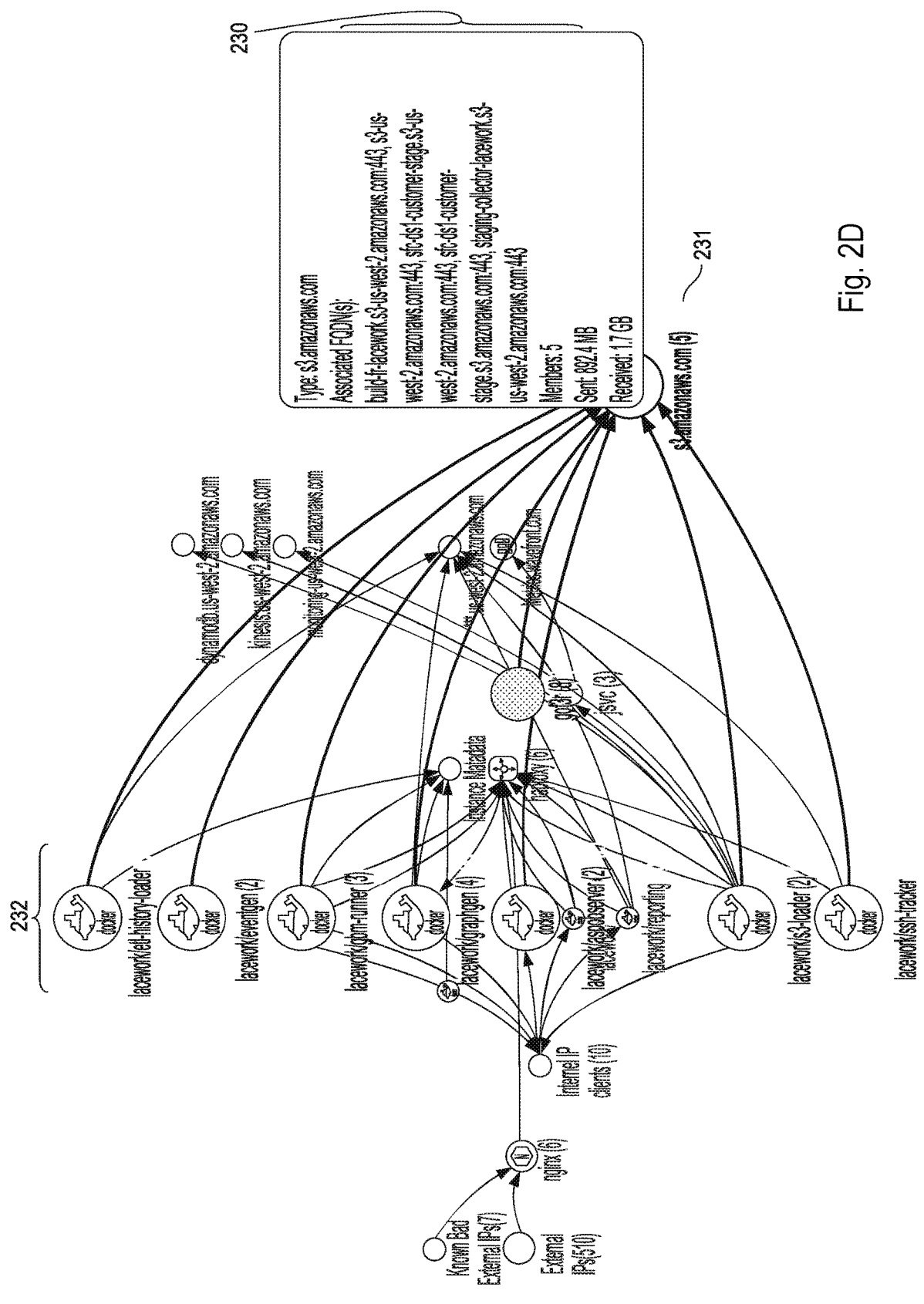
FIG. 2D illustrates a portion of a polygraph.

In various embodiments, polygraph data is maintained for every application in a datacenter, and such polygraph data can be combined to make a single datacenter view across all such applications. FIG. 2D illustrates a portion of a polygraph for a service that evidences more complex behaviors than are depicted in FIG. 2C. In particular, FIG. 2D illustrates the behaviors of S3 as a service (as used by a particular customer datacenter). Clients within the datacenter variously connect to the S3 service using one of five fully qualified domains (listed in region 230). Contact with any of the domains is aggregated as contact with S3 (as indicated in region 231). Depicted in region 232 are various containers which (as clients) connect with S3. Other containers (which do not connect with S3) are not included. As with the polygraph portion depicted in FIG. 2C, statistical information about the connections is known and summarized, such as the number of bytes transferred, histogram information, etc.

Figure 2E:
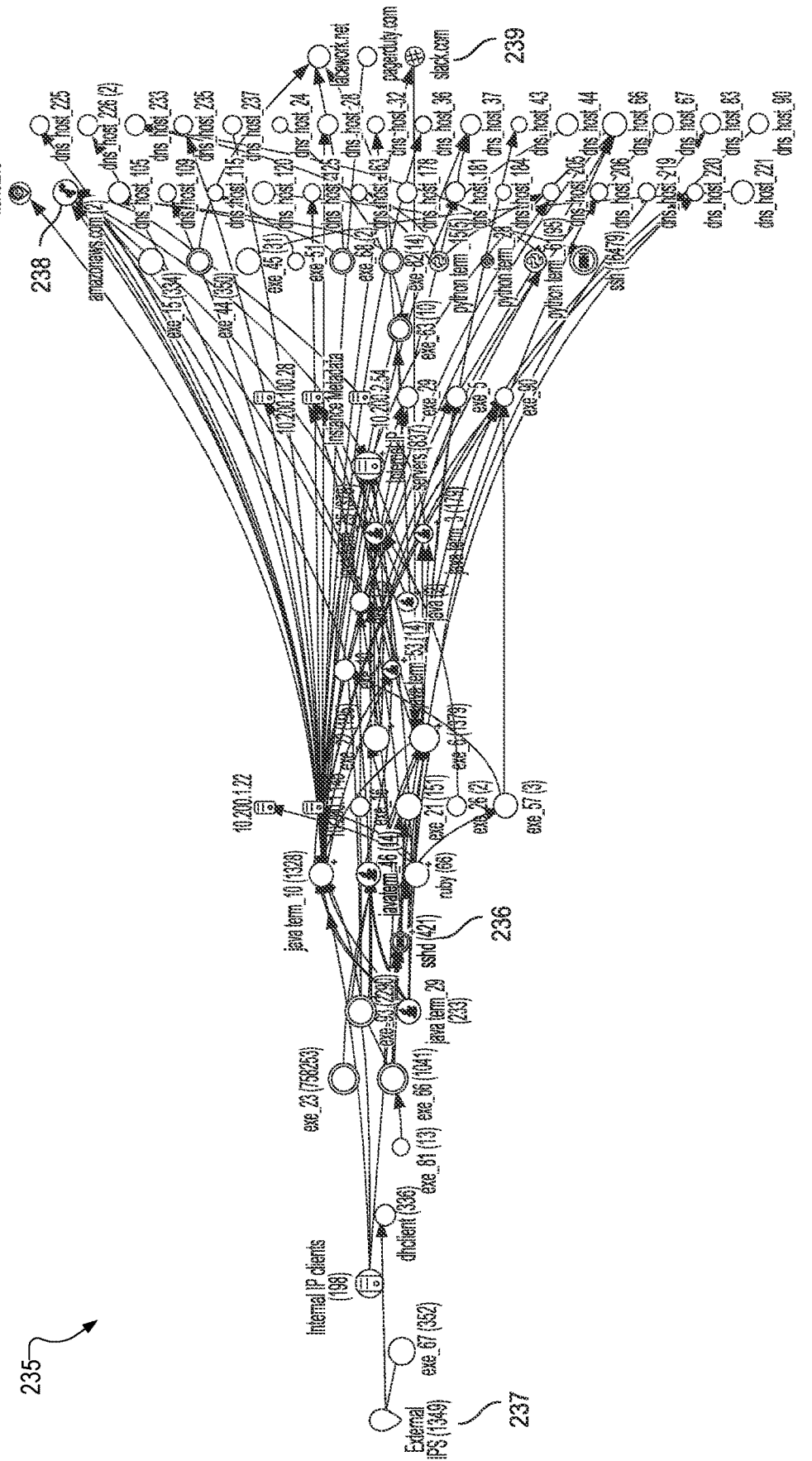
FIG. 2E illustrates an example of a communication polygraph.

FIG. 2E illustrates a communication polygraph for a datacenter. In particular, the polygraph indicates a one hour summary of approximately 500 virtual machines, which collectively run one million processes, and make 100 million connections in that hour. As illustrated in FIG. 2E, a polygraph represents a drastic reduction in size (e.g., from tracking information on 100 million connections in an hour, to a few hundred nodes and a few hundred edges). Further, as a datacenter scales up (e.g., from using 10 virtual machines to 100 virtual machines as the datacenter uses more workers to support existing applications), the polygraph for the datacenter will tend to stay the same size (with the 100 virtual machines clustering into the same nodes that the 10 virtual machines previously clustered into). As new applications are added into the datacenter, the polygraph may automatically scale to include behaviors involving those applications.

In the particular polygraph shown in FIG. 2E, nodes generally correspond to workers, and edges correspond to communications the workers engage in (with connection activity being the behavior modeled in polygraph 235). Another example polygraph could model other behavior, such as application launching. The communications graphed in FIG. 2E include traffic entering the datacenter, traffic exiting the datacenter, and traffic that stays wholly within the datacenter (e.g., traffic between workers). One example of a node included in polygraph 235 is the sshd application, depicted as node 236. As indicated in FIG. 2E, 421 instances of sshd were executing during the one hour time period of data represented in polygraph 235. As indicated in region 237, nodes within the datacenter communicated with a total of 1349 IP addresses outside of the datacenter (and not otherwise accounted for, e.g., as belonging to a service such as Amazon AWS 238 or Slack 239).

In the following examples, suppose that user B, an administrator of datacenter 106, is interacting with data platform 12 to view visualizations of polygraphs in a web browser (e.g., as served to user B via web app 120). One type of polygraph user B can view is an application-communication polygraph, which indicates, for a given one hour window (or any other suitable time interval), which applications communicated with which other applications. Another type of polygraph user B can view is an application launch polygraph. User B can also view graphs related to user behavior, such as an insider behavior graph which tracks user connections (e.g., to internal and external applications, including chains of such behavior), a privilege change graph which tracks how privileges change between processes, and a user login graph, which tracks which (logical) machines a user logs into.

Figure 2F:
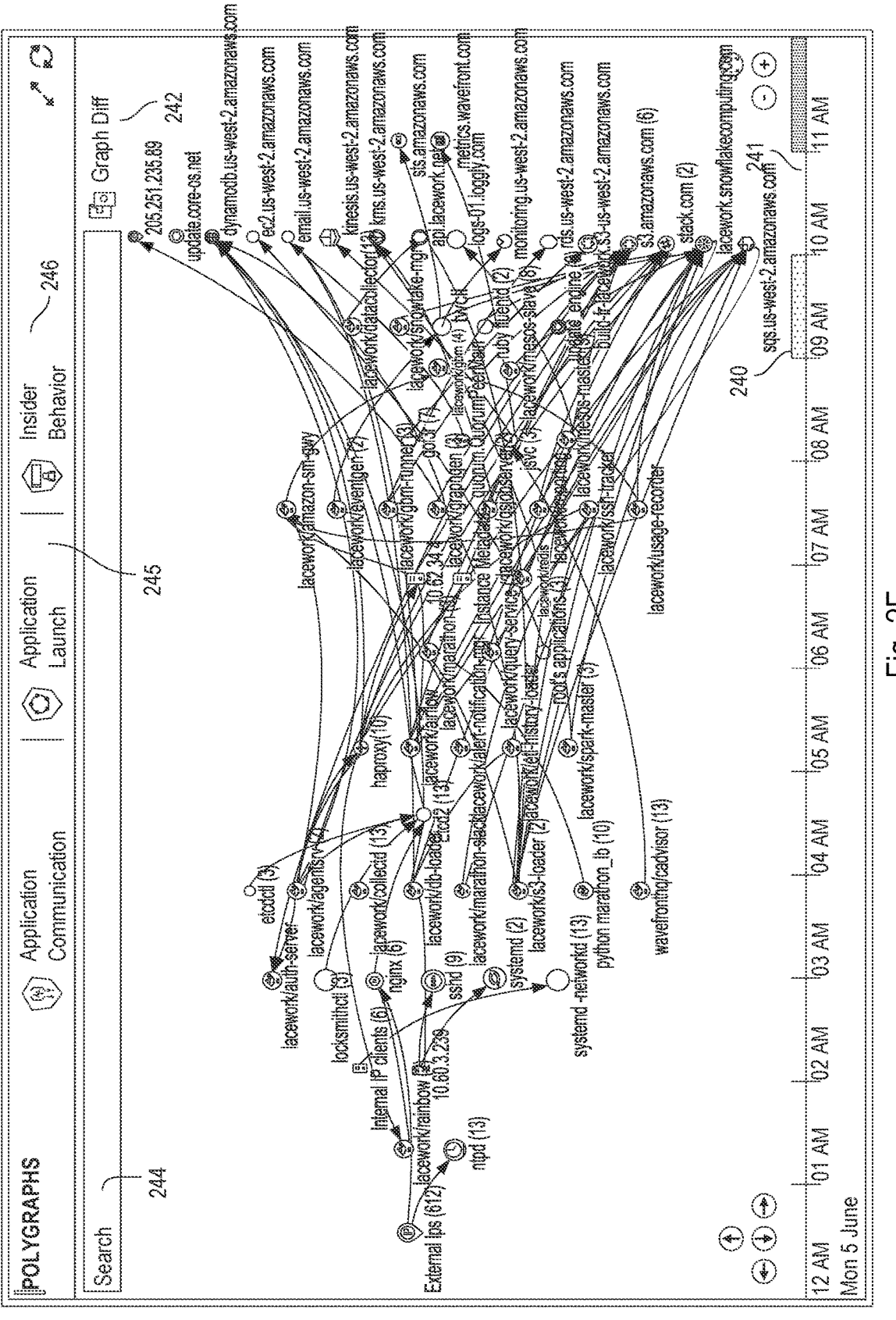
FIG. 2F illustrates an example of a polygraph.

FIG. 2F illustrates an example of an application-communication polygraph for a datacenter (e.g., datacenter 106) for the one hour period of 9 am-10 am on June 5. The time slice currently being viewed is indicated in region 240. If user B clicks his mouse in region 241, user B will be shown a representation of the application-communication polygraph as generated for the following hour (10 am-11 am on June 5).

Figure 2G:
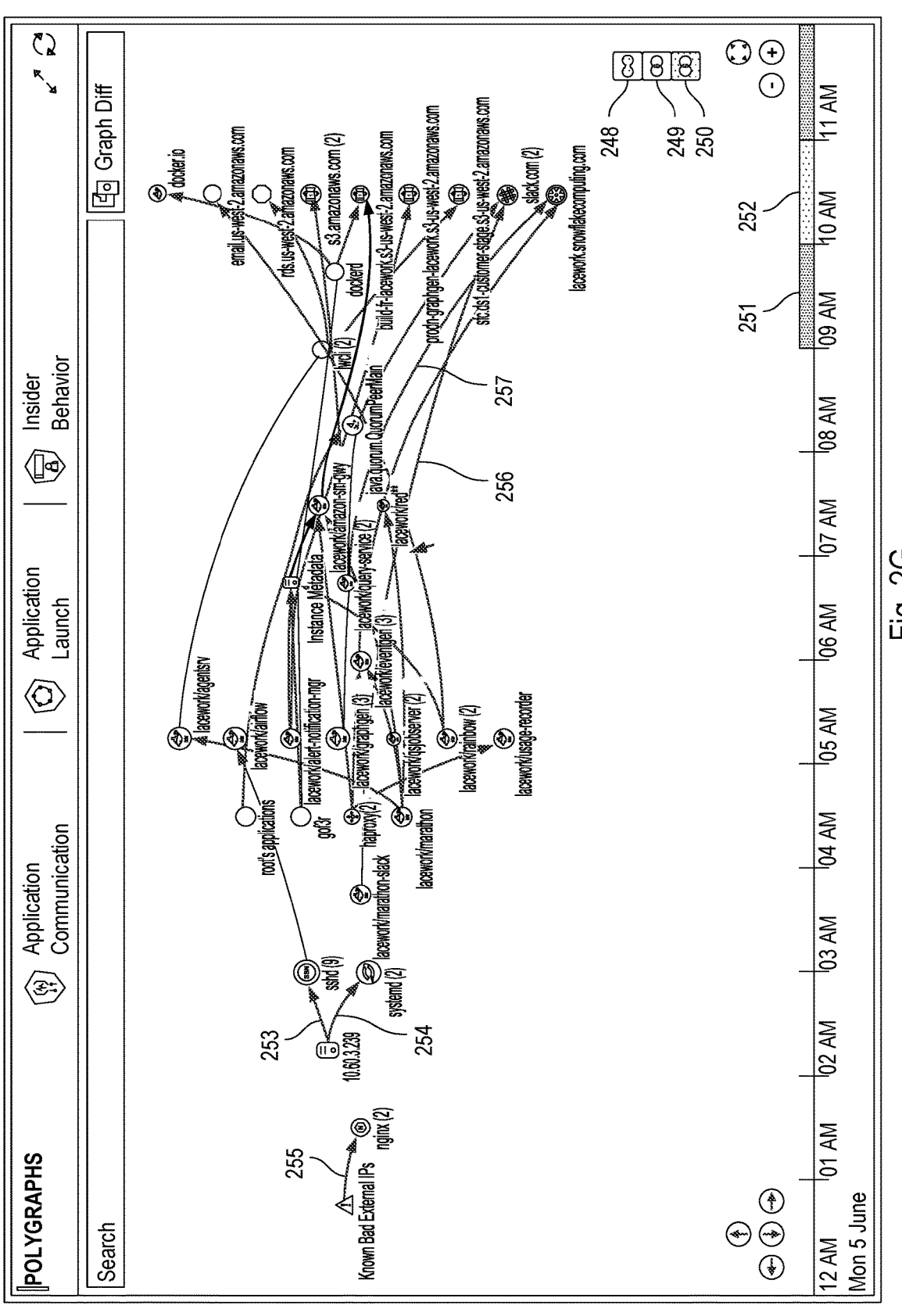
FIG. 2G illustrates an example of a polygraph as rendered in an interface.

FIG. 2G depicts what is shown in user B's browser after he has clicked on region 241, and has further clicked on region 242. The selection in region 242 turns on and off the ability to compare two time intervals to one another. User B can select from a variety of options when comparing the 9 am-10 am and 10 am-11 am time intervals. By clicking region 248, user B will be shown the union of both graphs (i.e., any connections that were present in either time interval). By clicking region 249, user B will be shown the intersection of both graphs (i.e., only those connections that were present in both time intervals).

As shown in FIG. 2G, user B has elected to click on region 250, which depicts connections that are only present in the 9 am-10 am polygraph in a first color 251, and depicts connections that are only present in the 10 am-11 am polygraph in a second color 252. Connections present in both polygraphs are omitted from display. As one example, in the 9 am-10 am polygraph (corresponding to connections made during the 9 am-10 am time period at datacenter 106), a connection was made by a server to sshd (253) and also to systemd (254). Both of those connections ended prior to 10 am and are thus depicted in the first color. As another example, in the 10 am-11 am polygraph (corresponding to connections made during the 10 am-11 am time period at datacenter 106), a connection was made from a known bad external IP to nginx (255). The connection was not present during the 9 am-10 am time slice and thus is depicted in the second color. As yet another example, two different connections were made to a Slack service between 9 am and 11 am. However, the first was made by a first client during the 9 am-10 am time slice (256) and the second was made by a different client during the 10 am-11 am slice (257), and so the two connections are depicted respectively in the first and second colors and blue.

Figure 2H:
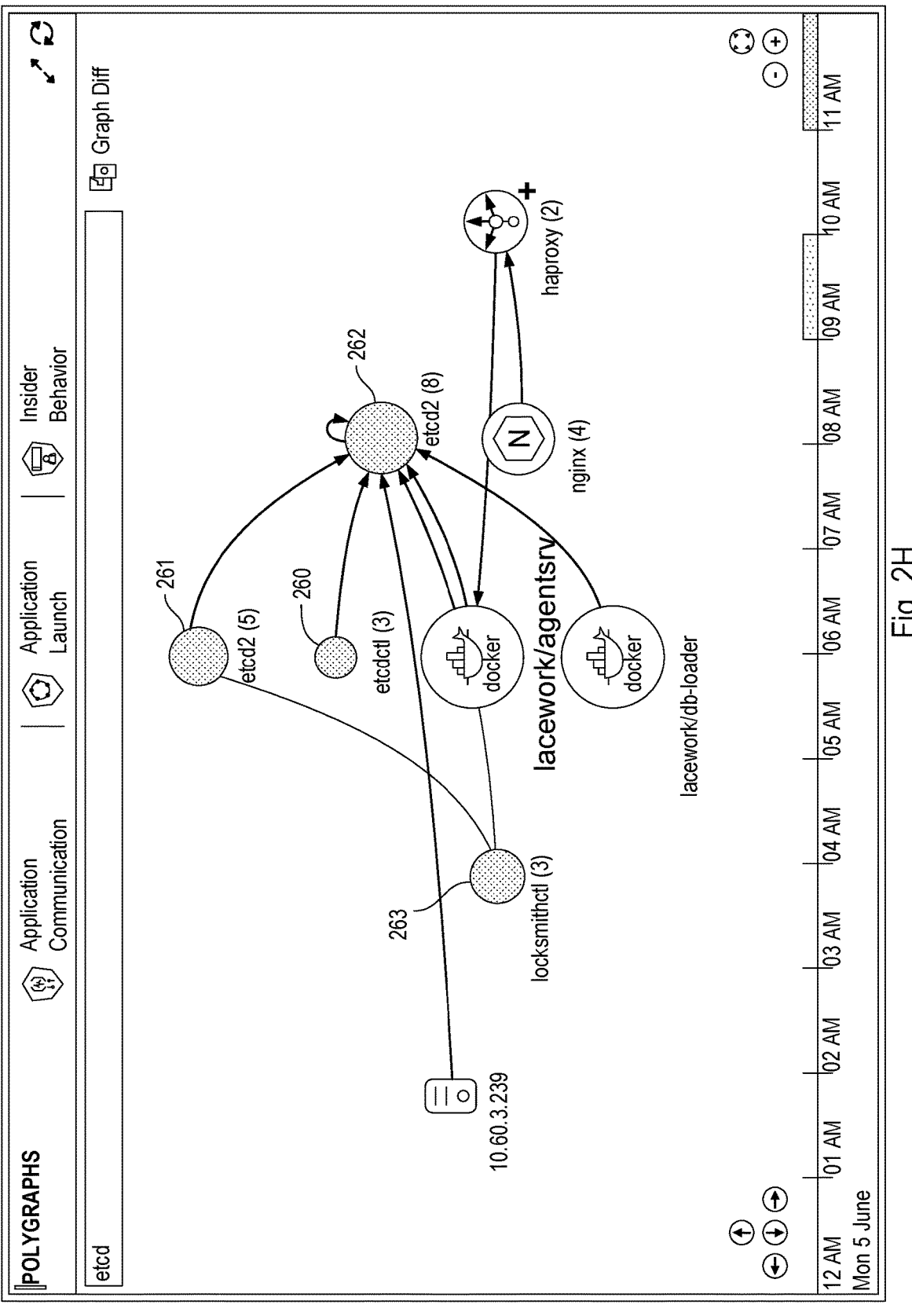
FIG. 2H illustrates an example of a portion of a polygraph as rendered in an interface.
Figure 21:
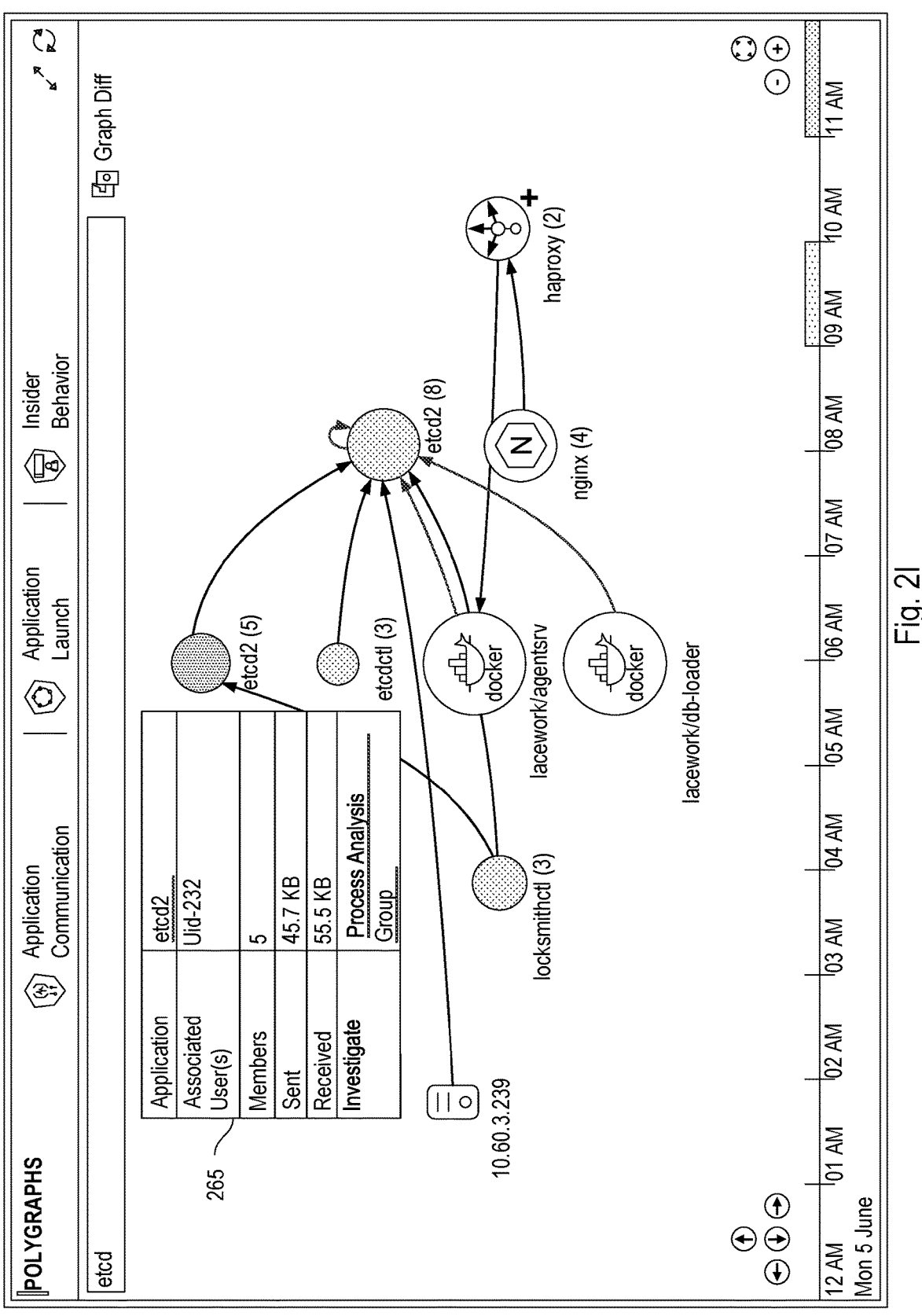

Returning to the polygraph depicted in FIG. 2F, suppose user B enters "etcd" into the search box located in region 244. User B will then be presented with the interface illustrated in FIG. 2H. As shown in FIG. 2H, three applications containing the term "etcd" were engaged in communications during the 9 am-10 am window. One application is etcdctl, a command line client for etcd. As shown in FIG. 2H, a total of three different etcdctl processes were executed during the 9 am-10 am window, and were clustered together (260). FIG. 2H also depicts two different clusters that are both named etcd2. The first cluster includes (for the 9 am-10 am window) five members (261) and the second cluster includes (for the same window) eight members (262). The reason for these two distinct clusters is that the two groups of applications behave differently (e.g., they exhibit two distinct sets of communication patterns). Specifically, the instances of etcd2 in cluster 261 only communicate with locksmithctl (263) and other etcd2 instances (in both clusters 261 and 262). The instances of etcd2 in cluster 262 communicate with additional entities, such as etcdctl and Docker containers. As desired, user B can click on one of the clusters (e.g., cluster 261) and be presented with summary information about the applications included in the cluster, as is shown in FIG. 2I (e.g., in region 265). User B can also double click on a given cluster (e.g., cluster 261) to see details on each of the individual members of the cluster broken out.

Figure 2J:
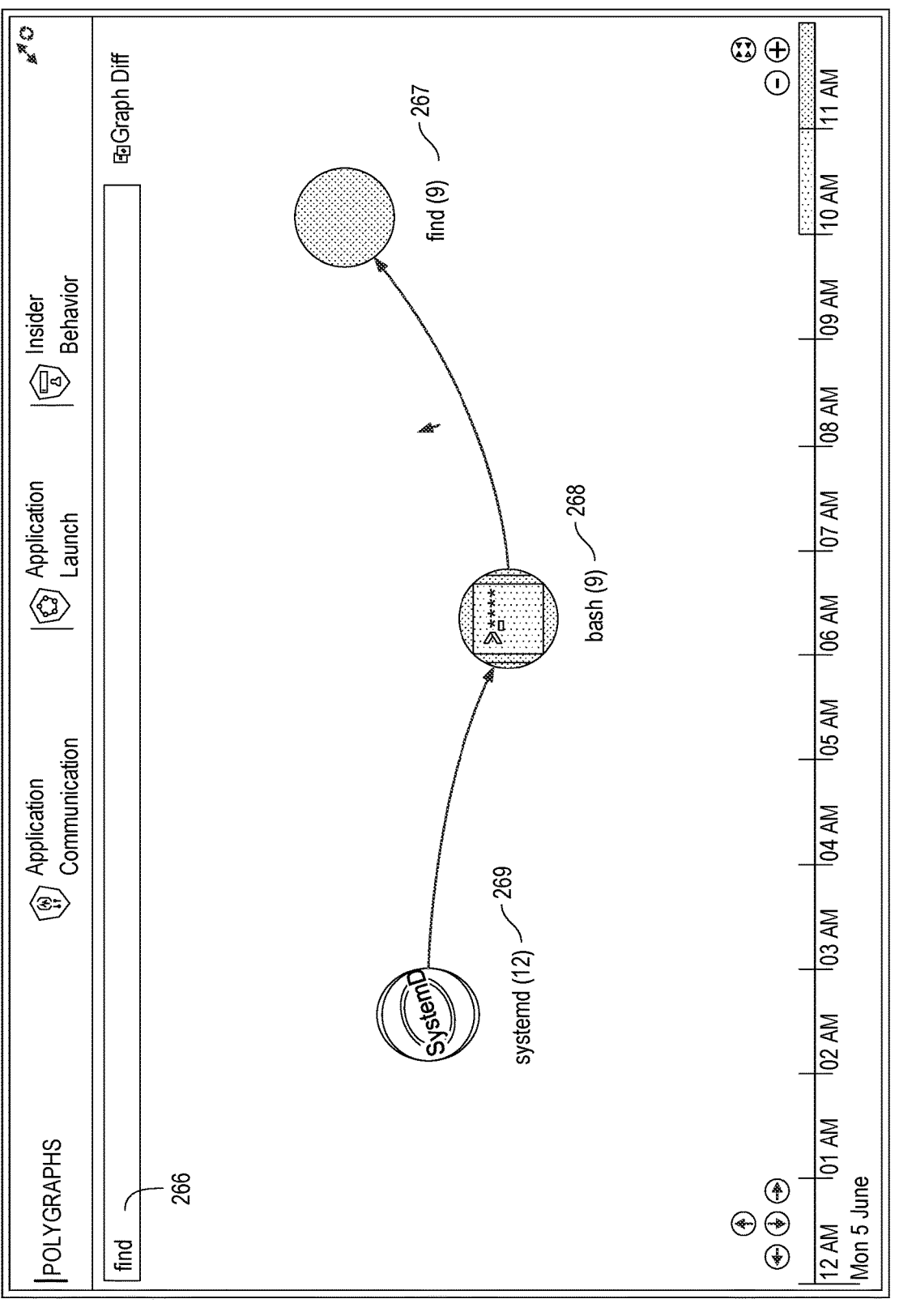
FIG. 2J illustrates an example of a portion of a polygraph as rendered in an interface.

Suppose user B now clicks on region 245 of the interface shown in FIG. 2F. User B will then be shown an application launch polygraph. Launching an application is another example of a behavior. The launch polygraph models how applications are launched by other applications. FIG. 2J illustrates an example of a portion of a launch polygraph. In particular, user B has typed "find" into region 266, to see how the "find" application is being launched. As shown in FIG. 2J, in the launch polygraph for the 10 am-11 am time period, find applications (267) are always launched by bash (268), which is in turn always launched by systemd (269). If find is launched by a different application, this would be anomalous behavior.

Figure 2K:
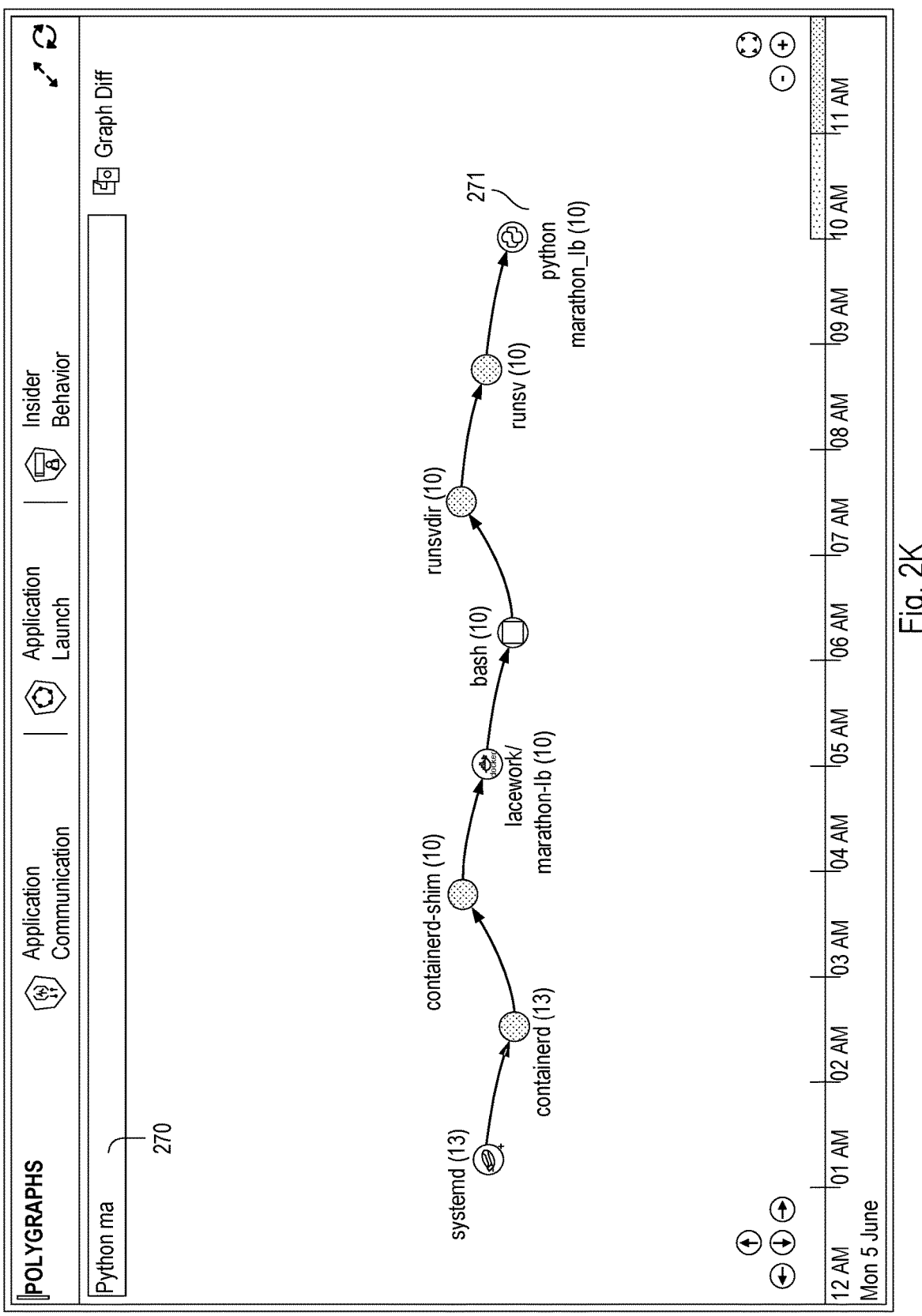
FIG. 2K illustrates an example of a portion of a polygraph as rendered in an interface.

FIG. 2K illustrates another example of a portion of an application launch polygraph. In FIG. 2K, user B has searched (270) for "python ma" to see how "python marathon_lb" (271) is launched. As shown in FIG. 2K, in each case (during the one hour time slice of 10 am-11 am), python marathon_lb is launched as a result of a chain of the same seven applications each time. If python marathon_lb is ever launched in a different manner, this indicates anomalous behavior. The behavior could be indicative of malicious activities, but could also be due to other reasons, such as a misconfiguration, a performance-related issue, and/or a failure, etc.

Suppose user B now clicks on region 246 of the interface shown in FIG. 2F. User B will then be shown an insider behavior graph. The insider behavior graph tracks information about behaviors such as processes started by a user interactively using protocols such as ssh or telnet, and any processes started by those processes. As one example, suppose an administrator logs into a first virtual machine in datacenter 106 (e.g., using sshd via an external connection he makes from a hotel), using a first set of credentials (e.g., first.last@example.com and an appropriate password). From the first virtual machine, the administrator connects to a second virtual machine (e.g., using the same credentials), then uses the sudo command to change identities to those of another user, and then launches a program. graphs built by data platform 12 can be used to associate the administrator with each of his actions, including launching the program using the identity of another user.

Figure 2L:
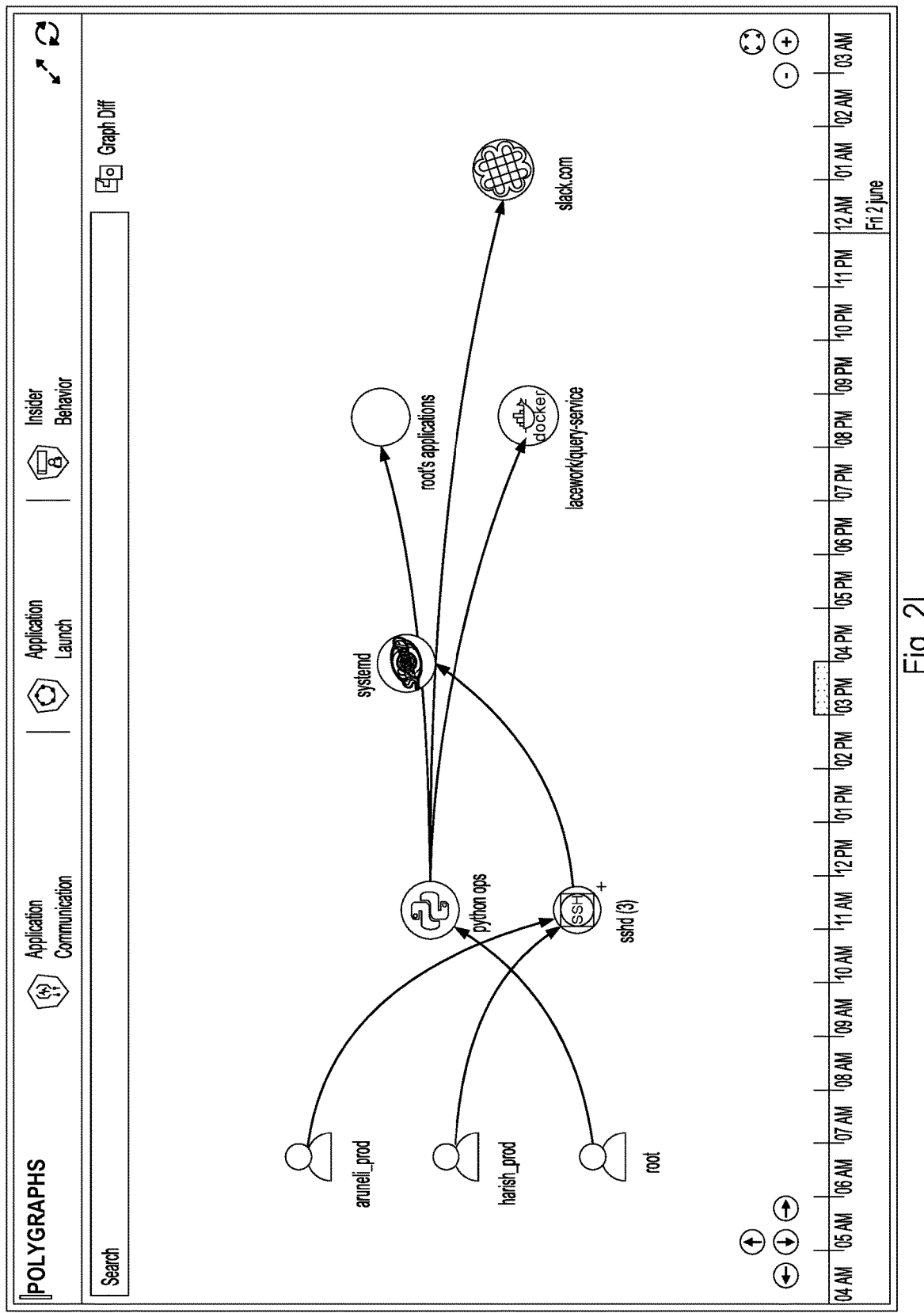
FIG. 2L illustrates an example of an insider behavior graph as rendered in an interface.

FIG. 2L illustrates an example of a portion of an insider behavior graph. In particular, in FIG. 2L, user B is viewing a graph that corresponds to the time slice of 3 pm-4 pm on June 1. FIG. 2L illustrates the internal/external applications that users connected to during the one hour time slice. If a user typically communicates with particular applications, that information will become part of a baseline. If the user deviates from his baseline behavior (e.g., using new applications, or changing privilege in anomalous ways), such anomalies can be surfaced.

Figure 2M:
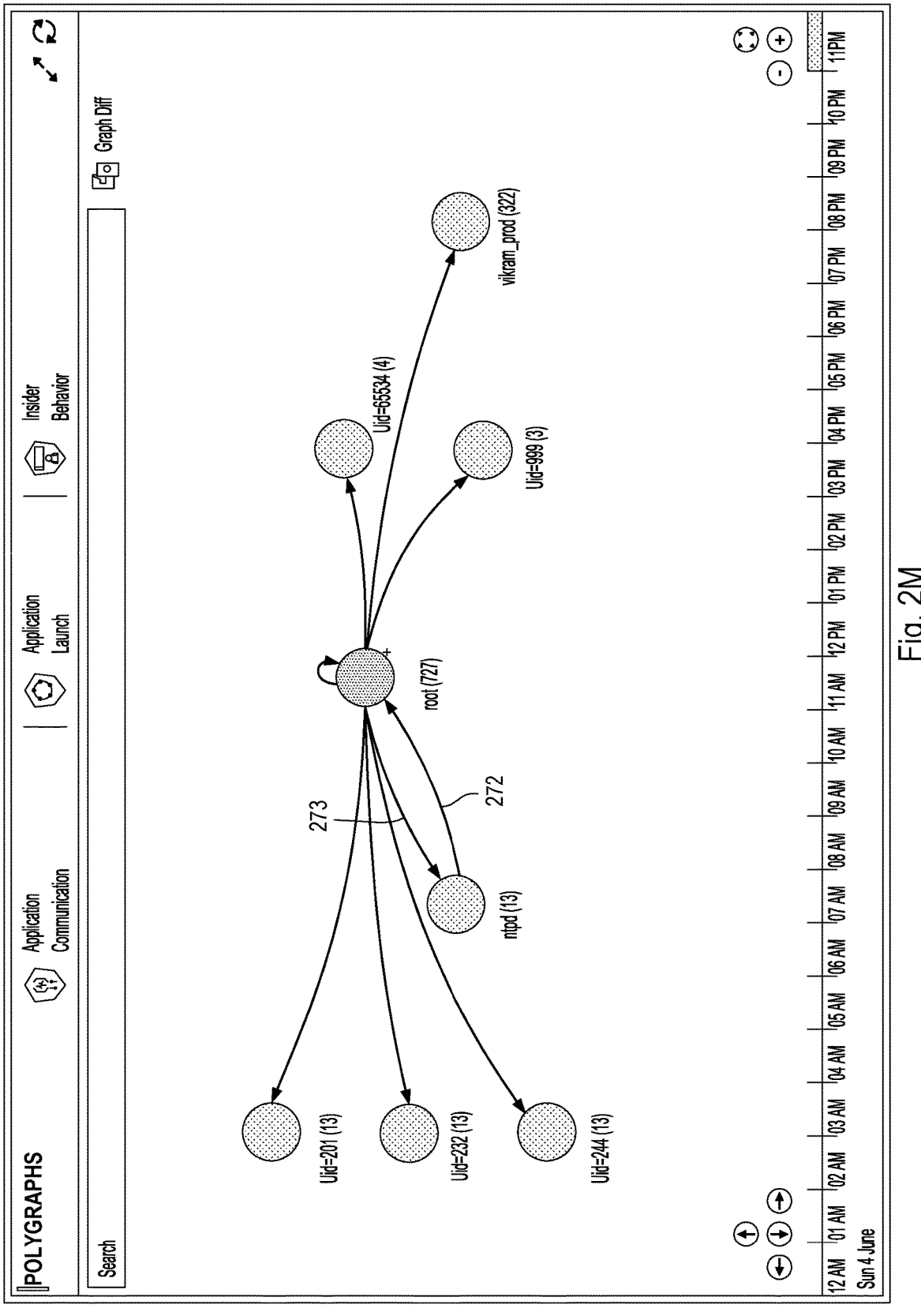
FIG. 2M illustrates an example of a privilege change graph as rendered in an interface.

FIG. 2M illustrates an example of a portion of a privilege change graph, which identifies how privileges are changed between processes. Typically, when a user launches a process (e.g., "ls"), the process inherits the same privileges that the user has. And, while a process can have fewer privileges than the user (i.e., go down in privilege), it is rare (and generally undesirable) for a user to escalate in privilege. Information included in the privilege change graph can be determined by examining the parent of each running process, and determining whether there is a match in privilege between the parent and the child. If the privileges are different, a privilege change has occurred (whether a change up or a change down). The application ntpd is one rare example of a scenario in which a process escalates (272) to root, and then returns back (273). The sudo command is another example (e.g., used by an administrator to temporarily have a higher privilege). As with the other examples, ntpd's privilege change actions, and the legitimate actions of various administrators (e.g., using sudo) will be incorporated into a baseline model by data platform 12. When deviations occur, such as where a new application that is not ntpd escalates privilege, or where an individual that has not previously/does not routinely use sudo does so, such behaviors can be identified as anomalous.

Figure 2N:
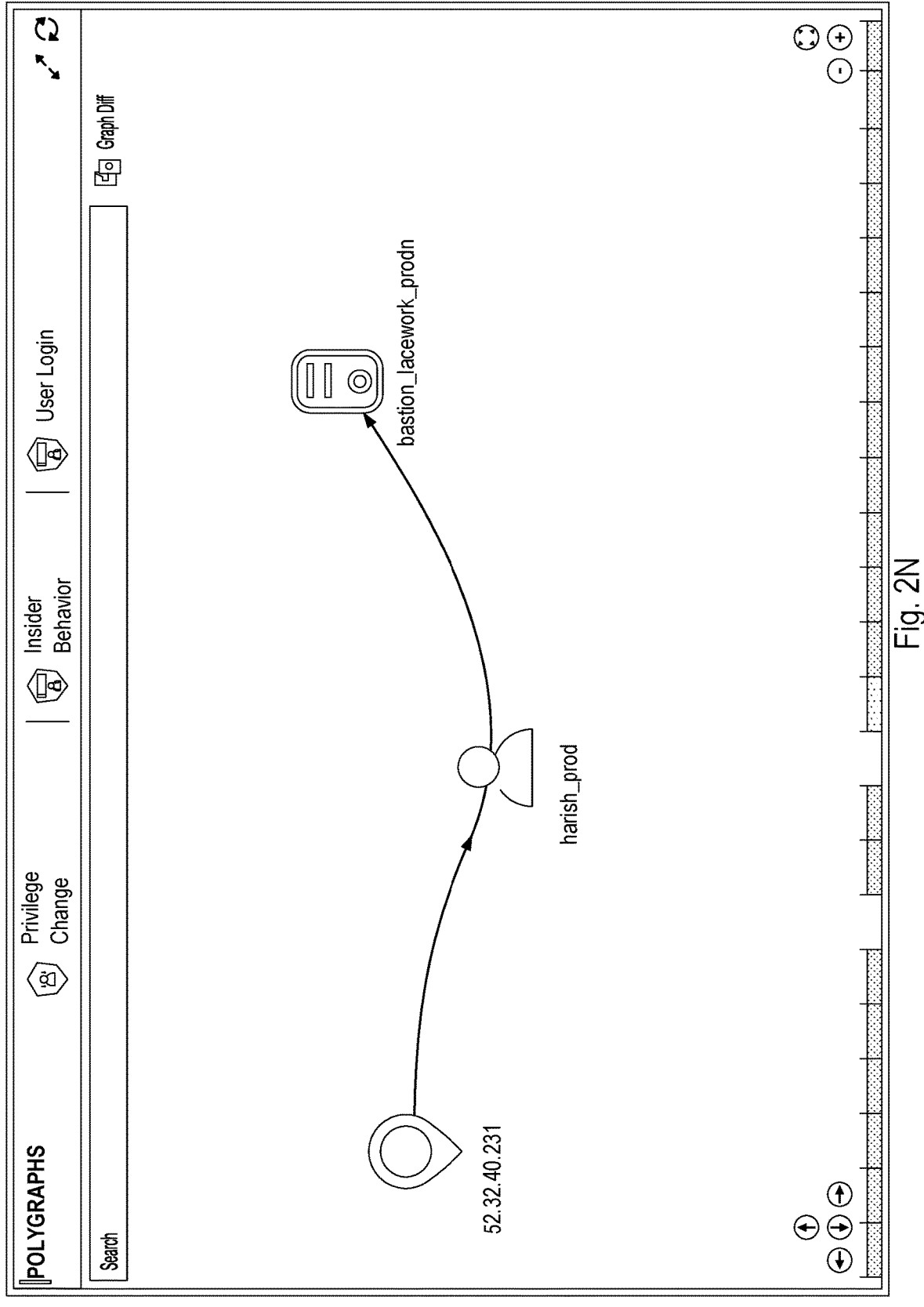
FIG. 2N illustrates an example of a user login graph as rendered in an interface.
Figure 20:
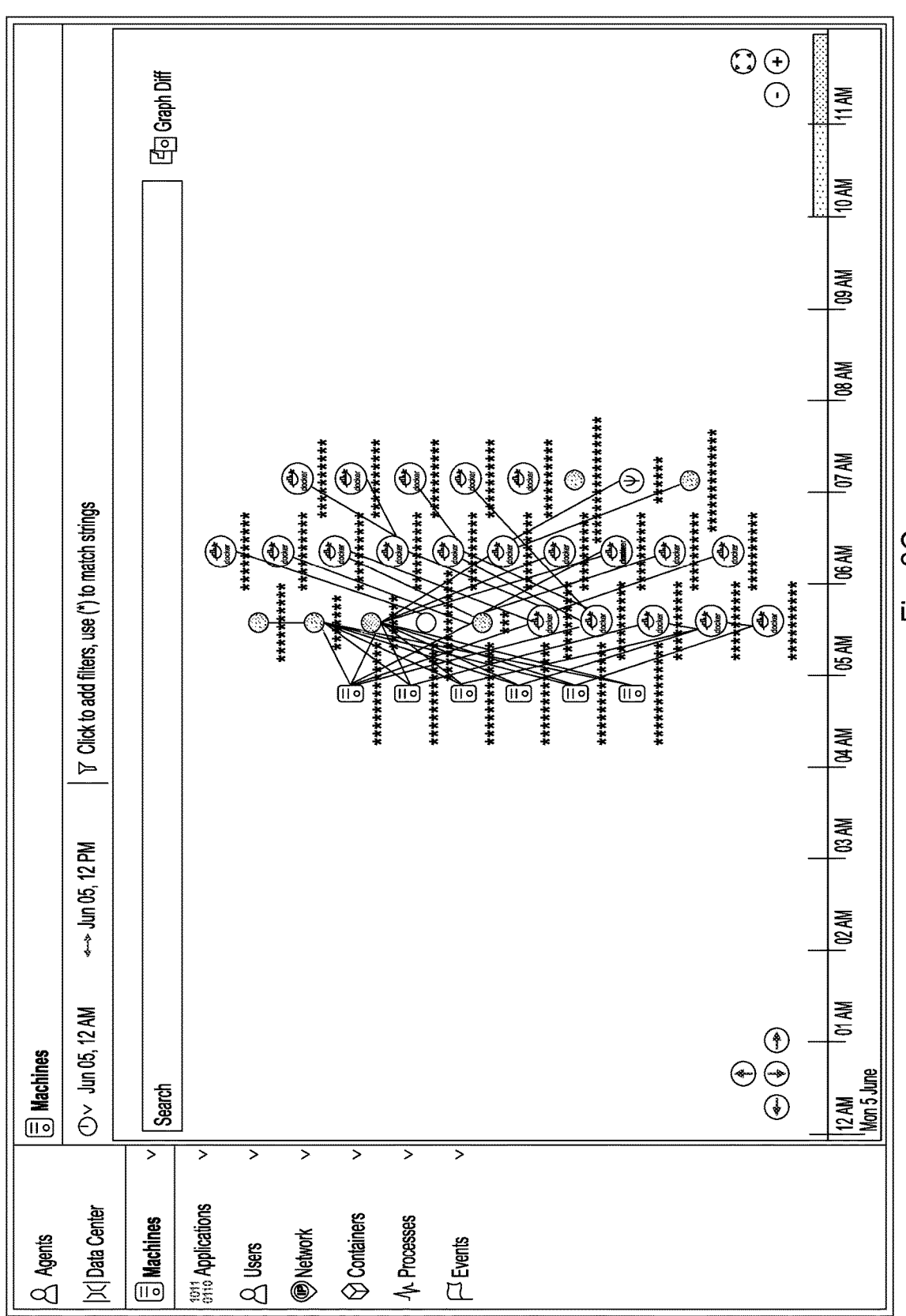

FIG. 2N illustrates an example of a portion of a user login graph, which identifies which users log into which logical nodes. Physical nodes (whether bare metal or virtualized) are clustered into a logical machine cluster, for example, using yet another graph, a machine-server graph, an example of which is shown in FIG. 2O. For each machine, a determination is made as to what type of machine it is, based on what kind(s) of workflows it runs. As one example, some machines run as master nodes (having a typical set of workflows they run, as master nodes) and can thus be clustered as master nodes. Worker nodes are different from master nodes, for example, because they run Docker containers, and frequently change as containers move around. Worker nodes can similarly be clustered.

As previously mentioned, the polygraph depicted in FIG. 2E corresponds to activities in a datacenter in which, in a given hour, approximately 500 virtual machines collectively run one million processes, and make 100 million connections in that hour. The polygraph represents a drastic reduction in size (e.g., from tracking information on 100 million connections in an hour, to a few hundred nodes and a few hundred edges). Using techniques described herein, such a polygraph can be constructed (e.g., using commercially available computing infrastructure) in less than an hour (e.g., within a few minutes). Thus, ongoing hourly snapshots of a datacenter can be created within a two hour moving window (i.e., collecting data for the time period Sam-9 am, while also generating a snapshot for the time previous time period 7 am-8 am). The following describes various example infrastructure that can be used in polygraph construction, and also describes various techniques that can be used to construct polygraphs.

Returning to FIG. 1D, embodiments of data platform 12 may be built using any suitable infrastructure as a service (IaaS) (e.g., AWS). For example, data platform 12 can use Simple Storage Service (S3) for data storage, Key Management Service (KMS) for managing secrets, Simple Queue Service (SQS) for managing messaging between applications, Simple Email Service (SES) for sending emails, and Route 53 for managing DNS. Other infrastructure tools can also be used. Examples include: orchestration tools (e.g., Kubernetes or Mesos/Marathon), service discovery tools (e.g., Mesos-DNS), service load balancing tools (e.g., marathon-LB), container tools (e.g., Docker or rkt), log/metric tools (e.g., collectd, fluentd, kibana, etc.), big data processing systems (e.g., Spark, Hadoop, AWS Redshift, Snowflake etc.), and distributed key value stores (e.g., Apache Zookeeper or etcd2).

As previously mentioned, in various embodiments, data platform 12 may make use of a collection of microservices. Each microservice can have multiple instances, and may be configured to recover from failure, scale, and distribute work amongst various such instances, as applicable. For example, microservices are auto-balancing for new instances, and can distribute workload if new instances are started or existing instances are terminated. In various embodiments, microservices may be deployed as self-contained Docker containers. A Mesos-Marathon or Spark framework can be used to deploy the microservices (e.g., with Marathon monitoring and restarting failed instances of microservices as needed). The service etcd2 can be used by microservice instances to discover how many peer instances are running, and used for calculating a hash-based scheme for workload distribution. Microservices may be configured to publish various health/status metrics to either an SQS queue, or etcd2, as applicable. In some examples, Amazon DynamoDB can be used for state management.

Additional information on various microservices used in embodiments of data platform 12 is provided below.

Graph generator 146 is a microservice that may be responsible for generating raw behavior graphs on a per customer basis periodically (e.g., once an hour). In particular, graph generator 146 may generate graphs of entities (as the nodes in the graph) and activities between entities (as the edges). In various embodiments, graph generator 146 also performs other functions, such as aggregation, enrichment (e.g., geolocation and threat), reverse DNS resolution, TF-IDF based command line analysis for command type extraction, parent process tracking, etc.

Graph generator 146 may perform joins on data collected by the agents, so that both sides of a behavior are linked. For example, suppose a first process on a first virtual machine (e.g., having a first IP address) communicates with a second process on a second virtual machine (e.g., having a second IP address). Respective agents on the first and second virtual machines may each report information on their view of the communication (e.g., the PID of their respective processes, the amount of data exchanged and in which direction, etc.). When graph generator performs a join on the data provided by both agents, the graph will include a node for each of the processes, and an edge indicating communication between them (as well as other information, such as the directionality of the communication—i.e., which process acted as the server and which as the client in the communication).

In some cases, connections are process to process (e.g., from a process on one virtual machine within the cloud environment associated with entity A to another process on a virtual machine within the cloud environment associated with entity A). In other cases, a process may be in communication with a node (e.g., outside of entity A) which does not have an agent deployed upon it. As one example, a node within entity A might be in communication with node 172, outside of entity A. In such a scenario, communications with node 172 are modeled (e.g., by graph generator 146) using the IP address of node 172. Similarly, where a node within entity A does not have an agent deployed upon it, the IP address of the node can be used by graph generator in modeling.

Graphs created by graph generator 146 may be written to data store 30 and cached for further processing. A graph may be a summary of all activity that happened in a particular time interval. As each graph corresponds to a distinct period of time, different rows can be aggregated to find summary information over a larger timestamp. In some examples, picking two different graphs from two different timestamps can be used to compare different periods. If necessary, graph generator can parallelize its workload (e.g., where its backlog cannot otherwise be handled within a particular time period, such as an hour, or if is required to process a graph spanning a long time period).

Graph generator 146 can be implemented in any appropriate programming language, such as Java or C, and machine learning libraries, such as Spark's MLLib. Example ways that graph generator computations can be implemented include using SQL or Map-R, using Spark or Hadoop.

SSH tracker 148 is a microservice that may be responsible for following ssh connections and process parent hierarchies to determine trails of user ssh activity. Identified ssh trails are placed by the SSH tracker 148 into data store 30 and cached for further processing.

SSH tracker 148 can be implemented in any appropriate programming language, such as Java or C, and machine libraries, such as Spark's MLLib. Example ways that SSH tracker computations can be implemented include using SQL or Map-R, using Spark or Hadoop.

Threat aggregator 150 is a microservice that may be responsible for obtaining third party threat information from various applicable sources, and making it available to other micro-services. Examples of such information include reverse DNS information, GeoIP information, lists of known bad domains/IP addresses, lists of known bad files etc. As applicable, the threat information is normalized before insertion into data store 30. Threat aggregator 150 can be implemented in any appropriate programming language, such as Java or C, using SQL/JDBC libraries to interact with data store 30 (e.g., for insertions and queries).

Scheduler 152 is a microservice that may act as a scheduler and that may run arbitrary jobs organized as a directed graph. In some examples, scheduler 152 ensures that all jobs for all customers are able to run during at a given time interval (e.g., every hour). Scheduler 152 may handle errors and retrying for failed jobs, track dependencies, manage appropriate resource levels, and/or scale jobs as needed. Scheduler 152 can be implemented in any appropriate programming language, such as Java or C. A variety of components can also be used, such as open source scheduler frameworks (e.g., Airflow), or AWS services (e.g., the AWS Data pipeline) which can be used for managing schedules.

Graph Behavior Modeler (GBM) 154 is a microservice that may compute polygraphs. In particular, GBM 154 can be used to find clusters of nodes in a graph that should be considered similar based on some set of their properties and relationships to other nodes. As described herein, the clusters and their relationships can be used to provide visibility into a datacenter environment without requiring user specified labels. GBM 154 may track such clusters over time persistently, allowing for changes to be detected and alerts to be generated.

GBM 154 may take as input a raw graph (e.g., as generated by graph generator 146). Nodes are actors of a behavior, and edges are the behavior relationship itself. For example, in the case of communication, example actors include processes, which communicate with other processes. The GBM 154 clusters the raw graph based on behaviors of actors and produces a summary (the polygraph). The polygraph summarizes behavior at a datacenter level. The GBM also produces "observations" that represent changes detected in the datacenter. Such observations may be based on differences in cumulative behavior (e.g., the baseline) of the datacenter with its current behavior. The GBM 154 can be implemented in any appropriate programming language, such as Java, C, or Golang, using appropriate libraries (as applicable) to handle distributed graph computations (handling large amounts of data analysis in a short amount of time). Apache Spark is another example tool that can be used to compute polygraphs. The GBM can also take feedback from users and adjust the model according to that feedback. For example, if a given user is interested in relearning behavior for a particular entity, the GBM can be instructed to "forget" the implicated part of the polygraph.

GBM runner 156 is a microservice that may be responsible for interfacing with GBM 154 and providing GBM 154 with raw graphs (e.g., using a query language, such as SQL, to push any computations it can to data store 30). GBM runner 156 may also insert polygraph output from GBM 154 to data store 30. GBM runner 156 can be implemented in any appropriate programming language, such as Java or C, using SQL/JDBC libraries to interact with data store 30 to insert and query data.

Alert generator 158 is a microservice that may be responsible for generating alerts. Alert generator 158 may examine observations (e.g., produced by GBM 154) in aggregate, deduplicate them, and score them. Alerts may be generated for observations with a score exceeding a threshold. Alert generator 158 may also compute (or retrieves, as applicable) data that a customer (e.g., user A or user B) might need when reviewing the alert. Examples of events that can be detected by data platform 12 (and alerted on by alert generator 158) include, but are not limited to the following:

new user: This event may be created the first time a user (e.g., of node 116) is first observed by an agent within a datacenter.

user launched new binary: This event may be generated when an interactive user launches an application for the first time.

new privilege escalation: This event may be generated when user privileges are escalated and a new application is run.

new application or container: This event may be generated when an application or container is seen for the first time.

new external connection: This event may be generated when a connection to an external IP/domain is made from a new application.

new external host or IP: This event may be generated when a new external host or IP is involved in a connection with a datacenter.

new internal connection: This event may be generated when a connection between internal-only applications is seen for the first time.

new external client: This event may be generated when a new external connection is seen for an application which typically does not have external connections.

new parent: This event may be generated when an application is launched by a different parent.

connection to known bad IP/domain: Data platform 12 maintains (or can otherwise access) one or more reputation feeds. If an environment makes a connection to a known bad IP or domain, an event will be generated.

login from a known bad IP/domain: An event may be generated when a successful connection to a datacenter from a known bad IP is observed by data platform 12.

Alert generator 158 can be implemented in any appropriate programming language, such as Java or C, using SQL/JDBC libraries to interact with data store 30 to insert and query data. In various embodiments, alert generator 158 also uses one or more machine learning libraries, such as Spark's MLLib (e.g., to compute scoring of various observations). Alert generator 158 can also take feedback from users about which kinds of events are of interest and which to suppress.

QsJob Server 160 is a microservice that may look at all the data produced by data platform 12 for an hour, and compile a materialized view (MV) out of the data to make queries faster. The MV helps make sure that the queries customers most frequently run, and data that they search for, can be easily queried and answered. QsJob Server 160 may also precompute and cache a variety of different metrics so that they can quickly be provided as answers at query time. QsJob Server 160 can be implemented using any appropriate programming language, such as Java or C, using SQL/JDBC libraries. In some examples, QsJob Server 160 is able to compute an MV efficiently at scale, where there could be a large number of joins. An SQL engine, such as Oracle, can be used to efficiently execute the SQL, as applicable.

Alert notifier 162 is a microservice that may take alerts produced by alert generator 158 and send them to customers' integrated Security Information and Event Management (STEM) products (e.g., Splunk, Slack, etc.). Alert notifier 162 can be implemented using any appropriate programming language, such as Java or C. Alert notifier 162 can be configured to use an email service (e.g., AWS SES or pagerduty) to send emails. Alert notifier 162 may also provide templating support (e.g., Velocity or Moustache) to manage templates and structured notifications to SIEM products.

Reporting module 164 is a microservice that may be responsible for creating reports out of customer data (e.g., daily summaries of events, etc.) and providing those reports to customers (e.g., via email). Reporting module 164 can be implemented using any appropriate programming language, such as Java or C. Reporting module 164 can be configured to use an email service (e.g., AWS SES or pagerduty) to send emails. Reporting module 164 may also provide templating support (e.g., Velocity or Moustache) to manage templates (e.g., for constructing HTML-based email).

Web app 120 is a microservice that provides a user interface to data collected and processed on data platform 12. Web app 120 may provide login, authentication, query, data visualization, etc. features. Web app 120 may, in some embodiments, include both client and server elements. Example ways the server elements can be implemented are using Java DropWizard or Node.Js to serve business logic, and a combination of JSON/HTTP to manage the service. Example ways the client elements can be implemented are using frameworks such as React, Angular, or Backbone. JSON, jQuery, and JavaScript libraries (e.g., underscore) can also be used.

Query service 166 is a microservice that may manage all database access for web app 120. Query service 166 abstracts out data obtained from data store 30 and provides a JSON-based REST API service to web app 120. Query service 166 may generate SQL queries for the REST APIs that it receives at run time. Query service 166 can be implemented using any appropriate programming language, such as Java or C and SQL/JDBC libraries, or an SQL framework such as jOOQ. Query service 166 can internally make use of a variety of types of databases, including a relational database engine 168 (e.g., AWS Aurora) and/or data store 30 to manage data for clients. Examples of tables that query service 166 manages are OLTP tables and data warehousing tables.

Cache 170 may be implemented by Redis and/or any other service that provides a key-value store. Data platform 12 can use cache 170 to keep information for frontend services about users. Examples of such information include valid tokens for a customer, valid cookies of customers, the last time a customer tried to login, etc.

FIG. 3A illustrates an example of a process for detecting anomalies in a network environment. In various embodiments, process 300 is performed by data platform 12. The process begins at 301 when data associated with activities occurring in a network environment (such as entity A's datacenter) is received. One example of such data that can be received at 301 is agent-collected data described above (e.g., in conjunction with process 200).

At 302, a logical graph model is generated, using at least a portion of the monitored activities. A variety of approaches can be used to generate such logical graph models, and a variety of logical graphs can be generated (whether using the same, or different approaches). The following is one example of how data received at 301 can be used to generate and maintain a model.

During bootstrap, data platform 12 creates an aggregate graph of physical connections (also referred to herein as an aggregated physical graph) by matching connections that occurred in the first hour into communication pairs. Clustering is then performed on the communication pairs. Examples of such clustering, described in more detail below, include performing Matching Neighbor clustering and similarity (e.g., SimRank) clustering. Additional processing can also be performed (and is described in more detail below), such as by splitting clusters based on application type, and annotating nodes with DNS query information. The resulting graph (also referred to herein as a base graph or common graph) can be used to generate a variety of models, where a subset of node and edge types (described in more detail below) and their properties are considered in a given model. One example of a model is a UID to UID model (also referred to herein as a Uid2Uid model) which clusters together processes that share a username and show similar privilege change behavior. Another example of a model is a CType model, which clusters together processes that share command line similarity. Yet another example of a model is a PType model, which clusters together processes that share behaviors over time.

Each hour (or any other predetermined time interval) after bootstrap, a new snapshot is taken (i.e., data collected about a datacenter in the last hour is processed) and information from the new snapshot is merged with existing data to create and (as additional data is collected/processed) maintain a cumulative graph. The cumulative graph (also referred to herein as a cumulative PType graph and a polygraph) is a running model of how processes behave over time. Nodes in the cumulative graph are PType nodes, and provide information such as a list of all active processes and PIDs in the last hour, the number of historic total processes, the average number of active processes per hour, the application type of the process (e.g., the CType of the PType), and historic CType information/frequency. Edges in the cumulative graph can represent connectivity and provide information such as connectivity frequency. The edges can be weighted (e.g., based on number of connections, number of bytes exchanged, etc.). Edges in the cumulative graph (and snapshots) can also represent transitions.

One approach to merging a snapshot of the activity of the last hour into a cumulative graph is as follows. An aggregate graph of physical connections is made for the connections included in the snapshot (as was previously done for the original snapshot used during bootstrap). And, clustering/splitting is similarly performed on the snapshot's aggregate graph. Next, PType clusters in the snapshot's graph are compared against PType clusters in the cumulative graph to identify commonality.

One approach to determining commonality is, for any two nodes that are members of a given CmdType (described in more detail below), comparing internal neighbors and calculating a set membership Jaccard distance. The pairs of nodes are then ordered by decreasing similarity (i.e., with the most similar sets first). For nodes with a threshold amount of commonality (e.g., at least 66% members in common), any new nodes (i.e., appearing in the snapshot's graph but not the cumulative graph) are assigned the same PType identifier as is assigned to the corresponding node in the cumulative graph. For each node that is not classified (i.e., has not been assigned a PType identifier), a network signature is generated (i.e., indicative of the kinds of network connections the node makes, who the node communicates with, etc.). The following processing is then performed until convergence. If a match of the network signature is found in the cumulative graph, the unclassified node is assigned the PType identifier of the corresponding node in the cumulative graph. Any nodes which remain unclassified after convergence are new PTypes and are assigned new identifiers and added to the cumulative graph as new. As applicable, the detection of a new PType can be used to generate an alert. If the new PType has a new CmdType, a severity of the alert can be increased. If any surviving nodes (i.e., present in both the cumulative graph and the snapshot graph) change PTypes, such change is noted as a transition, and an alert can be generated. Further, if a surviving node changes PType and also changes CmdType, a severity of the alert can be increased.

Changes to the cumulative graph (e.g., a new PType or a new edge between two PTypes) can be used (e.g., at 303) to detect anomalies (described in more detail below). Two example kinds of anomalies that can be detected by data platform 12 include security anomalies (e.g., a user or process behaving in an unexpected manner) and devops/root cause anomalies (e.g., network congestion, application failure, etc.). Detected anomalies can be recorded and surfaced (e.g., to administrators, auditors, etc.), such as through alerts which are generated at 304 based on anomaly detection.

Additional detail regarding processing performed, by various components depicted in FIG. 1D (whether performed individually or in combination), in conjunction with model/polygraph construction (e.g., as performed at 302) are provided below.

As explained above, an aggregated physical graph can be generated on a per customer basis periodically (e.g., once an hour) from raw physical graph information, by matching connections (e.g., between two processes on two virtual machines). In various embodiments, a deterministic fixed approach is used to cluster nodes in the aggregated physical graph (e.g., representing processes and their communications). As one example, Matching Neighbors Clustering (MNC) can be performed on the aggregated physical graph to determine which entities exhibit identical behavior and cluster such entities together.

Figure 3B:
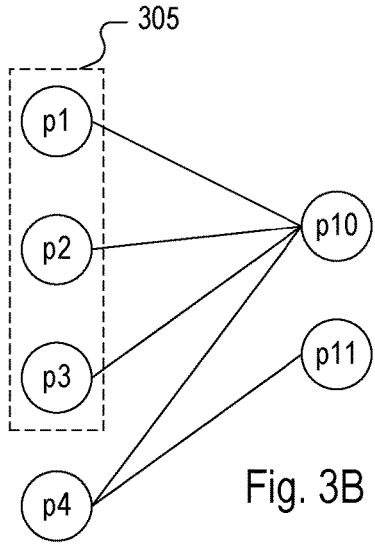
FIG. 3B depicts a set of example processes communicating with other processes.

FIG. 3B depicts a set of example processes (p1, p2, p3, and p4) communicating with other processes (p10 and p11). FIG. 3B is a graphical representation of a small portion of an aggregated physical graph showing (for a given time period, such as an hour) which processes in a datacenter communicate with which other processes. Using MNC, processes p1, p2, and p3 will be clustered together (305), as they exhibit identical behavior (they communicate with p10 and only p10). Process p4, which communicates with both p10 and p11, will be clustered separately.

In MNC, only those processes exhibiting identical (communication) behavior will be clustered. In various embodiments, an alternate clustering approach can also/instead be used, which uses a similarity measure (e.g., constrained by a threshold value, such as a 60% similarity) to cluster items. In some embodiments, the output of MNC is used as input to SimRank, in other embodiments, MNC is omitted.

Figure 3C:
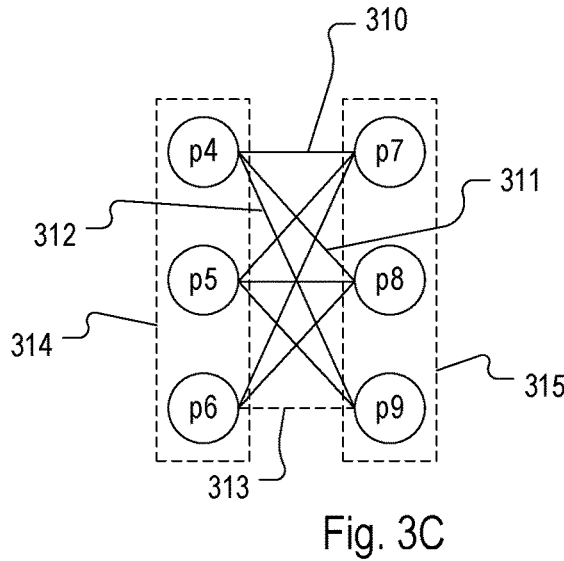
FIG. 3C depicts a set of example processes communicating with other processes.

FIG. 3C depicts a set of example processes (p4, p5, p6) communicating with other processes (p7, p8, p9). As illustrated, most of nodes p4, p5, and p6 communicate with most of nodes p7, p8, and p9 (as indicated in FIG. 3C with solid connection lines). As one example, process p4 communicates with process p7 (310), process p8 (311), and process p9 (312). An exception is process p6, which communicates with processes p7 and p8, but does not communicate with process p9 (as indicated by dashed line 313). If MNC were applied to the nodes depicted in FIG. 3C, nodes p4 and p5 would be clustered (and node p6 would not be included in their cluster).

One approach to similarity clustering is to use SimRank. In an embodiment of the SimRank approach, for a given node v in a directed graph, I(v) and O(v) denote the respective set of in-neighbors and out-neighbors of v. Individual in-neighbors are denoted as $I_i(v)$, for $1 \leq i \leq |I(v)|$, and individual out-neighbors are denoted as $O_i(v)$, for $1 \leq i \leq |O(v)|$. The similarity between two objects a and b can be denoted by $s(a,b) \in [1,0]$. A recursive equation (hereinafter "the SimRank equation") can be written for s(a,b), where, if a=b, then s(a,b) is defined as 1, otherwise, $$s(a, b) = \frac{-C}{|I(a)||I(b)|} \sum_{i=1}^{|I(a)|} \sum_{j=1}^{|I(b)|} s(I_i(a), I_j(b))$$

where C is a constant between 0 and 1. One example value for the decay factor C is 0.8 (and a fixed number of iterations such as five). Another example value for the decay factor C is 0.6 (and/or a different number of iterations). In the event that a or b has no in-neighbors, similarity is set to s(a,b)=0, so the summation is defined to be 0 when I(a)=Ø or I(b)=Ø.

The SimRank equations for a graph G can be solved by iteration to a fixed point. Suppose n is the number of nodes in G. For each iteration k, $n^2$ entries $s_k(*,*)$ are kept, where $s_k(a,b)$ gives the score between a and b on iteration k. Successive computations of $s_{k+1}(*,*)$ are made based on $s_k(*,*)$. Starting with $s_0(*,*)$, where each $s_0(a,b)$ is a lower bound on the actual SimRank score s(a,b):

$$s_0(a, b) = \begin{cases} 1, \text{ if } a = b, \\ 0, \text{ if } a \neq b. \end{cases}$$

The SimRank equation can be used to compute $s_{k+1}$ (a, b) from $s_k(*,*)$ with $$s_{k+1}(a, b) = \frac{C}{|I(a)||I(b)|} \sum_{i=1}^{|I(a)|} \sum_{j=1}^{|I(b)|} s_k(I_i(a), I_j(b))$$

for a≠b, and $s_{k+1}$(a, b)=1 for a=b. On each iteration k+1, the similarity of (a,b) is updated using the similarity scores of the neighbors of (a,b) from the previous iteration k according to the SimRank equation. The values $s_k(*,*)$ are nondecreasing as k increases.

Returning to FIG. 3C, while MNC would cluster nodes p4 and p5 together (and not include node p6 in their cluster), application of SimRank would cluster nodes p4-p6 into one cluster (314) and also cluster nodes p7-p9 into another cluster (315).

Figure 3D:
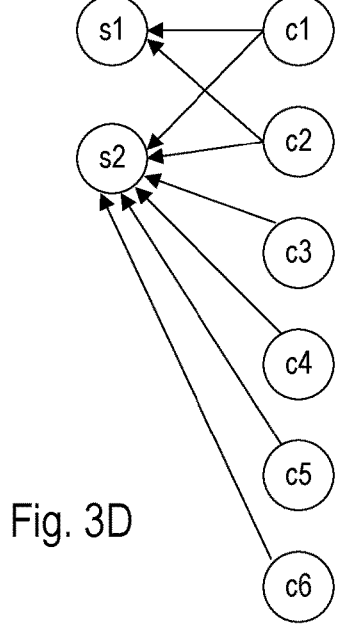
FIG. 3D depicts a set of example processes communicating with other processes.

FIG. 3D depicts a set of processes, and in particular server processes s1 and s2, and client processes c1, c2, c3, c4, c5, and c6. Suppose only nodes s1, s2, c1, and c2 are present in the graph depicted in FIG. 3D (and the other nodes depicted are omitted from consideration). Using MNC, nodes s1 and s2 would be clustered together, as would nodes c1 and c2. Performing SimRank clustering as described above would also result in those two clusters (s1 and s2, and c1 and c2). As previously mentioned, in MNC, identical behavior is required. Thus, if node c3 were now also present in the graph, MNC would not include c3 in a cluster with c2 and c1 because node c3 only communicates with node s2 and not node s1. In contrast, a SimRank clustering of a graph that includes nodes s1, s2, c1, c2, and c3 would result (based, e.g., on an applicable selected decay value and number of iterations) in a first cluster comprising nodes s1 and s2, and a second cluster of c1, c2, and c3. As an increasing number of nodes which communicate with server process s2, and do not also communicate with server process s1, are included in the graph (e.g., as c4, c5, and c6 are added), under SimRank, nodes s1 and s2 will become decreasingly similar (i.e., their intersection is reduced).

In various embodiments, SimRank is modified (from what is described above) to accommodate differences between the asymmetry of client and server connections. As one example, SimRank can be modified to use different thresholds for client communications (e.g., an 80% match among nodes c1-c6) and for server communications (e.g., a 60% match among nodes s1 and s2). Such modification can also help achieve convergence in situations such as where a server process dies on one node and restarts on another node.

The application of MNC/SimRank to an aggregated physical graph results in a smaller graph, in which processes which are determined to be sufficiently similar are clustered together. Typically, clusters generated as output of MNC will be underinclusive. For example, for the nodes depicted in FIG. 3C, process p6 will not be included in a cluster with processes p4 and p5, despite substantial similarity in their communication behaviors. The application of SimRank (e.g., to the output of MNC) helps mitigate the underinclusiveness of MNC, but can result in overly inclusive clusters. As one example, suppose (returning to the nodes depicted in FIG. 3B) that as a result of applying SimRank to the depicted nodes, nodes p1-p4 are all included in a single cluster. Both MNC and SimRank operate agnostically of which application a given process belongs to. Suppose processes p1-p3 each correspond to a first application (e.g., an update engine), and process p4 corresponds to a second application (e.g., sshd). Further suppose process p10 corresponds to contact with AWS. Clustering all four of the processes together (e.g., as a result of SimRank) could be problematic, particularly in a security context (e.g., where granular information useful in detecting threats would be lost).

As previously mentioned, data platform 12 may maintain a mapping between processes and the applications to which they belong. In various embodiments, the output of SimRank (e.g., SimRank clusters) is split based on the applications to which cluster members belong (such a split is also referred to herein as a "CmdType split"). If all cluster members share a common application, the cluster remains. If different cluster members originate from different applications, the cluster members are split along application-type (CmdType) lines. Using the nodes depicted in FIG. 3D as an example, suppose that nodes c1, c2, c3, and c5 all share "update engine" as the type of application to which they belong (sharing a CmdType). Suppose that node c4 belongs to "ssh," and suppose that node c6 belongs to "bash." As a result of SimRank, all six nodes (c1-c6) might be clustered into a single cluster. After a CmdType split is performed on the cluster, however, the single cluster will be broken into three clusters (c1, c2, c3, c5; c4; and c6). Specifically, the resulting clusters comprise processes associated with the same type of application, which exhibit similar behaviors (e.g., communication behaviors). Each of the three clusters resulting from the CmdType split represents, respectively, a node (also referred to herein as a PType) of a particular CmdType. Each PType is given a persistent identifier and stored persistently as a cumulative graph.

A variety of approaches can be used to determine a CmdType for a given process. As one example, for some applications (e.g., sshd), a one-to-one mapping exists between the CmdType and the application/binary name. Thus, processes corresponding to the execution of sshd will be classified using a CmdType of sshd. In various embodiments, a list of common application/binary names (e.g., sshd, apache, etc.) is maintained by data platform 12 and manually curated as applicable. Other types of applications (e.g., Java, Python, and Ruby) are multi-homed, meaning that several very different applications may all execute using the binary name, "java." For these types of applications, information such as command line/execution path information can be used in determining a CmdType. In particular, the subapplication can be used as the CmdType of the application, and/or term frequency analysis (e.g., TF/IDF) can be used on command line information to group, for example, any marathon related applications together (e.g., as a python.marathon CmdType) and separately from other Python applications (e.g., as a python.airflow CmdType).

In various embodiments, machine learning techniques are used to determine a CmdType. The CmdType model is constrained such that the execution path for each CmdType is unique. One example approach to making a CmdType model is a random forest based approach. An initial CmdType model is bootstrapped using process parameters (e.g., available within one minute of process startup) obtained using one hour of information for a given customer (e.g., entity A). Examples of such parameters include the command line of the process, the command line of the process's parent(s) (if applicable), the uptime of the process, UID/EUID and any change information, TTY and any change information, listening ports, and children (if any). Another approach is to perform term frequency clustering over command line information to convert command lines into cluster identifiers.

The random forest model can be used (e.g., in subsequent hours) to predict a CmdType for a process (e.g., based on features of the process). If a match is found, the process can be assigned the matching CmdType. If a match is not found, a comparison between features of the process and its nearest CmdType (e.g., as determined using a Levenstein distance) can be performed. The existing CmdType can be expanded to include the process, or, as applicable, a new CmdType can be created (and other actions taken, such as generating an alert). Another approach to handling processes which do not match an existing CmdType is to designate such processes as unclassified, and once an hour, create a new random forest seeded with process information from a sampling of classified processes (e.g., 10 or 100 processes per CmdType) and the new processes. If a given new process winds up in an existing set, the process is given the corresponding CmdType. If a new cluster is created, a new CmdType can be created.

Conceptually, a polygraph represents the smallest possible graph of clusters that preserve a set of rules (e.g., in which nodes included in the cluster must share a CmdType and behavior). As a result of performing MNC, SimRank, and cluster splitting (e.g., CmdType splitting) many processes are clustered together based on commonality of behavior (e.g., communication behavior) and commonality of application type. Such clustering represents a significant reduction in graph size (e.g., compared to the original raw physical graph). Nonetheless, further clustering can be performed (e.g., by iterating on the graph data using the GBM to achieve such a polygraph). As more information within the graph is correlated, more nodes can be clustered together, reducing the size of the graph, until convergence is reached and no further clustering is possible.

Figure 3E:
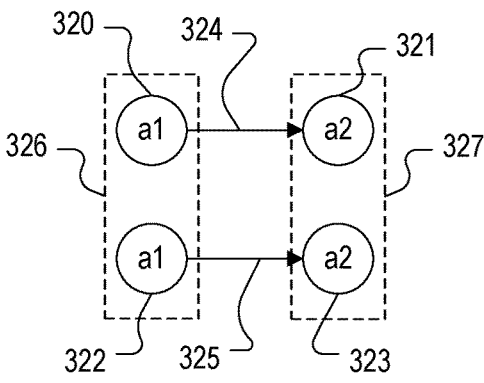
FIG. 3E depicts two pairs of clusters.

FIG. 3E depicts two pairs of clusters. In particular, cluster 320 represents a set of client processes sharing the same CmdType ("a1"), communicating (collectively) with a server process having a CmdType ("a2"). Cluster 322 also represents a set of client processes having a CmdType a1 communicating with a server process having a CmdType a2. The nodes in clusters 320 and 322 (and similarly nodes in 321 and 323) remain separately clustered (as depicted) after MNC/SimRank/CmdType splitting—isolated islands. One reason this could occur is where server process 321 corresponds to processes executing on a first machine (having an IP address of 1.1.1.1). The machine fails and a new server process 323 starts, on a second machine (having an IP address of 2.2.2.2) and takes over for process 321.

Communications between a cluster of nodes (e.g., nodes of cluster 320) and the first IP address can be considered different behavior from communications between the same set of nodes and the second IP address, and thus communications 324 and 325 will not be combined by MNC/SimRank in various embodiments. Nonetheless, it could be desirable for nodes of clusters 320/322 to be combined (into cluster 326), and for nodes of clusters 321/323 to be combined (into cluster 327), as representing (collectively) communications between a1 and a2. One task that can be performed by data platform 12 is to use DNS query information to map IP addresses to logical entities. As will be described in more detail below, GBM 154 can make use of the DNS query information to determine that graph nodes of cluster 320 and graph nodes of cluster 322 both made DNS queries for "appserverabc.example.com," which first resolved to 1.1.1.1 and then to 2.2.2.2, and to combine nodes 320/322 and 321/323 together into a single pair of nodes (326 communicating with 327).

In various embodiments, GBM 154 operates in a batch manner in which it receives as input the nodes and edges of a graph for a particular time period along with its previous state, and generates as output clustered nodes, cluster membership edges, cluster-to-cluster edges, events, and its next state.

GBM 154 may not try to consider all types of entities and their relationships that may be available in a conceptual common graph all at once. Instead, GBM uses a concept of models where a subset of node and edge types and their properties are considered in a given model. Such an approach is helpful for scalability, and also to help preserve detailed information (of particular importance in a security context)—as clustering entities in a more complex and larger graph could result in less useful results. In particular, such an approach allows for different types of relationships between entities to be preserved/more easily analyzed.

While GBM 154 can be used with different models corresponding to different subgraphs, core abstractions remain the same across types of models.

For example, each node type in a GBM model is considered to belong to a class. The class can be thought of as a way for the GBM to split nodes based on the criteria it uses for the model. The class for a node is represented as a string whose value is derived from the node's key and properties depending on the GBM Model. Note that different GBM models may create different class values for the same node. For each node type in a given GBM model, GBM 154 can generate clusters of nodes for that type. A GBM generated cluster for a given member node type cannot span more than one class for that node type. GBM 154 generates edges between clusters that have the same types as the edges between source and destination cluster node types.

Additionally or alternatively, the processes described herein as being used for a particular model can be used (can be the same) across models, and different models can also be configured with different settings.

Additionally or alternatively, the node types and the edge types may correspond to existing types in the common graph node and edge tables but this is not necessary. Even when there is a correspondence, the properties provided to GBM 154 are not limited to the properties that are stored in the corresponding graph table entries. They can be enriched with additional information before being passed to GBM 154.

Logically, the input for a GBM model can be characterized in a manner that is similar to other graphs. Edge triplets can be expressed, for example, as an array of source node type, edge type, and destination node type. And, each node type is associated with node properties, and each edge type is associated with edge properties. Other edge triplets can also be used (and/or edge triplets can be extended) in accordance with various embodiments.

Note that the physical input to the GBM model need not (and does not, in various embodiments) conform to the logical input. For example, the edges in the PtypeConn model correspond to edges between Matching Neighbors (MN) clusters, where each process node has an MN cluster identifier property. In the User ID to User ID model (also referred to herein as the Uid2Uid model), edges are not explicitly provided separately from nodes (as the euid array in the node properties serves the same purpose). In both cases, however, the physical information provides the applicable information necessary for the logical input.

The state input for a particular GBM model can be stored in a file, a database, or other appropriate storage. The state file (from a previous run) is provided, along with graph data, except for when the first run for a given model is performed, or the model is reset. In some cases, no data may be available for a particular model in a given time period, and GBM may not be run for that time period. As data becomes available at a future time, GBM can run using the latest state file as input.

GBM 154 outputs cluster nodes, cluster membership edges, and inter-cluster relationship edges that are stored (in some embodiments) in the graph node tables: node_c, node_cm, and node_icr, respectively. The type names of nodes and edges may conform to the following rules:

A given node type can be used in multiple different GBM models. The type names of the cluster nodes generated by two such models for that node type will be different. For instance, process type nodes will appear in both PtypeConn and Uid2Uid models, but their cluster nodes will have different type names.

The membership edge type name is "MemberOf."

The edge type names for cluster-to-cluster edges will be the same as the edge type names in the underlying node-to-node edges in the input.

The following are example events GBM 154 can generate: new class, new cluster, new edge from class to class, split class (the notion that GBM 154 considers all nodes of a given type and class to be in the same cluster initially and if GBM 154 splits them into multiple clusters, it is splitting a class), new edge from cluster and class, new edge between cluster and cluster, and/or new edge from class to cluster.

One underlying node or edge in the logical input can cause multiple types of events to be generated. Conversely, one event can correspond to multiple nodes or edges in the input. Not every model generates every event type.

Additional information regarding examples of data structures/models that can be used in conjunction with models used by data platform 12 is now provided.

In some examples, a PTypeConn Model clusters nodes of the same class that have similar connectivity relationships. For example, if two processes had similar incoming neighbors of the same class and outgoing neighbors of the same class, they could be clustered.

The node input to the PTypeConn model for a given time period includes non-interactive (i.e., not associated with tty) process nodes that had connections in the time period and the base graph nodes of other types (IP Service Endpoint (IPSep) comprising an IP address and a port), DNS Service Endpoint (DNSSep) and IPAddress) that have been involved in those connections. The base relationship is the connectivity relationship for the following type triplets:

Process, ConnectedTo, Process

Process, ConnectedTo, IP Service Endpoint (IPSep)

Process, ConnectedTo, DNS Service Endpoint (DNSSep)

IPAddress, ConnectedTo, ProcessProcess, DNS, ConnectedTo, Process

The edge inputs to this model are the ConnectedTo edges from the MN cluster, instead of individual node-to-node ConnectedTo edges from the base graph. The membership edges created by this model refer to the base graph node type provided in the input.

Class Values:

The class values of nodes are determined as follows depending on the node type (e.g., Process nodes, IPSep nodes, DNSSep nodes, and IP Address nodes).

Process Nodes:

if exe_path contains java then "java <cmdline_term 1> . . . "

else if exe_path contains python then "python <cmdline_ term 1> . . . "

else "last_part_of_exe_path"

IPSep Nodes:

if IP_internal then "IntIPS"

else if severity=0 then "<IP_addr>:<protocol>:<port>"

else "<IP_addr>:<port>_BadIP"

DNSSep Nodes:

if IP_internal=1 then "<hostname>"

else if severity=0 then "<hostname>:<protocol>:port"

else "<hostname>:<port>_BadIP"

IPAddress nodes (will appear only on client side):

if IP_internal=1 then "IPIntC"

else if severity=0 then "ExtIPC"

else "ExtBadIPC"

Events:

A new class event in this model for a process node is equivalent to seeing a new CType being involved in a connection for the first time. Note that this does not mean the CType was not seen before. It is possible that it was previously seen but did not make a connection at that time.

A new class event in this model for an IPSep node with IP_internal=0 is equivalent to seeing a connection to a new external IP address for the first time.

A new class event in this model for a DNSSep node is equivalent to seeing a connection to a new domain for the first time.

A new class event in this model for an IPAddress node with IP_internal=0 and severity=0 is equivalent to seeing a connection from any external IP address for the first time.

A new class event in this model for an IPAddress node with IP_internal=0 and severity>0 is equivalent to seeing a connection from any bad external IP address for the first time.

A new class to class to edge from a class for a process node to a class for a process node is equivalent to seeing a communication from the source CType making a connection to the destination CType for the first time.

A new class to class to edge from a class for a process node to a class for a DNSSep node is equivalent to seeing a communication from the source CType making a connection to the destination domain name for the first time.

An IntPConn Model may be similar to the PtypeConn Model, except that connection edges between parent/child processes and connections between processes where both sides are not interactive are filtered out.

A Uid2Uid Model may cluster processes with the same username that show similar privilege change behavior. For instance, if two processes with the same username had similar effective user values, launched processes with similar usernames, and were launched by processes with similar usernames, then they could be clustered.

An edge between a source cluster and destination cluster generated by this model means that all of the processes in the source cluster had a privilege change relationship to at least one process in the destination cluster.

The node input to this model for a given time period includes process nodes that are running in that period. The value of a class of process nodes is "<username>".

The base relationship that is used for clustering is privilege change, either by the process changing its effective user ID, or by launching a child process which runs with a different user.

The physical input for this model includes process nodes (only), with the caveat that the complete ancestor hierarchy of process nodes active (i.e., running) for a given time period is provided as input even if an ancestor is not active in that time period. Note that effective user IDs of a process are represented as an array in the process node properties, and launch relationships are available from ppid_hash fields in the properties as well.

A new class event in this model is equivalent to seeing a user for the first time.

A new class to class edge event is equivalent to seeing the source user making a privilege change to the destination user for the first time.

A Ct2Ct Model may cluster processes with the same CType that show similar launch behavior. For instance, if two processes with the same CType have launched processes with similar CTypes, then they could be clustered.

The node input to this model for a given time period includes process nodes that are running in that period. The value class of process nodes is CType (similar to how it is created for the PtypeConn Model).

The base relationship that is used for clustering is a parent process with a given CType launching a child process with another given destination CType.

The physical input for this model includes process nodes (only) with the caveat that the complete ancestor hierarchy active process nodes (i.e., that are running) for a given time period is provided as input even if an ancestor is not active in that time period. Note that launch relationships are available from ppid_hash fields in the process node properties.

An edge between a source cluster and destination cluster generated by this model means that all of the processes in the source cluster launched at least one process in the destination cluster.

A new class event in this model is equivalent to seeing a CType for the first time. Note that the same type of event will be generated by the PtypeConn Model as well.

A new class to class edge event is equivalent to seeing the source CType launching the destination CType for the first time.

An MTypeConn Model may cluster nodes of the same class that have similar connectivity relationships. For example, if two machines had similar incoming neighbors of the same class and outgoing neighbors of the same class, they could be clustered.

A new class event in this model will be generated for external IP addresses or (as applicable) domain names seen for the first time. Note that a new class to class to edge Machine, class to class for an IPSep or DNSName node will also be generated at the same time.

The membership edges generated by this model will refer to Machine, IPAddress, DNSName, and IPSep nodes in the base graph. Though the nodes provided to this model are IPAddress nodes instead of IPSep nodes, the membership edges it generates will refer to IPSep type nodes. Alternatively, the base graph can generate edges between Machine and IPSep node types. Note that the Machine to IPAddress edges have tcp_dst_ports/udp_dst_ports properties that can be used for this purpose.

The node input to this model for a given time period includes machine nodes that had connections in the time period and the base graph nodes of other types (IPAddress and DNSName) that were involved in those connections.

The base relationship is the connectivity relationship for the following type triplets:

Machine, ConnectedTo, Machine
Machine, ConnectedTo, IPAddress
Machine, ConnectedTo, DNSName
IPAddress, ConnectedTo, Machine, DNS, ConnectedTo, Machine The edge inputs to this model are the corresponding ConnectedTo edges in the base graph.

Class Values:

Machine:

The class value for all Machine nodes is "Machine."

The machine terms property in the Machine nodes is used, in various embodiments, for labeling machines that are clustered together. If a majority of the machines clustered together share a term in the machine terms, that term can be used for labeling the cluster.

IPSep:

The class value for IPSep nodes is determined as follows:

```
if IP_internal then "IntIPS"
else
    if severity = 0 then "<ip_addr>:<protocol>:<port>"
    else "<IP_addr_BadIP>"
```

IPAddress:

The class value for IpAddress nodes is determined as follows:

```
if IP_internal then "IntIPC"
else
    if severity = 0 then "ExtIPC"
    else "ExtBadIPC"
```

DNSName:

The class value for DNSName nodes is determined as follows:

```
if severity = 0 then "<hostname>"
else then "<hostname> _BadIP"
```

An example structure for a New Class Event is now described.

The key field for this event type looks as follows (using the PtypeConn model as an example):

```
{
  "node": {
    "class": {
      "cid": "httpd"
    },
    "key": {
      "cid": "29654"
    },
    "type": "PtypeConn"
  }
}
```

It contains the class value and also the ID of the cluster where that class value is observed. Multiple clusters can be observed with the same value in a given time period. It contains the class value and also the ID of the cluster where that class value is observed. Multiple clusters can be observed with the same value in a given time period. Accordingly, in some embodiments, GBM 154 generates multiple events of this type for the same class value.

The properties field looks as follows:

```
{
  "set_size": 5
}
```

The set_size indicates the size of the cluster referenced in the keys field.

Conditions:

For a given model and time period, multiple NewClass events can be generated if there is more than one cluster in that class. NewNode events will not be generated separately in this case.

Example New Class to Class Edge Event structure:

The key field for this event type looks as follows (using the PtypeConn model as an example):

```
"edge": {
  "dst_node": {
    "class": {
      "cid": "java war"
    },
    "key": {
      "cid": "27635"
    },
    "type": "PtypeConn"
  },
  "src_node": {
    "class": {
      "cid": "IntIPC"
    },
    "key": {
      "cid": "20881"
    },
    "type": "PtypeConn"
  },
  "type": "ConnectedTo"
}
```

The key field contains source and destination class values and also source and destination cluster identifiers (i.e., the src/dst_node:key.cid represents the src/dst cluster identifier).

In a given time period for a given model, an event of this type could involve multiple edges between different cluster pairs that have the same source and destination class values. GBM 154 can generate multiple events in this case with different source and destination cluster identifiers.

The props fields look as follows for this event type:

```
{
  "dst_set_size": 2,
  "src_set_size": 1
}
```

The source and destination sizes represent the sizes of the clusters given in the keys field.

Conditions:

For a given model and time period, multiple NewClassTo-Class events can be generated if there are more than one pair of clusters in that class pair. NewNodeToNode events are not generated separately in this case.

Combining Events at the Class Level: for a given model and time period, the following example types of events can represent multiple changes in the underlying GBM cluster level graph in terms of multiple new clusters or multiple new edges between clusters:

NewClass

NewEdgeClassToClass

NewEdgeNodeToClass

NewEdgeClassToNode

Multiple NewClass events with the same model and class can be output if there are multiple clusters in that new class.

Multiple NewEdgeClassToClass events with the same model and class pair can be output if there are multiple new cluster edges within that class pair.

Multiple NewEdgeNodeToClass events with the same model and destination class can be output if there are multiple new edges from the source cluster to the destination clusters in that destination class (the first time seeing this class as a destination cluster class for the source cluster).

Multiple NewEdgeClassToNode events with the same model and source class can be output if there are multiple new edges from source clusters to the destination clusters in that source class (the first time seeing this class as a source cluster class for the destination cluster).

These events may be combined at the class level and treated as a single event when it is desirable to view changes at the class level, e.g., when one wants to know when there is a new CType.

In some examples, different models may have partial overlap in the types of nodes they use from the base graph. Therefore, they can generate NewClass type events for the same class. NewClass events can also be combined across models when it is desirable to view changes at the class level.

Using techniques herein, actions can be associated with processes and (e.g., by associating processes with users) actions can thus also be associated with extended user sessions. Such information can be used to track user behavior correctly, even where a malicious user attempts to hide his trail by changing user identities (e.g., through lateral movement). Extended user session tracking can also be useful in operational use cases without malicious intent, e.g., where users make original logins with distinct usernames (e.g., "charlie" or "dave") but then perform actions under a common username (e.g., "admin" or "support"). One such example is where multiple users with administrator privileges exist, and they need to gain superuser privilege to perform a particular type of maintenance. It may be desirable to know which operations are performed (as the superuser) by which original user when debugging issues. In the following examples describing extended user session tracking, reference is generally made to using the secure shell (ssh) protocol as implemented by openssh (on the server side) as the mechanism for logins. However, extended user session tracking is not limited to the ssh protocol or a particular limitation and the techniques described herein can be extended to other login mechanisms.

On any given machine, there will be a process that listens for and accepts ssh connections on a given port. This process can run the openssh server program running in daemon mode or it could be running another program (e.g., initd on a Linux system). In either case, a new process running openssh will be created for every new ssh login session and this process can be used to identify an ssh session on that machine. This process is called the "privileged" process in openssh.

After authentication of the ssh session, when an ssh client requests a shell or any other program to be run under that ssh session, a new process that runs that program will be created under (i.e., as a child of) the associated privileged process. If an ssh client requests port forwarding to be performed, the connections will be associated with the privileged process.

In modern operating systems such as Linux and Windows, each process has a parent process (except for the very first process) and when a new process is created the parent process is known. By tracking the parent-child hierarchy of processes, one can determine if a particular process is a descendant of a privileged openssh process and thus if it is associated with an ssh login session.

For user session tracking across machines (or on a single machine with multiple logins) in a distributed environment, it is established when two login sessions have a parent-child relationship. After that, the "original" login session, if any, for any given login session can be determined by following the parent relationship recursively.

Figure 3F:
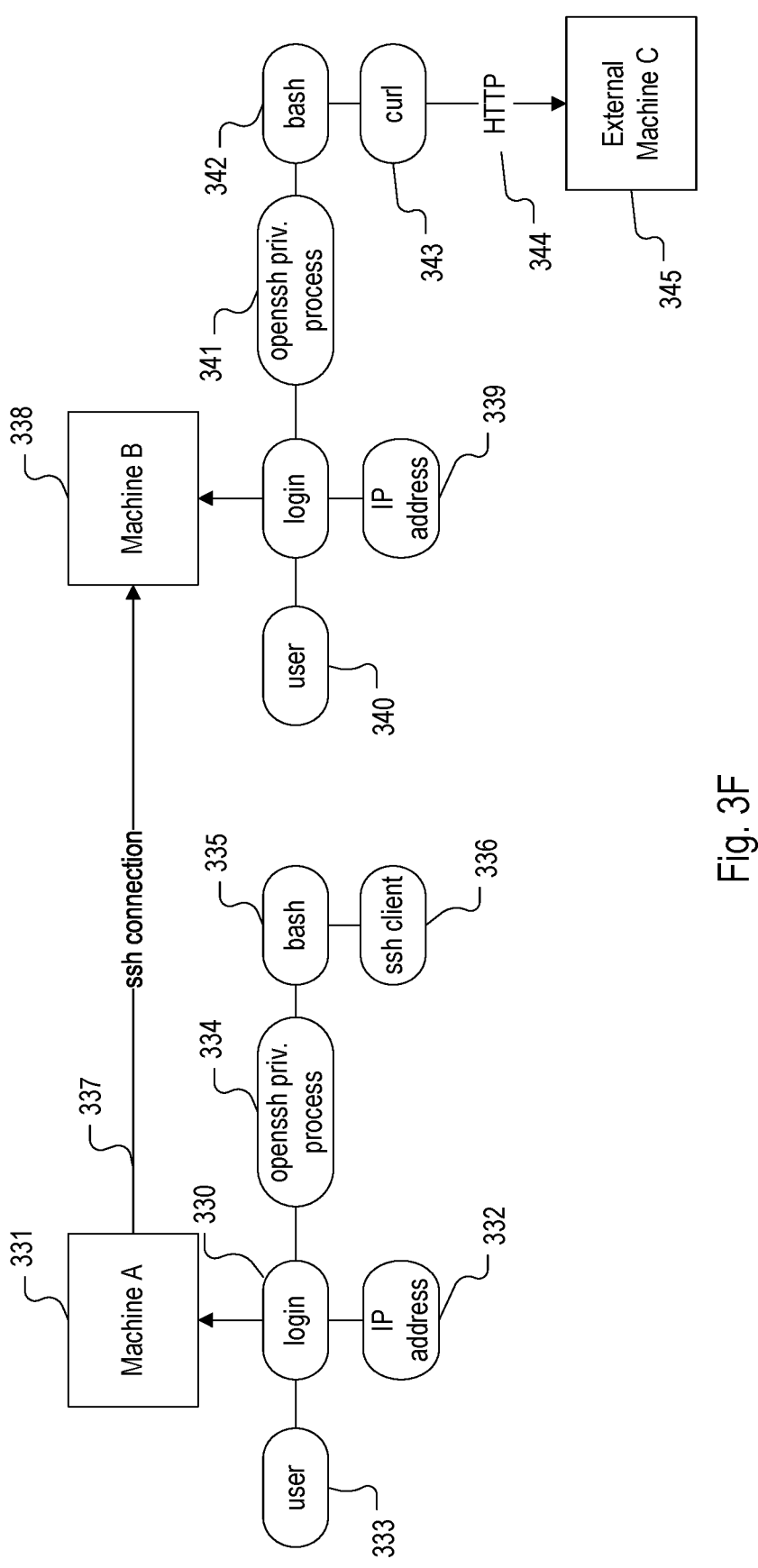
FIG. 3F is a representation of a user logging into a first machine, then into a second machine from the first machine, and then making an external connection.

FIG. 3F is a representation of a user logging into a first machine and then into a second machine from the first machine, as well as information associated with such actions. In the example of FIG. 3F, a user, Charlie, logs into Machine A (331) from a first IP address (332). As part of the login process, he provides a username (333). Once connected to Machine A, an openssh privileged process (334) is created to handle the connection for the user, and a terminal session is created and a bash process (335) is created as a child. Charlie launches an ssh client (336) from the shell, and uses it to connect (337) to Machine B (338). As with the connection he makes to Machine A, Charlie's connection to Machine B will have an associated incoming IP address (339), in this case, the IP address of Machine A. And, as part of the login process with Machine B, Charlie will provide a username (340) which need not be the same as username 333. An openssh privileged process (341) is created to handle the connection, and a terminal session and child bash process (342) will be created. From the command line of Machine B, Charlie launches a curl command (343), which opens an HTTP connection (2028) to an external Machine C (345).

Figure 3G:
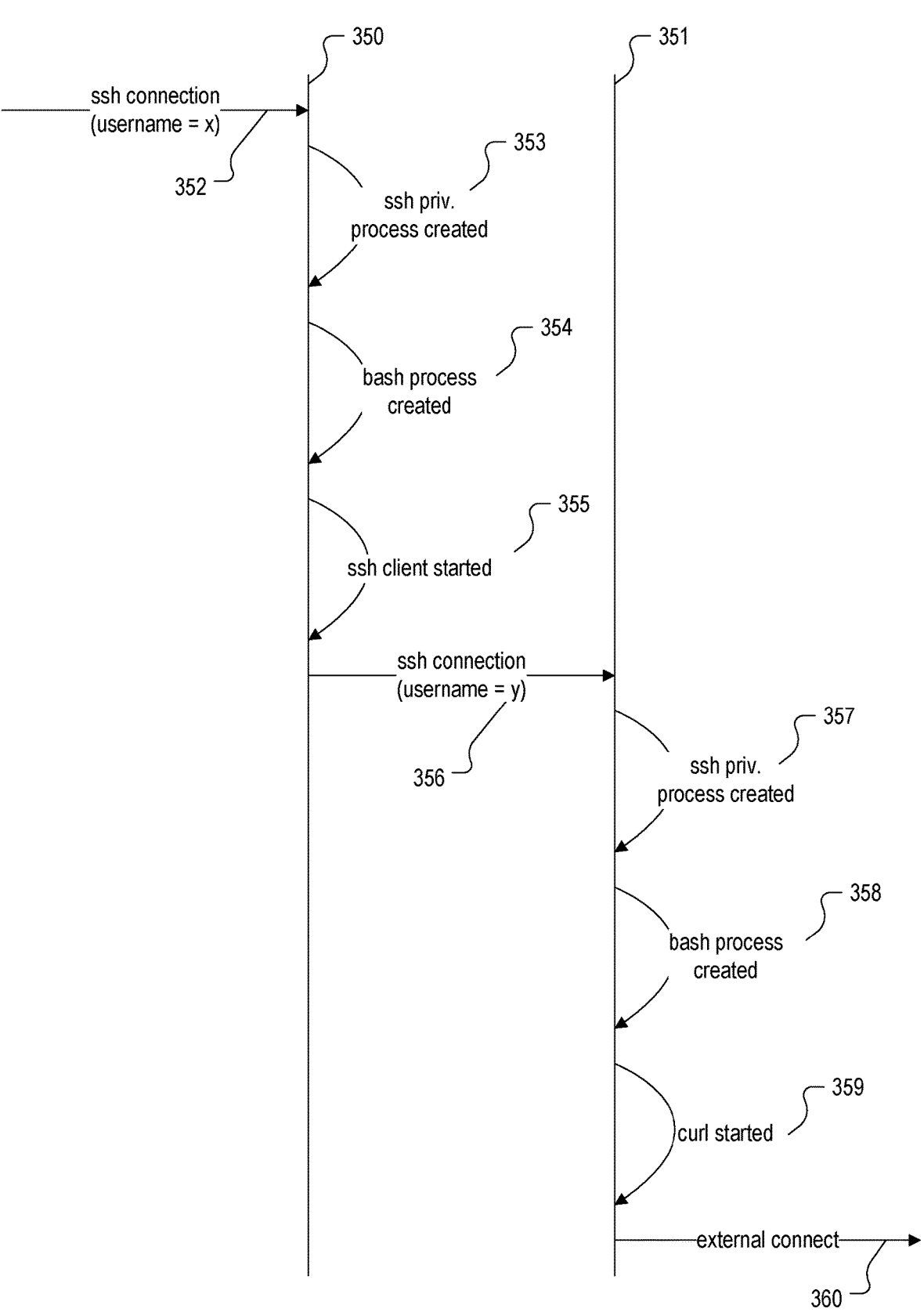
FIG. 3G is an alternate representation of actions occurring in FIG. 3F.

FIG. 3G is an alternate representation of actions occurring in FIG. 3F, where events occurring on Machine A are indicated along line 350, and events occurring on Machine B are indicated along line 351. As shown in FIG. 3G, an incoming ssh connection is received at Machine A (352). Charlie logs in (as user "x") and an ssh privileged process is created to handle Charlie's connection (353). A terminal session is created and a bash process is created (354) as a child of process 353. Charlie wants to ssh to Machine B, and so executes an ssh client on Machine A (355), providing credentials (as user "y") at 356. Charlie logs into Machine B, and an ssh privileged process is created to handle Charlie's connection (357). A terminal session is created and a bash process is created (358) as a child of process 357. Charlie then executes curl (359) to download content from an external domain (via connection 360).

The external domain could be a malicious domain, or it could be benign. Suppose the external domain is malicious (and, e.g., Charlie has malicious intent). It would be advantageous (e.g., for security reasons) to be able to trace the contact with the external domain back to Machine A, and then back to Charlie's IP address. Using techniques described herein (e.g., by correlating process information collected by various agents), such tracking of Charlie's activities back to his original login (330) can be accomplished. In particular, an extended user session can be tracked that associates Charlie's ssh processes together with a single original login and thus original user.

As described herein, software agents (such as agent 112) may run on machines (such as a machine that implements one of nodes 116) and detect new connections, processes, and/or logins. As also previously explained, such agents send associated records to data platform 12 which includes one or more datastores (e.g., data store 30) for persistently storing such data. Such data can be modeled using logical tables, also persisted in datastores (e.g., in a relational database that provides an SQL interface), allowing for querying of the data. Other datastores such as graph oriented databases and/or hybrid schemes can also be used.

The following identifiers are commonly used in the tables:
MID
PID_hash

An ssh login session can be identified uniquely by an (MID, PID_hash) tuple. The MID is a machine identifier that is unique to each machine, whether physical or virtual, across time and space. Operating systems use numbers called process identifiers (PIDs) to identify processes running at a given time. Over time processes may die and new processes may be started on a machine or the machine itself may restart. The PID is not necessarily unique across time in that the same PID value can be reused for different processes at different times. In order to track process descendants across time, one should therefore account for time as well. In order to be able to identify a process on a machine uniquely across time, another number called a PID_hash is generated for the process. In various embodiments, the PID_hash is generated using a collision-resistant hash function that takes the PID, start time, and (in various embodiments, as applicable) other properties of a process.

Input data collected by agents comprises the input data model and is represented by the following logical tables:
connections
processes
logins A connections table may maintain records of TCP/IP connections observed on each machine. Example columns included in a connections table are as follows:

| Column Name | Description |
| --- | --- |
| MID | Identifier of the machine that the connection was observed on. |
| start_time | Connection start time. |
| PID_hash | Identifier of the process that was associated with the connection. |
| src_IP_addr | Source IP address (the connection was initiated from this IP address). |
| src_port | Source port. |
| dst_IP_addr | Destination IP address (the connection was made to this IP address). |
| dst_port | Destination port. |
| Prot | Protocol (TCP or UDP). |
| Dir | Direction of the connection (incoming or outgoing) with respect to this machine. |

The source fields (IP address and port) correspond to the side from which the connection was initiated. On the destination side, the agent associates an ssh connection with the privileged ssh process that is created for that connection.

For each connection in the system, there will be two records in the table, assuming that the machines on both sides of the connection capture the connection. These records can be matched based on equality of the tuple (src_IP_addr, src_port, dst_IP_addr, dst_port, Prot) and proximity of the start time fields (e.g., with a one minute upper threshold between the start time fields).

A processes table maintains records of processes observed on each machine. It may have the following columns:

| Column Name | Description |
| --- | --- |
| MID | Identifier of the machine that the process was observed on. |
| PID_hash | Identifier of the process. |
| start_time | Start time of the process. |
| exe_path | The executable path of the process. |
| PPID_hash | Identifier of the parent process. |

A logins table may maintain records of logins to machines. It may have the following columns:

| Column Name | Description |
| --- | --- |
| MID | Identifier of the machine that the login was observed on. |
| sshd_PID_hash | Identifier of the sshd privileged process associated with login. |
| login_time | Time of login. |
| login_username | Username used in login. |

Output data generated by session tracking is represented with the following logical tables:
login-local-descendant
login-connection
login-lineage Using data in these tables, it is possible to determine descendant processes of a given ssh login session across the environment (i.e., spanning machines). Conversely, given a process, it is possible to determine if it is an ssh login descendant as well as the original ssh login session for it if so.

A login-local-descendant table maintains the local (i.e., on the same machine) descendant processes of each ssh login session. It may have the following columns:

| Column Name | Description |
| --- | --- |
| MID | Identifier of the machine that the login was observed on. |
| sshd_PID_hash | Identifier of the sshd privileged process associated with login. |
| login_time | Time of login. |
| login_username | Username used in login. |

A login-connections table may maintain the connections associated with ssh logins. It may have the following columns:

| Column Name | Description |
| --- | --- |
| MID | Identifier of the machine that the process was observed on. |
| sshd_PID_hash | Identifier of the sshd privileged process associated with the login. |
| login_time | Time of login. |
| login_username | The username used in the login. |
| src_IP_addr | Source IP address (connection was initiated from this IP address). |

-continued

| Column Name | Description |
|---|---|
| src_port | Source port. |
| dst_IP_addr | Destination IP address (connection was made to this IP address). |
| dst_port | Destination port. |

A login-lineage table may maintain the lineage of ssh login sessions. It may have the following columns:

| Column Name | Description |
|---|---|
| MID | Identifier of the machine that the ssh login was observed on. |
| sshd_PID_hash | Identifier of the sshd privileged process associated with the login. |
| parent_MID | Identifier of the machine that the parent ssh login was observed on. |
| parent_sshd_PID_hash | Identifier of the sshd privileged process associated with the parent login. |
| origin_MID | Identifier of the machine that the origin ssh login was observed on. |
| origin_sshd_PID_hash | Identifier of the sshd privileged process associated with the origin login. |

The parent MID and parent_sshd_PID_hash columns can be null if there is no parent ssh login. In that case, the (MID, sshd_PID_hash) tuple will be the same as the (origin_MID, origin_sshd_PID_hash) tuple.

FIG. 3H illustrates an example of a process for performing extended user tracking. In various embodiments, process 361 is performed by data platform 12. The process begins at 362 when data associated with activities occurring in a network environment (such as entity A's datacenter) is received. One example of such data that can be received at 362 is agent-collected data described above (e.g., in conjunction with process 200). At 363, the received network activity is used to identify user login activity. And, at 364, a logical graph that links the user login activity to at least one user and at least one process is generated (or updated, as applicable). Additional detail regarding process 361, and in particular, portions 363 and 364 of process 361 are described in more detail below (e.g., in conjunction with discussion of FIG. 3J).

Figure 3I:
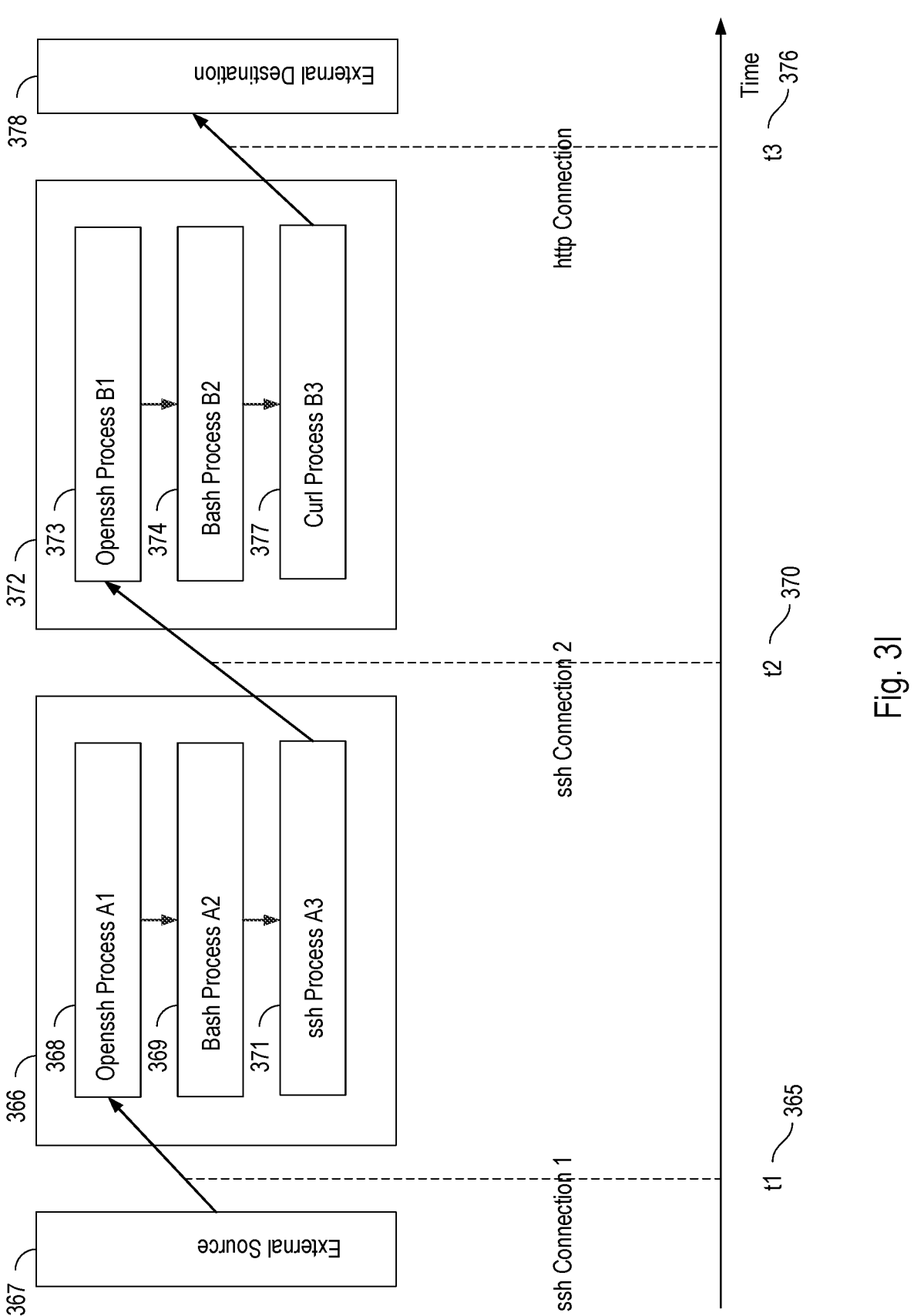
FIG. 3I is a representation of a user logging into a first machine, then into a second machine from the first machine, and then making an external connection.

FIG. 3I depicts a representation of a user logging into a first machine, then into a second machine from the first machine, and then making an external connection. The scenario depicted in FIG. 3I is used to describe an example of processing that can be performed on data collected by agents to generate extended user session tracking information. FIG. 3I is an alternate depiction of the information shown in FIGS. 3F and 3G.

At time t1 (365), a first ssh connection is made to Machine A (366) from an external source (367) by a user having a username of "X." In the following example, suppose the external source has an IP address of 1.1.1.10 and uses source port 10000 to connect to Machine A (which has an IP address of 2.2.2.20 and a destination port 22). External source 367 is considered an external source because its IP address is outside of the environment being monitored (e.g., is a node outside of entity A's datacenter, connecting to a node inside of entity A's datacenter).

A first ssh login session LS1 is created on machine A for user X. The privileged openssh process for this login is A1 (368). Under the login session LS1, the user creates a bash shell process with PID_hash A2 (369).

At time t2 (370), inside the bash shell process A2, the user runs an ssh program under a new process A3 (371) to log in to machine B (372) with a different username ("Y"). In particular, an ssh connection is made from source IP address 2.2.2.20 and source port 10001 (Machine A's source information) to destination IP address 2.2.2.21 and destination port 22 (Machine B's destination information).

A second ssh login session LS2 is created on machine B for user Y. The privileged openssh process for this login is B1 (373). Under the login session LS2, the user creates a bash shell process with PID_hash B2 (374).

At time t3 (376), inside the bash shell process B2, the user runs a curl command under a new process B3 (377) to download a file from an external destination (378). In particular, an HTTPS connection is made from source IP address 2.2.2.21 and source port 10002 (Machine B's source information) to external destination IP address 3.3.3.30 and destination port 443 (the external destination's information).

Using techniques described herein, it is possible to determine the original user who initiated the connection to external destination 378, which in this example is a user having the username X on machine A (where the extended user session can be determined to start with ssh login session LS1).

Based on local descendant tracking, the following determinations can be on machine A and B without yet having performed additional processing (described in more detail below):

A3 is a descendant of A1 and thus associated with LS1.
The connection to the external domain from machine B is initiated by B3.
B3 is a descendant of B1 and is thus associated with LS2.
Connection to the external domain is thus associated with LS2.

An association between A3 and LS2 can be established based on the fact that LS2 was created based on an ssh connection initiated from A3. Accordingly, it can be determined that LS2 is a child of LS1.

To determine the user responsible for making the connection to the external destination (e.g., if it were a known bad destination), first, the process that made the connection would be traced, i.e., from B3 to LS2. Then LS2 would be traced to LS1 (i.e., LS1 is the origin login session for LS2). Thus the user for this connection is the user for LS1, i.e., X. As represented in FIG. 3I, one can visualize the tracing by following the links (in the reverse direction of arrows) from external destination 378 to A1 (368).

In the example scenario, it is assumed that both ssh connections occur in the same analysis period. However, the approaches described herein will also work for connections and processes that are created in different time periods.

Figure 3J:
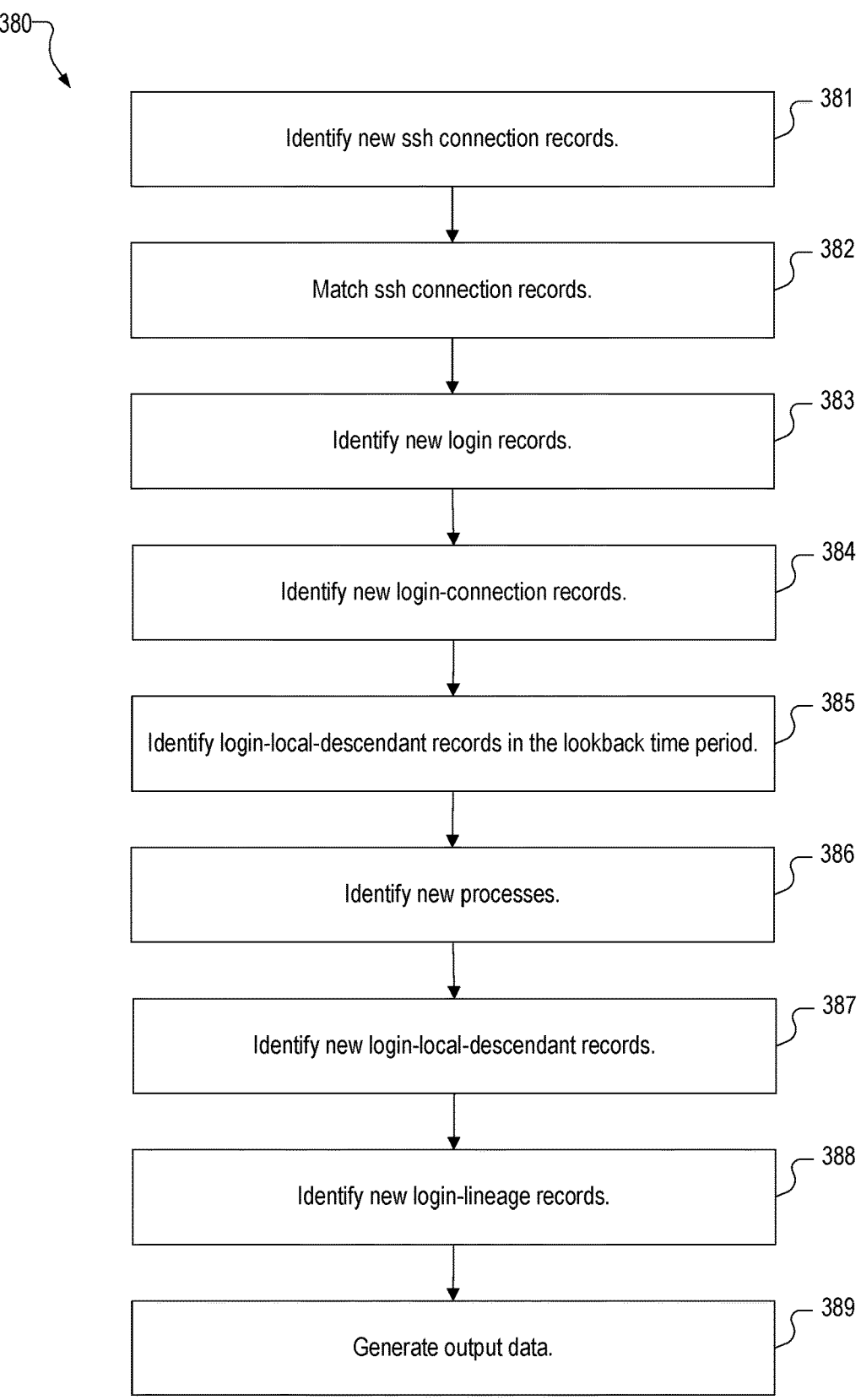
FIG. 3J illustrates an example of a process for performing extended user tracking.

FIG. 3J illustrates an example of a process for performing extended user tracking. In various embodiments, process 380 is performed periodically (e.g., once an hour in a batch fashion) by ssh tracker 148 to generate new output data. In general, batch processing allows for efficient analysis of large volumes of data. However, the approach can be adapted, as applicable, to process input data on a record-by-record fashion while maintaining the same logical data processing flow. As applicable the results of a given portion of process 380 are stored for use in a subsequent portion.

The process begins at 381 when new ssh connection records are identified. In particular, new ssh connections started during the current time period are identified by querying the connections table. The query uses filters on the start_time and dst_port columns. The values of the range filter on the start time column are based on the current time period. The dst_port column is checked against ssh listening port(s). By default, the ssh listening port number is 22. However, as this could vary across environments, the port(s) that openssh servers are listening to in the environment can be determined by data collection agents dynamically and used as the filter value for the dst_port as applicable. In the scenario depicted in FIG. 3I, the query result will generate the records shown in FIG. 3K. Note that for the connection between machine A and B, the two machines are likely to report start time values that are not exactly the same but close enough to be considered matching (e.g., within one minute or another appropriate amount of time). In the above table, they are shown to be the same for simplicity.

At 382, ssh connection records reported from source and destination sides of the same connection are matched. The ssh connection records (e.g., returned from the query at 381) are matched based on the following criteria:

The five tuples (src_IP, dst_IP, IP_prot, src_port, dst_port) of the connection records must match.

The delta between the start times of the connections must be within a limit that would account for the worst case clock difference expected between two machines in the environment and typical connection setup latency.

If there are multiple matches possible, then the match with the smallest time delta is chosen.

Note that record 390 from machine A for the incoming connection from the external source cannot be matched with another record as there is an agent only on the destination side for this connection. Example output of portion 382 of process 380 is shown in FIG. 3L. The values in the dst_ PID_hash column (391) are that of the sshd privileged process associated with ssh logins.

At 383, new logins during the current time period are identified by querying the logins table. The query uses a range filter on the login_time column with values based on the current time period. In the example depicted in FIG. 3I, the query result will generate the records depicted in FIG. 3M.

At 384, matched ssh connection records created at 382 and new login records created at 383 are joined to create new records that will eventually be stored in the login-connection table. The join condition is that dst_MID of the matched connection record is equal to the MID of the login record and the dst_PID_hash of the matched connection record is equal to the sshd_PID_hash of the login record. In the example depicted in FIG. 3I, the processing performed at 384 will generate the records depicted in FIG. 3N.

At 385, login-local-descendant records in the lookback time period are identified. It is possible that a process that is created in a previous time period makes an ssh connection in the current analysis batch period. Although not depicted in the example illustrated in FIG. 3I, consider a case where bash process A2 does not create ssh process A3 right away but instead that the ssh connection A3 later makes to machine B is processed in a subsequent time period than the one where A2 was processed. While processing this subsequent time period in which processes A3 and B1 are seen, knowledge of A2 would be useful in establishing that B1 is associated with A3 (via ssh connection) which is associated with A2 (via process parentage) which in turn would be useful in establishing that the parent of the second ssh login is the first ssh login. The time period for which look back is performed can be limited to reduce the amount of historical data that is considered. However, this is not a requirement (and the amount of look back can be determined, e.g., based on available processing resources). The login local descendants in the lookback time period can be identified by querying the login-local-descendant table. The query uses a range filter on the login_time column where the range is from start_time_of_current_period-lookback_time to start-_time_of_current_period. (No records as a result of performing 385 on the scenario depicted in FIG. 3I are obtained, as only a single time period is applicable in the example scenario.)

At 386, new processes that are started in the current time period are identified by querying the processes table. The query uses a range filter on the start time column with values based on the current time period. In the example depicted in FIG. 3I, the processing performed at 386 will generate the records depicted in FIG. 3O.

At 387, new login-local-descendant records are identified. The purpose is to determine whether any of the new processes in the current time period are descendants of an ssh login process and if so to create records that will be stored in the login-local-descendant table for them. In order to do so, the parent-child relationships between the processes are recursively followed. Either a top down or bottom up approach can be used. In a top down approach, the ssh local descendants in the lookback period identified at 385, along with new ssh login processes in the current period identified at 384 are considered as possible ancestors for the new processes in the current period identified at 386.

Conceptually, the recursive approach can be considered to include multiple sub-steps where new processes that are identified to be ssh local descendants in the current sub-step are considered as ancestors for the next step. In the example scenario depicted in FIG. 3I, the following descendancy relationships will be established in two sub-steps:

Sub-Step 1:

Process A2 is a local descendant of LS1 (i.e., MID=A, sshd_PID_hash=A1) because it is a child of process A1 which is the login process for LS1.

Process B2 is a local descendant of LS2 (i.e., MID=B, sshd_PID_hash=B1) because it is a child of process B1 which is the login process for LS2.

Sub-Step 2:

Process A3 is a local descendant of LS1 because it is a child of process A2 which is associated to LS1 in sub-step 1.

Process B3 is a local descendant of LS2 because it is a child of process B1 which is associated to LS2 in sub-step 1.

Implementation portion 387 can use a datastore that supports recursive query capabilities, or, queries can be constructed to process multiple conceptual sub-steps at once. In the example depicted in FIG. 3I, the processing performed at 387 will generate the records depicted in FIG. 3P. Note that the ssh privileged processes associated with the logins are also included as they are part of the login session.

At 388, the lineage of new ssh logins created in the current time period is determined by associating their ssh connections to source processes that may be descendants of other ssh logins (which may have been created in the current period or previous time periods). In order to do so, first an attempt is made to join the new ssh login connections in the current period (identified at 384) with the combination of the login local descendants in the lookback period (identified at 385) and the login local descendants in the current time period (identified at 386). This will create adjacency relationships between child and parent logins. In the example depicted in FIG. 3I, the second ssh login connection will be associated with process A3 and an adjacency relationship between the two login sessions will be created (as illustrated in FIG. 3Q).

Next, the adjacency relationships are used to find the original login sessions. While not shown in the sample scenario, there could be multiple ssh logins in a chain in the current time period, in which case a recursive approach (as in 387) could be used. At the conclusion of portion 388, the login lineage records depicted in FIG. 3R will be generated.

Finally, at 389, output data is generated. In particular, the new login-connection, login-local-descendant, and login-lineage records generated at 384, 387, and 388 are inserted into their respective output tables (e.g., in a transaction manner).

An alternate approach to matching TCP connections between machines running an agent is for the client to generate a connection GUID and send it in the connection request (e.g., the SYN packet) it sends and for the server to extract the GUID from the request. If two connection records from two machines have the same GUID, they are for the same connection. Both the client and server will store the GUID (if it exists) in the connection records they maintain and report. On the client side, the agent can configure the network stack (e.g. using IP tables functionality on Linux) to intercept an outgoing TCP SYN packet and modify it to add the generated GUID as a TCP option. On the server side, the agent already extracts TCP SYN packets and thus can look for this option and extract the GUID if it exists.

Example graph-based user tracking and threat detection embodiments associated with data platform 12 will now be described. Administrators and other users of network environments (e.g., entity A's datacenter 104) often change roles to perform tasks. As one example, suppose that at the start of a workday, an administrator (hereinafter "Joe Smith") logs in to a console, using an individualized account (e.g., username=joe.smith). Joe performs various tasks as himself (e.g., answering emails, generating status reports, writing code, etc.). For other tasks (e.g., performing updates), Joe may require different/additional permission than his individual account has (e.g., root privileges). One way Joe can gain access to such permissions is by using sudo, which will allow Joe to run a single command with root privileges. Another way Joe can gain access to such permissions is by su or otherwise logging into a shell as root. After gaining root privileges, another thing that Joe can do is to switch identities. As one example, to perform administrative tasks, Joe may use "su help" or "su database-admin" to become (respectively) the help user or the database-admin user on a system. He may also connect from one machine to another, potentially changing identities along the way (e.g., logging in as joe.smith at a first console, and connecting to a database server as database-admin). When he's completed various administrative tasks, Joe can relinquish his root privileges by closing out of any additional shells created, reverting back to a shell created for user joe.smith.

While there are many legitimate reasons for Joe to change his identity throughout the day, such changes may also correspond to nefarious activity. Joe himself may be nefarious, or Joe's account (joe.smith) may have been compromised by a third party (whether an "outsider" outside of entity A's network, or an "insider"). Using techniques described herein, the behavior of users of the environment can be tracked (including across multiple accounts and/or multiple machines) and modeled (e.g., using various graphs described herein). Such models can be used to generate alerts (e.g., to anomalous user behavior). Such models can also be used forensically, e.g., helping an investigator visualize various aspects of a network and activities that have occurred, and to attribute particular types of actions (e.g., network connections or file accesses) to specific users.

In a typical day in a datacenter, a user (e.g., Joe Smith) will log in, run various processes, and (optionally) log out. The user will typically log in from the same set of IP addresses, from IP addresses within the same geographical area (e.g., city or country), or from historically known IP addresses/geographical areas (i.e., ones the user has previously/occasionally used). A deviation from the user's typical (or historical) behavior indicates a change in login behavior. However, it does not necessarily mean that a breach has occurred. Once logged into a datacenter, a user may take a variety of actions. As a first example, a user might execute a binary/script. Such binary/script might communicate with other nodes in the datacenter, or outside of the datacenter, and transfer data to the user (e.g., executing "curl" to obtain data from a service external to the datacenter). As a second example, the user can similarly transfer data (e.g., out of the datacenter), such as by using POST. As a third example, a user might change privilege (one or more times), at which point the user can send/receive data as per above. As a fourth example, a user might connect to a different machine within the datacenter (one or more times), at which point the user can send/receive data as per the above.

In various embodiments, the above information associated with user behavior is broken into four tiers. The tiers represent example types of information that data platform 12 can use in modeling user behavior:

1. The user's entry point (e.g., domains, IP addresses, and/or geolocation information such as country/city) from which a user logs in.
2. The login user and machine class.
3. Binaries, executables, processes, etc. a user launches.
4. Internal servers with which the user (or any of the user's processes, child processes, etc.) communicates, and external contacts (e.g., domains, IP addresses, and/or geolocation information such as country/city) with which the user communicates (i.e., transfers data).

In the event of a security breach, being able to concretely answer questions about such information can be very important. And, collectively, such information is useful in providing an end-to-end path (e.g., for performing investigations).

In the following example, suppose a user ("UserA") logs into a machine ("Machine01") from a first IP address ("IP01"). Machine01 is inside a datacenter. UserA then launches a script ("runnable.sh") on Machine01. From Machine01, UserA next logs into a second machine ("Machine02") via ssh, also as UserA, also within the datacenter. On Machine02, UserA again launches a script ("new_runnable.sh"). On Machine02, UserA then changes privilege, becoming root on Machine02. From Machine02, UserA (now as root) logs into a third machine ("Machine03") in the datacenter via ssh, as root on Machine03. As root on Machine03, the user executes a script ("collect_data.sh") on Machine03. The script internally communicates (as root) to a MySQL-based service internal to the datacenter, and downloads data from the MySQL-based service. Finally, as root on Machine03, the user externally communicates with a server outside the datacenter ("External01"), using a POST command. To summarize what has occurred, in this example, the source/entry point is IP01. Data is transferred to an external server External01. The machine performing the transfer to External01 is Machine03. The user transferring the data is "root" (on Machine03), while the actual user (hiding behind root) is UserA.

In the above scenario, the "original user" (ultimately responsible for transmitting data to External01) is UserA, who logged in from IP01. Each of the processes ultimately started by UserA, whether started at the command line (tty) such as "runnable.sh" or started after an ssh connection such as "new_runnable.sh," and whether as UserA, or as a subsequent identity, are all examples of child processes which can be arranged into a process hierarchy.

As previously mentioned, machines can be clustered together logically into machine clusters. One approach to clustering is to classify machines based on information such as the types of services they provide/binaries they have installed upon them/processes they execute. Machines sharing a given machine class (as they share common binaries/services/etc.) will behave similarly to one another. Each machine in a datacenter can be assigned to a machine cluster, and each machine cluster can be assigned an identifier (also referred to herein as a machine class). One or more tags can also be assigned to a given machine class (e.g., database_servers_west or prod_web_frontend). One approach to assigning a tag to a machine class is to apply term frequency analysis (e.g., TF/IDF) to the applications run by a given machine class, selecting as tags those most unique to the class. Data platform 12 can use behavioral baselines taken for a class of machines to identify deviations from the baseline (e.g., by a particular machine in the class).

FIG. 3S illustrates an example of a process for detecting anomalies. In various embodiments, process 392 is performed by data platform 12. As explained above, a given session will have an original user. And, each action taken by the original user can be tied back to the original user, despite privilege changes and/or lateral movement throughout a datacenter. Process 392 begins at 393 when log data associated with a user session (and thus an original user) is received. At 394, a logical graph is generated, using at least a portion of the collected data. When an anomaly is detected (395), it can be recorded, and as applicable, an alert is generated (396). The following are examples of graphs that can be generated (e.g., at 394), with corresponding examples of anomalies that can be detected (e.g., at 395) and alerted upon (e.g., at 396).

Figure 4A:
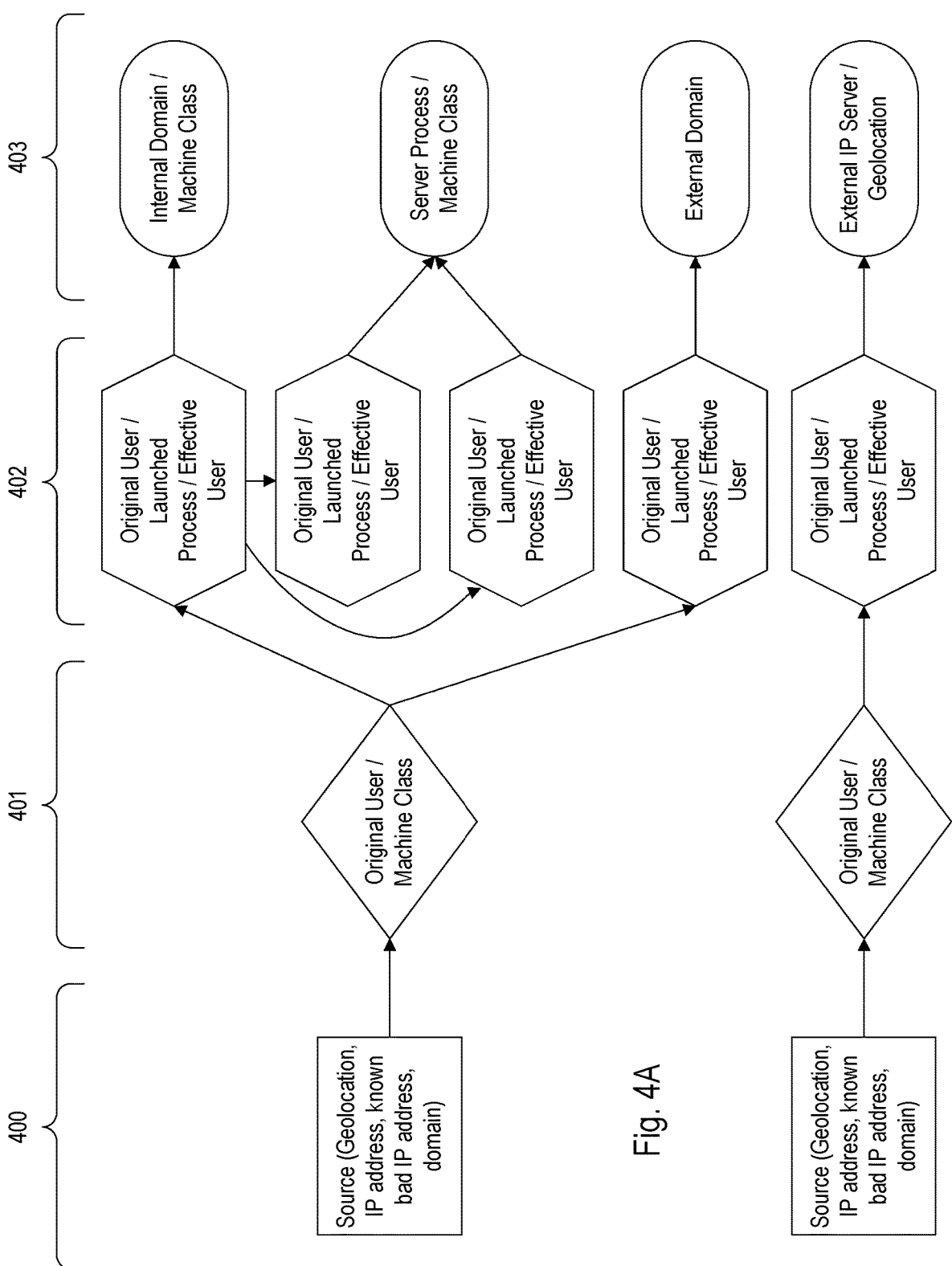
FIG. 4A illustrates a representation of an embodiment of an insider behavior graph.

FIG. 4A illustrates a representation of an embodiment of an insider behavior graph. In the example of FIG. 4A, each node in the graph can be: (1) a cluster of users; (2) a cluster of launched processes; (3) a cluster of processes/servers running on a machine class; (4) a cluster of external IP addresses (of incoming clients); or (5) a cluster of external servers based on DNS/IP/etc. As depicted in FIG. 4A, graph data is vertically tiered into four tiers. Tier 0 (400) corresponds to entry point information (e.g., domains, IP addresses, and/or geolocation information) associated with a client entering the datacenter from an external entry point. Entry points are clustered together based on such information. Tier 1 (401) corresponds to a user on a machine class, with a given user on a given machine class represented as a node. Tier 2 (402) corresponds to launched processes, child processes, and/or interactive processes. Processes for a given user and having similar connectivity (e.g., sharing the processes they launch and the machines with which they communicate) are grouped into nodes. Finally, Tier 3 (403) corresponds to the services/servers/domains/IP addresses with which processes communicate. A relationship between the tiers can be stated as follows: Tier 0 nodes log in to tier 1 nodes. Tier 1 nodes launch tier 2 nodes. Tier 2 nodes connect to tier 3 nodes.

The inclusion of an original user in both Tier 1 and Tier 2 allows for horizontal tiering. Such horizontal tiering ensures that there is no overlap between any two users in Tier 1 and Tier 2. Such lack of overlap provides for faster searching of an end-to-end path (e.g., one starting with a Tier 0 node and terminating at a Tier 3 node). Horizontal tiering also helps in establishing baseline insider behavior. For example, by building an hourly insider behavior graph, new edges/changes in edges between nodes in Tier 1 and Tier 2 can be identified. Any such changes correspond to a change associated with the original user. And, any such changes can be surfaced as anomalous and alerts can be generated.

As explained above, Tier 1 corresponds to a user (e.g., user "U") logging into a machine having a particular machine class (e.g., machine class "M"). Tier 2 is a cluster of processes having command line similarity (e.g., CType "C"), having an original user "U," and running as a particular effective user (e.g., user "U1"). The value of U1 may be the same as U (e.g., joe.smith in both cases), or the value of U1 may be different (e.g., U=joe.smith and U1=root). Thus, while an edge may be present from a Tier 1 node to a Tier 2 node, the effective user in the Tier 2 node may or may not match the original user (while the original user in the Tier 2 node will match the original user in the Tier 1 node).

A change from a user U into a user U1 can take place in a variety of ways. Examples include where U becomes U1 on the same machine (e.g., via su), and also where U sshes to other machine(s). In both situations, U can perform multiple changes, and can combine approaches. For example, U can become U1 on a first machine, ssh to a second machine (as U1), become U2 on the second machine, and ssh to a third machine (whether as user U2 or user U3). In various embodiments, the complexity of how user U ultimately becomes U3 (or U5, etc.) is hidden from a viewer of an insider behavior graph, and only an original user (e.g., U) and the effective user of a given node (e.g., U5) are depicted. As applicable (e.g., if desired by a viewer of the insider behavior graph), additional detail about the path (e.g., an end-to-end path of edges from user U to user U5) can be surfaced (e.g., via user interactions with nodes).

Figure 4B:
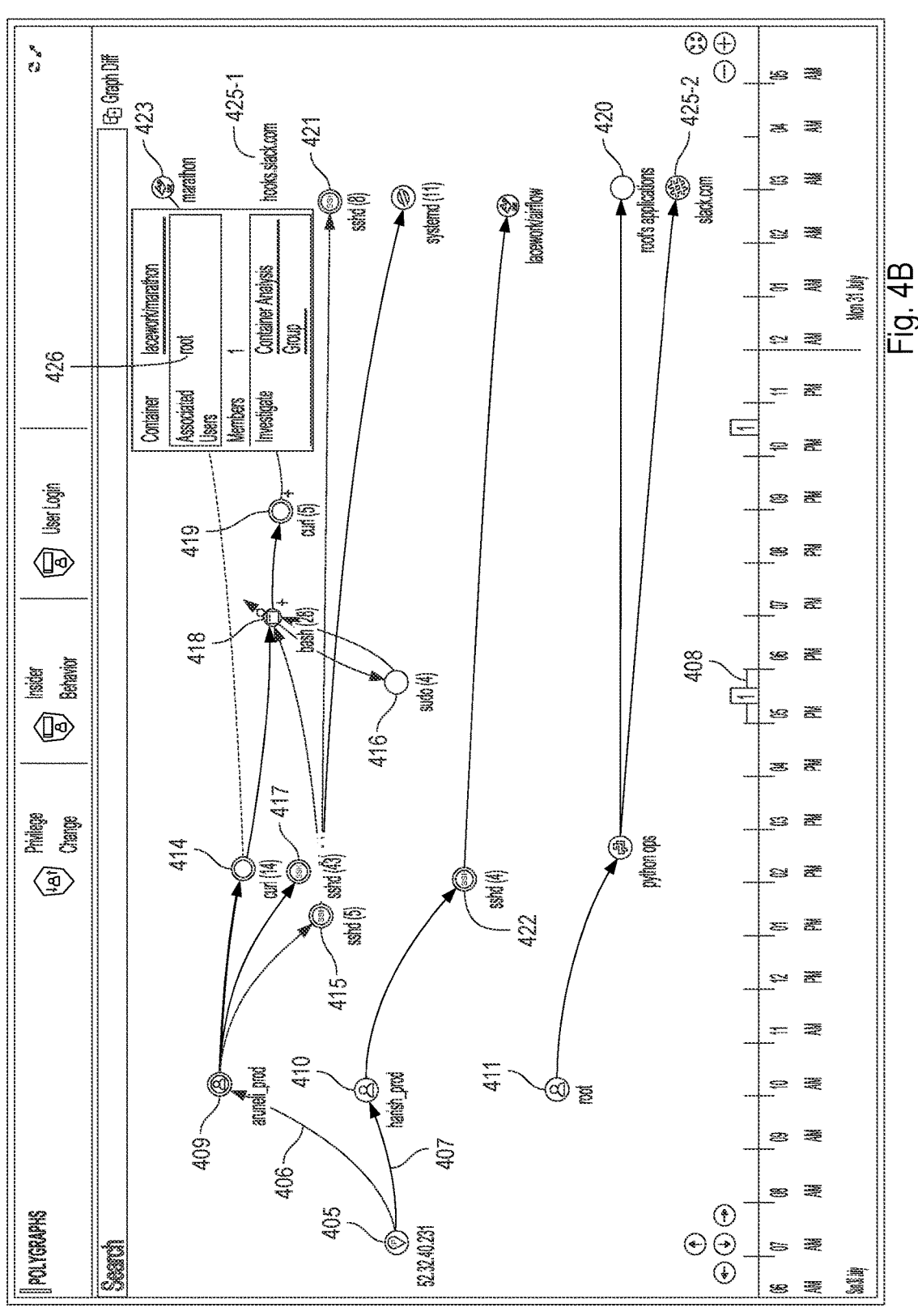
FIG. 4B illustrates an embodiment of a portion of an insider behavior graph.

FIG. 4B illustrates an example of a portion of an insider behavior graph (e.g., as rendered in a web browser). In the example shown, node 405 (the external IP address, 52.32.40.231) is an example of a Tier 0 node, and represents an entry point into a datacenter. As indicated by directional arrows 406 and 407, two users, "aruneli_prod" and "harish_prod," both made use of the source IP 52.32.40.231 when logging in between 5 μm and 6 pm on Sunday July 30 (408). Nodes 409 and 410 are examples of Tier 1 nodes, having aruneli_prod and harish_prod as associated respective original users. As previously mentioned, Tier 1 nodes correspond to a combination of a user and a machine class. In the example depicted in FIG. 4B, the machine class associated with nodes 409 and 410 is hidden from view to simplify visualization, but can be surfaced to a viewer of interface 404 (e.g., when the user clicks on node 409 or 410).

Nodes 414-423 are examples of Tier 2 nodes—processes that are launched by users in Tier 1 and their child, grandchild, etc. processes. Note that also depicted in FIG. 4B is a Tier 1 node 411 that corresponds to a user, "root," that logged in to a machine cluster from within the datacenter (i.e., has an entry point within the datacenter). Nodes 425-1 and 425-2 are examples of Tier 3 nodes—internal/external IP addresses, servers, etc., with which Tier 2 nodes communicate.

In the example shown in FIG. 4B, a viewer of interface 404 has clicked on node 423. As indicated in region 426, the user running the marathon container is "root." However, by following the directional arrows in the graph backwards from node 423 (i.e. from right to left), the viewer can determine that the original user, responsible for node 423, is "aruneli_prod," who logged into the datacenter from IP 52.32.40.231.

The following are examples of changes that can be tracked using an insider behavior graph model:

A user logs in from a new IP address.

A user logs in from a geolocation not previously used by that user.

A user logs into a new machine class.

A user launches a process not previously used by that user.

A user connects to an internal server to which the user has not previously connected.

An original user communicates with an external server (or external server known to be malicious) with which that user has not previously communicated.

A user communicates with an external server which has a geolocation not previously used by that user.

Such changes can be surfaced as alerts, e.g., to help an administrator determine when/what anomalous behavior occurs within a datacenter. Further, the behavior graph model can be used (e.g., during forensic analysis) to answer questions helpful during an investigation. Examples of such questions include:

Was there any new login activity (Tier 0) in the timeframe being investigated? As one example, has a user logged in from an IP address with unknown geolocation information? Similarly, has a user started communicating externally with a new Tier 3 node (e.g., one with unknown geolocation information).

Has there been any suspicious login activity (Tier 0) in the timeframe being investigated? As one example, has a user logged in from an IP address that corresponds to a known bad IP address as maintained by Threat aggregator 150? Similarly, has there been any suspicious Tier 3 activity?

Were any anomalous connections made within the datacenter during the timeframe being investigated? As one example, suppose a given user ("Frank") typically enters a datacenter from a particular IP address (or range of IP addresses), and then connects to a first machine type (e.g., bastion), and then to a second machine type (e.g., database prod). If Frank has directly connected to database prod (instead of first going through bastion) during the timeframe, this can be surfaced using the insider graph.

Who is (the original user) responsible for running a particular process?

Figure 4C:
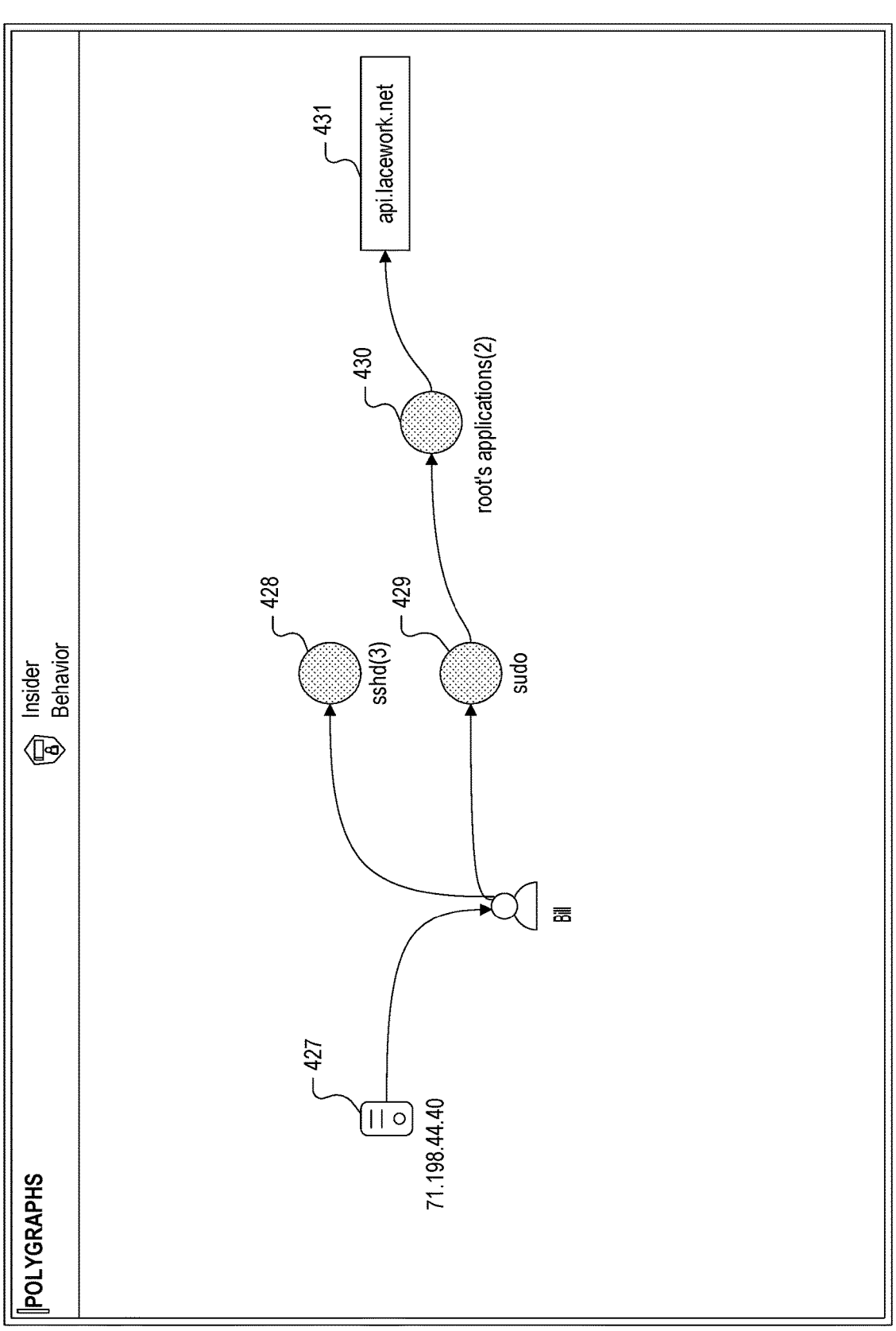
FIG. 4C illustrates an embodiment of a portion of an insider behavior graph.
Figure 4D:
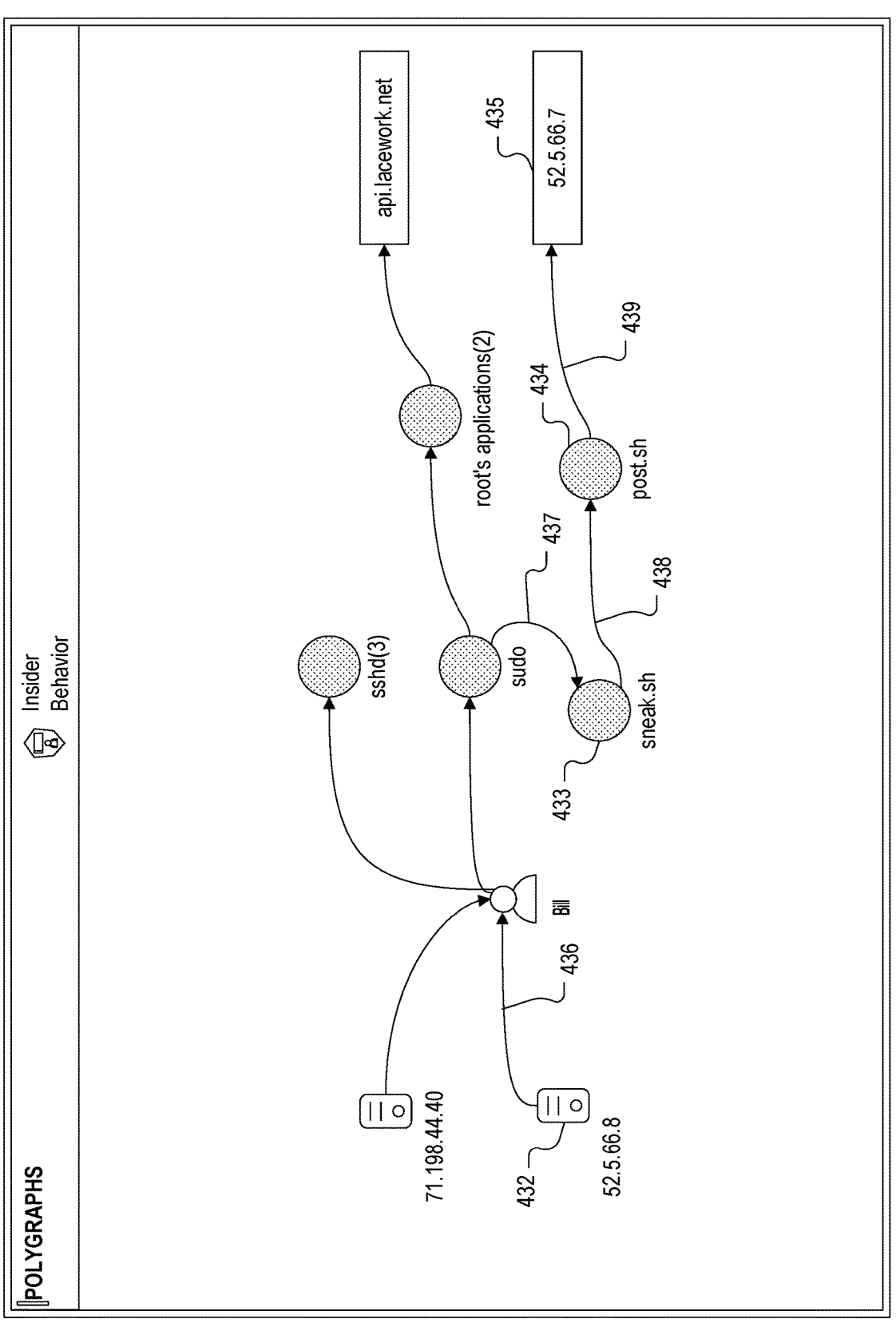
FIG. 4D illustrates an embodiment of a portion of an insider behavior graph.

An example of an insider behavior graph being used in an investigation is depicted in FIGS. 4C and 4D. FIG. 4C depicts a baseline of behavior for a user, "Bill." As shown in FIG. 4C, Bill typically logs into a datacenter from the IP address, 71.198.44.40 (427). He typically makes use of ssh (428), and sudo (429), makes use of a set of typical applications (430) and connects (as root) with the external service, api.lacework.net (431).

Suppose Bill's credentials are compromised by a nefarious outsider ("Eve"). FIG. 4D depicts an embodiment of how the graph depicted in FIG. 4C would appear once Eve begins exfiltrating data from the datacenter. Eve logs into the datacenter (using Bill's credentials) from 52.5.66.8 (432). As Bill, Eve escalates her privilege to root (e.g., via su), and then becomes a different user, Alex (e.g., via su alex). As Alex, Eve executes a script, "sneak.sh" (433), which launches another script, "post.sh" (434), which contacts external server 435 which has an IP address of 52.5.66.7, and transmits data to it. Edges 436-439 each represent changes in Bill's behavior. As previously mentioned, such changes can be detected as anomalies and associated alerts can be generated. As a first example, Bill logging in from an IP address he has not previously logged in from (436) can generate an alert. As a second example, while Bill does typically make use of sudo (429), he has not previously executed sneak.sh (433) or post.sh (434) and the execution of those scripts can generate alerts as well. As a third example, Bill has not previously communicated with server 435, and an alert can be generated when he does so (439). Considered individually, each of edges 436-439 may indicate nefarious behavior, or may be benign. As an example of a benign edge, suppose Bill begins working from a home office two days a week. The first time he logs in from his home office (i.e., from an IP address that is not 71.198.44.40), an alert can be generated that he has logged in from a new location. Over time, however, as Bill continues to log in from his home office but otherwise engages in typical activities, Bill's graph will evolve to include logins from both 71.198.44.40 and his home office as baseline behavior. Similarly, if Bill begins using a new tool in his job, an alert can be generated the first time he executes the tool, but over time will become part of his baseline.

In some cases, a single edge can indicate a serious threat. For example, if server 432 (or 435) is included in a known bad IP listing, edge 436 (or 439) indicates compromise. An alert that includes an appropriate severity level (e.g., "threat level high") can be generated. In other cases, a combination of edges could indicate a threat (where a single edge might otherwise result in a lesser warning). In the example shown in FIG. 4D, the presence of multiple new edges is indicative of a serious threat. Of note, even though "sneak.sh" and "post.sh" were executed by Alex, because data platform 12 also keeps track of an original user, the compromise of user B's account will be discovered.

Figure 4E:
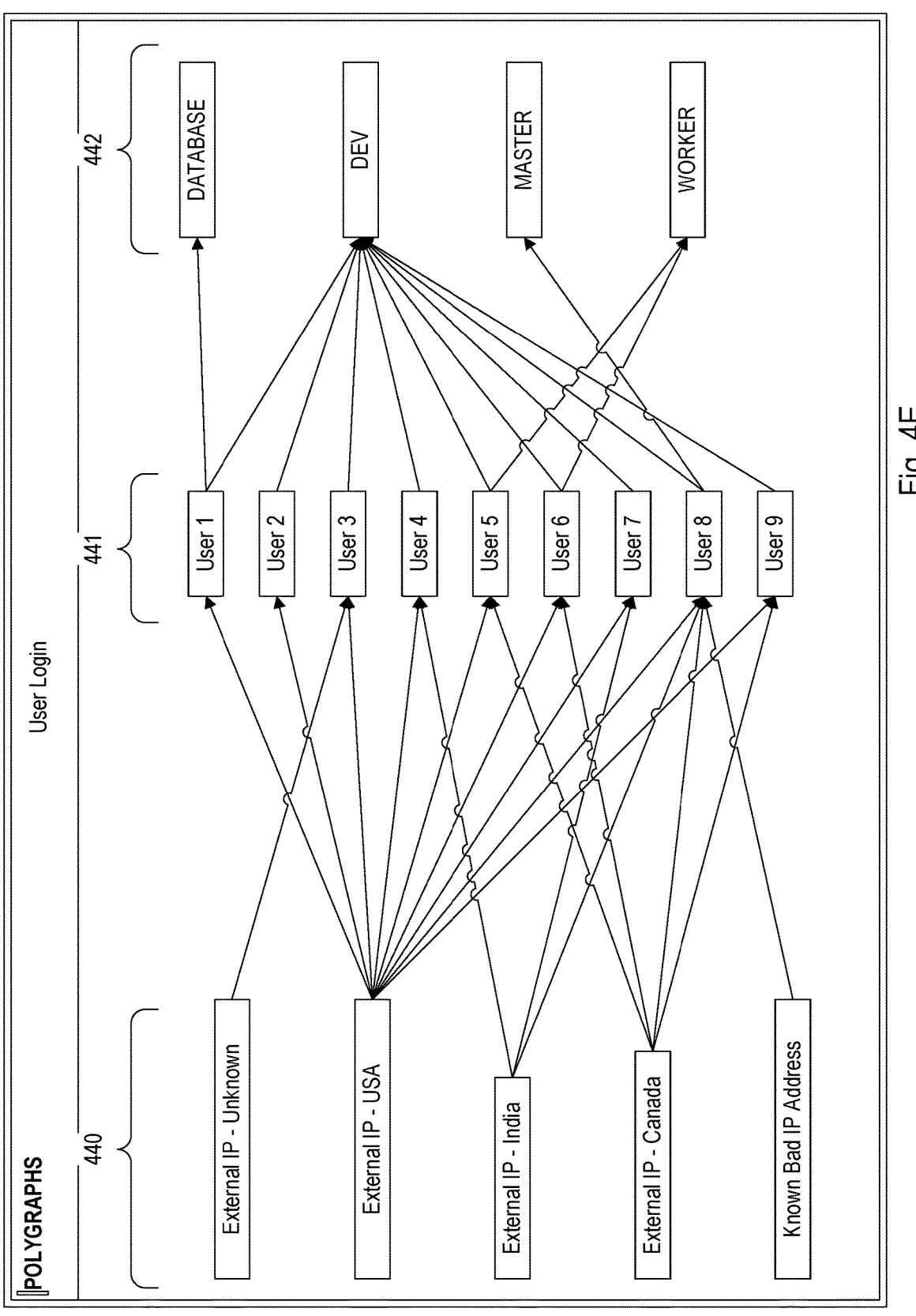
FIG. 4E illustrates a representation of an embodiment of a user login graph.

FIG. 4E illustrates a representation of an embodiment of a user login graph. In the example of FIG. 4E, tier 0 (440) clusters source IP addresses as belonging to a particular country (including an "unknown" country) or as a known bad IP. Tier 1 (441) clusters user logins, and tier 2 (442) clusters type of machine class into which a user is logging in. The user login graph tracks the typical login behavior of users. By interacting with a representation of the graph, answers to questions such as the following can be obtained:

Where is a user logging in from?

Have any users logged in from a known bad address?

Have any non-developer users accessed development machines?

Which machines does a particular user access?

Examples of alerts that can be generated using the user login graph include:

A user logs in from a known bad IP address.

A user logs in from a new country for the first time.

A new user logs into the datacenter for the first time.

A user accesses a machine class that the user has not previously accessed.

One way to track privilege changes in a datacenter is by monitoring a process hierarchy of processes. To help filter out noisy commands/processes such as "su -u," the hierarchy of processes can be constrained to those associated with network activity. In a *nix system, each process has two identifiers assigned to it, a process identifier (PID) and a parent process identifier (PPID). When such a system starts, the initial process is assigned a PID 0. Each user process has a corresponding parent process.

Using techniques described herein, a graph can be constructed (also referred to herein as a privilege change graph) which models privilege changes. In particular, a graph can be constructed which identifies where a process P1 launches a process P2, where P1 and P2 each have an associated user U1 and U2, with U1 being an original user, and U2 being an effective user. In the graph, each node is a cluster of processes (sharing a CType) executed by a particular (original) user. As all the processes in the cluster belong to the same user, a label that can be used for the cluster is the user's username. An edge in the graph, from a first node to a second node, indicates that a user of the first node changed its privilege to the user of the second node.

Figure 4F:
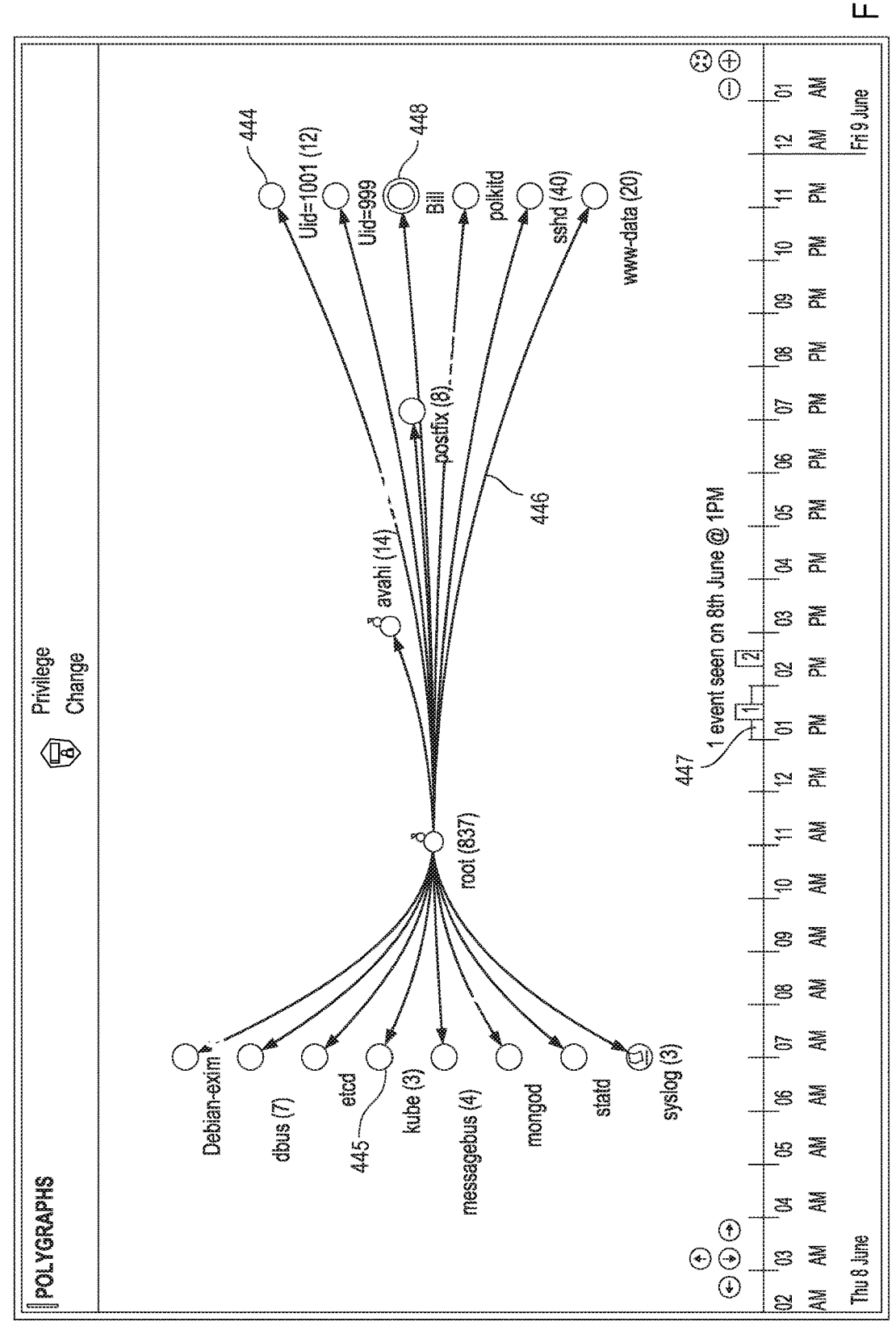
FIG. 4F illustrates an example of a privilege change graph.

FIG. 4F illustrates an example of a privilege change graph. In the example shown in FIG. 4F, each node (e.g., nodes 444 and 445) represents a user. Privilege changes are indicated by edges, such as edge 446.

As with other graphs, anomalies in graph 443 can be used to generate alerts. Three examples of such alerts are as follows:

New user entering the datacenter. Any time a new user enters the datacenter and runs a process, the graph will show a new node, with a new CType. This indicates a new user has been detected within the datacenter. FIG. 4F is a representation of an example of an interface that depicts such an alert. Specifically, as indicated in region 447, an alert for the time period 1 pm-2 pm on June 8 was generated. The alert identifies that a new user, Bill (448) executed a process.

Privilege change. As explained above, a new edge, from a first node (user A) to a second node (user B) indicates that user A has changed privilege to user B.

Privilege escalation. Privilege escalation is a particular case of privilege change, in which the first user becomes root.

Figure 4G:
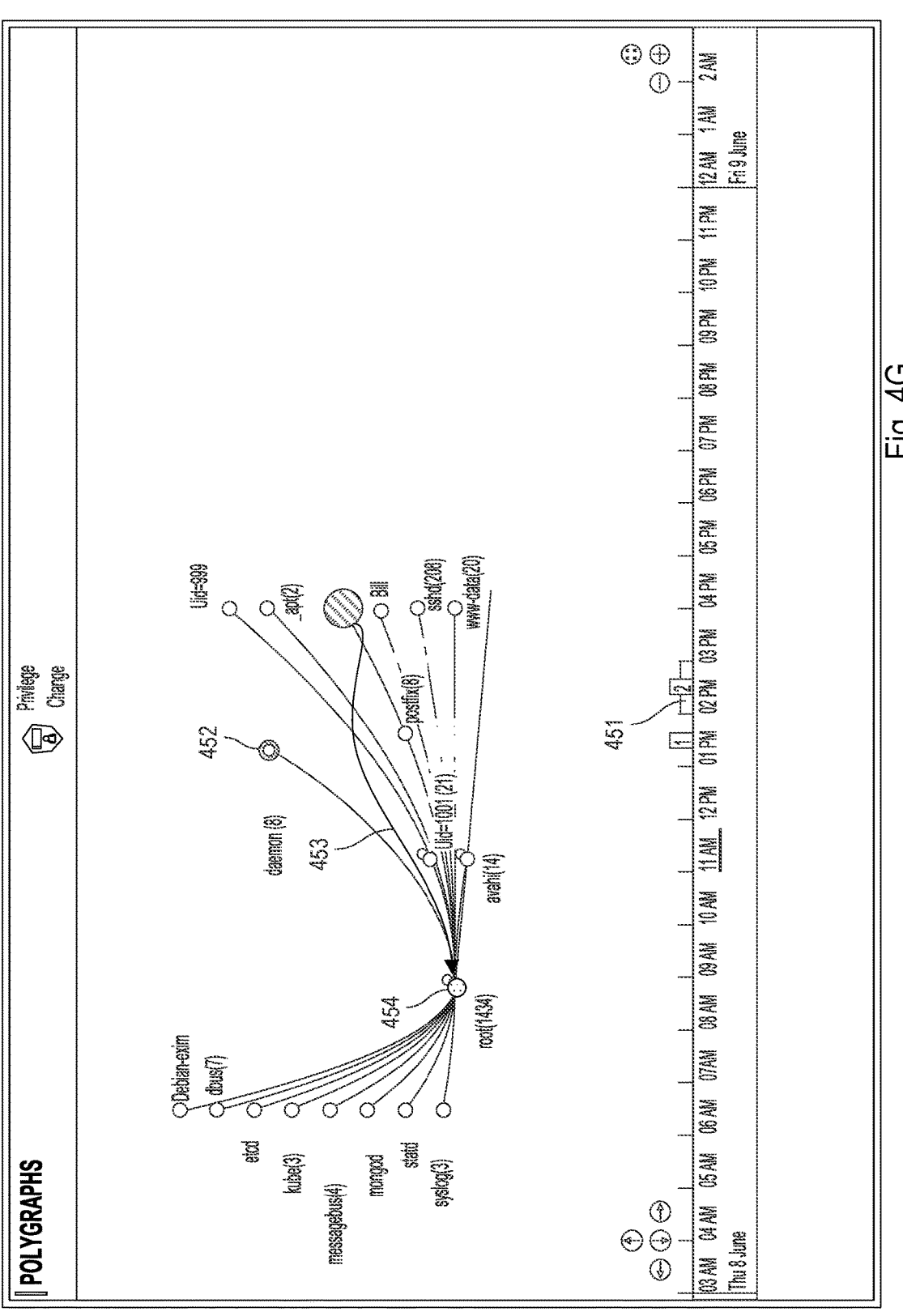
FIG. 4G illustrates an example of a privilege change graph.

An example of an anomalous privilege change and an example of an anomalous privilege escalation are each depicted in graph 450 of FIG. 4G. In particular, as indicated in region 451, two alerts for the time period 2 pm-3 pm on June 8 were generated (corresponding to the detection of the two anomalous events). In region 452, root has changed privilege to the user "daemon," which root has not previously done. This anomaly is indicated to the user by highlighting the daemon node (e.g., outlining it in a particular color, e.g., red). As indicated by edge 453, Bill has escalated his privilege to the user root (which can similarly be highlighted in region 454). This action by Bill represents a privilege escalation.

An Extensible query interface for dynamic data compositions and filter applications will now be described.

As described herein, datacenters are highly dynamic environments. And, different customers of data platform 12 (e.g., entity A vs. entity B) may have different/disparate needs/requirements of data platform 12, e.g., due to having different types of assets, different applications, etc. Further, as time progresses, new software tools will be developed, new types of anomalous behavior will be possible (and should be detectable), etc. In various embodiments, data platform 12 makes use of predefined relational schema (including by having different predefined relational schema for different customers). However, the complexity and cost of maintaining/updating such predefined relational schema can rapidly become problematic—particularly where the schema includes a mix of relational, nested, and hierarchical (graph) datasets. In other embodiments, the data models and filtering applications used by data platform 12 are extensible. As will be described in more detail below, in various embodiments, data platform 12 supports dynamic query generation by automatic discovery of join relations via static or dynamic filtering key specifications among composable data sets.

This allows a user of data platform 12 to be agnostic to modifications made to existing data sets as well as creation of new data sets. The extensible query interface also provides a declarative and configurable specification for optimizing internal data generation and derivations.

As will also be described in more detail below, data platform 12 is configured to dynamically translate user interactions (e.g., received via web app 120) into SQL queries (and without the user needing to know how to write queries). Such queries can then be performed (e.g., by query service 166) against any compatible backend (e.g., data store 30).

Figure 4H:
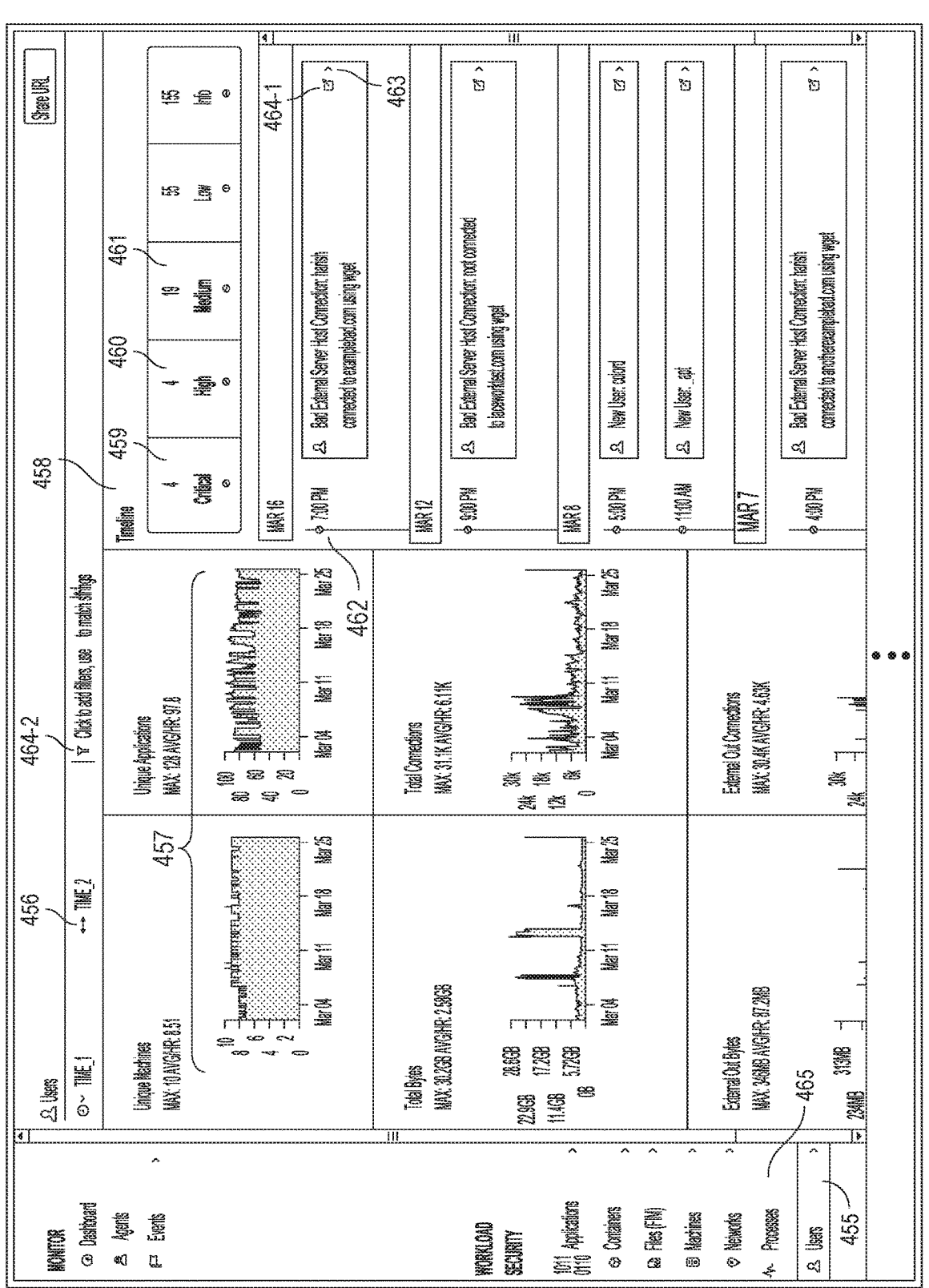
FIG. 4H illustrates an example of a user interacting with a portion of an interface.
Figure 41:
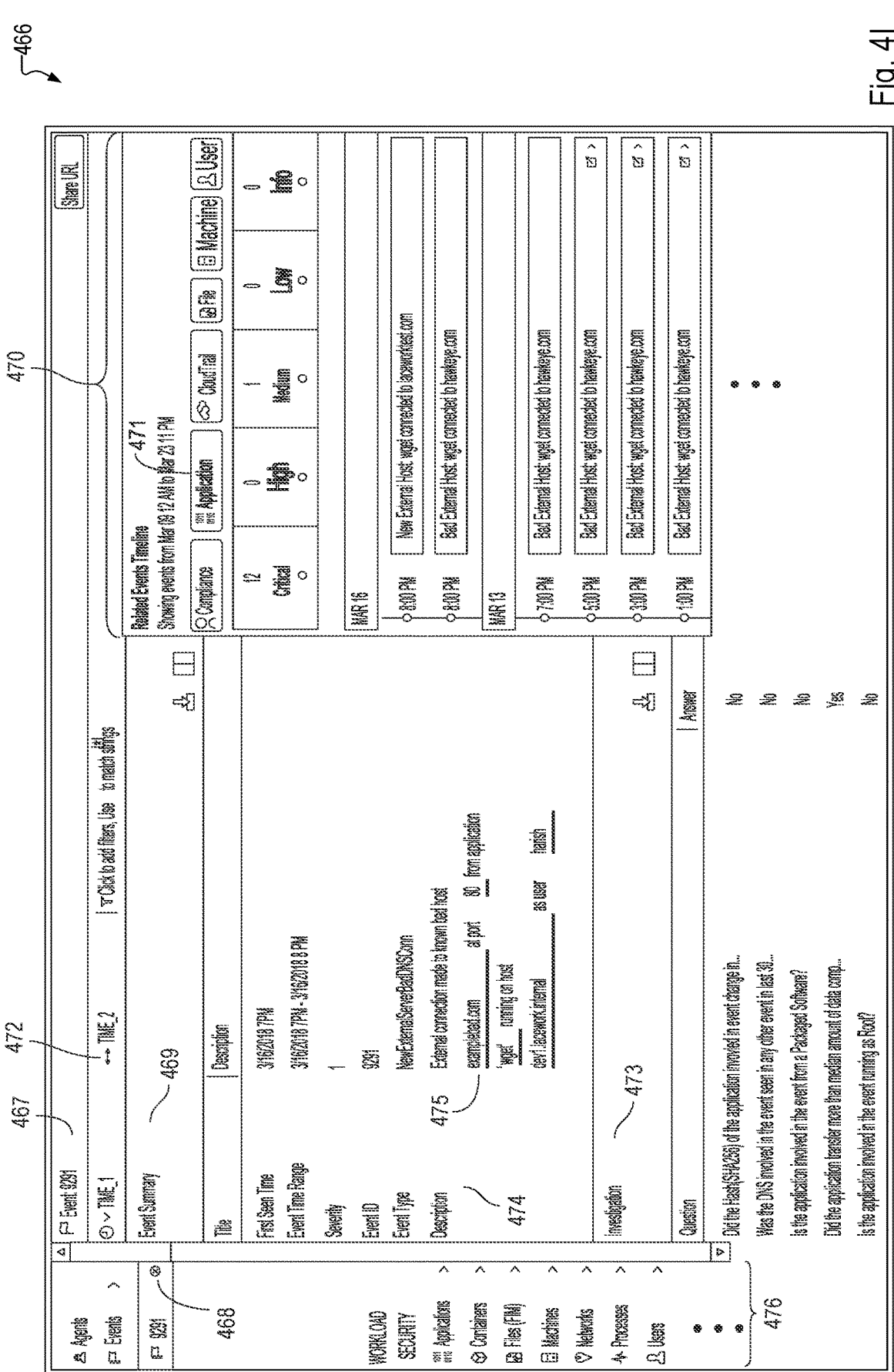

FIG. 4H illustrates an example of a user interacting with a portion of an interface. When a user visits data platform 12 (e.g., via web app 120 using a browser), data is extracted from data store 30 as needed (e.g., by query service 166), to provide the user with information, such as the visualizations depicted variously herein). As the user continues to interact with such visualizations (e.g., clicking on graph nodes, entering text into search boxes, navigating between tabs (e.g., tab 455 vs. 465)), such interactions act as triggers that cause query service 166 to continue to obtain information from data store 30 as needed (and as described in more detail below).

In the example shown in FIG. 4H, user A is viewing a dashboard that provides various information about entity A users (455), during the time period March 2 at midnight-March 25 at 7 pm (which she selected by interacting with region 456). Various statistical information is presented to user A in region 457. Region 458 presents a timeline of events that occurred during the selected time period. User A has opted to list only the critical, high, and medium events during the time period by clicking on the associated boxes (459-461). A total of 55 low severity, and 155 info-only events also occurred during the time period. Each time user A interacts with an element in FIG. 4H (e.g., clicks on box 461, clicks on link 464-1, or clicks on tab 465), her actions are translated/formalized into filters on the data set and used to dynamically generate SQL queries. The SQL queries are generated transparently to user A (and also to a designer of the user interface shown in FIG. 4H).

User A notes in the timeline (462) that a user, Harish, connected to a known bad server (examplebad.com) using wget, an event that has a critical severity level. User A can click on region 463 to expand details about the event inline (which will display, for example, the text "External connection made to known bad host examplebad.com at port 80 from application 'wget' running on host dev1.lacework.internal as user harish") directly below line 462. User A can also click on link 464-1, which will take her to a dossier for the event (depicted in FIG. 4I). As will be described in more detail below, a dossier is a template for a collection of visualizations.

As shown in interface 466, the event of Harish using wget to contact examplebad.com on March 16 was assigned an event ID of 9291 by data platform 12 (467). For convenience to user A, the event is also added to her dashboard in region 476 as a bookmark (468). A summary of the event is depicted in region 469. By interacting with boxes shown in region 470, user A can see a timeline of related events. In this case, user A has indicated that she would like to see other events involving the wget application (by clicking box 471). Events of critical and medium security involving wget occurred during the one hour window selected in region 472.

Figure 4J:
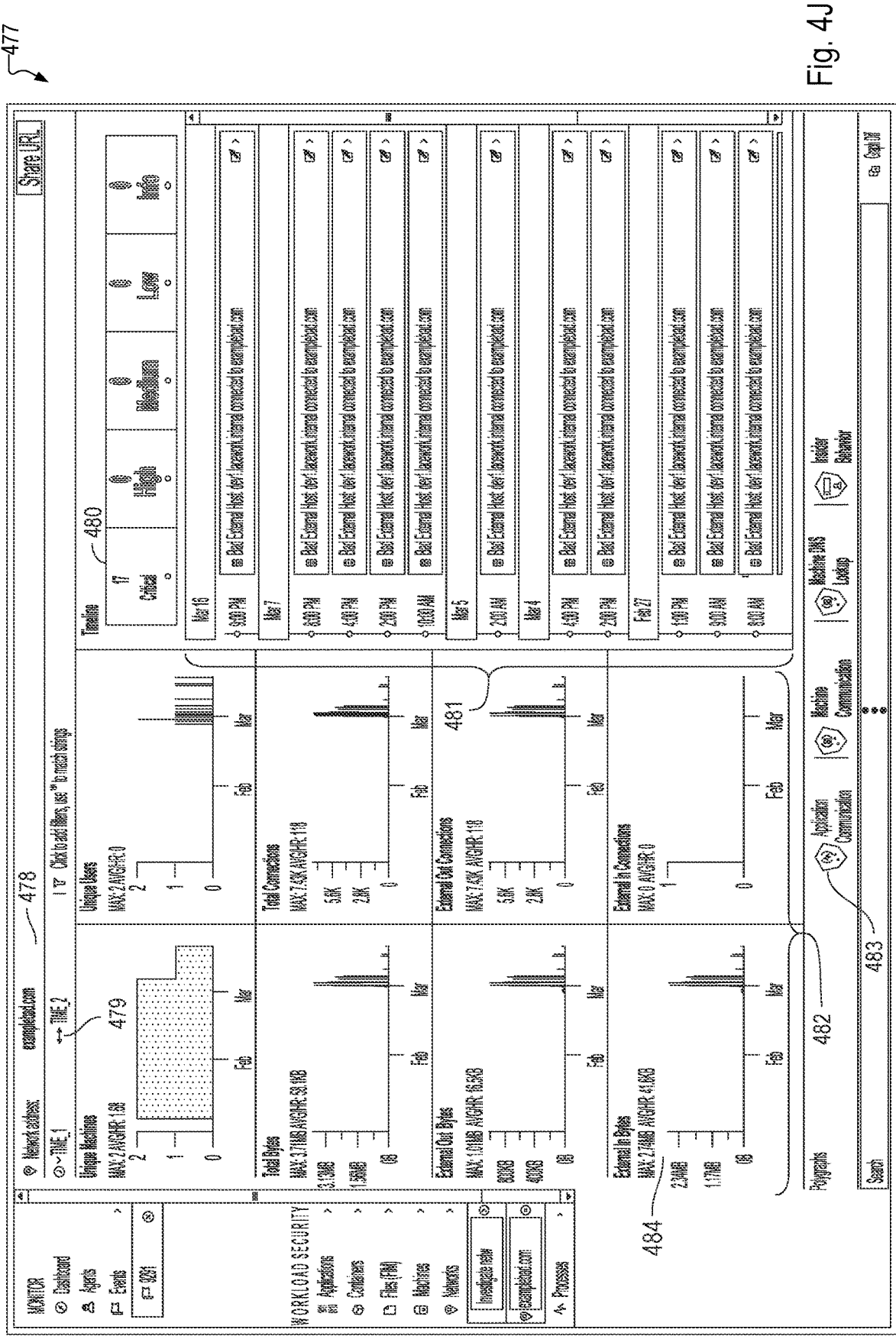
FIG. 4J illustrates an example of a dossier for a domain.

Region 473 automatically provides user A with answers to questions that may be helpful to have answers to while investigating event 9291. If user A clicks on any of the links in the event description (474), she will be taken to a corresponding dossier for the link. As one example, suppose user A clicks on link 475. She will then be presented with interface 477 shown in FIG. 4J.

Interface 477 is an embodiment of a dossier for a domain. In this example, the domain is "examplebad.com," as shown in region 478. Suppose user A would like to track down more information about interactions entity A resources have made with examplebad.com between January 1 and March 20. She selects the appropriate time period in region 479 and information in the other portions of interface 477 automatically update to provide various information corresponding to the selected time frame. As one example, user A can see that contact was made with examplebad.com a total of 17 times during the time period (480), as well as a list of each contact (481). Various statistical information is also included in the dossier for the time period (482). If she scrolls down in interface 477, user A will be able to view various polygraphs associated with examplebad.com, such as an application-communication polygraph (483).

Data stored in data store 30 can be internally organized as an activity graph. In the activity graph, nodes are also referred to as Entities. Activities generated by Entities are modeled as directional edges between nodes. Thus, each edge is an activity between two Entities. One example of an Activity is a "login" Activity, in which a user Entity logs into a machine Entity (with a directed edge from the user to the machine). A second example of an Activity is a "launch" Activity, in which a parent process launches a child process (with a directed edge from the parent to the child). A third example of an Activity is a "DNS query" Activity, in which either a process or a machine performs a query (with a directed edge from the requestor to the answer, e.g., an edge from a process to www.example.com). A fourth example of an Activity is a network "connected to" Activity, in which processes, IP addresses, and listen ports can connect to each other (with a directed edge from the initiator to the server).

As will be described in more detail below, query service 166 provides either relational views or graph views on top of data stored in data store 30. Typically, a user will want to see data filtered using the activity graph. For example, if an entity was not involved in an activity in a given time period, that entity should be filtered out of query results. Thus, a request to show "all machines" in a given time frame will be interpreted as "show distinct machines that were active" during the time frame.

Query service 166 relies on three main data model elements: fields, entities, and filters. As used herein, a field is a collection of values with the same type (logical and physical). A field can be represented in a variety of ways, including: 1. a column of relations (table/view), 2. a return field from another entity, 3. an SQL aggregation (e.g., COUNT, SUM, etc.), 4. an SQL expression with the references of other fields specified, and 5. a nested field of a JSON object. As viewed by query service 166, an entity is a collection of fields that describe a data set. The data set can be composed in a variety of ways, including: 1. a relational table, 2. a parameterized SQL statement, 3. DynamicSQL created by a Java function, and 4. join/project/aggregate/subclass of other entities. Some fields are common for all entities. One example of such a field is a "first observed" timestamp (when first use of the entity was detected). A second example of such a field is the entity classification type (e.g., one of: 1. Machine (on which an agent is installed), 2. Process, 3. Binary, 4. UID, 5. IP, 6. DNS Information, 7. ListenPort, and 8. PType). A third example of such a field is a "last observed" timestamp.

A filter is an operator that: 1. takes an entity and field values as inputs, 2. a valid SQL expression with specific reference(s) of entity fields, or 3. is a conjunct/disjunct of filters. As will be described in more detail below, filters can be used to filter data in various ways, and limit data returned by query service 166 without changing the associated data set.

As mentioned above, a dossier is a template for a collection of visualizations. Each visualization (e.g., the box including chart 484) has a corresponding card, which identifies particular target information needed (e.g., from data store 30) to generate the visualization. In various embodiments, data platform 12 maintains a global set of dossiers/cards. Users of data platform 12 such as user A can build their own dashboard interfaces using preexisting dossiers/cards as components, and/or they can make use of a default dashboard (which incorporates various of such dossiers/cards).

A JSON file can be used to store multiple cards (e.g., as part of a query service catalog). A particular card is represented by a single JSON object with a unique name as a field name.

Each card may be described by the following named fields:

TYPE: the type of the card. Example values include:
Entity (the default type)
SQL
Filters
DynamicSQL
graphFilter
graph
Function
Template PARAMETERS: a JSON array object that contains an array of parameter objects with the following fields:
    name (the name of the parameter)
    required (a Boolean flag indicating whether the parameter is required or not)
    default (a default value of the parameter)
    props (a generic JSON object for properties of the parameter. Possible values are: "utype" (a user defined type), and "scope" (an optional property to configure a namespace of the parameter))
    value (a value for the parameter—non-null to override the default value defined in nested source entities)

SOURCES: a JSON array object explicitly specifying references of input entities. Each source reference has the following attributes:
    name (the card/entity name or fully-qualified Table name)
    type (required for base Table entity)
    alias (an alias to access this source entity in other fields (e.g., returns, filters, groups, etc))

RETURNS: a required JSON array object of a return field object. A return field object can be described by the following attributes:
    field (a valid field name from a source entity)
    expr (a valid SQL scalar expression. References to input fields of source entities are specified in the format of #{Entity.Field}. Parameters can also be used in the expression in the format of ${ParameterName})
    type (the type of field, which is required for return fields specified by expr. It is also required for all return fields of an Entity with an SQL type)
    alias (the unique alias for return field)
    aggr (possible aggregations are: COUNT, COUNT DISTINCT, DISTINCT, MAX, MIN, AVG, SUM, FIRST_VALUE, LAST_VALUE)

case (JSON array object represents conditional expressions "when" and "expr")

fieldsFrom, and, except (specification for projections from a source entity with excluded fields)

props (general JSON object for properties of the return field. Possible properties include: "filterGroup," "title," "format," and "utype")

PROPS: generic JSON objects for other entity properties

SQL: a JSON array of string literals for SQL statements. Each string literal can contain parameterized expressions ${ParameterName} and/or composable entity by #{EntityName}

GRAPH: required for graph entity. Has the following required fields:

source (including "type," "props," and "keys")

target (including "type," "props," and "keys")

edge (including "type" and "props")

JOINS: a JSON array of join operators. Possible fields for a join operator include:

type (possible join types include: "loj"—Left Outer Join, "join"—Inner Join, "in"—Semi Join, "implicit"—Implicit Join)

left (a left hand side field of join)

right (a right hand side field of join)

keys (key columns for multi-way joins)

order (a join order of multi-way joins)

FKEYS: a JSON array of FilterKey(s). The fields for a FilterKey are:

type (type of FilterKey)

fieldRefs (reference(s) to return fields of an entity defined in the sources field)

alias (an alias of the FilterKey, used in implicit join specification)

FILTERS: a JSON array of filters (conjunct). Possible fields for a filter include:

type (types of filters, including: "eq"—equivalent to SQL=, "ne"—equivalent to SQL < >, "ge"—equivalent to SQL>=, "gt"—equivalent to SQL >, "le"—equivalent to SQL<=, "lt"—equivalent to SQL <, "like"—equivalent to SQL LIKE, "not_like"—equivalent to SQL NOT LIKE, "rlike"—equivalent to SQL RLIKE (Snowflake specific), "not_rlike"—equivalent to SQL NOT RLIKE (Snowflake specific), "in"—equivalent to SQL IN, "not_in"—equivalent to SQL NOT IN)

expr (generic SQL expression)

field (field name)

value (single value)

values (for both IN and NOT IN)

ORDERS: a JSON array of ORDER BY for returning fields. Possible attributes for the ORDER BY clause include:

field (field ordinal index (1 based) or field alias)

order (asc/desc, default is ascending order)

GROUPS: a JSON array of GROUP BY for returning fields. Field attributes are:

field (ordinal index (1 based) or alias from the return fields)

LIMIT: a limit for the number of records to be returned

OFFSET: an offset of starting position of returned data. Used in combination with limit for pagination.

Suppose customers of data platform 12 (e.g., entity A and entity B) request new data transformations or a new aggregation of data from an existing data set (as well as a corresponding visualization for the newly defined data set). As mentioned above, the data models and filtering applications used by data platform 12 are extensible. Thus, two example scenarios of extensibility are (1) extending the filter data set, and (2) extending a FilterKey in the filter data set.

Data platform 12 includes a query service catalog that enumerates cards available to users of data platform 12. New cards can be included for use in data platform 12 by being added to the query service catalog (e.g., by an operator of data platform 12). For reusability and maintainability, a single external-facing card (e.g., available for use in a dossier) can be composed of multiple (nested) internal cards. Each newly added card (whether external or internal) will also have associated FilterKey(s) defined. A user interface (UI) developer can then develop a visualization for the new data set in one or more dossier templates. The same external card can be used in multiple dossier templates, and a given external card can be used multiple times in the same dossier (e.g., after customization). Examples of external card customization include customization via parameters, ordering, and/or various mappings of external data fields (columns).

As mentioned above, a second extensibility scenario is one in which a FilterKey in the filter data set is extended (i.e., existing template functions are used to define a new data set). As also mentioned above, data sets used by data platform 12 are composable/reusable/extensible, irrespective of whether the data sets are relational or graph data sets. One example data set is the User Tracking polygraph, which is generated as a graph data set (comprising nodes and edges). Like other polygraphs, User Tracking is an external data set that can be visualized both as a graph (via the nodes and edges) and can also be used as a filter data set for other cards, via the cluster identifier (CID) field.

As mentioned above, as users such as user A navigate through/interact with interfaces provided by data platform 12 (e.g., as shown in FIG. 4H), such interactions trigger query service 166 to generate and perform queries against data store 30. Dynamic composition of filter datasets can be implemented using FilterKeys and FilterKey Types. A FilterKey can be defined as a list of columns and/or fields in a nested structure (e.g., JSON). Instances of the same FilterKey Type can be formed as an Implicit Join Group. The same instance of a FilterKey can participate in different Implicit Join Groups. A list of relationships among all possible Implicit Join Groups is represented as a Join graph for the entire search space to create a final data filter set by traversing edges and producing Join Path(s).

Each card (e.g., as stored in the query service catalog and used in a dossier) can be introspected by a/card/describe/CardID REST request.

Figure 4K:
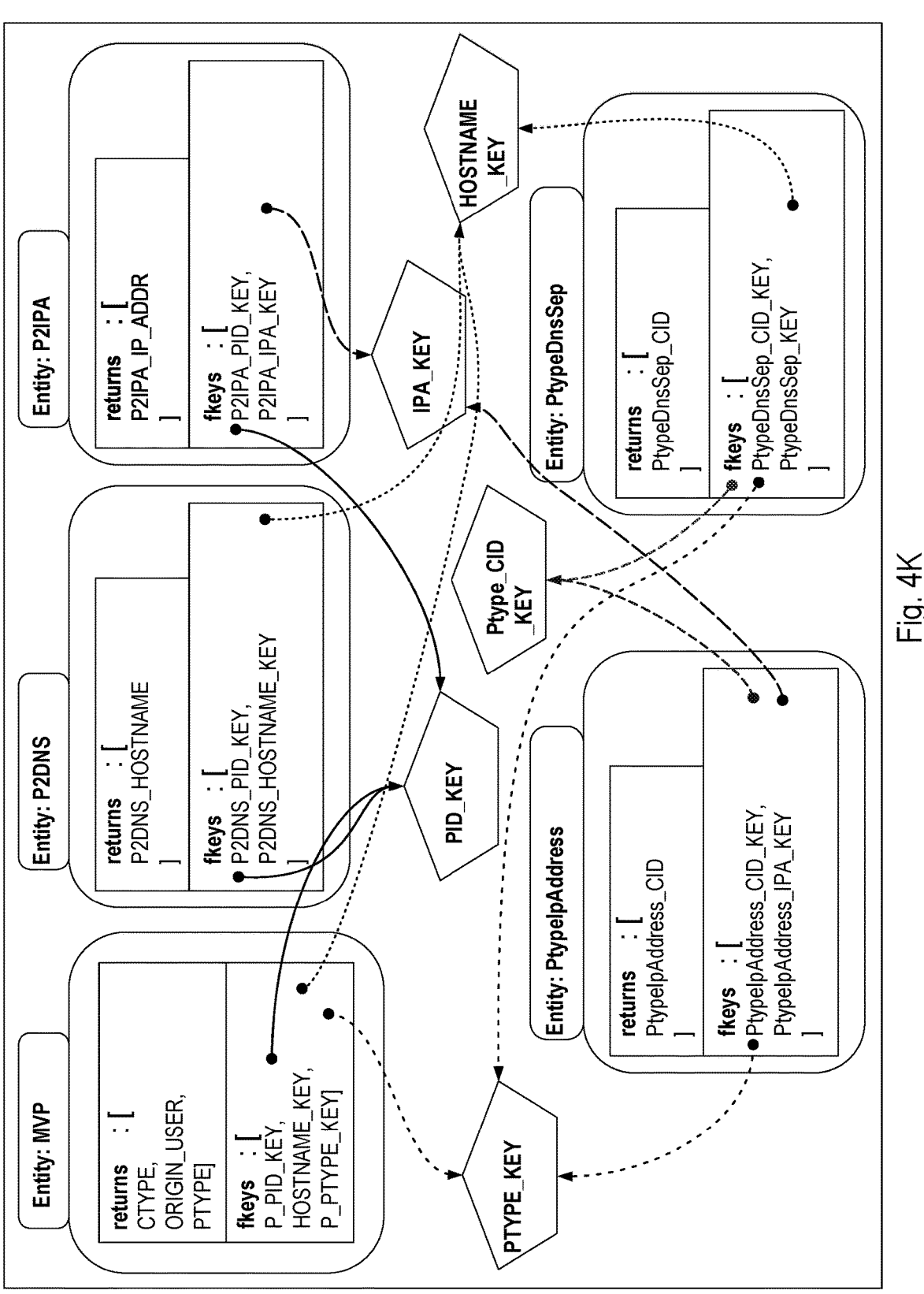
FIG. 4K depicts an example of an Entity Join graph by FilterKey and FilterKey Group (implicit join).

At runtime (e.g., whenever it receives a request from web app 120), query service 166 parses the list of implicit joins and creates a Join graph to manifest relationships of FilterKeys among Entities. A Join graph (an example of which is depicted in FIG. 4K) comprises a list of Join Link(s). A Join Link represents each implicit join group by the same FilterKey type. A Join Link maintains a reverse map (Entity-to-FilterKey) of FilterKeys and their Entities. As previously mentioned, Entities can have more than one FilterKey defined. The reverse map guarantees one FilterKey per Entity can be used for each JoinLink. Each JoinLink also maintains a list of entities for the priority order of joins. Each JoinLink is also responsible for creating and adding directional edge(s) to graphs. An edge represents a possible join between two Entities.

At runtime, each Implicit Join uses the Join graph to find all possible join paths. The search of possible join paths starts with the outer FilterKey of an implicit join. One approach is to use a shortest path approach, with breadth first traversal and subject to the following criteria:

Use the priority order list of Join Links for all entities in the same implicit join group.

Stop when a node (Entity) is reached which has local filter(s).

Include all join paths at the same level (depth).

Exclude join paths based on the predefined rules (path of edges).

FIG. 4L illustrates an example of a process for dynamically generating and executing a query. In various embodiments, process 485 is performed by data platform 12. The process begins at 486 when a request is received to filter information associated with activities within a network environment. One example of such a request occurs in response to user A clicking on tab 465. Another example of such a request occurs in response to user A clicking on link 464-1. Yet another example of such a request occurs in response to user A clicking on link 464-2 and selecting (e.g., from a dropdown) an option to filter (e.g., include, exclude) based on specific criteria that she provides (e.g., an IP address, a username, a range of criteria, etc.).

At 487, a query is generated based on an implicit join. One example of processing that can be performed at 487 is as follows. As explained above, one way dynamic composition of filter datasets can be implemented is by using FilterKeys and FilterKey Types. And, instances of the same FilterKey Type can be formed as an Implicit Join Group. A Join graph for the entire search space can be constructed from a list of all relationships among all possible Join Groups. And, a final data filter set can be created by traversing edges and producing one or more Join Paths. Finally, the shortest path in the join paths is used to generate an SQL query string.

One approach to generating an SQL query string is to use a query building library (authored in an appropriate language such as Java). For example, a common interface "sqlGen" may be used in conjunction with process 485 is as follows. First, a card/entity is composed by a list of input cards/entities, where each input card recursively is composed by its own list of input cards. This nested structure can be visualized as a tree of query blocks(SELECT) in standard SQL constructs. SQL generation can be performed as the traversal of the tree from root to leaf entities (top-down), calling the sqlGen of each entity. Each entity can be treated as a subclass of the Java class(Entity). An implicit join filter (EntityFilter) is implemented as a subclass of Entity, similar to the right hand side of a SQL semi-join operator. Unlike the static SQL semi-join construct, it is conditionally and recursively generated even if it is specified in the input sources of the JSON specification. Another recursive interface can also be used in conjunction with process 485, preSQLGen, which is primarily the entry point for Entity-Filter to run a search and generate nested implicit join filters. During preSQLGen recursive invocations, the applicability of implicit join filters is examined and pushed down to its input subquery list. Another top-down traversal, pullUp-Cachable, can be used to pull up common sub-query blocks, including those dynamically generated by preSQLGen, such that SELECT statements of those cacheable blocks are generated only once at top-level WITH clauses. A recursive interface, sqlWith, is used to generate nested subqueries inside WITH clauses. The recursive calls of a sqlWith function can generate nested WITH clauses as well. An sqlFrom function can be used to generate SQL FROM clauses by referencing those subquery blocks in the WITH clauses. It also produces INNER/OUTER join operators based on the joins in the specification. Another recursive interface, sqlWhere, can be used to generate conjuncts and disjuncts of local predicates and semi-join predicates based on implicit join transformations. Further, sqlProject, sql- GroupBy, sqlOrderBy, and sqlLimitOffset can respectively be used to translate the corresponding directives in JSON spec to SQL SELECT list, GROUP BY, ORDER BY, and LIMIT/OFFSET clauses.

Returning to process 485, at 488, the query (generated at 487) is used to respond to the request. As one example of the processing performed at 488, the generated query is used to query data store 30 and provide (e.g., to web app 120) fact data formatted in accordance with a schema (e.g., as associated with a card associated with the request received at 486).

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable the joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in the EDW. "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged. Such data stores may be proprietary or may be embodied as vendor provided products or services such as, for example, Google BigQuery, Druid, Amazon Redshift, IBM db2, Dremio, Databricks Lakehouse Platform, Cloudera, Azure Synapse Analytics, and others.

The deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may be provisioned, deployed, and/or managed using infrastructure as code ('IaC'). IaC involves the managing and/or provisioning of infrastructure through code instead of through manual processes. With IaC, configuration files may be created that include infrastructure specifications. IaC can be beneficial as configurations may be edited and distributed, while also ensuring that environments are provisioned in a consistent manner. IaC approaches may be enabled in a variety of ways including, for example, using IaC software tools such as Terraform by HashiCorp. Through the usage of such tools, users may define and provide data center infrastructure using JavaScript Object Notation ('JSON'), YAML, proprietary formats, or some other format. In some embodiments, the configuration files may be used to emulate a cloud deployment for the purposes of analyzing the emulated cloud deployment using the systems described herein. Likewise, the configuration files themselves may be used as inputs to the systems described herein, such that the configuration files may be inspected to identify vulnerabilities, misconfigurations, violations of regulatory requirements, or other issues. In fact, configuration files for multiple cloud deployments may even be used by the systems described herein to identify best practices, to identify configuration files that deviate from typical configuration files, to identify configuration files with similarities to deployments that have been determined to be deficient in some way, or the configuration files may be leveraged in some other ways to detect vulnerabilities, misconfigurations, violations of regulatory requirements, or other issues prior to deploying an infrastructure that is described in the configuration files. In some embodiments the techniques described herein may be use in multi-cloud, multi-tenant, cross-cloud, cross-tenant, cross-user, industry cloud, digital platform, and other scenarios depending on specific need or situation.

In some embodiments, the deployments that are analyzed, monitored, evaluated, or otherwise observed by the systems described herein (e.g., systems that include components such as the platform 12 of FIG. 1D, the data collection agents described herein, and/or other components) may be monitored to determine the extent to which a particular component has experienced "drift" relative to its associated IaC configuration. Discrepancies between how cloud resources were defined in an IaC configuration file and how they are currently configured in runtime may be identified and remediation workflows may be initiated to generate an alert, reconfigure the deployment, or take some other action. Such discrepancies may occur for a variety of reasons. Such discrepancies may occur, for example, due to maintenance operations being performed, due to incident response tasks being carried out, or for some other reason. Readers will appreciate that while IaC helps avoid initial misconfigurations of a deployment by codifying and enforcing resource creation, resource configuration, security policies, and so on, the systems described herein may prevent unwanted drift from occurring during runtime and after a deployment has been created in accordance with an IaC configuration.

In some embodiments, the deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may also be provisioned, deployed, and/or managed using security as code ('SaC').

SaC extends IaC concepts by defining cybersecurity policies and/or standards programmatically, so that the policies and/or standards can be referenced automatically in the configuration scripts used to provision cloud deployments. Stated differently, SaC can automate policy implementation and cloud deployments may even be compared with the policies to prevent "drift." For example, if a policy is created where all personally identifiable information (TIP) or personal health information ('PHI') must be encrypted when it is stored, that policy is translated into a process that is automatically launched whenever a developer submits code, and code that violates the policy may be automatically rejected.

In some embodiments, SaC may be implemented by initially classifying workloads (e.g., by sensitivity, by criticality, by deployment model, by segment). Policies that can be instantiated as code may subsequently be designed. For example, compute-related policies may be designed, access-related policies may be designed, application-related policies may be designed, network-related policies may be designed, data-related policies may be designed, and so on. Security as code may then be instantiated through architecture and automation, as successful implementation of SaC can benefit from making key architectural-design decisions and executing the right automation capabilities. Next, operating model protections may be built and supported. For example, an operating model may "shift left" to maximize self-service and achieve full-life-cycle security automation (e.g., by standardizing common development toolchains, CI/CD pipelines, and the like). In such an example, security policies and access controls may be part of the pipeline, automatic code review and bug/defect detection may be performed, automated build processes may be performed, vulnerability scanning may be performed, checks against a risk-control framework may be made, and other tasks may be performed all before deploying an infrastructure or components thereof.

The systems described herein may be useful in analyzing, monitoring, evaluating, or otherwise observing a GitOps environment. In a GitOps environment, Git may be viewed as the one and only source of truth. As such, GitOps may require that the desired state of infrastructure (e.g., a customer's cloud deployment) be stored in version control such that the entire audit trail of changes to such infrastructure can be viewed or audited. In a GitOps environment, all changes to infrastructure are embodied as fully traceable commits that are associated with committer information, commit IDs, time stamps, and/or other information. In such an embodiment, both an application and the infrastructure (e.g., a customer's cloud deployment) that supports the execution of the application are therefore versioned artifacts and can be audited using the gold standards of software development and delivery. Readers will appreciate that while the systems described herein are described as analyzing, monitoring, evaluating, or otherwise observing a GitOps environment, in other embodiments other source control mechanisms may be utilized for creating infrastructure, making changes to infrastructure, and so on. In these embodiments, the systems described herein may similarly be used for analyzing, monitoring, evaluating, or otherwise observing such environments.

As described in other portions of the present disclosure, the systems described herein may be used to analyze, monitor, evaluate, or otherwise observe a customer's cloud deployment. While securing traditional datacenters requires managing and securing an IP-based perimeter with networks and firewalls, hardware security modules ('HSMs'), security information and event management ('STEM') technologies, and other physical access restrictions, such solutions are not particularly useful when applied to cloud deployments. As such, the systems described herein may be configured to interact with and even monitor other solutions that are appropriate for cloud deployments such as, for example, "zero trust" solutions.

A zero trust security model (a.k.a., zero trust architecture) describes an approach to the design and implementation of IT systems. A primary concept behind zero trust is that devices should not be trusted by default, even if they are connected to a managed corporate network such as the corporate LAN and even if they were previously verified. Zero trust security models help prevent successful breaches by eliminating the concept of trust from an organization's network architecture. Zero trust security models can include multiple forms of authentication and authorization (e.g., machine authentication and authorization, human/user authentication and authorization) and can also be used to control multiple types of accesses or interactions (e.g., machine-to-machine access, human-to-machine access).

In some embodiments, the systems described herein may be configured to interact with zero trust solutions in a variety of ways. For example, agents that collect input data for the systems described herein (or other components of such systems) may be configured to access various machines, applications, data sources, or other entity through a zero trust solution, especially where local instances of the systems described herein are deployed at edge locations. Likewise, given that zero trust solutions may be part of a customer's cloud deployment, the zero trust solution itself may be monitored to identify vulnerabilities, anomalies, and so on. For example, network traffic to and from the zero trust solution may be analyzed, the zero trust solution may be monitored to detect unusual interactions, log files generated by the zero trust solution may be gathered and analyzed, and so on.

In some embodiments, the systems described herein may leverage various tools and mechanisms in the process of performing its primary tasks (e.g., monitoring a cloud deployment). For example, Linux eBPF is mechanism for writing code to be executed in the Linux kernel space. Through the usage of eBPF, user mode processes can hook into specific trace points in the kernel and access data structures and other information. For example, eBPF may be used to gather information that enables the systems described herein to attribute the utilization of networking resources or network traffic to specific processes. This may be useful in analyzing the behavior of a particular process, which may be important for observability/STEM.

The systems described may be configured to collect security event logs (or any other type of log or similar record of activity) and telemetry in real time for threat detection, for analyzing compliance requirements, or for other purposes. In such embodiments, the systems described herein may analyze telemetry in real time (or near real time), as well as historical telemetry, to detect attacks or other activities of interest. The attacks or activities of interest may be analyzed to determine their potential severity and impact on an organization. In fact, the attacks or activities of interest may be reported, and relevant events, logs, or other information may be stored for subsequent examination.

In one embodiment, systems described herein may be configured to collect security event logs (or any other type of log or similar record of activity) and telemetry in real time to provide customers with a STEM or STEM-like solution. STEM technology aggregates event data produced by security devices, network infrastructure, systems, applications, or other source. Centralizing all of the data that may be generated by a cloud deployment may be challenging for a traditional STEM, however, as each component in a cloud deployment may generate log data or other forms of machine data, such that the collective amount of data that can be used to monitor the cloud deployment can grow to be quite large. A traditional STEM architecture, where data is centralized and aggregated, can quickly result in large amounts of data that may be expensive to store, process, retain, and so on. As such, STEM technologies may frequently be implemented such that silos are created to separate the data.

In some embodiments of the present disclosure, data that is ingested by the systems described herein may be stored in a cloud-based data warehouse such as those provided by Snowflake and others. Given that companies like Snowflake offer data analytics and other services to operate on data that is stored in their data warehouses, in some embodiments one or more of the components of the systems described herein may be deployed in or near Snowflake as part of a secure data lake architecture (a.k.a., a security data lake architecture, a security data lake/warehouse). In such an embodiment, components of the systems described herein may be deployed in or near Snowflake to collect_data, transform data, analyze data for the purposes of detecting threats or vulnerabilities, initiate remediation workflows, generate alerts, or perform any of the other functions that can be performed by the systems described herein. In such embodiments, data may be received from a variety of sources (e.g., EDR or EDR-like tools that handle endpoint data, cloud access security broker ('CASB') or CASB-like tools that handle data describing interactions with cloud applications, Identity and Access Management ('IAM') or IAM-like tools, and many others), normalized for storage in a data warehouse, and such normalized data may be used by the systems described herein. In fact, the systems described herein may actually implement the data sources (e.g., an EDR tool, a CASB tool, an IAM tool) described above.

In some embodiments one data source that is ingested by the systems described herein is log data, although other forms of data such as network telemetry data (flows and packets) and/or many other forms of data may also be utilized. In some embodiments, event data can be combined with contextual information about users, assets, threats, vulnerabilities, and so on, for the purposes of scoring, prioritization and expediting investigations. In some embodiments, input data may be normalized, so that events, data, contextual information, or other information from disparate sources can be analyzed more efficiently for specific purposes (e.g., network security event monitoring, user activity monitoring, compliance reporting). The embodiments described here offer real-time analysis of events for security monitoring, advanced analysis of user and entity behaviors, querying and long-range analytics for historical analysis, other support for incident investigation and management, reporting (for compliance requirements, for example), and other functionality.

In some embodiments, the systems described herein may be part of an application performance monitoring ('APM') solution. APM software and tools enable the observation of application behavior, observation of its infrastructure dependencies, observation of users and business key performance indicators ('KPIs') throughout the application's life cycle, and more. The applications being observed may be developed internally, as packaged applications, as software as a service ('SaaS'), or embodied in some other ways. In such embodiments, the systems described herein may provide one or more of the following capabilities:

The ability to operate as an analytics platform that ingests, analyzes, and builds context from traces, metrics, logs, and other sources.

Automated discovery and mapping of an application and its infrastructure components.

Observation of an application's complete transactional behavior, including interactions over a data communications network.

Monitoring of applications running on mobile (native and browser) and desktop devices.

Identification of probable root causes of an application's performance problems and their impact on business outcomes.

Integration capabilities with automation and service management tools.

Analysis of business KPIs and user journeys (for example, login to check-out).

Domain-agnostic analytics capabilities for integrating data from third-party sources.

Endpoint monitoring to understand the user experience and its impact on business outcomes.

Support for virtual desktop infrastructure ('VDI') monitoring.

In embodiments where the systems described herein are used for APM, some components of the system may be modified, other components may be added, some components may be removed, and other components may remain the same. In such an example, similar mechanisms as described elsewhere in this disclosure may be used to collect information from the applications, network resources used by the application, and so on. The graph based modelling techniques may also be leveraged to perform some of the functions mentioned above, or other functions as needed.

In some embodiments, the systems described herein may be part of a solution for developing and/or managing artificial intelligence ('AI') or machine learning ('ML') applications. For example, the systems described herein may be part of an AutoML tool that automate the tasks associated with developing and deploying ML models. In such an example, the systems described herein may perform various functions as part of an AutoML tool such as, for example, monitoring the performance of a series of processes, microservices, and so on that are used to collectively form the AutoML tool. In other embodiments, the systems described herein may perform other functions as part of an AutoML tool or may be used to monitor, analyze, or otherwise observe an environment that the AutoML tool is deployed within.

In some embodiments, the systems described herein may be used to manage, analyze, or otherwise observe deployments that include other forms of AI/ML tools. For example, the systems described herein may manage, analyze, or otherwise observe deployments that include AI services. AI services are, like other resources in an as-a-service model, ready-made models and AI applications that are consumable as services and made available through APIs. In such an example, rather than using their own data to build and train models for common activities, organizations may access pre-trained models that accomplish specific tasks. Whether an organization needs natural language processing ('NLP'), automatic speech recognition ('ASR'), image recognition, or some other capability, AI services simply plug-and-play into an application through an API. Likewise, the systems described herein may be used to manage, analyze, or otherwise observe deployments that include other forms of AI/ML tools such as Amazon Sagemaker (or other cloud machine-learning platform that enables developers to create, train, and deploy ML models) and related services such as Data Wrangler (a service to accelerate data prep for ML) and Pipelines (a CI/CD service for ML).

In some embodiments, the systems described herein may be used to manage, analyze, or otherwise observe deployments that include various data services. For example, data services may include secure data sharing services, data marketplace services, private data exchanges services, and others. Secure data sharing services can allow access to live data from its original location, where those who are granted access to the data simply reference the data in a controlled and secure manner, without latency or contention from concurrent users. Because changes to data are made to a single version, data remains up-to-date for all consumers, which ensures data models are always using the latest version of such data. Data marketplace services operate as a single location to access live, ready-to-query data (or data that is otherwise ready for some other use). A data marketplace can even include a "feature stores," which can allow data scientists to repurpose existing work. For example, once a data scientist has converted raw data into a metric (e.g., costs of goods sold), this universal metric can be found quickly and used by other data scientists for quick analysis against that data.

In some embodiments, the systems described herein may be used to manage, analyze, or otherwise observe deployments that include distributed training engines or similar mechanisms such as, for example, such as tools built on Dask. Dask is an open source library for parallel computing that is written in Python. Dask is designed to enable data scientists to improve model accuracy faster, as Dask enables data scientists can do everything in Python end-to-end, which means that they no longer need to convert their code to execute in environments like Apache Spark. The result is reduced complexity and increased efficiency. The systems described herein may also be used to manage, analyze, or otherwise observe deployments that include technologies such as RAPIDS (an open source Python framework which is built on top of Dask). RAPIDS optimizes compute time and speed by providing data pipelines and executing data science code entirely on graphics processing units (GPUs) rather than CPUs. Multi-cluster, shared data architecture, DataFrames, Java user-defined functions (UDF) are supported to enable trained models to run within a data warehouse.

In some embodiments, the systems described herein may be leveraged for the specific use case of detecting and/or remediating ransomware attacks and/or other malicious action taken with respect to data, systems, and/or other resources associated with one or more entities. Ransomware is a type of malware from cryptovirology that threatens to publish the victim's data or perpetually block access to such data unless a ransom is paid. In such embodiments, ransomware attacks may be carried out in a manner such that patterns (e.g., specific process-to-process communications, specific data access patterns, unusual amounts of encryption/re-encryption activities) emerge, where the systems described herein may monitor for such patterns. Alternatively, ransomware attacks may involve behavior that deviates from normal behavior of a cloud deployment that is not experiencing a ransomware attack, such that the mere presence of unusual activity may trigger the systems described herein to generate alerts or take some other action, even without explicit knowledge that the unusual activity is associated with a ransomware attack.

In some embodiments, particular policies may be put in place the systems described herein may be configured to enforce such policies as part of an effort to thwart ransomware attacks. For example, particular network sharing protocols (e.g., Common Internet File System ('CIFS'), Network File System ('NFS')) may be avoided when implementing storage for backup data, policies that protect backup systems may be implemented and enforced to ensure that usable backups are always available, multifactor authentication for particular accounts may be utilized and accounts may be configured with the minimum privilege required to function, isolated recovery environments may be created and isolation may be monitored and enforced to ensure the integrity of the recovery environment, and so on. As described in the present disclosure, the systems described herein may be configured to explicitly enforce such policies or may be configured to detect unusual activity that represents a violation of such policies, such that the mere presence of unusual activity may trigger the systems described herein to generate alerts or take some other action, even without explicit knowledge that the unusual activity is associated with a violation of a particular policy.

Readers will appreciate that ransomware attacks are often deployed as part of a larger attack that may involve, for example:

Penetration of the network through means such as, for example, stolen credentials and remote access malware.

Stealing of credentials for critical system accounts, including subverting critical administrative accounts that control systems such as backup, Active Directory ('AD'), DNS, storage admin consoles, and/or other key systems.

Attacks on a backup administration console to turn off or modify backup jobs, change retention policies, or even provide a roadmap to where sensitive application data is stored.

Data theft attacks.

As a result of the many aspects that are part of a ransomware attack, embodiments of the present disclosure may be configured as follows:

The systems may include one or more components that detect malicious activity based on the behavior of a process.

The systems may include one or more components that store indicator of compromise ('IOC') or indicator of attack ('IOA') data for retrospective analysis.

The systems may include one or more components that detect and block fileless malware attacks.

The systems may include one or more components that remove malware automatically when detected.

The systems may include a cloud-based, SaaS-style, multitenant infrastructure.

The systems may include one or more components that identify changes made by malware and provide the recommended remediation steps or a rollback capability.

The systems may include one or more components that detect various application vulnerabilities and memory exploit techniques.

The systems may include one or more components that continue to collect suspicious event data even when a managed endpoint is outside of an organization's network.

The systems may include one or more components that perform static, on-demand malware detection scans of folders, drives, devices, or other entities.

The systems may include data loss prevention (DLP) functionality.

In some embodiments, the systems described herein may manage, analyze, or otherwise observe deployments that include deception technologies. Deception technologies allow for the use of decoys that may be generated based on scans of true network areas and data. Such decoys may be deployed as mock networks running on the same infrastructure as the real networks, but when an intruder attempts to enter the real network, they are directed to the false network and security is immediately notified. Such technologies may be useful for detecting and stopping various types of cyber threats such as, for example, Advanced Persistent Threats ('APTs'), malware, ransomware, credential dumping, lateral movement and malicious insiders. To continue to outsmart increasingly sophisticated attackers, these solutions may continuously deploy, support, refresh and respond to deception alerts.

In some embodiments, the systems described herein may manage, analyze, or otherwise observe deployments that include various authentication technologies, such as multifactor authentication and role-based authentication. In fact, the authentication technologies may be included in the set of resources that are managed, analyzed, or otherwise observed as interactions with the authentication technologies may monitored. Likewise, log files or other information retained by the authentication technologies may be gathered by one or more agents and used as input to the systems described herein.

In some embodiments, the systems described herein may be leveraged for the specific use case of detecting supply chain attacks. More specifically, the systems described herein may be used to monitor a deployment that includes software components, virtualized hardware components, and other components of an organization's supply chain such that interactions with an outside partner or provider with access to an organization's systems and data can be monitored. In such embodiments, supply chain attacks may be carried out in a manner such that patterns (e.g., specific interactions between internal and external systems) emerge, where the systems described herein may monitor for such patterns. Alternatively, supply chain attacks may involve behavior that deviates from normal behavior of a cloud deployment that is not experiencing a supply chain attack, such that the mere presence of unusual activity may trigger the systems described herein to generate alerts or take some other action, even without explicit knowledge that the unusual activity is associated with a supply chain attack.

In some embodiments, the systems described herein may be leveraged for other specific use cases such as, for example, detecting the presence of (or preventing infiltration from) cryptocurrency miners (e.g., bitcoin miners), token miners, hashing activity, non-fungible token activity, other viruses, other malware, and so on. As described in the present disclosure, the systems described herein may monitor for such threats using known patterns or by detecting unusual activity, such that the mere presence of unusual activity may trigger the systems described herein to generate alerts or take some other action, even without explicit knowledge that the unusual activity is associated with a particular type of threat, intrusion, vulnerability, and so on.

The systems described herein may also be leveraged for endpoint protection, such the systems described herein form all of or part of an endpoint protection platform. In such an embodiment, agents, sensors, or similar mechanisms may be deployed on or near managed endpoints such as computers, servers, virtualized hardware, internet of things ('IotT') devices, mobile devices, phones, tablets, watches, other personal digital devices, storage devices, thumb drives, secure data storage cards, or some other entity. In such an example, the endpoint protection platform may provide functionality such as:

Prevention and protection against security threats including malware that uses file-based and fileless exploits.

The ability to apply control (allow/block) to access of software, scripts, processes, microservices, and so on.

The ability to detect and prevent threats using behavioral analysis of device activity, application activity, user activity, and/or other data.

The ability for facilities to investigate incidents further and/or obtain guidance for remediation when exploits evade protection controls The ability to collect and report on inventory, configuration and policy management of the endpoints.

The ability to manage and report on operating system security control status for the monitored endpoints.

The ability to scan systems for vulnerabilities and report/manage the installation of security patches.

The ability to report on internet, network and/or application activity to derive additional indications of potentially malicious activity.

Example embodiments are described in which policy enforcement, threat detection, or some other function is carried out by the systems described herein by detecting unusual activity, such that the mere presence of unusual activity may trigger the systems described herein to generate alerts or take some other action, even without explicit knowledge that the unusual activity is associated with a particular type of threat, intrusion, vulnerability, and so on. Although these examples are largely described in terms of identifying unusual activity, in these examples the systems described herein may be configured to learn what constitutes 'normal activity'—where 'normal activity' is activity observed, modeled, or otherwise identified in the absence of a particular type of threat, intrusion, vulnerability, and so on. As such, detecting 'unusual activity' may alternatively be viewed as detecting a deviation from 'normal activity' such that 'unusual activity' does not need to be identified and sought out. Instead, deviations from 'normal activity' may be assumed to be 'unusual activity'.

Readers will appreciate that while specific examples of the functionality that the systems described herein can provide are included in the present disclosure, such examples are not to be interpreted as limitations as to the functionality that the systems described herein can provide. Other functionality may be provided by the systems described herein, all of which are within the scope of the present disclosure. For the purposes of illustration and not as a limitation, additional examples can include governance, risk, and compliance ('GRC'), threat detection and incident response, identity and access management, network and infrastructure security, data protection and privacy, identity and access management ('IAM'), and many others.

In order to provide the functionality described above, the systems described herein or the deployments that are monitored by such systems may implement a variety of techniques. For example, the systems described herein or the deployments that are monitored by such systems may tag data and logs to provide meaning or context, persistent monitoring techniques may be used to monitor a deployment at all times and in real time, custom alerts may be generated based on rules, tags, and/or known baselines from one or more polygraphs, and so on.

Although examples are described above where data may be collected from one or more agents, in some embodiments other methods and mechanisms for obtaining data may be utilized. For example, some embodiments may utilize agentless deployments where no agent (or similar mechanism) is deployed on one or more customer devices, deployed within a customer's cloud deployment, or deployed at another location that is external to the data platform. In such embodiments, the data platform may acquire data through one or more APIs such as the APIs that are available through various cloud services. For example, one or more APIs that enable a user to access data captured by Amazon CloudTrail may be utilized by the data platform to obtain data from a customer's cloud deployment without the use of an agent that is deployed on the customer's resources. In some embodiments, agents may be deployed as part of a data acquisition service or tool that does not utilize a customer's resources or environment. In some embodiments, agents (deployed on a customer's resources or elsewhere) and mechanisms in the data platform that can be used to obtain data from through one or more APIs such as the APIs that are available through various cloud services may be utilized. In some embodiments, one or more cloud services themselves may be configured to push data to some entity (deployed anywhere), which may or may not be an agent. In some embodiments, other data acquisition techniques may be utilized, including combinations and variations of the techniques described above, each of which is within the scope of the present disclosure.

Readers will appreciate that while specific examples of the cloud deployments that may be monitored, analyzed, or otherwise observed by the systems described herein have been provided, such examples are not to be interpreted as limitations as to the types of deployments that may be monitored, analyzed, or otherwise observed by the systems described herein. Other deployments may be monitored, analyzed, or otherwise observed by the systems described herein, all of which are within the scope of the present disclosure. For the purposes of illustration and not as a limitation, additional examples can include multi-cloud deployments, on-premises environments, hybrid cloud environments, sovereign cloud environments, heterogeneous environments, DevOps environments, DevSecOps environments, GitOps environments, quantum computing environments, data fabrics, composable applications, composable networks, decentralized applications, and many others.

Readers will appreciate that while specific examples of the types of data that may be collected, transformed, stored, and/or analyzed by the systems described herein have been provided, such examples are not to be interpreted as limitations as to the types of data that may be collected, transformed, stored, and/or analyzed by the systems described herein. Other types of data can include, for example, data collected from different tools (e.g., DevOps tools, DevSecOps, GitOps tools), different forms of network data (e.g., routing data, network translation data, message payload data, Wi-Fi data, Bluetooth data, personal area networking data, payment device data, near field communication data, metadata describing interactions carried out over a network, and many others), data describing processes executing in a container, lambda, EC2 instance, virtual machine, or other execution environment), information describing the execution environment itself, and many other types of data.

In some embodiments, one or more of the components described above may be deployed using a secure access service edge (SASE') model or similar model. In a SASE model, the services, functionality, or components described above may be deployed at edge devices (or relatively close to such edge device) such as a user's laptop, tablet, smartphone, or other device. In such a way, network security controls may be delivered on such edge devices. SASE capabilities may be delivered as a service based upon the identity of the entity, real-time context, enterprise security/ compliance policies and continuous assessment of risk/trust throughout the sessions, where the identity of entities can be associated with people, groups of people, devices, applications, services, IoT systems or edge computing locations, and so on. In these embodiments, one or more of the components described above may be deployed at or near the edge devices, and the edge devices may even include local applications that are configured to utilize one or more of the components described above where the components are not deployed on the edge devices themselves.

For further explanation, FIG. 5 sets forth a flowchart illustrating an example method of dynamically generating monitoring tools for software applications in accordance with some embodiments of the present disclosure. Dynamically generating monitoring tools for software applications may be carried out using the systems described above. As such, one or more of the steps depicted in FIG. 5 may be performed by the systems described above.

The example method depicted in FIG. 5 includes inspecting 504, using static code analysis, a non-executable representation 502 of an application to identify one or more points 506 in an application for monitoring. The static code analysis may be performed at the time that an application is compiled, at some other point in a CI/CD pipeline, or at some other time in the development lifecycle, including any time before the application is actually deployed. The static code analysis may be used to identify, for example, points during the execution of the software application where external libraries are accessed, points during the execution of the software application where the application accesses/is accessible by the public internet, points during the execution of the software application where the application is connected to sensitive data sources, and many other potential points of interest in the application. In such an example, the points of interest in the application (as identified through static code analysis) may be determined to be the points in the execution of the application that will be monitored. By monitoring only predetermined points of interest in the application, the amount of monitoring that is needed can be reduced. Reducing the amount monitoring can introduce efficiencies as resources do not need to be dedicated to monitoring and analyzing points in the application's execution that need not be monitored (e.g., points where the application is secure, points where the application is optimized).

In some embodiments, abstract syntax tree ('AST') analyzers may be used for the purposes of identifying particular points of interest in an application. For example, an AST analyzer may identify the nodes of a particular application so that each node may be identified as being a point of interest, nodes of a particular type may be identified as being a point of interest, nodes that are connected to other nodes of a particular type may be identified as being a point of interest, and so on. In some embodiments, additional aspects of the application that do not have a relationship to the code itself may be used to identify particular points of interest in an application. For example, if a particular line of code has a debug symbol attached to it, that line may be identified as being a point of interest in the application by virtue of the fact that a developer (or other tool/person) thought that the line of code was interesting enough to warrant a debug symbol. Although the embodiments described above relate to embodiments where a non-executable representation 502 of an application is inspect 504, in other embodiments a fully executable version of the application may be inspected.

The example method depicted in FIG. 5 also includes, for each of the one or more points 506 in the application, generating 508 a monitoring program 510. The monitoring program 510 may be embodied, for example, one or more extended Berkeley Packet Filter ('eBPF') programs that may be attached to various tracepoints (e.g., tracepoints located at the predetermined points of interest in the application) to monitor aspects of the execution of the application. The particular nature of the monitoring program 510 that is generated 508 may vary, as it may be desirable to monitor different things at different points in the application's execution. In fact, the monitoring program 510 may be attached to a code path and whenever that code path is traversed, the monitoring program 510 can execute. The precise nature of the monitoring program 510 that is generated 508 can be based on the results of the static code analysis. The monitoring program 510 may be generated dynamically based on the results of the static code analysis, for example, by using the static analysis to determine that at a particular point in an application's execution the application may be engaged in data communications over a network such that the monitoring program 510 that is generated 508 must be capable of monitoring data communications-related information (e.g., IP addresses of communication endpoints that are communicated with, whether communications were encrypted, payload included in one or more messages). In another example, static code analysis may reveal that at a particular point in an application's execution may be accessing an external database such that the monitoring program 510 that is generated 508 must be capable of monitoring database access-related information (e.g., queries generated, identity of the database that was accessed, whether credentials were provided as part of the access request), and so on. In these examples, the particular nature of the task being performed by an application at a particular point in its execution (as informed by static analysis) may be used to drive the particular nature of the task being performed such that monitoring program 510 that is generated 508, as the monitoring program 510 that is inserted will need to be configured to monitor the particular tasks being performed by the application. In other embodiments, the monitoring program 510 may be generated 508 dynamically based on the results of the static code analysis in other ways.

Readers will appreciate that because monitoring program 510 are generated 508 that are specifically designed to monitor a particular application, the monitoring of an environment may become more customized to a particular customer's deployment, even as that deployment changes over time with new applications, updated versions of existing applications, and other changes. In fact, the monitoring program 510 are generated 508 may be unique to a particular customer, unique to a particular application, unique to a particular executable, unique to a particular Docker build, unique to a particular environment, unique to a particular point in time, or unique in some other way.

The example method depicted in FIG. 5 also includes, for each of the one or more points 506 in the application, inserting 512, into an executable representation 514 of the application, the monitoring program 510*a*, 510*b*, 510*n* at a location in the executable representation 514 of the application that corresponds to the identified point 506 in the application. The executable representation 514 of the application may be embodied, for example, as one or more fully executable binaries or in some other way. In such an example, the monitoring program 510 may be attached to a code path and whenever that code path is traversed, the monitoring program 510 can execute. By inserting a monitoring program 510a, 510b, 510n at each of the identified points 506 in the application, various things may be monitored at various points 506 of the application's execution.

Figure 6:
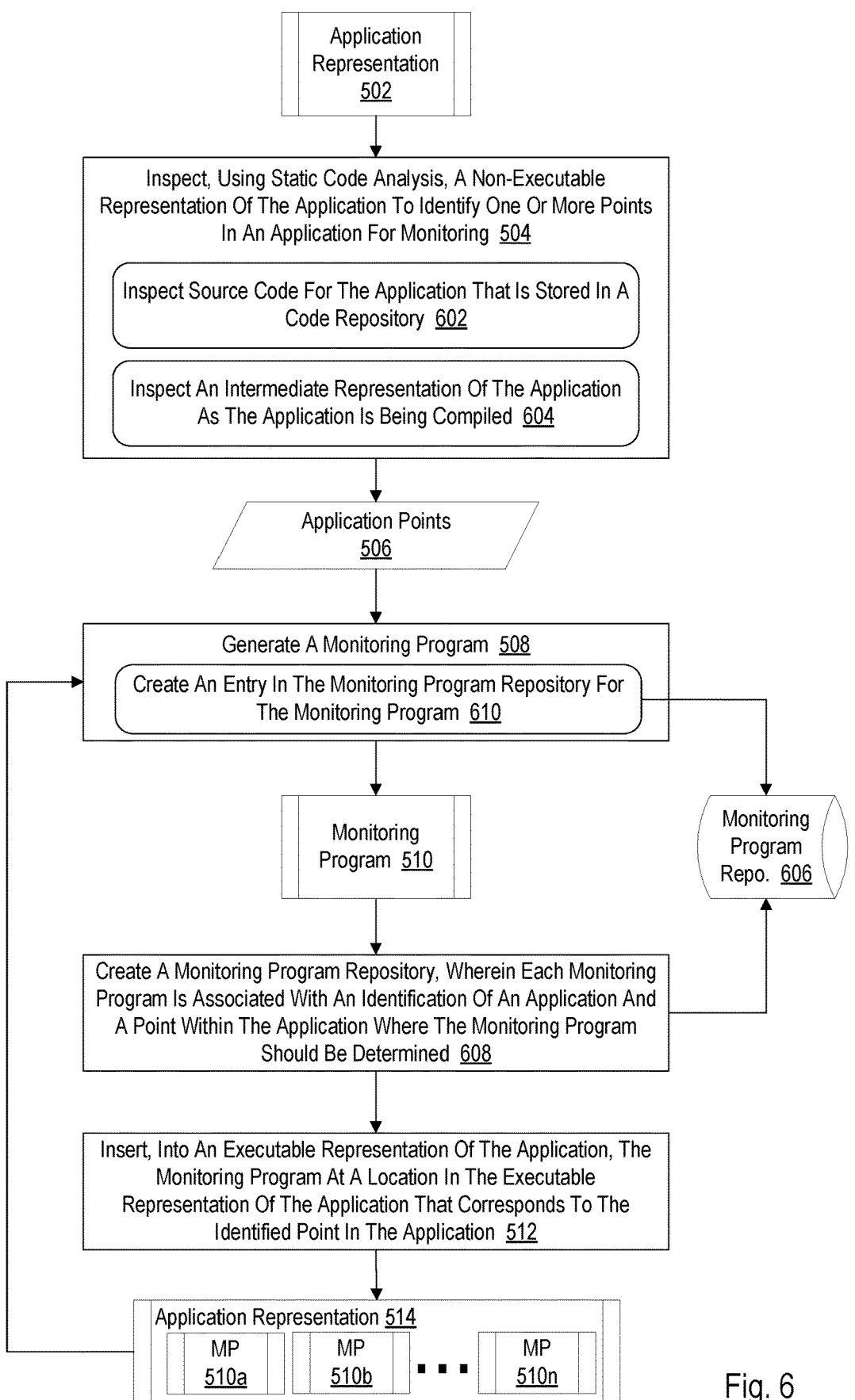
FIG. 6 sets forth a flowchart illustrating an additional example method of dynamically generating monitoring tools for software applications in accordance with some embodiments.

For further explanation, FIG. 6 sets forth a flowchart illustrating an additional example method of dynamically generating monitoring tools for software applications in accordance with some embodiments of the present disclosure. The example method depicted in FIG. 6 is similar to the example method depicted in FIG. 5, as the example method depicted in FIG. 6 includes many of the steps from FIG. 5.

In the example depicted in FIG. 6, inspecting 504 a non-executable representation 502 of an application to identify one or more points 506 in an application for monitoring can include inspecting 602 source code for the application that is stored in a code repository. Inspecting 602 source code for the application that is stored in a code repository may be carried out, for example, by examining each line of code to identify lines that perform some particular function that may be worth monitoring. For example, each line of code may be examined to identify lines of code that receive incoming communications, lines of code that generate outgoing communications, lines of code that issue commands to an external data sources, and so on. Readers will appreciate that because source code for the application is inspected 602, the process of inspecting 504 an application to identify one or more points 506 to be monitored may begin before the application is even compiled or deployed.

In the example depicted in FIG. 6, inspecting 504 a non-executable representation 502 of an application to identify one or more points 506 in an application for monitoring can alternatively include inspecting 604 an intermediate representation of the application as the application is being compiled. The intermediate representation may be embodied, for example, as an AST as described above, as a version of the application that is being compiled, or as some other version of the application that precedes a deployed, executable version of the application. Readers will appreciate that because an intermediate representation of the application is inspected 602, the process of inspecting 504 an application to identify one or more points 506 to be monitored may begin before the application is even deployed.

The example method depicted in FIG. 6 also include creating 608 a monitoring program repository 606. The monitoring program repository 606 may be embodied, for example, as a database, as a table, or as some other appropriate data structure. Each entry in the monitoring program repository 606 may associate a particular monitoring program with an identification of an application and a point within the application (or portion thereof) where the monitoring program should be inserted. In such an example, each application (or portion thereof) may be identified by a hash value that is generated by applying a hash function to the source code of the application (or portion thereof), or by associating some other identified with the application (or portion thereof). Creating 608 a monitoring program repository 606 may be carried out, for example, by creating the appropriate data structure and populating the monitoring program repository 606 with one or more entries as described above.

In some embodiments, the generated eBPF programs may be included in a library or other repository so that the eBPF programs can be reused elsewhere. For example, a hash function may be applied to the source code (or even a binary) for a first application to generate a hash value for the first application. After one or more eBPF programs are generated to monitor the first application (or a component thereof), as other applications are deployed for the same customer or even for other customers, the same hash function may be applied and any subsequently deployed applications (or portions thereof) to generate hash values for those subsequently deployed applications (or portions thereof). In such an example, if the hash value for a subsequently deployed application (or portion thereof) matches the hash value for the first application (or portion thereof), the one or more eBPF programs that were used to monitor the first application may be attached to the same points of the subsequently deployed applications to monitor the subsequently deployed application. Readers will appreciate that although such applications are described as being 'subsequently deployed', in some embodiments the applications may not be actually deployed prior to attaching the one or more eBPF programs that were used to monitor the first application.

The method depicted in FIG. 6 also includes creating 610 an entry in the monitoring program repository 606 for a generated monitoring program 510. Creating 610 an entry in the monitoring program repository 606 for a generated monitoring program 510 may be carried out, for example, by creating an entry that associates the application (or some portion thereof) with a monitoring program 510 that was generated 508 to monitor the application (or some portion thereof). Such an entry may include other information such as, for example, the location in the application where the monitoring program 510 was inserted, or any other relevant information.

Figure 7:
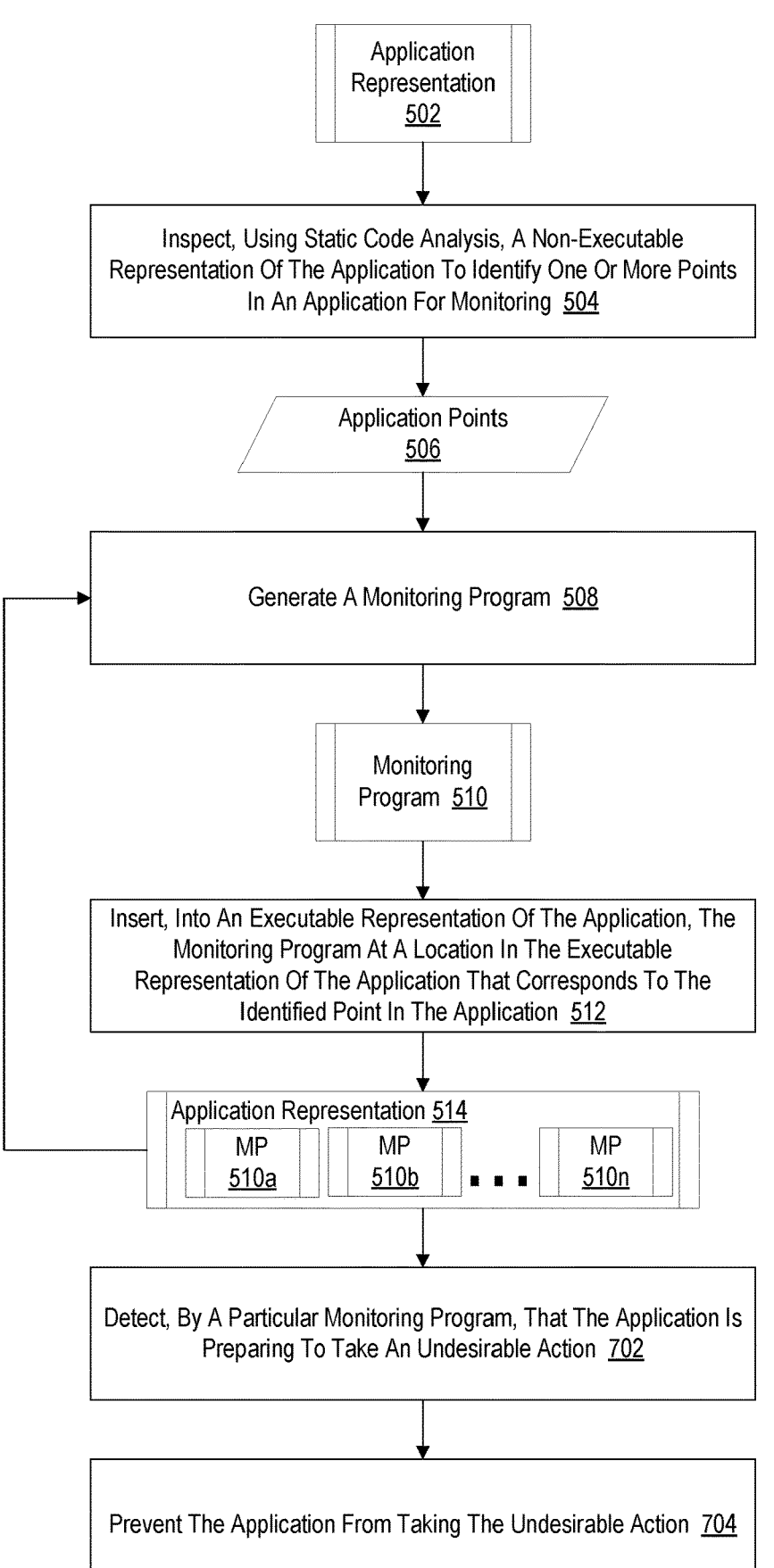
FIG. 7 sets forth a flowchart illustrating an additional example method of dynamically generating monitoring tools for software applications in accordance with some embodiments.

For further explanation, FIG. 7 sets forth a flowchart illustrating an additional example method of dynamically generating monitoring tools for software applications in accordance with some embodiments of the present disclosure. The example method depicted in FIG. 7 is similar to the example methods depicted in FIG. 5 and FIG. 6, as the example method depicted in FIG. 7 includes many of the steps from FIG. 5 and FIG. 6.

The example method depicted in FIG. 7 also includes detecting 702, by a particular monitoring program 510a, 510b, 510n, that the application is preparing to take an undesirable action. One or more of the monitoring programs 510a, 510b, 510n may detect 702 that the application is preparing to take an undesirable action, for example, by monitoring the application for data packets being generated by the application and determining that a not-yet sent data packet is targeting a known malicious address, by monitoring the application for data communications connections that are in the process of being established and determining that a not-yet a pending data communications connection will be established with a known malicious address/actor, and so on. In such an example, because the monitoring programs 510a, 510b, 510n monitor the actions that are being taken by the application rather than monitoring packets that have already been sent/received by the application, undesirable actions can be prevented before they are taken. For example, an undesirable action of establishing a data communications connection between the application and a malicious actor may be prevented when the monitoring program detects that the application is about to establish a data communications connection between the application and the malicious actor.

The example method depicted in FIG. 7 also includes preventing 704 the application from taking the undesirable action. Preventing 704 the application from taking the undesirable action may be carried out, for example, by blocking or sending an instruction to block some pending action. For example, a pending data communications message may not be sent, a pending sequence to open a data communications connection with some communications endpoint may be terminated, and so on.

In some embodiments, a particular monitoring program 510a, 510b, 510n may be configured to inspect data communications messages generated by the application prior to the application sending the data communications messages. The data communications messages may be embodied, for example, as actual data communications packets, as messages (or similar mechanism) that is used to open a data communications session, or as any other data communication between the application and something that is external to the application. For example, a monitoring program 510a, 510b, 510n may be configured to inspect data communications messages generated by a first portion of the application (i.e., a first service) that is sent to a second portion of the application (i.e., a second service).

In some embodiments, a particular monitoring program is configured to monitor for known exploitable conditions. Readers will also appreciate that while the examples described above relate to embodiments in which the actual usage of an application may be monitored using the techniques and technologies described above, in other embodiments the techniques and technologies described above may be utilized for other purposes. For example, the techniques and technologies described above may be used for the purposes of inspecting an application or environment for exploitable conditions. In such an example, exploitable conditions such as an Out-of-bounds Write, Improper Neutralization of Special Elements used in an SQL Command ('SQL Injection'), and many others may be detected by monitoring the actual usage of an application and comparing that usage to rules, heuristics, or some other mechanism to detect the exploitable condition.

Readers will appreciate that the techniques described above may be leveraged in place of (or even in coordination with) packet capture ('PCAP') analysis in which the agents described above capture and analyze individual data packets that travel through a network in the deployment that is being monitored. Unlike PCAP analysis which monitors packets after they have been placed on the wire (i.e., in the network and outside of the application), the techniques described above may be leveraged to monitor the application without the application actually placing data on the wire.

In some embodiments, the techniques described above may be used as part of a real-time (or near real-time) system. Through the usage of static code analysis, points of interest in the execution of an application may be identified and those points of interest may be monitored in real-time for certain conditions. In fact, because the points of interest may be monitored in real-time, alerts could be generated in real-time (or near real-time) upon detecting the occurrence of a particular condition. In addition, because the points of interest may be monitored in real-time, other remedial actions could be taken in real-time (or near real-time) upon detecting the occurrence of a particular condition. Such remedial actions could include, as one example among many possible remedial actions, preventing an application from actually engaging in undesirable activity upon detecting that the application is about to engage in undesirable activity.

Readers will appreciate that although embodiments are described above in which monitoring is achieved using eBPF programs, in some embodiments monitoring may be achieved through the use of other technologies. For example, static code analysis may be used to identify points of interest that may be monitored using uBPF programs, monitored using a Microsoft Windows kernel driver or some other Windows hooking technology that allows the systems described above to do a run-time verification of an application state at various checkpoints, monitored using BPF programs, monitored using pcap (or a variant thereof) programs, or monitored in some other way, including through the use various platforms (e.g., FreeBSD, NetBSD, WinPcap) that can be used to convert BPF instructions into native code.

In some embodiments, monitoring the actual usage of an application and performing static analysis of the application may be carried out in a system that includes a feedback loop such that the results from monitoring the actual usage of an application are used to improve the static analysis of the application. For example, monitoring the actual usage of the application as described above may reveal that the application or environment is vulnerable to some set of malicious acts (e.g., bitcoin mining attack, ransomware attacks, etc. . . . ). In such an example, some vulnerabilities may only be detected when the systems described above are monitoring the actual usage of an application, when the systems described above are monitoring the state of an environment, or when the systems described above are engaged in some other form of monitoring that can provide context into the current state of some resource (e.g., an application, a data store, a virtual machine, a container cluster, etc. . . . ). Some other vulnerabilities, however, may be detected statically. As such and in accordance with some embodiments, the systems described above may be configured to evaluate whether a vulnerability, anomaly, or some other condition that was detected through monitoring the application could have been detected statically.

Figure 8:
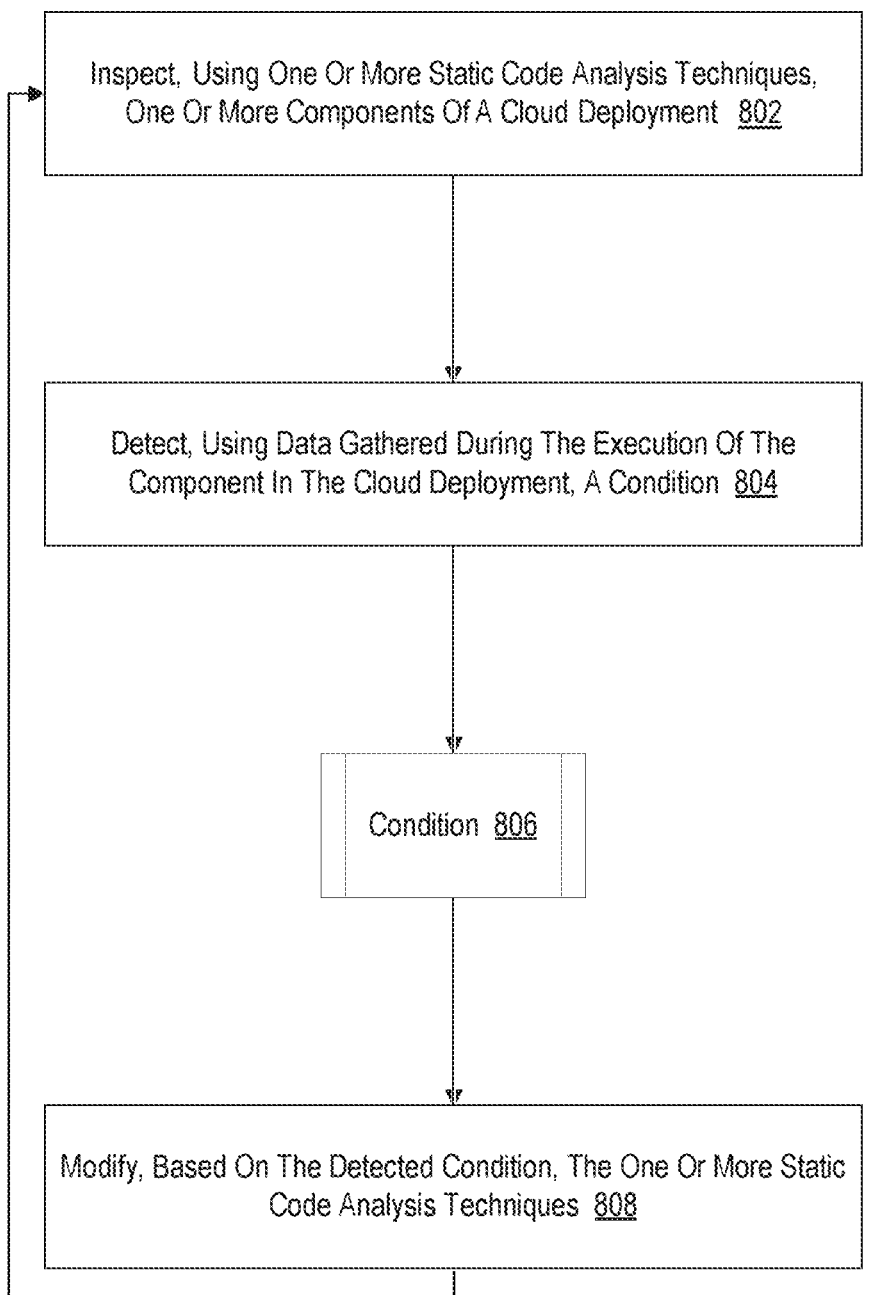
FIG. 8 sets forth a flow chart illustrating an example method of using real-time monitoring to inform static analysis in accordance with some embodiments of the present disclosure.

For further explanation, FIG. 8 sets forth a flow chart illustrating an example method of using real-time monitoring to inform static analysis in accordance with some embodiments of the present disclosure. The example method depicted in FIG. 8 may be carried out, for example, by one or more modules of computer program instructions executing on physical hardware, virtual hardware, or in some other execution environment (e.g., one or more AWS Lambda's, one or more containers). Such modules may be part of the systems described above or otherwise coupled to the systems described above.

The example method depicted in FIG. 8 includes inspecting 802, using one or more static code analysis techniques, one or more components of a cloud deployment. The one or more components of a cloud deployment may be embodied as one or more applications, one or more services, one or more microservices, some portion of an application, and so on. The one or more components of the cloud deployment may be inspected 802 using one or more static code analysis techniques, for example, by examining source code before a program is run where source code is analyzed against a set (or multiple sets) of coding rules. Static code analysis (also referred to as 'static program analysis') is distinguishable from dynamic analysis (which is performed on programs during their execution) largely by virtue of static code analysis being performed without executing the program, application, or executable object associated with the source code of such a program, application, or executable object. In such an example, the static code analysis techniques may be used to perform unit level, technology level, system level, and/or mission level analysis. Such static code analysis may be used to detect some vulnerable condition in an application, to detect some exploitable aspect of an application, or to otherwise detect deficiencies in the one or more components of the cloud deployment.

The example method depicted in FIG. 8 also includes detecting 804, using data gathered during the execution of the component in the cloud deployment, a condition 806. Detecting 804 a condition 806 may be carried out, for example, as described above where agents are deployed on or near various components in a cloud deployment to gather data which is subsequently analyzed in a variety of ways. In some embodiments, such an analysis may reveal anomalous activity (i.e., a condition 806) resulting in an alert being raised, a remediation workflow being initiated, or some other action being taken. In FIG. 8 and as described above, detecting 804 a condition 806 (e.g., an anomaly, a violation of some rule, a violation of some policy) is done using data gathered during the execution of the component in the cloud deployment. That is, detecting 804 a condition 806 is done using dynamic analysis techniques.

The example method depicted in FIG. 8 includes modifying 808, based on the detected condition 806, the one or more static code analysis techniques. Modifying 808 the one or more static code analysis techniques based on the detected condition 806 may be carried out to implement the feedback loop described above where dynamic analysis is used to inform, improve, or otherwise influence what static analysis is performed on the components in a cloud deployment. In such a way, conditions that are detected via dynamic analysis may be evaluated to determine whether such conditions could be detected/prevented using static analysis techniques, including static code analysis techniques.

In the example method depicted in FIG. 8, modifying 808 the one or more static code analysis techniques based on the detected condition 806 may be carried out, for example, by creating one or more static code analysis rules designed to capture the detected condition 806. Consider an example in which a condition 806 is detected 804 using data gathered during the execution of the component in the cloud deployment where an SQL injection is detected. In such an example, in response to detecting the SQL injection via dynamic analysis, the one or more static code analysis techniques may be modified 808 so as to add one or more static code analysis rules that look for code performing SQL queries and check whether or not those queries are dependent upon untrusted, external input. Such static code analysis techniques may be modified to include rules to determine whether the untrusted, external input is sanitized to remove any potentially malicious or dangerous content before use. If the untrusted, external input is not sanitized (meaning that untrusted input is used in an SQL query), then the modified static code analysis techniques may label the associated source code as containing a potential SQL injection vulnerability.

Although the example described above related to an embodiment where the one or more static code analysis techniques are modified 808 based on the detected condition 806, in other embodiments the one or more static code analysis techniques are modified 808 based on the data gathered during the execution of the component in the cloud deployment. In fact, in some embodiments the one or more static code analysis techniques may be modified 808 based on some combination that includes the detected condition 806 and the data gathered during the execution of the component in the cloud deployment.

For further explanation, FIG. 9 sets forth a flow chart illustrating an additional example method of using real-time monitoring to inform static analysis in accordance with some embodiments of the present disclosure. The example method depicted in FIG. 9 is similar to the example method depicted in FIG. 8, as FIG. 9 also includes: inspecting 802, using one or more static code analysis techniques, one or more components of a cloud deployment; detecting 804, using data gathered during the execution of the component in the cloud deployment, a condition 806; and modifying 808, based on the detected condition 806, the one or more static code analysis techniques.

The example method depicted in FIG. 9 also includes modifying 902, based on one or more modifications to the static code analysis techniques, real-time monitoring of the component. Modifying 902 real-time monitoring of the component based on one or more modifications to the static code analysis techniques may be carried out, for example, by removing real-time monitoring for conditions that the static code analysis techniques have been modified 808 to detect. For example (and continuing with the examples described above), if the static code analysis techniques have been modified 808 to detect all SQL injection vulnerabilities and the source code has been determined to not have any SQL injection vulnerabilities, the real-time monitoring of the component may be modified 902 to not look for SQL injections. Modifying 902 real-time monitoring (i.e., dynamic analysis) of the component based on one or more modifications to the static code analysis techniques may be carried out to implement the feedback loop described above where static analysis is used to inform, improve, or otherwise influence what dynamic analysis is performed on the components in a cloud deployment. In such a way, conditions that are incapable of detection via static analysis, expensive to detect via static analysis, or otherwise determined to be more capably discovered via real-time monitoring (i.e., dynamic analysis) may be evaluated to determine whether such conditions could be better detected/prevented using real-time monitoring (i.e., dynamic analysis). Likewise, the burden to detect conditions that could be detected via static analysis may be shifted to the static code analysis tools and shifted away from the dynamic analysis tools.

For further explanation, FIG. 10 sets forth a flow chart illustrating an additional example method of using real-time monitoring to inform static analysis in accordance with some embodiments of the present disclosure. The example method depicted in FIG. 10 is similar to the example methods depicted in FIG. 8 and FIG. 9, as FIG. 10 also includes: inspecting 802, using one or more static code analysis techniques, one or more components of a cloud deployment; detecting 804, using data gathered during the execution of the component in the cloud deployment, a condition 806; and modifying 808, based on the detected condition 806, the one or more static code analysis techniques.

The example method depicted in FIG. 10 also includes detecting 1002, using the modified one or more static code analysis techniques, the condition 806. Detecting 1002 the condition 806 using the modified static code analysis techniques may be carried out, for example, by re-performing static code analysis on the one or more components using the modified one or more static code analysis techniques. Readers will appreciate that in this example, an actual occurrence of a particular condition 806 may not be possible to detect by the modified static code analysis techniques. For example, if the detected condition 806 was an SQL injection, the modified static code analysis techniques would not detect an actual SQL injection given that an actual SQL injection would only occur when the one or more components (e.g., an application) were executing. As such, detecting 1002 the condition 806 may be carried out by detecting that some code is vulnerable to the detected condition 806 or is otherwise structured such that the detected condition 806 could occur is the code was executed.

The example method depicted in FIG. 10 also includes determining 1004 whether the condition 806 could have been detected using static code analysis techniques. Determining 1004 whether the condition 806 could have been detected using static code analysis techniques may be carried out, for example, by determining that the condition 806 is of a predetermined type that is discoverable via static analysis, by determining that the condition 806 was discoverable without needing any of the real-time execution data, by determining that the condition 806 is of a type of vulnerability that can be detected using static code analysis, and so on. Continuing with the example described above in which the detected condition was an SQL injection, this type of condition may be of a predetermined type (i.e., an SQL injection vulnerability type) that can be detectable via static analysis. In such an example, as conditions are detected they may be categorized and designated as the types of conditions that can or cannot be detected via static analysis. Such a categorization and designation of conditions may be done by a system administrator or other user. Alternatively, such a categorization and designation of conditions may be machine learned. In such a way, a determination may be made as to whether a condition 806 that actually occurred in a particular cloud deployment could have been avoided with more rigorous static analysis.

In the examples described above, static code analysis techniques deployed for a first customer may be different than static code analysis techniques deployed for a second customer. In such an example, a first customer may have a first cloud deployment and the second customer may have a second cloud deployment, such that the static code analysis techniques that are used to inspect the components in each cloud deployment are distinct.

In the examples described above, the condition 806 may be detected for a component in a cloud deployment of a first customer and the static code analysis techniques that were modified may be used for inspecting components in a cloud deployment of a second customer. Alternatively, the condition 806 may be detected for a component in a first cloud deployment and the static code analysis techniques that were modified may be used for inspecting components in a second cloud deployment. As such, static code analysis techniques for a particular customer (or a particular cloud deployment) may be improved without actually deploying components in the particular customer's cloud deployment. Readers will appreciate that by using dynamic analysis in another customer's cloud deployment to inform, improve, or otherwise influence what static analysis is performed on the components in a cloud deployment, a customer's cloud deployment may be inspected by well-conceived static code analysis techniques from the outset.

In the examples described above, the static code analysis techniques may be used to inspect source code in a code repository prior to deploying the source code in the cloud deployment. The source code repository may be embodied, for example, as a Git Repository or as some other repository. The static code analysis techniques may be used to inspect source code in a code repository prior to deploying the source code in the cloud deployment, for example, by using static analysis as part of the software development process and providing the results of such static analysis to developers, quality assurance teams, and so on. As such, the use of the improved static code analysis techniques may be leverage prior to actually deploying a component in a cloud environment, thereby improving the quality of such components.

Evaluating whether a vulnerability, anomaly, or some other condition that was detected through monitoring the application could have been detected statically may be carried out in a variety of ways. In some embodiments, evaluating whether a vulnerability, anomaly, or some other condition that was detected through monitoring the application could have been detected statically may be carried out through the use of machine learning techniques. For example, information describing an application, an environment, or other resources may be provided to a machine learning model along with information describing various conditions that were detected by monitoring the application, environment, or other resources. Through the usage of such machine learning techniques, static markers of an application, an environment, or other resources may be identified that correlate with the occurrence of some detected condition. For example, such machine learning techniques may reveal that environments that experience a successful bitcoin mining attack (as detected by the systems described above monitoring such environments) frequently have some combination of configuration characteristics that makes the environment more prone to bitcoin mining attack. In such an example, the static analysis that is performed may be augmented using such a feedback loop to evaluate an environment for the identified combination of configuration characteristics that makes the environment more prone to bitcoin mining attack. Readers will appreciate that by using such a feedback loop, the systems described above may evolve over time to improve their static analysis capabilities such that vulnerabilities or other conditions are prevented from ever occurring—rather than being detected through monitoring.

Readers will appreciate that although the example described above relates to an embodiment in which a feedback loop is used to expand static analysis capabilities, in other embodiments the feedback loop may be used to optimize static analysis capabilities, which may even include identifying static analysis functions that need not be performed. Some static analysis capabilities may not need to be performed, for example, because there may be no correlation between some statically detectable attributes of an application, an environment, or other resource and the occurrence of any conditions that may be detected through monitoring the application, the environment, or the other resource. In such an example, because performing static analysis does come with some costs (e.g., utilizing resources to perform static analysis, delays in deploying applications or resources generally), the costs associated with performing some static analysis capabilities may not be justified by the gains that can be achieved by performing such static analysis. In order to detect such situations, information describing an application, an environment, or other resources may be provided to a machine learning model along with information describing various conditions that were detected by monitoring the application, environment, or other resources. Through the usage of such machine learning techniques, static markers of an application, an environment, or other resources may be identified that have no (or sufficiently low when compared to some threshold) correlation with the occurrence of some detected condition. When a lack of correlation is detected, static analysis capabilities that are designed to discover such inconsequential static markers of an application, an environment, or other resources may be disabled.

Readers will further appreciate that, as was the case with monitoring applications, the particular static analysis capabilities that are enabled for one customer may differ from the static analysis capabilities that are enabled for another customer. The static analysis capabilities that are enabled for each customer may be different, for example, because the customers have deployed different applications in different environments, because the customers have resources that are utilized differently, and for a variety of other reasons. For example, while two customers may have containerized applications that are each deployed in a K8s cluster, one customer may have their K8s cluster only exposed via a private network whereas another customer may have their K8s cluster exposed to the public internet. As such, the conditions (e.g., threats, vulnerabilities) that need to be either prevented through static analysis or detected through monitoring may be different for each customer.

Readers will further appreciate that, as was the case with monitoring applications, the particular static analysis capabilities that are enabled/disabled for one customer may be influenced by the static analysis capabilities that are enabled/disabled for another customer. The static analysis capabilities that are enabled/disabled for each customer may be similar, for example, because the customers have deployed similar applications in similar environments, because the customers have resources that are utilized similarly, and for a variety of other reasons. For example, two customers may have containerized applications that are each deployed in a K8s cluster that exposed to the public internet. As such, the conditions (e.g., threats, vulnerabilities) that need to be either prevented through static analysis or detected through monitoring may be similar for each customer.

In some embodiments, the outputs of the systems described above (including the polygraph that is generated as described above) may continuously be evaluated to ensure that the systems described above are producing useful output. Readers will appreciate that generating polygraphs (and other forms of output) comes with a cost. For example, storage resources need to be consumed to store data describing a customer's environment, processing resources need to be consumed to process (including enriching) the data, processing resources need to be consumed to evaluate the data for the presence of certain conditions, and so on. Because generating polygraphs (and other forms of output) comes with a cost, the systems described above may be configured to evaluate whether the output that is being generated is useful, so that costs can be avoided if those costs only result in relatively low value output. Readers will appreciate that, as another motivation to avoid producing low value output, presenting low value output to customers also has the possibility of degrading the customer's experience, distracting the customer from high value output, and other negative impacts.

In order to avoid producing relatively low value output, the systems described above may be configured to evaluate a customer's utilization of its output as an indication of the relative value of the output. For example, if a first type of output (e.g., alerts related to some particular vulnerability) is generally acted upon whereas a second type of output (e.g., alerts related to a different vulnerability) is generally ignored, this may be an indication that second type of output is relatively low value output whereas the first type of output is relatively high value output. In other embodiments, other information related to the manner in which one or more customers consume output may be used to determine the usefulness of the output. Such other information can include, for example, how quickly a customer acted upon some output, whether a customer presented the output to others (e.g., did an admin forward the output to peers), how a customer categorized the resolution of some output (e.g., resolved v. ignored), and so on.

Readers will appreciate that in some embodiments the value of some output may be specific to a particular customer (e.g., one customer may routinely ignore a first type of output relative to other types of output while another customer routinely acts upon the first type of output relative to other types of output). In other embodiments, however, the value that is assigned to some output may be influenced by how other customers interact with (or consume) that output. In fact, a combination of such approaches may be used for each customer as one type of output may be treated in a way that is highly specific to a particular customer while another type of output may not be treated in a way that is specific to the particular customer.

In some embodiments, by modeling outputs as described above, changes and modifications to the systems described above may be evaluated in a more objective manner. For example, if an update to the system causes relatively high value output to be hidden and also causes relatively low value output to be promoted, this change may be viewed negatively. If an update to the system causes relatively high value output to be promoted and also causes relatively low value output to be hidden, however, this change may be viewed positively. In such a way, the quality of the system described above may be improved by modeling output in terms of its usefulness. Likewise, the systems may operate more efficiently by modeling output in terms of its usefulness such that the system does not consume valuable resources (e.g., storage, compute, time) in the pursuit of output that is not sufficiently useful as indicated by a customer's consumption of that output.

For further explanation, FIG. 11 sets forth a flowchart illustrating an example method of configuring cloud deployments (or components in a software development pipeline) based on learnings obtained by monitoring other cloud deployments (or components in another software development pipeline) in accordance with some embodiments of the present disclosure. The cloud deployments 1108, 1114 may be similar to the cloud deployments described above, where a particular cloud deployment can include a variety of components 1110, 1112 such as one or more applications, one or more data sources, networking resources, processing resources, and other resources. Such components 1110, 1112 may, in some embodiments, be deployed in the cloud deployments 1108, 1114 using one or more as-a-service models where software, infrastructure, platforms, databases, and other components as delivered as services. Configuring cloud deployments 1108, 1114 based on learnings obtained by monitoring other cloud deployments may be carried out using the systems described above. As such, one or more of the steps depicted in FIG. 11 may be performed by the systems described above. Readers will appreciate that although the examples described here relate to an embodiment where learnings that are related to one cloud deployment are used to improve another cloud deployment, in other embodiments learnings that are obtained by monitoring or otherwise observing a first software development pipeline may be used to improve a second first software development pipeline.

The example method depicted in FIG. 11 includes determining 1102 normal behavior for one or more components 1110 in a first cloud deployment 1108. Determining 1102 normal behavior for one or more components 1110 in a first cloud deployment 1108 may be carried out, for example, as described in greater detail above (at times described as identifying 'normal activity') by the systems described above (also referred to herein as a 'data platform').

The example method depicted in FIG. 11 also includes determining 1104 normal behavior for one or more components 1112 in one or more other cloud deployments 1114. Determining 1104 normal behavior for one or more components 1112 in one or more other cloud deployments 1114 may also be carried out, for example, as described in greater detail above (at times described as identifying 'normal activity') by the systems described above.

In some embodiments, a customer-specific data platform may be used to analyze, monitor, or otherwise observe a particular customer's cloud deployment (or some other deployment). Within such a cloud deployment, various clusters may exist. For example, a collection of microservices may form a cluster by virtue of those microservices communicating only (or mostly) with each other. Likewise, one or more cloud computing instances (e.g., one or more EC2 instances) and a database may form a cluster by virtue of the EC2 instances accessing the database as the only source of data utilized by the EC2 instances. Using the techniques and mechanisms described above, such clusters may be identified. Although clusters may be identified and characteristics associated with the cluster may be learned, limited insights may be gained if only a particular customer's cloud deployment is analyzed, monitored, or otherwise observed. In accordance with embodiments of the present disclosure, cross-customer analysis may be leveraged to gain deeper insights than would be gained if only a single customer's cloud deployment is analyzed, monitored, or otherwise observed.

In some embodiments, cross-customer analysis may be carried out by gathering information related to cloud deployments (or some other deployments) for multiple customers and comparing such information. Using the example described above, information describing clusters identified in a first customer's cloud deployment may be compared to information describing clusters identified in a second customer's cloud deployment for the purposes of identifying similar or identical clusters in each customer's cloud deployment.

Consider an example in which each customer's deployment included a web server that was deployed in one or more EC2 instances. In such an example, a particular cluster that represents the web server may be identified in each customer's deployment. For example, a first cluster in the first customer's deployment may represent a first web server and a second cluster in the second customer's deployment may represent a second web server. Because the first cluster and the second cluster would have similar characteristics (e.g., each cluster receives data communications using HTTP or HTTPS or any other suitable communication protocol, each cluster communicates with a web browser, each cluster requires similar computing resources, and so on), the first cluster and the second cluster may be identified as being identical clusters by comparing the characteristics of each cluster that each cluster. This process may be repeated across the cloud deployments for many customers such that a collection of 'web server' clusters (in this example) may be identified.

Readers will appreciate that although the example described above relates to an embodiment where a collection of 'web server' clusters are identified in different customer's cloud deployments, identifying the nature or type (e.g., a web server) of the clusters is not required. In fact, by comparing the characteristics of different clusters to each other, similar or identical clusters may be identified even if the exact nature/type of those clusters is not known. For example, a comparison of the characteristics of multiple clusters may only reveal that the cluster are identical, even if such a comparison does not reveal that clusters are 'web server' clusters. Multiple clusters that have been identified as being identical (or sufficiently similar as measured by a threshold) will be referred to throughout the remainder of this document as a "cluster set," where the clusters that are members of the cluster set may be deployed across multiple customer's cloud deployments.

In some embodiments, information describing each member of the cluster set may be utilized to identify distributions across the cluster set. Distributions may be identified for traditional resource consumption metrics such as, for example, CPU usage, memory usage, network bandwidth usage, and others. A distribution may reveal, for example, that all members of the cluster set utilize between 10-60 Mb/s of network bandwidth, with the vast majority of members of the cluster set utilize between 45-60 Mb/s of network bandwidth. Readers will appreciate that distributions may also be identified for other quantifiable characteristics of each cluster. Such quantifiable characteristics can include, for example, the failure rate of a cluster or particular components thereof, an identification of communication protocols used by a cluster or particular components thereof, an identification of the types of communications endpoints that a cluster or particular components thereof communicate with (e.g., endpoints that reside on the public internet v. endpoints that are in a private network), characteristics that can be classified by a binary value (e.g., does any component in the cluster perform privileged operations), information describing the various privileges that are given to a particular cluster, and many more.

In some embodiments, the distributions may be used to identify 'normal' behavior for a particular cluster. Consider an example in which the cluster set is identified, where each member of the cluster set represents a payroll system deployed in a particular customer's cloud deployment. In such an example, a distribution may be identified which indicates that all members of the cluster communicate with (and has privileged access to) the same set of cloud services, including: 1) a cloud database service (e.g., Amazon Aurora, Microsoft Azure SQL Database, Amazon Relational Database Service, Google Cloud SQL, Amazon DynamoDB), 2) a vendor provided SaaS offering that provides bill payment services, and 3) a vendor provided SaaS offering that provides accounting services. In such an example, by looking at each member of the cluster set and identifying that each member communicates with the same set of cloud services, a baseline may be established that identifies 'normal' behavior for each member of the cluster set, at least with respect to the specific characteristic (i.e., what cloud services are utilized by members) that the distribution is based on. As such, if monitoring a particular cluster revealed that some member of the cluster set accessed a source code repository cloud service (e.g., GitHub Enterprise on AWS), this sort of access would be outside of the typical distribution for this cluster set and could serve as the basis for raising an alert, denying access to the service, or initiating some other alerting/remediation workflow. Readers will appreciate that many distributions may be created for each cluster set, where each distribution is based on one or more characteristics of the members of the cluster set.

The example method depicted in FIG. 11 also includes recommending 1106, based on the normal behavior for one or more components 1112 in one or more other cloud deployments 1114, a change to the first cloud deployment 1108. Recommending 1106 a change to the first cloud deployment 1108 may be carried out, for example, in response to determining that the normal behavior in one or more other cloud deployments 1114 differs from the normal behavior for one or more components 1110 in a first cloud deployment 1108. In such an example, changes to the first cloud deployment 1108 may be recommended that (if implemented) would cause the first cloud deployment 1108 to be more similar to the other cloud deployments 1114. For example, if the normal behavior in one or more other cloud deployments 1114 indicates that all computing resources (e.g., virtual machines, container, serverless computing resources) communicate with each other using a particular secure data communications protocol and the normal behavior for one or more components 1110 in a first cloud deployment 1108 is for computing resources to communicate using some other data communications protocol, a change may be recommended that involves reconfiguring the computing resources to communicate using the particular secure data communications protocol.

Readers will appreciate that in some embodiments the mere fact that normal behavior in a first cloud deployment 1108 deviates from normal behavior in one or more other cloud deployments 1114 may be sufficient rationale for recommending 1106 a change to the first cloud deployment 1108. That is, a departure from normality and standard practices alone may result in recommending 1106 a change to the first cloud deployment 1108. In other embodiments, recommending 1106 a change to the first cloud deployment 1108 may only occur where the normal behavior in one or more other cloud deployments 1114 is determined to be superior to the normal behavior in the first cloud deployment 1108. For example, recommending 1106 a change to the first cloud deployment 1108 may only be carried where the normal behavior in one or more other cloud deployments 1114 is representative of a stronger security posture than the normal behavior in the first cloud deployment 1108.

Consider an example in which a particular threat was detected (in part by detecting a deviation from normal behavior for one or more components 1112) in a particular customer's cloud deployment 1114, where the threat turned out to be a ransomware attack, which may in some embodiments include an encryption component and/or a data theft or leakage component. In such an example, if an identical (or sufficiently similar, following a general recognized pattern or 'fingerprint') threat is detected in the first customer's cloud deployment 1108 (in part by detecting a similar deviation from deviation from normal behavior for one or more components 1110), information describing the remedial actions (e.g., disabling encryption, increasing the frequency of backups, locking down a backup system, blocking transmission of data externally, etc.) that were taken by the particular customer 1114 may even recommended 1106 as changes to be made to the first cloud deployment 1108. Furthermore, if many customers had experienced the same attack and the data platform could determine with sufficient certainty that the first cloud deployment 1108 was experiencing the same attack, workflows may be automatically initiated to carry out various remedial actions.

Readers will appreciate that although the examples described above relate to embodiments where learnings that are related to one cloud deployment are used to improve another cloud deployment (i.e., "cross-customer learnings"), in other embodiments learnings that are obtained by monitoring or otherwise observing a first software development pipeline may be used to improve a second first software development pipeline. In fact, other details related to obtaining and utilizing cross customer learnings, as described in greater detail in U.S. Ser. No. 17/671,199, can similarly be applied in the context of a software development pipeline. U.S. Ser. No. 17/671,199, the entire disclosure of which, except for any definitions, disclaimers, disavowals, and inconsistencies, is incorporated herein by reference.

Figure 12:
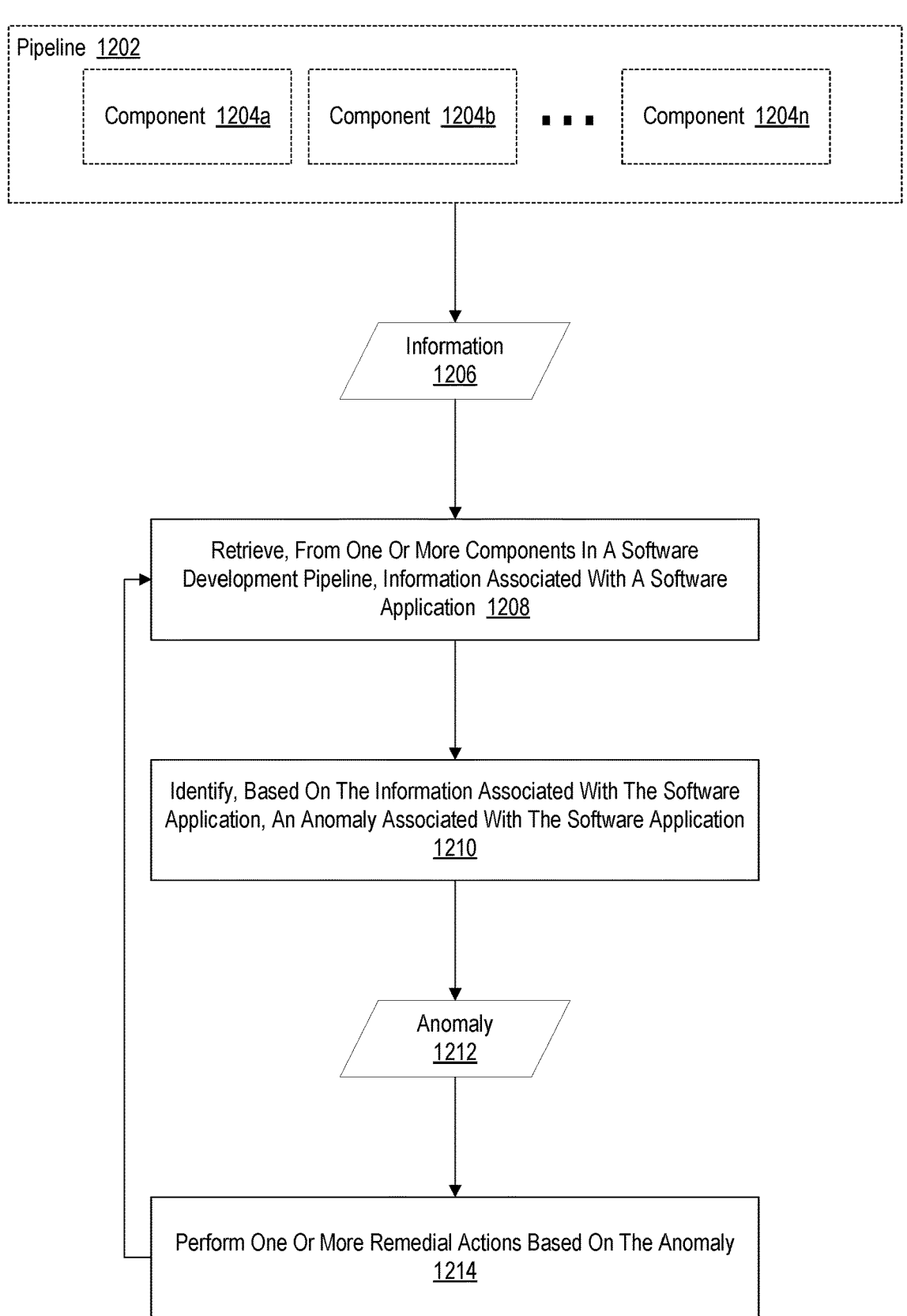
FIG. 12 sets forth a flow chart illustrating an example method of monitoring a software development pipeline in accordance with some embodiments.

For further explanation, FIG. 12 sets forth an example method of monitoring a software development pipeline 1202 in accordance with some embodiments of the present disclosure. The example method depicted in FIG. 12 may be carried out, for example, by one or more modules of computer program instructions executing on physical hardware, virtual hardware, or in some other execution environment (e.g., one or more AWS Lambda's, one or more containers). Such modules may be part of the systems described above or otherwise coupled to the systems described above.

The example method depicted in FIG. 12 includes retrieving 1208, from one or more components 1204*a*, 1204*b*, 1204*n* in the software development pipeline 1202, information 1206 associated with a software application. The software application may include a software application executable in a variety of computing environments, including cloud-based systems, on-premises systems, and the like. For example, in some embodiments, an instance or version of the software application may be deployed in a customer-facing or customer-accessible environment (e.g., a production environment). As another example, the software application may be embodied as source code or other resources stored in a version control system or source code repository such as Git. Accordingly, the software application may or may not be deployed to a production environment, with the software application being under development in the software development pipeline 1202. In some embodiments, the software application may be embodied as one or more containerized applications executable or deployable in a container orchestration environment such as Kubernetes.

Accordingly, in some embodiments, the software development pipeline 1202 includes various hardware and software resources facilitating the development, testing, and deployment of the software application. As an example, the software development pipeline 1202 may be implemented as a continuous integration/continuous deployment (CI/CD) pipeline.

The software development pipeline 1202 may facilitate various stages of the development and deployment process for the software application. For example, in some embodiments, the software development pipeline 1202 includes endpoint devices for developers or other entities that may write compile code for the software application (e.g., a "build" stage). In some embodiments, the software development pipeline 1202 includes resources for testing the software application, including test suites executed on the endpoint devices as well as in a version control system or source code repository (e.g., a "test" stage).

In some embodiments, the software development pipeline 1202 includes resources for a version control system or source code repository. For example, such a code repository may store source code generated or contributed by developers via endpoint devices. As another example, the source code repository may maintain a code branch that is compiled and deployed into a production environment (e.g., a "release" stage). Accordingly, the developer-produced code may be pushed or merged into this branch for subsequent deployment.

In some embodiments, the software development pipeline 1202 includes resources for deploying the software application to a production or customer-facing environment (e.g., a "deployment" stage). Accordingly, the software deployment and development pipeline 1202 may include scripts or code for allocating computational resources (e.g., in a cloud-computing environment or other environment) that facilitate deployment of the software application. As an example, the software development pipeline 1202 may include resources that execute infrastructure-as-code (IaC) scripts to allocate resources for application deployment. As another example, the software development pipeline 1202 may include a container orchestration system such as Kubernetes to manage the resource allocation and deployment of containerized applications.

Each of these various components for the various stages of the software development pipeline 1202 may correspond to a particular component 1204*a,b-n*. The information 1206 may then describe various actions performed in or by a particular component 1204*a,b-n*. For example, the information 1206 may describe code submissions and therefore describe a particular user or entity submitting code to a code repository. The information 1206 may also describe various build-time dependencies (e.g., for particular libraries, applications, and the like) for the software application as indicated in source code. The information 1206 may further include particular portions of source code, or an entirety of source code for the software application. The information 1206 may also describe the results of various test operations performed by submitted or stored code in the repository. The information 1206 may further describe actions related to merging submitted code into a master branch or other deployable code branch for the software application. The information 1206 may also include logs or other data describing events related to the compilation and deployment of the software application. One skilled in the art will appreciate that these examples of information 1206 are merely non-limiting illustrative examples, and that other kinds of information 1206 related to the software development pipeline 1202 may also be retrieved 1208.

The example method depicted in FIG. 12 also includes identifying 1210, based on the information 1206 associated with the software application, an anomaly 1212 associated with the software application. In some embodiments, the anomaly 1212 may include a new user or account submitting code for the application (e.g., to a branch of code for the software application). In some embodiments, the anomaly 1212 may include a user lacking a certification, signature, or other credential attempting to submit code for the application.

In some embodiments, the anomaly 1212 may include a failed compilation or test for the application. In some embodiments, the anomaly 1212 may include newly failed test (e.g., a test that had previously passed that is now failed). In some embodiments, the anomaly 1212 may include a failed vulnerability scan. The vulnerability scan may include a scan of source code (e.g., a static code analysis). In some embodiments, the vulnerability scan may include a scan of a containerized application. In some embodiments, as will be described in further detail below, the vulnerability scan may include a scan of one or more build-time dependencies.

In some embodiments, the anomaly 1212 may include a temporal anomaly based on a known or predefined time series or schedule. For example, in some embodiments, the anomaly 1212 may include a scheduled build or deployment varying from a defined or inferred schedule or frequency. In some embodiments, the anomaly 1212 may include a code submission or merge request occurring at a time varying from an inferred or defined schedule or frequency. In some embodiments, the anomaly 1212 may include a location-based or geographic anomaly, such as a code submission, build request, deployment request, or other request originating from an aberrant location or falling out of some defined geographic boundary. One skilled in the art will appreciate that other anomalies 1212 may also be identified 1210 and are contemplated within the scope of the present disclosure.

The example method depicted in FIG. 12 also includes performing 1214 a remedial action based on the anomaly 1212. In some embodiments, the remedial action includes presenting an alert associated with the anomaly 1212. For example, in some embodiments, the alert may include a log entry identifying the anomaly 1212. In some embodiments, the alert may include a notification in a dashboard or other user interface presented to a user associated with the software application (e.g., an administrator, a developer, and the like). In some embodiments, the alert may include an email notification, push notification, or other visual notification as can be appreciated.

In some embodiments, the remedial action includes preventing one or more actions or stages of the software development pipeline 1202. For example, in some embodiments, the remedial action includes preventing a deployment of the software application. In some embodiments, the remedial action includes preventing a build or compilation of the software application. In some embodiments, the remedial action incudes preventing a merger of a branch of code associated with the anomaly 1212 into the code of the software application.

In some embodiments, the remedial action includes rolling back a deployed instance of the software application. For example, a previous version of the software application (e.g., created prior to identification of the anomaly 1212) stored in a code repository may be compiled and deployed in place of a currently executed instance of the software application.

In some embodiments, the remedial action includes deleting or isolating particular branches of source code associated with the anomaly 1212. For example, particular branches submitted by a user associated with the anomaly 1212 may be rolled back, deleted, or isolated (e.g., prevented from merger) in response to identifying the anomaly 1212. In some embodiments, particular user access may be blocked or otherwise restricted in response identifying 1210 the anomaly 1212.

One skilled in the art will appreciate that the approaches described herein allow for anomaly 1212 detection and remediation during various stages of a software development pipeline 1202. This increases the chance of identifying and remediating anomalies 1212 prior to deployment, ensuring that customer experience is not negatively impacted by anomalies affecting deployed applications.

Figure 13:
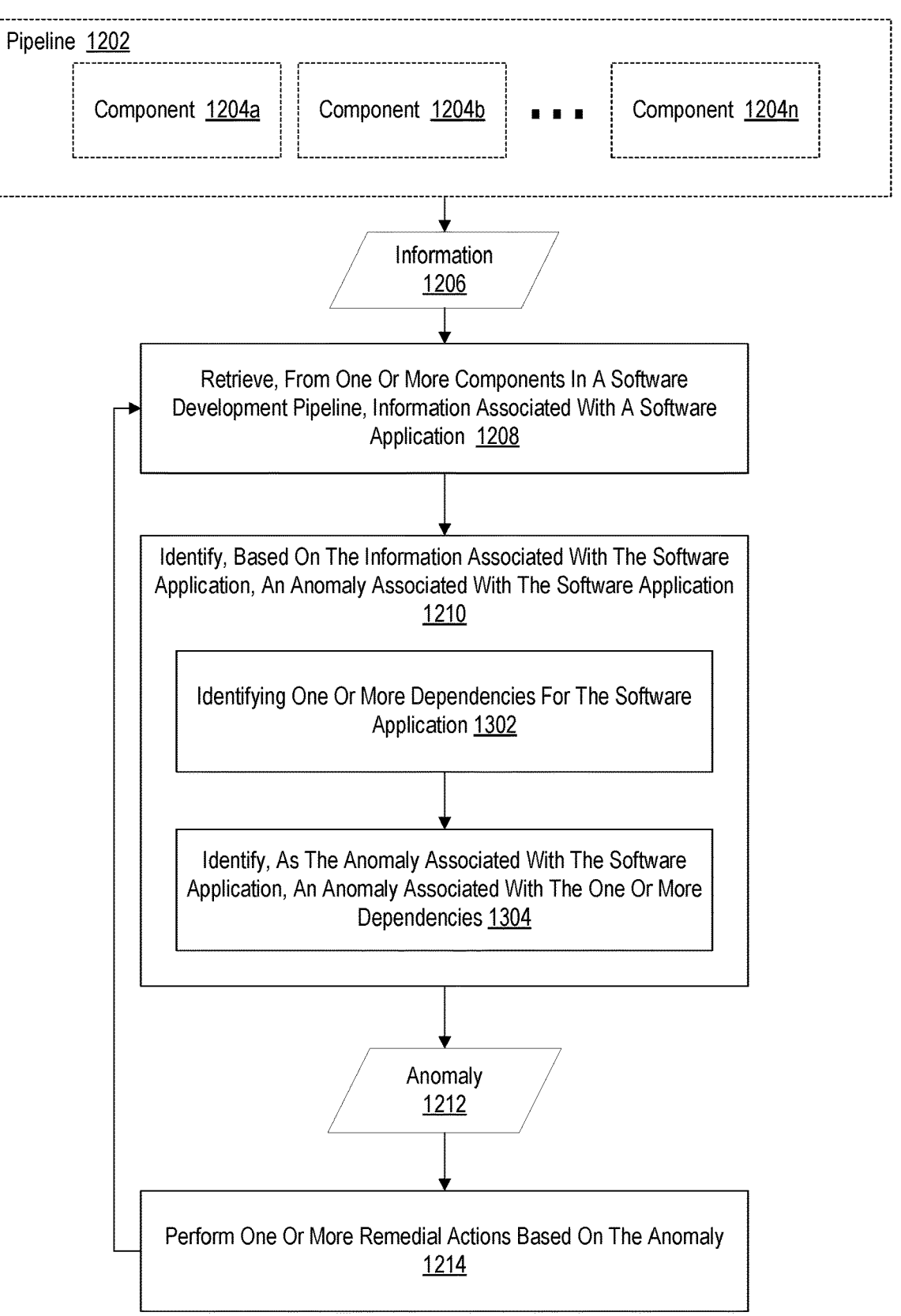
FIG. 13 sets forth a flow chart illustrating another example method of monitoring a software development pipeline in accordance with some embodiments.

For further explanation, FIG. 13 sets forth an additional example method of monitoring a software development pipeline 1202 in accordance with some embodiments of the present disclosure. The example method depicted in FIG. 13 is similar to the example method depicted in FIG. 12, as the method depicted in FIG. 13 also includes: retrieving 1208, from one or more components 1204*a*, 1204*b*, 1204*n* in the software development pipeline 1202, information 1206 associated with a software application; identifying 1210, based on the information 1206 associated with the software application, an anomaly 1212 associated with the software application; and performing 1214 one or more remedial actions based on the anomaly 1212.

The method of FIG. 13 differs from FIG. 12 in that identifying 1210, based on the information 1206 associated with the software application, an anomaly 1212 associated with the software application includes identifying 1302 one or more dependencies for the software application. As an example, in some embodiments, the one or more dependencies include one or more run-time dependencies (e.g., dependencies on other software, services, or resources required during run-time execution of the software application). As another example, in some embodiments, the one or more dependencies include one or more build-time dependencies (e.g., dependencies on other code, libraries, and the like required at build-time in order to compile the software application).

As an example, identifying 1302 the one or more dependencies includes scanning source code for references to libraries, external code resources, and the like that are required for compiling the software application. The scanned source code may include an entire corpus of source code for the software application, or particular subsets of source code such as newly created or modified portions of source code.

The method of FIG. 13 further differs from FIG. 12 in that identifying 1210, based on the information 1206 associated with the software application, an anomaly 1212 associated with the software application includes identifying 1304, as the anomaly 1212 associated with the software application, an anomaly associated with the one or more dependencies. As an example, an anomaly associated with the one or more dependencies may include a newly introduced dependency (e.g., a newly required or identified dependency).

In some embodiments, the anomaly associated with the one or more dependencies may include a vulnerability associated with the one or more dependencies. For example, in some embodiments, a vulnerability scan is performed on code or libraries identified as a build-time dependency. As another example, a build-time dependency may be compared to a repository of known vulnerable libraries in order to identify the vulnerability.

Figure 14:
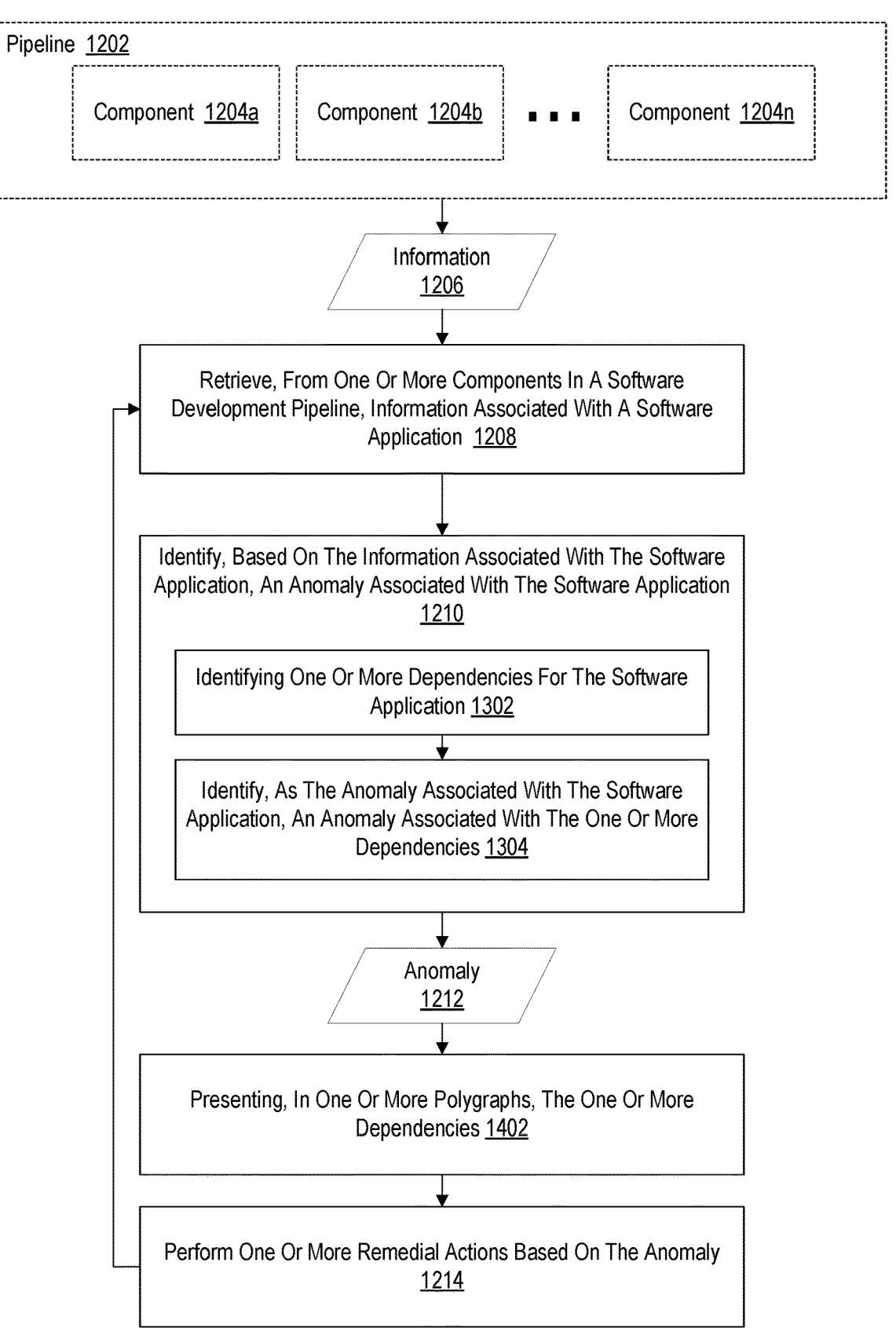
FIG. 14 sets forth a flow chart illustrating another example method of monitoring a software development pipeline in accordance with some embodiments.

For further explanation, FIG. 14 sets forth an additional example method of monitoring a software development pipeline 1202 in accordance with some embodiments of the present disclosure. The example method depicted in FIG. 14 is similar to the example method depicted in FIG. 13, as the method depicted in FIG. 14 also includes: retrieving 1208, from one or more components 1204a, 1204b, 1204n in the software development pipeline 1202, information 1206 associated with a software application; identifying 1210, based on the information 1206 associated with the software application, an anomaly 1212 associated with the software application including: identifying 1302 one or more dependencies for the software application; and identifying 1304, as the anomaly 1212 associated with the software application, an anomaly associated with one or more dependencies; and performing 1214 one or more remedial actions based on the anomaly 1212.

The method of FIG. 14 differs from FIG. 13 in that the method of FIG. 14 also includes presenting 1402, in one or more polygraphs, the one or more dependencies. As is set forth above, a polygraph is a visual representation of particular relationships between entities during a particular time period. Accordingly, the presented polygraph may change to reflect the relationships during different instances in time. Here, the polygraph may identify build-time dependencies for the software application.

For example, a dependency may be represented in the polygraph an icon or user interface element corresponding to a particular library, source code file, or other dependency referenced by the source code of the software application. The polygraph may present relationships using various degrees of granularity. For example, a polygraph may indicate particular containerized applications or services with separate icons for dependencies. The polygraph may also indicate particular source code files or branches, with separate icons for their dependencies. One skilled in the art will appreciate that the software application and its dependencies may be indicated in the polygraph using other degrees of granularity as can be appreciated.

Accordingly, in some embodiments, the performed 1214 remedial action may include presenting an alert within the polygraph. As an example, particular dependencies failing a vulnerability scan or newly introduced dependencies may be highlighted or otherwise indicated in the polygraph.

For example, assume a polygraph indicates the particular software library dependencies for the software application during a selected period in time. Assume that a new dependency is added, resulting in a new icon or indicator in the polygraph. Where this dependency fails a vulnerability test, is introduced by a new or unverified user, or is otherwise anomalous, the user interface element for this particular dependency may be highlighted or otherwise identified in order to indicate the anomaly 1212 to a user.

Although the preceding discussion describes the presentation of build-time dependencies in the context of identifying 1210 an anomaly 1212, one skilled in the art will appreciate that a polygraph of build-time dependencies may be presented independent of identifying 1210 particular anomalies 1212. For example, a polygraph of build-time dependencies may be presented even if no particular anomalies 1212 have been identified, or if no active anomaly 1212 identification is being performed.

Figure 15:
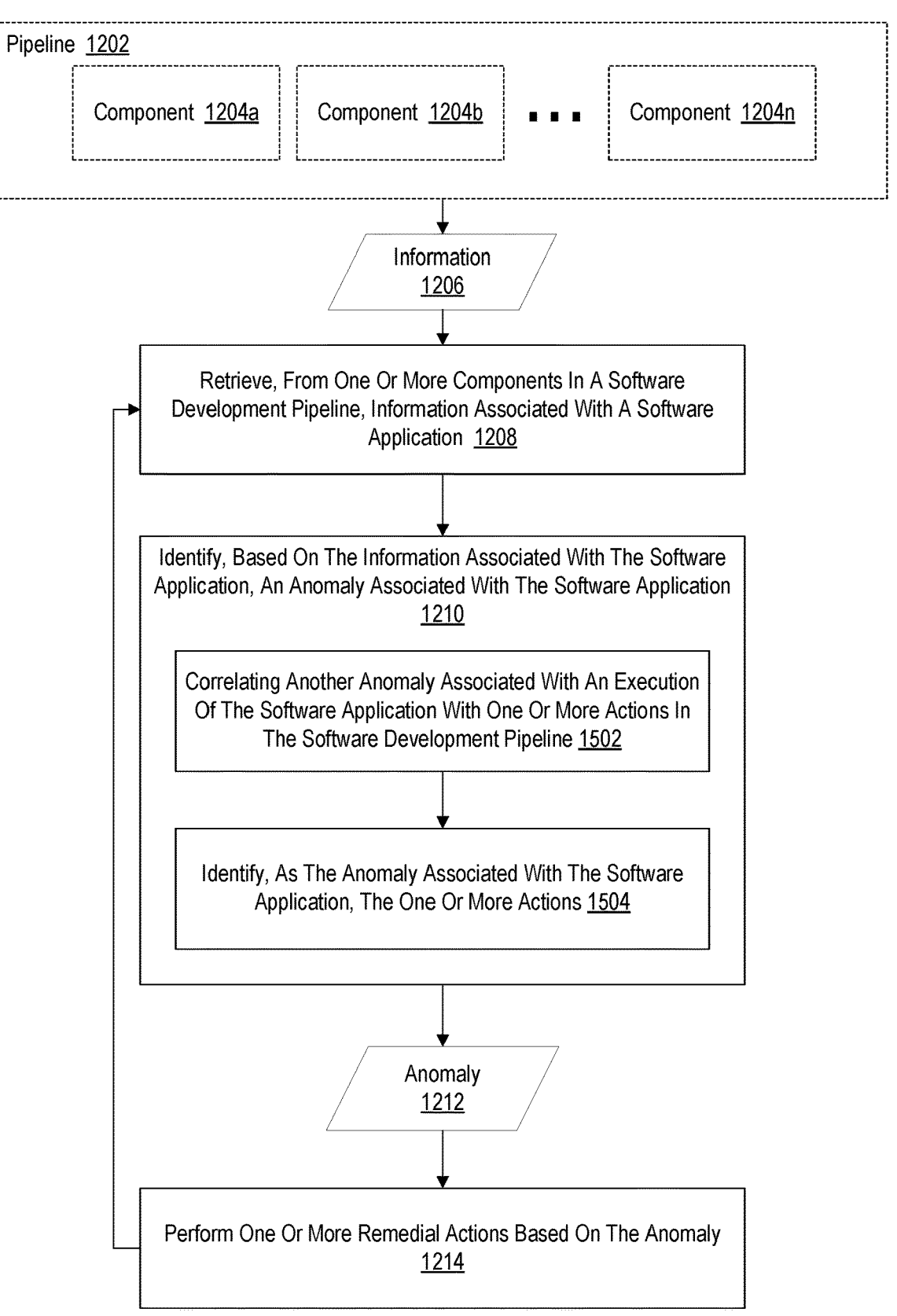
FIG. 15 sets forth a flow chart illustrating another example method of monitoring a software development pipeline in accordance with some embodiments.

For further explanation, FIG. 15 sets forth an additional example method of monitoring a software development pipeline 1202 in accordance with some embodiments of the present disclosure. The example method depicted in FIG. 15 is similar to the example method depicted in FIG. 14, as the method depicted in FIG. 15 also includes: retrieving 1208, from one or more components 1204a, 1204b, 1204n in the software development pipeline 1202, information 1206 associated with a software application; identifying 1210, based on the information 1206 associated with the software application, an anomaly 1212 associated with the software application; and performing 1214 one or more remedial actions based on the anomaly 1212.

The method of FIG. 15 differs from FIG. 14 in that identifying 1210, based on the information 1206 associated with the software application, an anomaly 1212 associated with the software application includes correlating 1502 another anomaly associated with an execution of the software application with one or more actions in the software development pipeline 1202. As is set forth above, such actions may include a user access to a code repository, a code submission or push, a merge of a code branch, a build of the software application, and the like.

The other anomaly associated with the execution of the software application may include any real-time monitored anomaly for an executed and deployed application as is described above. Accordingly, correlating 1502 the other anomaly with the one or more actions in the software development pipeline 1202 may include identifying 1504 the particular one or more actions that were performed prior to the other anomaly being identified or introduced in the executed application, therefore indicating which actions may have caused the introduction of these anomalies. In some embodiments, correlating 1502 the one or more actions may include identifying a sequence of related actions.

For example, assume that, during execution of the software application, a number of external network connections increased, with these increased external network connections being identified as an anomaly. This is due to the increased number of network connections potentially being due to the introduction of malicious code into the software application. The build action for the executed instance of the software application may be identified, and a newly merged branch of code for that build may be identified. This may therefore identify, as the anomaly 1212, a merged branch of code that potentially introduced code allowing for the increased number of network connections.

In some embodiments, a user associated with this newly merged branch of code (e.g., a submitter of the code, a user that requested the merge, and the like) may also be identified. Thus, a suer account that may have introduced malicious code may also be identified. Thus, an anomaly in execution may be traced back through the software development pipeline 1202 to any action that may have introduced a vulnerability or malicious code, potentially back to the user that initially introduced the vulnerability or potentially malicious code.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method of monitoring a software development pipeline, the method comprising:
retrieving information describing actions performed by one or more components during execution of the software application in a software development pipeline;

identifying an anomaly associated with the software application based on the information;
displaying one or more dependencies associated with the software application in a plurality of polygraphs as icons in a user interface, including:
displaying a first polygraph reflects a first relationship between the one or more components during a first instance in time; and
displaying a second polygraph reflects a second relationship between the one or more components during a second instance in time, wherein the first relationship is different than the second relationship; and
displaying an alert icon within a polygraph to identify the anomaly within the one or more dependencies.

2. The method of claim 1 wherein identifying the anomaly associated with the software application further comprises:
identifying the one or more dependencies for the software application; and
identifying, as the anomaly associated with the software application, an anomaly associated with the one or more dependencies.

3. The method of claim 2 wherein the anomaly associated with the one or more dependencies comprises a vulnerability in the one or more dependencies.

4. The method of claim 2 wherein the one or more dependencies for the software application comprise one or more build-time dependencies.

5. The method of claim 1 further comprising blocking deployment of the software application.

6. The method of claim 1 further comprising rolling back a deployment of the software application.

7. The method of claim 1 wherein identifying the anomaly associated with the software application further comprises:
correlating another anomaly associated with an execution of the software application with one or more actions in the software development pipeline; and
identifying, as the anomaly associated with the software application, the one or more actions.

8. The method of claim 1 wherein the information comprises an action performed by each of the one or more components.

9. The method of claim 1 wherein a first icon comprises an application and a second icon comprises a service.

10. The method of claim 1 wherein a first icon comprises a source code file and a second icon comprises a code branch.

11. A system comprising one or more processors to execute one or more instructions, which cause the processor to monitor a software development pipeline, comprising:
retrieving information describing actions performed by one or more components during execution of the software application in the software development pipeline;
identifying an anomaly associated with the software application based on the information;
displaying one or more dependencies associated with the software application in a plurality of polygraphs as icons in a user interface, including:
displaying a first polygraph reflects a first relationship between the one or more components during a first instance in time; and
displaying a second polygraph reflects a second relationship between the one or more components during a second instance in time, wherein the first relationship is different than the second relationship; and
displaying an alert icon within a polygraph to identify the anomaly within the one or more dependencies.

12. The system of claim 11 wherein identifying the anomaly associated with the software application further comprises:

identifying the one or more dependencies for the software application; and identifying, as the anomaly associated with the software application, an anomaly associated with the one or more dependencies.

13. The system of claim 12 wherein the anomaly associated with the one or more dependencies comprises a vulnerability in the one or more dependencies.

14. The system of claim 12 wherein the one or more dependencies for the software application comprise one or more build-time dependencies.

15. The system of claim 11 wherein the one or more processors to execute one or more instructions, which further cause the processors to block deployment of the software application.

16. The system of claim 11 wherein the one or more processors to execute one or more instructions, which further cause the processor to roll back a deployment of the software application.

17. The system of claim 11 wherein identifying the anomaly associated with the software application further comprises:

correlating another anomaly associated with an execution of the software application with one or more actions in the software development pipeline; and identifying, as the anomaly associated with the software application, the one or more actions.

18. The system of claim 11 wherein a first icon comprises an application and a second icon comprises a service.

19. The system of claim 11 wherein a first icon comprises a source code file and a second icon comprises a code branch.

20. A non-transitory machine-readable medium having instructions, which when executed by one or more processors, cause the one or more processors to:

retrieve information describing actions performed by one or more components during execution of a software application in a software development pipeline;

identify an anomaly associated with the software application based on the information;

display one or more dependencies associated with the software application in a plurality of polygraphs as icons in a user interface, including:

displaying a first polygraph reflects a first relationship between the one or more components during a first instance in time; and displaying a second polygraph reflects a second relationship between the one or more components during a second instance in time, wherein the first relationship is different than the second relationship; and display an alert icon within a polygraph to identify the anomaly within the one or more dependencies.

* * * * *